United States Patent
Fujimoto et al.

(10) Patent No.: US 11,193,065 B2
(45) Date of Patent: *Dec. 7, 2021

(54) LIQUID CRYSTAL COMPOSITION, METHOD OF PRODUCING THE SAME, AND RETARDATION FILM CONSTITUTED FROM THE SAME

(71) Applicant: Sumitomo Chemical Company, Limited, Tokyo (JP)

(72) Inventors: Daichi Fujimoto, Osaka (JP); Haruki Okawa, Niihama (JP); Shinnosuke Yoshioka, Osaka (JP); Tatsuaki Kasai, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 156 days.

This patent is subject to a terminal disclaimer.

(21) Appl. No.: 15/492,646

(22) Filed: Apr. 20, 2017

(65) Prior Publication Data
US 2017/0306234 A1    Oct. 26, 2017

(30) Foreign Application Priority Data
Apr. 25, 2016    (JP) .............................. JP2016-087170

(51) Int. Cl.
| | | |
|---|---|---|
| *G02F 1/1333* | (2006.01) | |
| *C09K 19/38* | (2006.01) | |
| *C09K 19/34* | (2006.01) | |
| *C08F 222/24* | (2006.01) | |
| *C09K 19/04* | (2006.01) | |
| *G02B 5/30* | (2006.01) | |

(52) U.S. Cl.
CPC ........ *C09K 19/3861* (2013.01); *C08F 222/24* (2013.01); *C09K 19/34* (2013.01); *C09K 2019/0448* (2013.01); *G02B 5/3016* (2013.01)

(58) Field of Classification Search
CPC ................ C09K 19/3861; C09K 19/34; C09K 2019/0448; C08F 222/24; G02F 1/1333; G02B 5/3016
USPC ........................................................ 526/257
See application file for complete search history.

(56) References Cited

U.S. PATENT DOCUMENTS 10,336,938 B2 *  7/2019  Yoshioka ............ C08F 122/105
2017/0306234 A1 * 10/2017  Fujimoto .............. C08F 222/24

FOREIGN PATENT DOCUMENTS

| JP | 2010-31223 A | 2/2010 | |
|---|---|---|---|
| JP | 2011-207765 A | 10/2011 | |
| JP | 2015-000896 A | 1/2015 | |
| WO | WO 2011155623 | * 12/2011 | ......... C09K 19/3068 |

* cited by examiner

*Primary Examiner* — Geraldina Visconti
(74) *Attorney, Agent, or Firm* — Panitch Schwarze Belisario & Nadel LLP

(57) ABSTRACT

A liquid crystal composition is provided containing a polymerizable liquid crystal compound, the composition having high preservation stability when dissolved in a solvent and also having the ability to restrain the development of orientation defects of the liquid crystal compound. A method of producing such a liquid crystal composition is also provided with ease. The liquid crystal composition includes a first polymerizable liquid crystal compound having five or more ring structures on its principal chain and represented by the following formula (A) and a second polymerizable liquid crystal compound having five or more ring structures and represented by the following formula (B).

17 Claims, No Drawings

LIQUID CRYSTAL COMPOSITION, METHOD OF PRODUCING THE SAME, AND RETARDATION FILM CONSTITUTED FROM THE SAME

BACKGROUND OF THE INVENTION

Field of the Invention

The present invention relates to a liquid crystal composition, a method of producing the liquid crystal composition, and a retardation film constituted from the liquid crystal composition.

Description of the Related Art

As optical films such as a retardation film used for a flat panel display (FPD), there is, for example, an optical film obtained by applying a coating solution prepared by dissolving a polymerizable liquid crystal compound in a solvent, to a support substrate, followed by polymerizing. As the polymerizable liquid crystal compound, for example, nematic liquid crystal compounds have been known that has a bar structure in which 2 to 4 six-membered rings are linked (for example, Handbook of Liquid Crystals edited by Editorial Committee for Handbook of Liquid Crystals, published in 2000, page 312). The retardation film, on the other hand, needs to be capable of converting polarized light in all wavelength regions as one of its properties and such a retardation film is known to be theoretically capable of uniformly conversing polarized light in a wavelength region where inverse wavelength dispersibility is proved by "Re(450)/Re(550)<1" and "Re(650)/Re(550)>1". Polymerizable compounds which can constitute such a retardation film are disclosed in, for example, JP-A-2011-207765.

SUMMARY OF THE INVENTION

When an optical film such as a retardation film is produced using a coating solution like those mentioned above, it is necessary to prepare a coating solution by dissolving a liquid crystal compound in a solvent. However, many polymerizable liquid crystal compounds have poor solubility in various types of solvents resulting from its chemical structure. There is the case where a liquid crystal compound crystallizes and precipitates when storing a coating solution of the liquid crystal compound and the precipitated crystals are a cause of defects of an optical film. Also, a technique that allows introduction of a long-chain alkyl group into a liquid crystal compound to improve the solubility in the solvent is used in general. However, in such a case, the molecular orientation of the liquid crystal compound is disturbed by the introduced substituent, causing the orientation defects of an optical film.

In light of this, it is an object of the present invention to provide a liquid crystal composition which contains a liquid crystal compound and which is superior in preservation stability when dissolved in a solvent and can restrain the development of orientation defects of the liquid crystal compound. Also, the present invention also has an object of providing a method of producing such a liquid crystal composition with ease.

The present invention provides the following preferred aspects.

[1] A liquid crystal composition including a polymerizable liquid crystal compound (A) having five or more ring structures on its principal chain and represented by the formula (A) and a polymerizable liquid crystal compound (B) having five or more ring structures on its principal chain and represented by the formula (B).

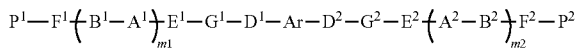

(A)

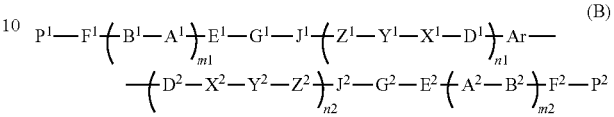

(B)

wherein;

m1, m2, n1, and n2 each independently denote an integer from 0 to 3, wherein the sum of n1 and n2 is 1 to 6, provided that when m1 is an integer of 2 or more, a plurality of $A^1$s and $B^1$s may be respectively the same or different and when m2 is an integer of 2 or more, a plurality of $A^2$s and $B^2$s may be respectively the same or different;

$B^1$, $B^2$, $D^1$, $D^2$, $E^1$, $E^2$, $J^1$, $J^2$, $Y^1$, and $Y^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond, wherein $R^1$ and $R^2$ each independently represent a hydrogen atom, a fluorine atom, or an alkyl group having 1 to 4 carbon atoms;

$A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms, provided that a hydrogen atom contained in the alicyclic hydrocarbon group and aromatic hydrocarbon group is optionally substituted with a halogen atom, —$R^3$, —$OR^4$, cyano group, or nitro group, —$CH_2$— contained in the alicyclic hydrocarbon group is optionally substituted with —O—, —S—, —NH—, or —$NR^5$—, and —CH(—)- contained in the alicyclic hydrocarbon group is optionally substituted with —N(—)-, wherein $R^3$, $R^4$, and $R^5$ each independently represent an alkyl group having 1 to 4 carbon atoms, provided that a hydrogen atom contained in the alkyl group is optionally substituted with a fluorine atom;

$X^1$ and $X^2$ each independently represent a divalent alicyclic hydrocarbon group having 3 to 16 carbon atoms, provided that a hydrogen atom contained in the alicyclic hydrocarbon group is optionally substituted with a halogen atom, —$R^6$, —$OR^7$, cyano group, or nitro group, —$CH_2$— contained in the alicyclic hydrocarbon group is optionally substituted with —O—, —S—, —NH—, or —$NR^8$—, and —CH(—)- contained in the alicyclic hydrocarbon group is optionally substituted with —N(—)-, wherein $R^6$, $R^7$, and $R^8$ each independently represent an alkyl group having 1 to 4 carbon atoms, provided that a hydrogen atom contained in the alkyl group is optionally substituted with a fluorine atom;

$F^1$, $F^2$, $Z^1$, and $Z^2$ each independently represent an alkanediyl group having 1 to 16 carbon atoms or a single bond, provided that a hydrogen atom contained in the alkanediyl group is optionally substituted with —$OR^9$ or a halogen atom and —$CH_2$— contained in the alkanediyl group is optionally replaced with —O— or —CO—, wherein $R^9$ represents an alkyl group having 1 to 4 carbon atoms, provided that a hydrogen atom contained in the alkyl group is optionally substituted with a fluorine atom;

$P^1$ and $P^2$ each independently represent a hydrogen atom or a polymerizable group, wherein at least one of $P^1$ and $P^2$ represents a polymerizable group; and Ar represents a divalent aromatic group which may be substituted, provided that the aromatic group contains at least one of a nitrogen atom, oxygen atom, and sulfur atom.

[2] The liquid crystal composition according to the above [1], wherein the aromatic group in Ar has 10 to 30 π-electrons.

[3] The liquid crystal composition according to the above [1] or [2], the liquid crystal composition having a maximum absorption wavelength ($\lambda_{max}$) of 300 to 400 nm.

[4] The liquid crystal composition according to any one of the above [1] to [3], wherein Ar is an aromatic group having a heteroring.

[5] The liquid crystal composition according to the above [4], wherein the aromatic group having a heteroring is an aromatic group having a benzothiazole group.

[6] The liquid crystal composition according to any one of the above [1] to [5], wherein $G^1$, $G^2$, $X^1$, and $X^2$ are independently a trans-cyclohexane-1,4-diyl group.

[7] The liquid crystal composition according to any one of the above [1] to [6], wherein the area percentage of the polymerizable liquid crystal compound (B) which is measured by gel permeation chromatography (GPC) is 0.1% to 40%.

[8] The liquid crystal composition according to any one of the above [1] to [7], wherein the weight average molecular weight of the polymerizable liquid crystal compound (B) which is measured by gel permeation chromatography (GPC) is 1000 to 3000.

[9] A polymerizable liquid crystal compound (B) having five or more ring structures on its principal chain and represented by the formula (B).

[Chemical 2]

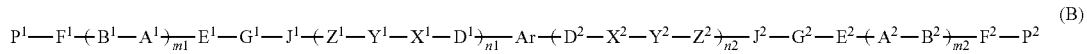

(B)

wherein;

m1, m2, n1, and n2 each independently denote an integer from 0 to 3, wherein the sum of n1 and n2 is 1 to 6, provided that when m1 is an integer of 2 or more, a plurality of $A^1$s and $B^1$s may be respectively the same or different and when m2 is an integer of 2 or more, a plurality of $A^2$s and $B^2$s may be respectively the same or different;

$B^1$, $B^2$, $D^1$, $D^2$, $E^1$, $E^2$, $J^1$, $J^2$, $Y^1$, and $Y^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond, wherein $R^1$ and $R^2$ each independently represent a hydrogen atom, a fluorine atom, or an alkyl group having 1 to 4 carbon atoms;

$A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms, provided that a hydrogen atom contained in the alicyclic hydrocarbon group and aromatic hydrocarbon group is optionally substituted with a halogen atom, —$R^3$, —$OR^4$, cyano group, or nitro group, —$CH_2$— contained in the alicyclic hydrocarbon group is optionally substituted with —O—, —S—, —NH—, or —$NR^5$—, and —CH(—)- contained in the alicyclic hydrocarbon group is optionally substituted with —N(—)-, wherein $R^3$, $R^4$, and $R^5$ each independently represent an alkyl group having 1 to 4 carbon atoms, provided that a hydrogen atom contained in the alkyl group is optionally substituted with a fluorine atom;

$X^1$ and $X^2$ each independently represent a divalent alicyclic hydrocarbon group having 3 to 16 carbon atoms, provided that a hydrogen atom contained in the alicyclic hydrocarbon group is optionally substituted with a halogen atom, —$R^6$, —$OR^7$, cyano group, or nitro group, —$CH_2$— contained in the alicyclic hydrocarbon group is optionally substituted with —O—, —S—, —NH—, or —$NR^8$—, and —CH(—)- contained in the alicyclic hydrocarbon group is optionally substituted with —N(—)-, wherein $R^6$, $R^2$, and $R^8$ each independently represent an alkyl group having 1 to 4 carbon atoms, provided that a hydrogen atom contained in the alkyl group is optionally substituted with a fluorine atom;

$F^1$, $F^2$, $Z^1$, and $Z^2$ each independently represent an alkanediyl group having 1 to 16 carbon atoms or a single bond, provided that a hydrogen atom contained in the alkanediyl group is optionally substituted with —$OR^9$ or a halogen atom and —$CH_2$— contained in the alkanediyl group is optionally replaced with —O— or —CO—, wherein $R^9$ represents an alkyl group having 1 to 4 carbon atoms, provided that a hydrogen atom contained in the alkyl group is optionally substituted with a fluorine atom;

$P^1$ and $P^2$ each independently represent a hydrogen atom or a polymerizable group, wherein at least one of $P^1$ and $P^2$ represents a polymerizable group; and Ar represents a divalent aromatic group which may be substituted, provided that the aromatic group contains at least one of a nitrogen atom, oxygen atom, and sulfur atom.

[10] A retardation film including a polymer of the polymerizable liquid crystal composition kept in an oriented state according to any one of the above [1] to [8].

[11] The retardation film according to the above [10], the retardation film satisfying the formula (1):

$$0.8 \leq Re(450 \text{ nm})/Re(550 \text{ nm}) < 1 \qquad (1)$$

wherein Re (λ) represents a front retardation value for light having a wavelength of λ nm.

[12] A polarizing plate including the retardation film according to the above [10] or [11].

[13] An optical display including the polarizing plate according to the above [12].

[14] A method of producing a liquid crystal composition containing a polymerizable liquid crystal compound (A-1) represented by the formula (A-1) and a polymerizable liquid crystal compound (B-1) represented by the formula (B-1):

[Chemical 3]

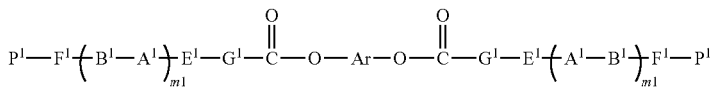
(A-1)

[Chemical 4]

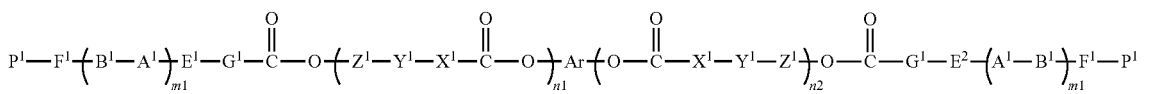
(B-1)

the method including a step of reacting a carboxylic acid compound (C) represented by the formula (C) with a carboxylic acid compound (D) represented by the formula (D) to obtain a mixture containing a carboxylic acid compound E represented by the formula (E) and the carboxylic acid compound (C):

[Chemical 5]

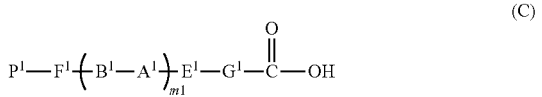
(C)

[Chemical 6]

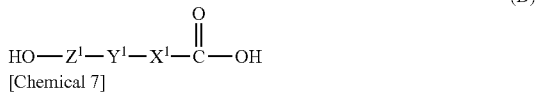
(D)

[Chemical 7]

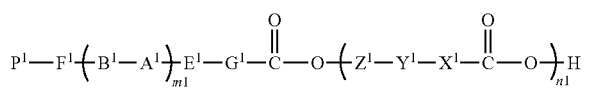
(E)

wherein;

m1, m2, n1, and n2 each independently denote an integer from 0 to 3, wherein the sum of n1 and n2 is 1 to 6, provided that when m1 is an integer of 2 or more, a plurality of $A^1$s and $B^1$s may be respectively the same or different and when m2 is an integer of 2 or more, a plurality of $A^2$s and $B^2$s may be respectively the same or different;

$B^1$, $B^2$, $D^1$, $D^2$, $E^1$, $E^2$, $J^1$, $J^2$, $Y^1$, and $Y^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond, wherein $R^1$ and $R^2$ each independently represent a hydrogen atom, a fluorine atom, or an alkyl group having 1 to 4 carbon atoms;

$A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms, provided that a hydrogen atom contained in the alicyclic hydrocarbon group and aromatic hydrocarbon group is optionally substituted with a halogen atom, —$R^3$, —$OR^4$, cyano group, or nitro group, —$CH_2$— contained in the alicyclic hydrocarbon group is optionally substituted with —O—, —S—, —NH—, or —$NR^5$—, and —CH(—)- contained in the alicyclic hydrocarbon group is optionally substituted with —N(—)-, wherein $R^3$, $R^4$, and $R^5$ each independently represent an alkyl group having 1 to 4 carbon atoms, provided that a hydrogen atom contained in the alkyl group is optionally substituted with a fluorine atom;

$X^1$ and $X^2$ each independently represent a divalent alicyclic hydrocarbon group having 3 to 16 carbon atoms, provided that a hydrogen atom contained in the alicyclic hydrocarbon group is optionally substituted with a halogen atom, —$R^6$, —$OR^2$, cyano group, or nitro group, —$CH_2$— contained in the alicyclic hydrocarbon group is optionally substituted with —O—, —S—, —NH—, or —$NR^8$—, and —CH(—)- contained in the alicyclic hydrocarbon group is optionally substituted with —N(—)-, wherein $R^6$, $R^2$, and $R^8$ each independently represent an alkyl group having 1 to 4 carbon atoms, provided that a hydrogen atom contained in the alkyl group is optionally substituted with a fluorine atom;

$F^1$, $F^2$, $Z^1$, and $Z^2$ each independently represent an alkanediyl group having 1 to 16 carbon atoms or a single bond, provided that a hydrogen atom contained in the alkanediyl group is optionally substituted with —$OR^9$ or a halogen atom and —$CH_2$— contained in the alkanediyl group is optionally replaced with —O— or —CO—, wherein $R^9$ represents an alkyl group having 1 to 4 carbon atoms, provided that a hydrogen atom contained in the alkyl group is optionally substituted with a fluorine atom; and $P^1$ and $P^2$ each independently represent a hydrogen atom or a polymerizable group, wherein at least one of $P^1$ and $P^2$ represents a polymerizable group.

[15] The method according to the above [14], the method including a step of reacting the above mixture containing the carboxylic acid compound (E) and carboxylic acid compound (C) with an alcohol compound (F) represented by the formula (F) to obtain the liquid crystal composition containing the polymerizable liquid crystal compound (A-1) and the polymerizable liquid crystal compound (B-1):

[Chemical 8]

(F)

wherein Ar represents a divalent aromatic group which may be substituted, the aromatic group containing at least one of a nitrogen atom, oxygen atom, and sulfur atom.

[16] The method according to the above [14] or [15], wherein the amount of the carboxylic acid compound (D) based on 1 mol of the carboxylic acid compound (C) is 0.001 to 0.5 mol.

[17] The method according to any one of the above [14] to [16], wherein the reaction between the carboxylic acid compound (C) and the carboxylic acid compound (D) and/or the reaction between the alcohol compound (F) and the mixture containing the carboxylic acid compound (C) and the carboxylic acid compound (E) is undergone in the presence of a condensing agent.

According to the present invention, a liquid crystal composition containing a liquid crystal compound can be provided, the liquid crystal composition having superior preservation stability when it is dissolved in a solvent and the ability to restrain the development of orientation defects of the liquid crystal compound. Also, according to the present invention, a method of producing the liquid crystal composition with ease can be provided.

DETAILED DESCRIPTION OF THE PREFERRED EMBODIMENTS

The liquid crystal composition of the present invention includes a polymerizable liquid crystal compound (A) having five or more ring structures on its principal chain and represented by the formula (A) and a polymerizable liquid crystal compound (B) having five or more ring structures on its principal chain and represented by the formula (B).

[Chemical 9]

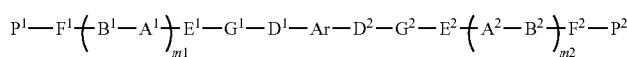

(A)

[Chemical 10]

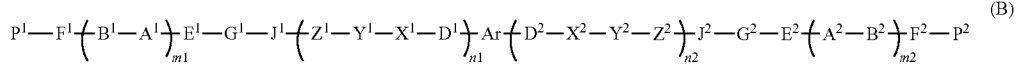

(B)

In the formulae (A) and (B) m1, m2, n1, and n2 each independently denote an integer from 0 to 3, wherein the sum of n1 and n2 is 1 to 6, provided that when m1 is an integer of 2 or more, a plurality of $A^1$s and $B^1$s may be respectively the same or different and when m2 is an integer of 2 or more, a plurality of $A^2$s and $B^2$s may be respectively the same or different;

$B^1$, $B^2$, $D^1$, $D^2$, $E^1$, $E^2$, $J^1$, $J^2$, $Y^1$, and $Y^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond, wherein $R^1$ and $R^2$ each independently represent a hydrogen atom, a fluorine atom, or an alkyl group having 1 to 4 carbon atoms;

$A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms, provided that a hydrogen atom contained in the alicyclic hydrocarbon group and aromatic hydrocarbon group is optionally substituted with a halogen atom, —$R^3$, cyano group, or nitro group, —$CH_2$— contained in the alicyclic hydrocarbon group is optionally substituted with —O—, —S—, —NH—, or —$NR^5$—, and —CH(—)- contained in the alicyclic hydrocarbon group is optionally substituted with —N(—)- wherein $R^3$, $R^4$, and $R^5$ each independently represent an alkyl group having 1 to 4 carbon atoms, provided that a hydrogen atom contained in the alkyl group is optionally substituted with a fluorine atom;

$X^1$ and $X^2$ each independently represent a divalent alicyclic hydrocarbon group having 3 to 16 carbon atoms, provided that a hydrogen atom contained in the alicyclic hydrocarbon group is optionally substituted with a halogen atom, —$R^6$, —$OR^7$, cyano group, or nitro group, —$CH_2$— contained in the alicyclic hydrocarbon group is optionally substituted with —O—, —S—, —NH—, or —$NR^8$—, and —CH(—)- contained in the alicyclic hydrocarbon group is optionally substituted with —N(—)-, wherein $R^6$, $R^7$, and $R^8$ each independently represent an alkyl group having 1 to 4 carbon atoms, provided that a hydrogen atom contained in the alkyl group is optionally substituted with a fluorine atom;

$F^1$, $F^2$, $Z^1$, and $Z^2$ each independently represent an alkanediyl group having 1 to 16 carbon atoms or a single bond, provided that a hydrogen atom contained in the alkanediyl group is optionally substituted with —$OR^9$ or a halogen atom and —$CH_2$— contained in the alkanediyl group is optionally replaced with —O— or —CO—, wherein $R^9$ represents an alkyl group having 1 to 4 carbon atoms, provided that a hydrogen atom contained in the alkyl group is optionally substituted with a fluorine atom;

$P^1$ and $P^2$ each independently represent a hydrogen atom or a polymerizable group, wherein at least one of $P^1$ and $P^2$ represents a polymerizable group; and Ar represents a divalent aromatic group which may be substituted, provided that the aromatic group contains at least one of a nitrogen atom, oxygen atom, and sulfur atom.

In the formulae (A) and (B), the divalent aromatic group represented by Ar contains at least one of a nitrogen atom, oxygen atom, and sulfur atom and preferably two or more of them. The description that the divalent aromatic group represented by Ar contains at least one of a nitrogen atom, oxygen atom, and sulfur atom means that it is only required to contain these heteroatoms in Ar and Ar either may have or may not have a heteroring. The divalent aromatic group represented by Ar is preferably an aromatic group having a heteroring from the viewpoint of developing the inverse wavelength dispersibility of a retardation film obtained from the above liquid crystal composition. Examples of these divalent aromatic groups include aromatic groups having a furan ring, benzofuran ring, pyrrole ring, thiophene ring, pyridine ring, thiazole ring, benzothiazole ring, phenanthroline ring, or the like. Among these groups, the aromatic group having a heteroring is more preferably an aromatic group having a benzene ring, thiazole ring, or benzothiazole ring and even more preferably an aromatic ring having a benzothiazole group from the viewpoint of production. Also, a nitrogen atom contained in the aromatic ring of Ar preferably contains a π-electron.

The total number of π-electrons contained in the aromatic ring is preferably 10 or more, more preferably 12 or more, even more preferably 14 or more, preferably 30 or less and more preferably 25 or less from the viewpoint of developing the inverse wavelength dispersibility of a retardation film obtained from the above liquid crystal composition.

Examples of the aromatic ring represented by Ar include the following groups.

[Chemical 11]
(Ar-1)
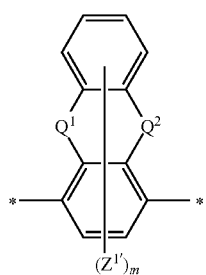
(Ar-2)
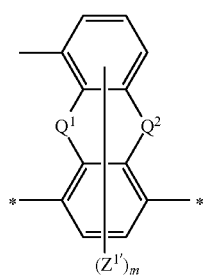
(Ar-3)
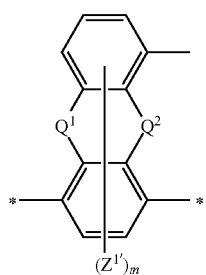
(Ar-4)
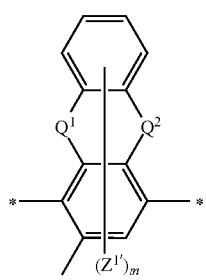
(Ar-5)
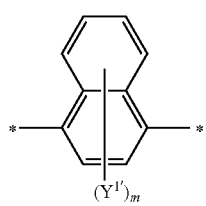
(Ar-6)
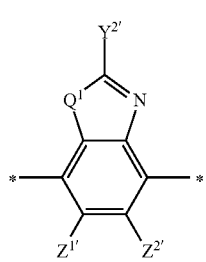
(Ar-7)
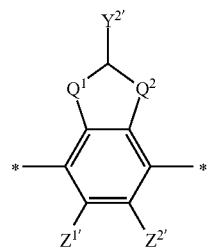
(Ar-8)
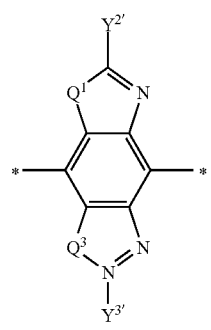
(Ar-9)
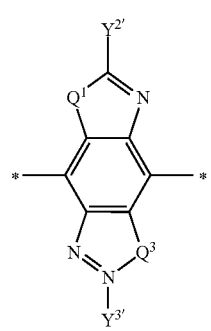
(Ar-10)
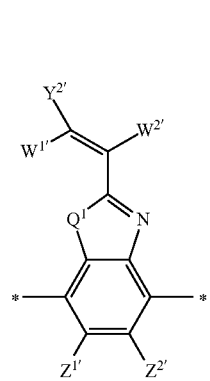
(Ar-11)
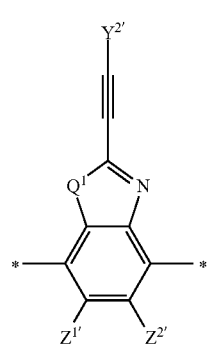

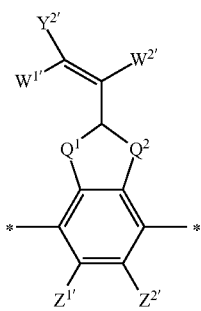
(Ar-12)

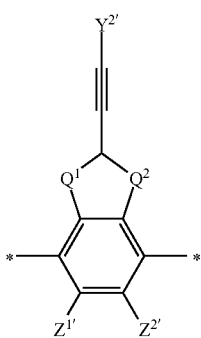
(Ar-13)

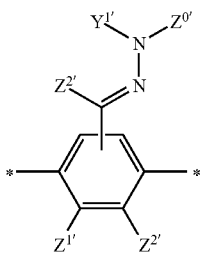
(Ar-14)

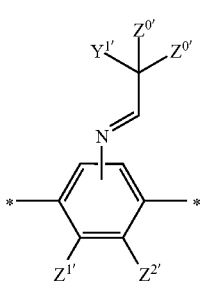
(Ar-15)

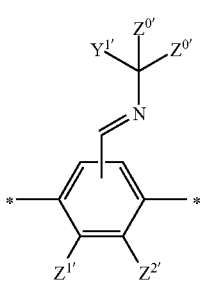
(Ar-16)

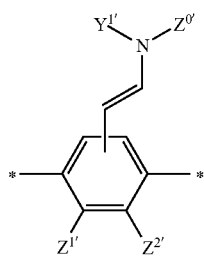
(Ar-17)

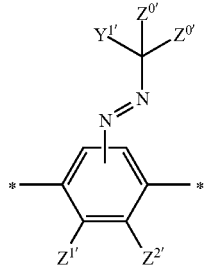
(Ar-18)

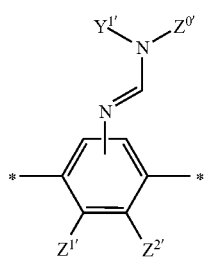
(Ar-19)

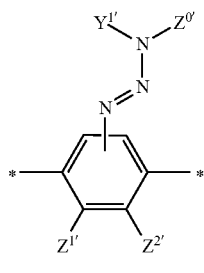
(Ar-20)

In the formulae (Ar-1) and (Ar-20), the (*) portion represents a connecting part, $Z^{0'}$, $Z^{1'}$, and $Z^{2'}$ each independently represent a hydrogen atom, a halogen atom, an alkyl group having 1 to 6 carbon atoms, a cyano group, a nitro group, an alkylsulfinyl group having 1 to 6 carbon atoms, an alkylsulfonyl group having 1 to 6 carbon atoms, a carboxyl group, a fluoroalkyl group having 1 to 6 carbon atoms, an alkoxy group having 1 to 6 carbon atoms, an alkylthio group having 1 to 6 carbon atoms, a N-alkylamino group having 1 to 6 carbon atoms, an N,N-dialkylamino group having 2 to 12 carbon atoms, a N-alkylsulfamoyl group having 1 to 6 carbon atoms, or a N,N-dialkylsulfamoyl group having 2 to 12 carbon atoms.

$Q^1$, $Q^2$, and $Q^3$ each independently represent —$CR^{10}R^{11}$—, —S—, —$NR^{12}$—, —CO—, or —O—.

$R^{10}$, $R^{11}$, and $R^{12}$ each independently represent a hydrogen atom or an alkyl group having 1 to 4 carbon atoms.

$Y^{1'}$, $Y^{2'}$, and $Y^{3'}$ each independently represent an aromatic hydrocarbon group which may be substituted or an aromatic heterocyclic group.

W1' and W2' each independently represent a hydrogen atom, a cyano group, a methyl group, or a halogen atom.

m denotes an integer from 0 to 6.

Examples of the halogen atom include a fluorine atom, chlorine atom, bromine atom, and iodine atom, among which, a fluorine atom, chlorine atom, and bromine atom are preferable.

Examples of the alkyl group having 1 to 6 carbon atoms include a methyl group, ethyl group, propyl group, isopropyl group, butyl group, isobutyl group, sec-butyl group, tert-butyl group, pentyl group, and hexyl group, among which, alkyl groups having 1 to 4 carbon atoms are preferable, alkyl groups having 1 to 2 carbon atoms are more preferable, and a methyl group is particularly preferable.

Examples of the alkylsulfinyl group having 1 to 6 carbon atoms include a methylsulfinyl group, ethylsulfinyl group, propylsulfinyl group, isopropylsulfinyl group, butylsulfinyl group, isobutylsulfinyl group, sec-butylsulfinyl group, tert-butylsulfinyl group, pentylsulfinyl group, and hexylsulfinyl group, among which, alkylsulfinyl groups having 1 to 4 carbon atoms are preferable, alkylsulfinyl groups having 1 to 2 carbon atoms are more preferable, and a methylsulfinyl group is particularly preferable.

Examples of the alkylsulfonyl group having 1 to 6 carbon atoms include a methylsulfonyl group, ethylsulfonyl group, propylsulfonyl group, isopropylsulfonyl group, butylsulfonyl group, isobutylsulfonyl group, sec-butylsulfonyl group, tert-butylsulfonyl group, pentylsulfonyl group, and hexylsulfonyl group, among which, alkylsulfonyl groups having 1 to 4 carbon atoms are preferable, alkylsulfonyl groups having 1 to 2 carbon atoms are more preferable, and a methylsulfonyl group is particularly preferable.

Examples of the fluoroalkyl group having 1 to 6 carbon atoms include a fluoromethyl group, trifluoromethyl group, fluoroethyl group, pentafluoroethyl group, heptafluoropropyl group, and nonafluorobutyl group, among which, fluoroalkyl groups having 1 to 4 carbon atoms are preferable, fluoroalkyl groups having 1 to 2 carbon atoms are more preferable, and a trifluoromethyl group is particularly preferable.

Examples of the alkoxy group having 1 to 6 carbon atoms include a methoxy group, ethoxy group, propoxy group, isopropoxy group, butoxy group, isobutoxy group, sec-butoxy group, tert-butoxy group, pentyloxy group, and hexyloxy group, among which alkoxy groups having 1 to 4 carbon atoms are preferable, alkoxy groups having 1 to 2 carbon atoms are more preferable, and a methoxy group is particularly preferable.

Examples of the alkylthio group having 1 to 6 carbon atoms include a methylthio group, ethylthio group, propylthio group, isopropylthio group, butylthio group, isobutylthio group, sec-butylthio group, tert-butylthio group, pentylthio group, and hexylthio group, among which, alkylthio groups having 1 to 4 carbon atoms are preferable, alkylthio groups having 1 to 2 carbon atoms are more preferable, and a methylthio group is particularly preferable.

Examples of the N-alkylamino group having 1 to 6 carbon atoms include a N-methylamino group, N-ethylamino group, N-propylamino group, N-isopropylamino group, N-butylamino group, N-isobutylamino group, N-sec-butylamino group, N-tert-butylamino group, N-pentylamino group, and N-hexylamino group, among which, N-alkylamino groups having 1 to 4 carbon atoms are preferable, N-alkylamino groups having 1 to 2 carbon atoms are more preferable, and a N-methylamino group is particularly preferable.

Examples of the N,N-dialkylamino group having 2 to 12 carbon atoms include a N,N-dimethylamino group, N-methyl-N-ethylamino group, N,N-diethylamino group, N,N-dipropylamino group, N,N-diisopropylamino group, N,N-dibutylamino group, N,N-diisobutylamino group, N,N-dipentylamino group, and N,N-dihexylamino group, among which, N,N-dialkylamino groups having 2 to 8 carbon atoms are preferable, N,N-dialkylamino groups having 2 to 4 carbon atoms are more preferable, and a N,N-dimethylamino group is particularly preferable.

Examples of the N-alkylsulfamoyl group having 1 to 6 carbon atoms include a N-methylsulfamoyl group, N-ethylsulfamoyl group, N-propylsulfamoyl group, N-isopropylsulfamoyl group, N-butylsulfamoyl group, N-isobutylsulfamoyl group, N-sec-butylsulfamoyl group, N-tert-butylsulfamoyl group, N-pentylsulfamoyl group, and N-hexylsulfamoyl group, among which, N-alkylsulfamoyl groups having 1 to 4 carbon atoms are preferable, N-alkylsulfamoyl groups having 1 to 2 carbon atoms are more preferable, and N-methylsulfamoyl group is particularly preferable.

Examples of the N,N-dialkylsulfamoyl group having 2 to 12 carbon atoms include a N,N-dimethylsulfamoyl group, N-methyl-N-ethylsulfamoyl group, N,N-diethylsulfamoyl group, N,N-dipropylsulfamoyl group, N,N-diisopropylsulfamoyl group, N,N-dibutylsulfamoyl group, N,N-diisobutylsulfamoyl group, N,N-dipentylsulfamoyl group, and N,N-dihexylsulfamoyl group, among which, N,N-dialkylsulfamoyl groups having 2 to 8 carbon atoms are preferable, N,N-dialkylsulfamoyl groups having 2 to 4 carbon atoms are more preferable, and N,N-dimethylsulfamoyl group is particularly preferable.

$Z^{0\prime}$, $Z^{1\prime}$, and $Z^{2\prime}$ are each independently preferably a hydrogen atom, a halogen atom, a methyl group, a cyano group, a nitro group, a carboxyl group, a methylsulfonyl group, a trifluoromethyl group, a methoxy group, a methylthio group, a N-methylamino group, a N,N-dimethylamino group, a N-methylsulfamoyl group, or a N,N-dimethylsulfamoyl group.

Examples of the alkyl group having 1 to 4 carbon atoms in $R^{10}$, $R^{11}$, and $R^{12}$ include a methyl group, ethyl group, propyl group, isopropyl group, butyl group, isobutyl group, and tert-butyl group, among which, alkyl groups having 1 to 2 carbon atoms are preferable and a methyl group is more preferable.

$Q^1$ and $Q^2$ are each independently preferably —S—, —CO—, —NH—, or —N(CH$_3$)— and $Q^3$ is preferably —S— or —CO—.

Examples of the aromatic hydrocarbon group in $Y^{1\prime}$, $Y^{2\prime}$, and $Y^{3\prime}$ include aromatic hydrocarbon groups having 6 to 20 carbon atoms such as a phenyl group, naphthyl group, anthryl group, phenanthryl group, and biphenyl group, among which, a phenyl group and naphthyl group are preferable and a phenyl group is more preferable. Examples of the aromatic heterocyclic group include aromatic heterocyclic groups which each contain at least one hetero atoms such as a nitrogen atom, oxygen atom, and sulfur atom and have 4 to 20 carbon atoms, and a furyl group, pyrrolyl group, thienyl group, pyridinyl group, thiazolyl group, and benzothiazolyl group are preferable.

The aromatic hydrocarbon group and aromatic heterocyclic group may have at least one substituent. Examples of the substituent include halogen atoms, alkyl groups having 1 to 6 carbon atoms, cyano group, nitro group, alkylsulfinyl groups having 1 to 6 carbon atoms, alkylsulfonyl groups having 1 to 6 carbon atoms, carboxyl groups, fluoroalkyl groups having 1 to 6 carbon atoms, alkoxy groups having 1 to 6 carbon atoms, alkylthio groups having 1 to 6 carbon atoms, alkylamino groups having 1 to 6 carbon atoms, N,N-dialkylamino groups having 2 to 12 carbon atoms, N-alkylsulfamoyl groups having 1 to 6 carbon atoms, and N,N-dialkylsulfamoyl groups having 2 to 12 carbon atoms, among which, halogen atoms, alkyl groups having 1 to 2 carbon atoms, cyano group, nitro group, alkylsulfonyl groups having 1 to 2 carbon atoms, fluoroalkyl groups having 1 to 2 carbon atoms, alkoxy groups having 1 to 2 carbon atoms, alkylthio groups having 1 to 2 carbon atoms, N-alkylamino groups having 1 to 2 carbon atoms, N,N-dialkylamino groups having 2 to 4 carbon atoms, and alkylsulfamoyl groups having 1 to 2 carbon atoms are preferable.

Examples of the halogen atom, alkyl group having 1 to 6 carbon atoms, cyano group, nitro group, alkylsulfinyl group having 1 to 6 carbon atoms, alkylsulfonyl group having 1 to 6 carbon atoms, carboxyl group, fluoroalkyl group having 1 to 6 carbon atoms, alkoxy group having 1 to 6 carbon atoms, alkylthio group having 1 to 6 carbon atoms, alkylamino group having 1 to 6 carbon atoms, N,N-dialkylamino group having 2 to 12 carbon atoms, N-alkylsulfamoyl group having 1 to 6 carbon atoms, and N,N-dialkylsulfamoyl group having 2 to 12 carbon atoms include the same ones as those mentioned above.

Among the formulae (Ar-14) to (Ar-20), the formulae (Ar-6) and (Ar-7) are preferable from the viewpoint of molecular stability.

In the formulae (Ar-14) to (Ar-20), $Y^{1\prime}$ may form an aromatic heterocyclic group together with a nitrogen atom and $Z^{0\prime}$ to be combined therewith. Examples of $Y^{1\prime}$ include a pyrrole ring, imidazole ring, pyridine ring, pyrimidine ring, indole ring, quinoline ring, isoquinoline ring, purine ring, pyrrolidine ring, and piperidine ring. This aromatic heterocyclic group may have a substituent. Also, $Y^{1\prime}$ may be a polycyclic aromatic hydrocarbon group or polycyclic aromatic heterocyclic group which contains a nitrogen atom or $Z^{0\prime}$ to be combined therewith and may be substituted as will be mentioned later.

$Y^{1\prime}$, $Y^{2\prime}$, and $Y^{3\prime}$ may be each independently a polycyclic aromatic hydrocarbon group or polycyclic aromatic heterocyclic group which may be substituted. The polycyclic aromatic hydrocarbon group means a fused polycyclic aromatic hydrocarbon group or a group derived from an aromatic ring aggregate. The polycyclic aromatic heterocyclic hydrocarbon group means a fused polycyclic aromatic heterocyclic hydrocarbon group or a group derived from an aromatic ring aggregate. For example, $Y^{1\prime}$, $Y^{2\prime}$, and $Y^{3\prime}$ are each independently preferably any one of the groups represented by the formulae $(Y^1\text{-}1)$ to $(Y^1\text{-}7)$ and more preferably any one of the groups represented by the formula $(Y^1\text{-}1)$ or $(Y^1\text{-}4)$.

[Chemical 12]

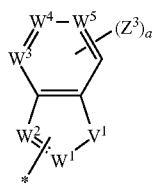
(Y¹-1)

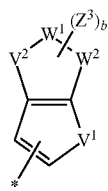
(Y¹-2)

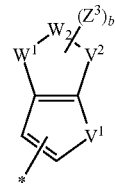
(Y¹-3)

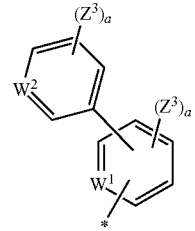
(Y¹-4)

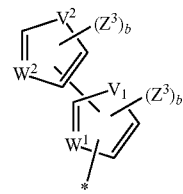
(Y¹-5)

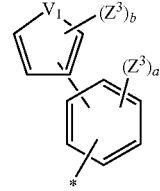
(Y¹-6)

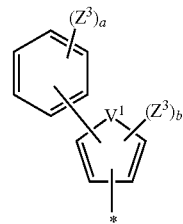
(Y¹-7)

In the formulae $(Y^1\text{-}1)$ to $(Y^1\text{-}7)$, the (*) portion represents a connecting part, $Z^3$s each independently represent a halogen atom, an alkyl group having 1 to 6 carbon atoms, a cyano group, a nitro group, a nitroxide group, a sulfone group, a sulfoxide group, a carboxyl group, a fluoroalkyl group having 1 to 6 carbon atoms, an alkoxy group having 1 to 6 carbon atoms, a thioalkyl group having 1 to 6 carbon atoms, a N,N-dialkylamino group having 2 to 8 carbon atoms, or a N-alkylamino group having 1 to 4 carbon atoms.

$V^1$ and $V^2$ each independently represent —CO—, —S—, —NR$^{13}$—, —O—, —Se—, or —SO$_2$—.

$W^1$ to $W^5$ each independently represent —C= or —N=.

In this case, at least one of $V^1$, $V^2$ and $W^1$ to $W^5$ represent a group containing S, N, O, or Se.

$R^{13}$ represents a hydrogen atom or an alkyl group having 1 to 4 carbon atoms.

"a"s each independently denote an integer from 0 to 3.

"b"s each independently denote an integer from 0 to 2.

Any one of the groups represented by the formulae $(Y^1\text{-}1)$ to $(Y^1\text{-}7)$ is preferably any one the groups represented by the formulae (Y²-1) to (Y²-16), more preferably any one the groups represented by the formulae (Y³-1) to (Y³-6), and even more preferably any one of the groups represented by the formulae (Y³-1) to (Y³-3). In this case, the (*) portion represents a connecting part.
[Chemical 13]
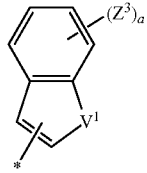 (Y²-1)
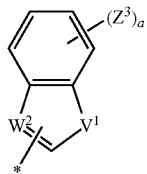 (Y²-2)
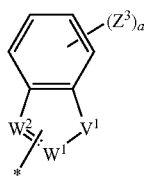 (Y²-3)
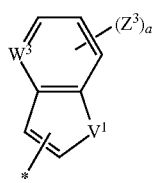 (Y²-4)
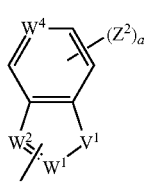 (Y²-5)
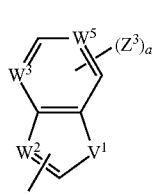 (Y²-6)
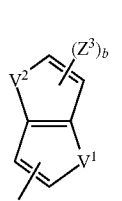 (Y²-7)
-continued
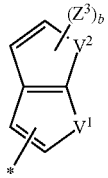 (Y²-8)
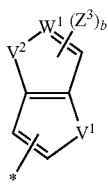 (Y²-9)
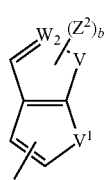 (Y²-10)
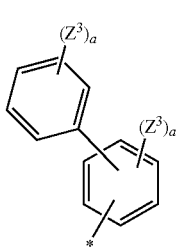 (Y²-11)
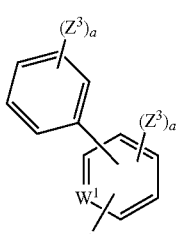 (Y²-12)
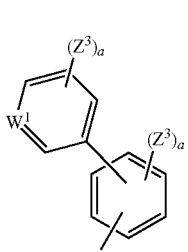 (Y²-13)
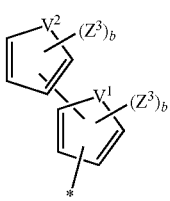 (Y²-14)

-continued

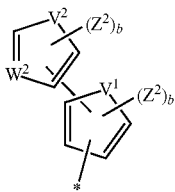
(Y²-15)

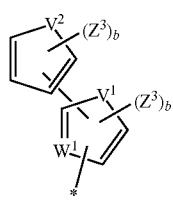
(Y²-16)

In the formulae (Y²-1) to (Y²-16), $Z^3$, a, b, $V^2$, and $W^1$ to $W^5$ each independently represent the same meaning as above.

[Chemical 14]

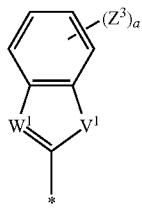
(Y³-1)

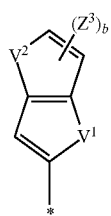
(Y³-2)

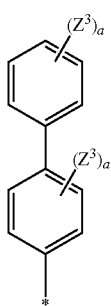
(Y³-3)

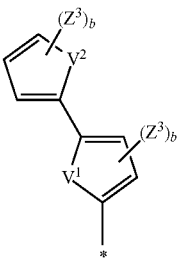
(Y³-4)

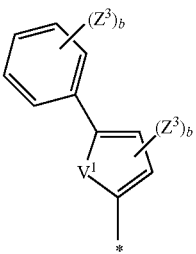
(Y³-5)

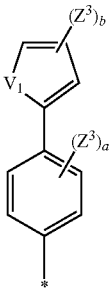
(Y³-6)

In the formulae (Y³-1) to (Y³-6), $Z^3$, a, b, $V^1$, $V^2$, and $W^1$ each independently represent the same meaning as above.

Examples of $Z^3$ include halogen atoms, alkyl groups having 1 to 6 carbon atoms, cyano group, nitro group, alkylsulfinyl groups having 1 to 6 carbon atoms, alkylsulfonyl groups having 1 to 6 carbon atoms, carboxyl group, fluoroalkyl groups having 1 to 6 carbon atoms, alkoxy groups having 1 to 6 carbon atoms, alkylthio groups having 1 to 6 carbon atoms, N-alkylamino groups having 1 to 6 carbon atoms, N,N-dialkylamino groups having 2 to 12 carbon atoms, N-alkylsulfamoyl groups having 1 to 6 carbon atoms, and N,N-dialkylsulfamoyl groups having 2 to 12 carbon atoms. Among these groups, halogen atoms, methyl group, ethyl group, isopropyl group, sec-butyl group, cyano group, nitro group, sulfone group, nitroxide group, carboxyl group, trifluoromethyl group, methoxy group, thiomethyl group, N,N-dimethylamino group, or N-methylamino group are preferable, halogen atoms, methyl group, ethyl group, isopropyl group, sec-butyl group, cyano group, nitro group, and trifluoromethyl group are more preferable, and a methyl group, ethyl group, isopropyl group, sec-butyl group, pentyl group, and hexyl group are particularly preferable.

Examples of the halogen atoms, alkyl groups having 1 to 6 carbon atoms, alkylsulfinyl groups having 1 to 6 carbon atoms, alkylsulfonyl groups having 1 to 6 carbon atoms, fluoroalkyl groups having 1 to 6 carbon atoms, alkoxy groups having 1 to 6 carbon atoms, alkylthio groups having 1 to 6 carbon atoms, N-alkylamino groups having 1 to 6 carbon atoms, N,N-dialkylamino groups having 2 to 12 carbon atoms, N-alkylsulfamoyl groups having 1 to 6 carbon atoms, and N,N-dialkylsulfamoyl groups having 2 to 12 carbon atoms include the same ones as those mentioned above.

$V^1$ and $V^2$ each independently preferably represent —S—, —NR$^{13}$—, or —O—.

$W^1$ to $W^5$ each independently preferably represent —C= or —N=.

In this case, at least one of $V^1$, $V^2$ and $W^1$ to $W^5$ preferably represent a group containing S, N, or O.

"a" is preferably 0 or 1. "b" is preferably 0.

Examples of $Y^{1\prime}$ to $Y^{3\prime}$ include groups represented by the formulae (ar-1) to (ar-840). In this case, the (*) portion represents a connecting portion.

[Chemical 15]

(ar-001)

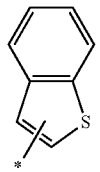

(ar-002)

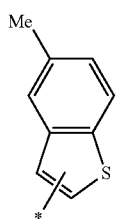

(ar-003)

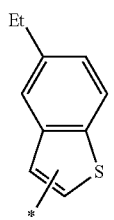

(ar-004)

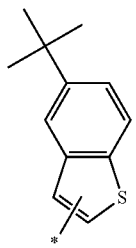

(ar-005)

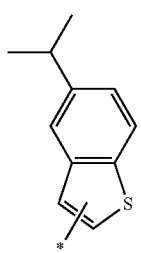

-continued (ar-006)

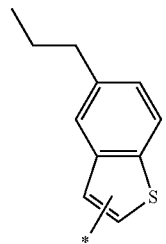

(ar-007)

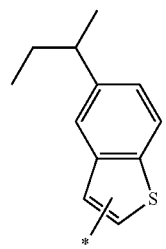

[Chemical 16]

(ar-008)

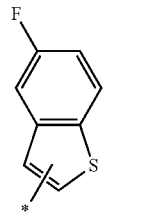

(ar-009)

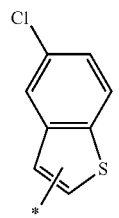

(ar-010)

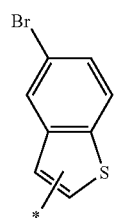

(ar-011)

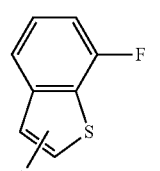

(ar-012)

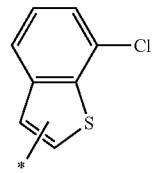

-continued
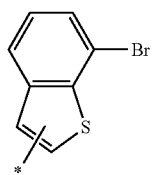 (ar-013)
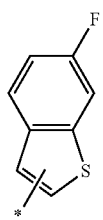 (ar-014)
[Chemical 17]
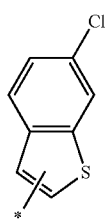 (ar-015)
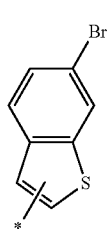 (ar-016)
 (ar-017)
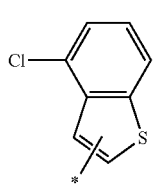 (ar-018)
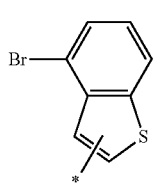 (ar-019)
-continued
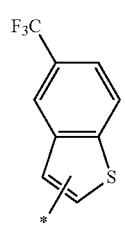 (ar-020)
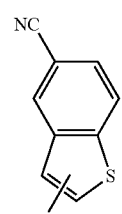 (ar-021)
[Chemical 18]
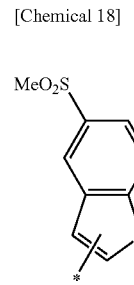 (ar-022)
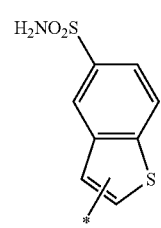 (ar-023)
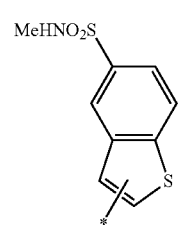 (ar-024)
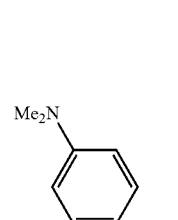 (ar-025)

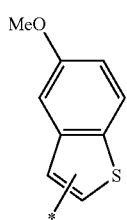 (ar-026)
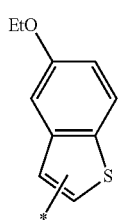 (ar-027)
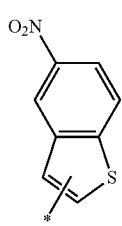 (ar-028)
[Chemical 19]
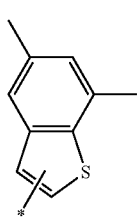 (ar-029)
 (ar-030)
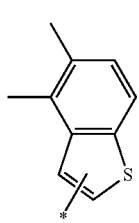 (ar-031)
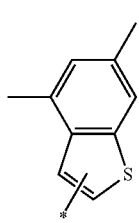 (ar-032)
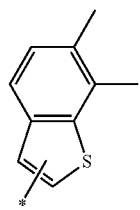 (ar-033)
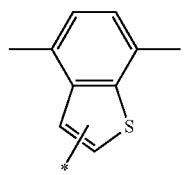 (ar-034)
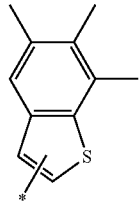 (ar-035)
[Chemical 20]
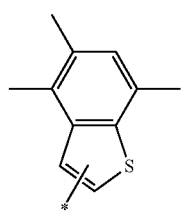 (ar-036)
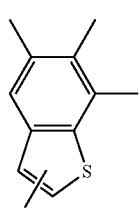 (ar-037)
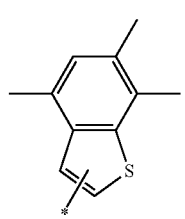 (ar-038)
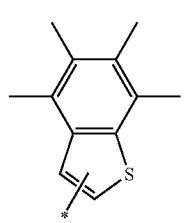 (ar-039)

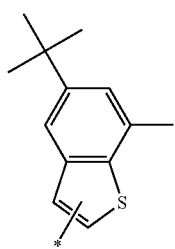 (ar-040)
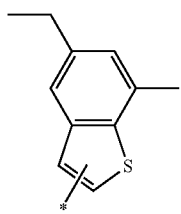 (ar-041)
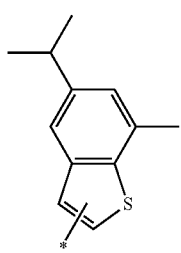 (ar-042)
[Chemical 21]
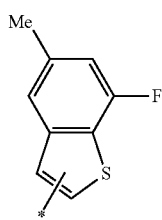 (ar-043)
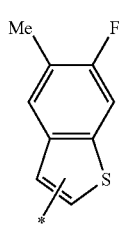 (ar-044)
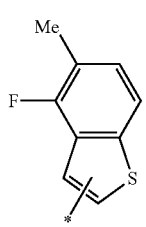 (ar-045)
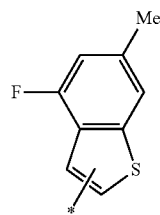 (ar-046)
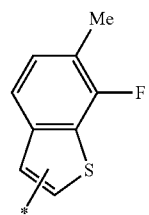 (ar-047)
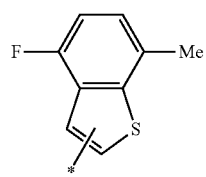 (ar-048)
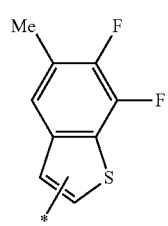 (ar-049)
[Chemical 22]
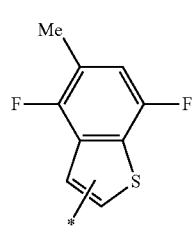 (ar-050)
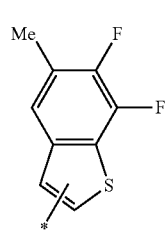 (ar-051)
(ar-052)

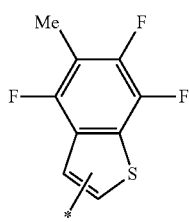 (ar-053)
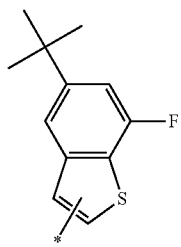 (ar-054)
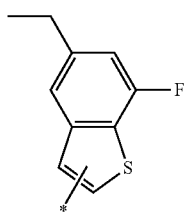 (ar-055)
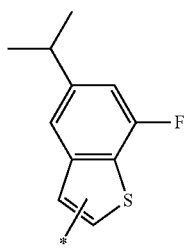 (ar-056)
[Chemical 23]
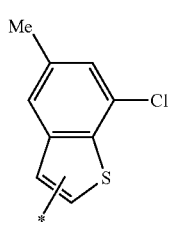 (ar-057)
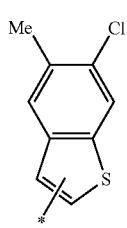 (ar-058)
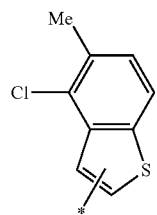 (ar-059)
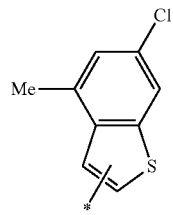 (ar-060)
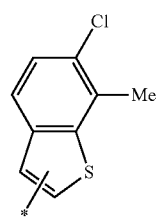 (ar-061)
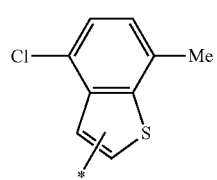 (ar-062)
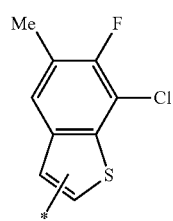 (ar-063)
[Chemical 24]
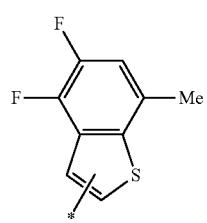 (ar-064)
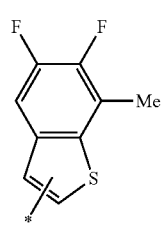 (ar-065)

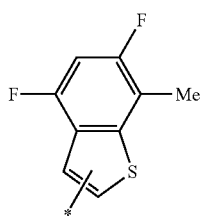
(ar-066)
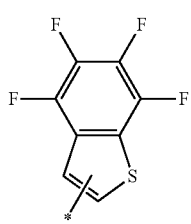
(ar-067)
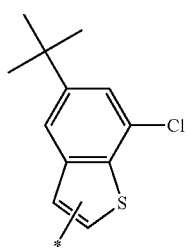
(ar-068)
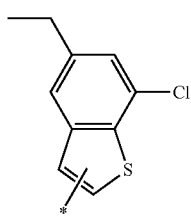
(ar-069)
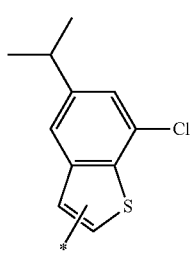
(ar-070)
[Chemical 25]
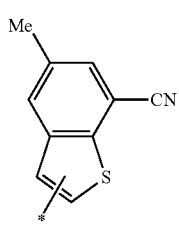
(ar-071)
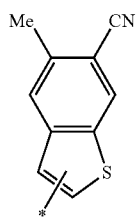
(ar-072)
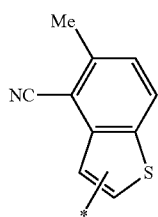
(ar-073)
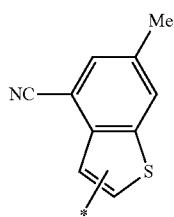
(ar-074)
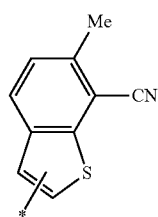
(ar-075)
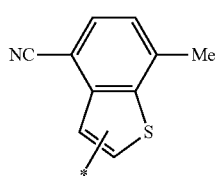
(ar-076)
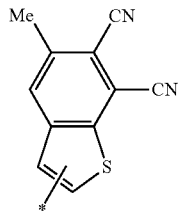
(ar-077)
[Chemical 26]
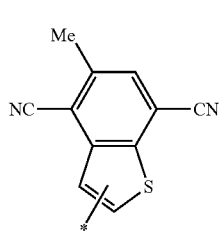
(ar-078)

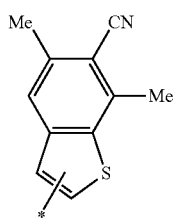 (ar-079)
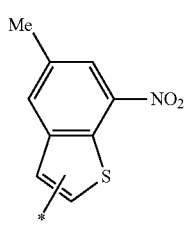 (ar-080)
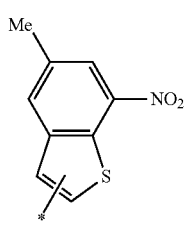 (ar-081)
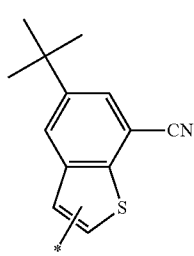 (ar-082)
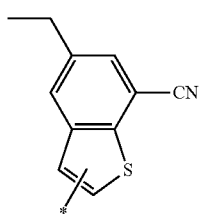 (ar-083)
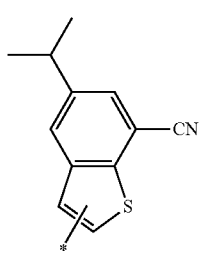 (ar-084)
[Chemical 27]
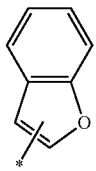 (ar-085)
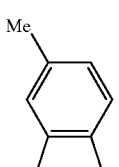 (ar-086)
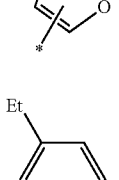 (ar-087)
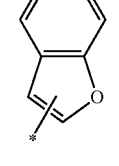 (ar-088)
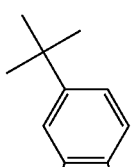 (ar-089)
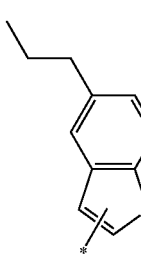 (ar-090)

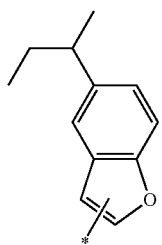
(ar-091)
[Chemical 28]
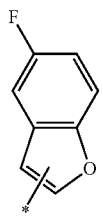
(ar-092)
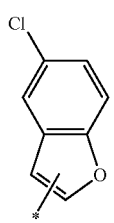
(ar-093)
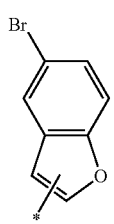
(ar-094)
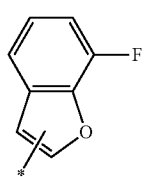
(ar-095)
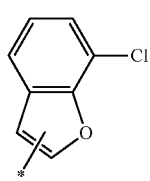
(ar-096)
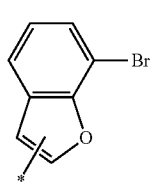
(ar-097)
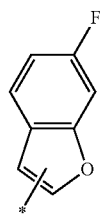
(ar-098)
[Chemical 29]
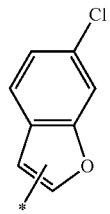
(ar-099)
(ar-100)
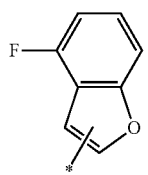
(ar-101)
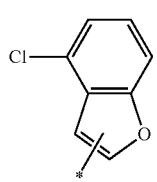
(ar-102)
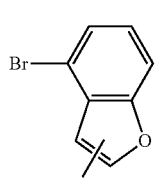
(ar-103)
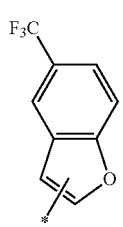
(ar-104)

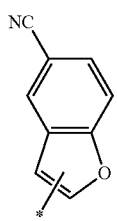
(ar-105)
[Chemical 30]
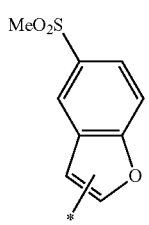
(ar-106)
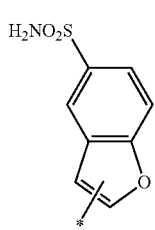
(ar-107)
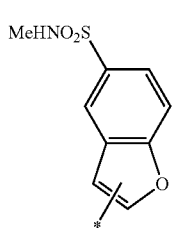
(ar-108)
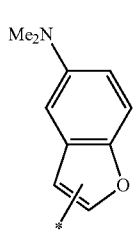
(ar-109)
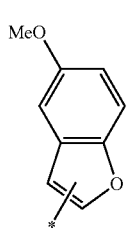
(ar-110)
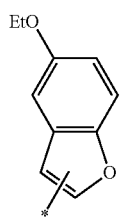
(ar-111)
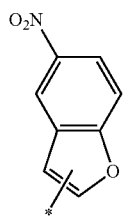
(ar-112)
[Chemical 31]
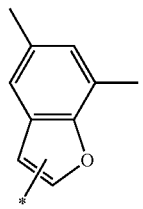
(ar-113)
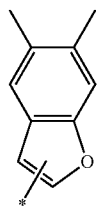
(ar-114)
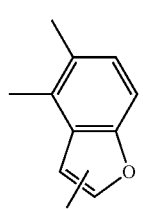
(ar-115)
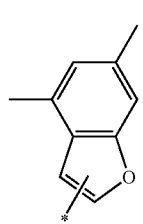
(ar-116)
(ar-117)

(ar-118) 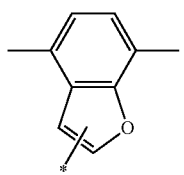
[Chemical 32]
(ar-119) 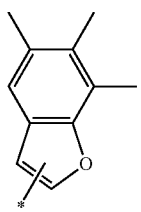
(ar-120) 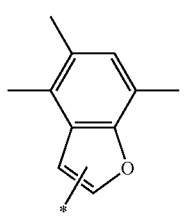
(ar-121) 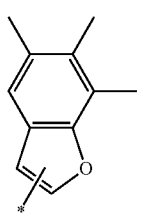
(ar-122) 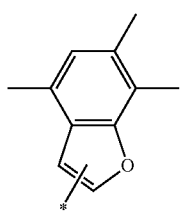
(ar-123) 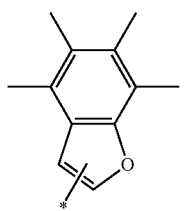
(ar-124) 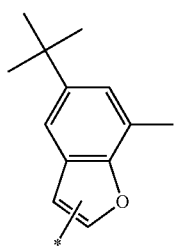
(ar-125) 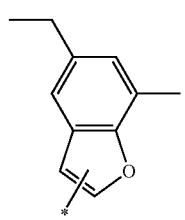
(ar-126) 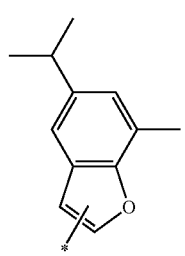
[Chemical 33]
(ar-127) 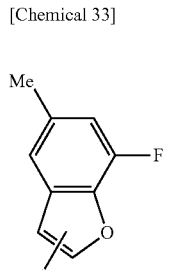
(ar-128) 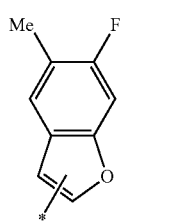
(ar-129) 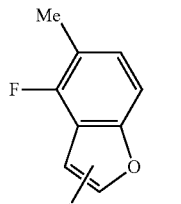
(ar-130) 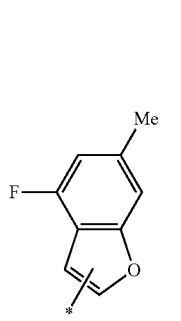

(ar-131) 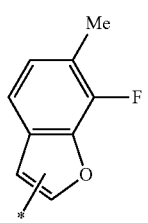
(ar-132) 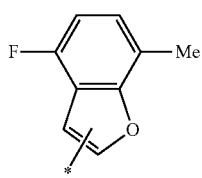
(ar-133) 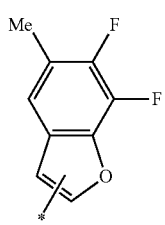
[Chemical 34]
(ar-134) 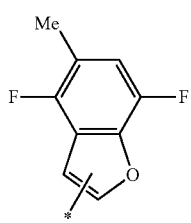
(ar-135) 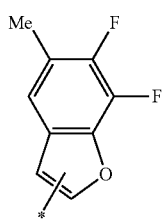
(ar-136) 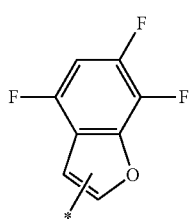
(ar-137) 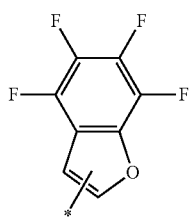
(ar-138) 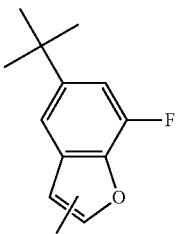
(ar-139) 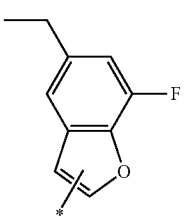
(ar-140) 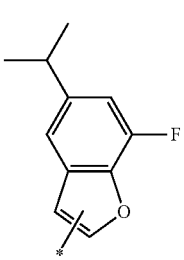
[Chemical 35]
(ar-141) 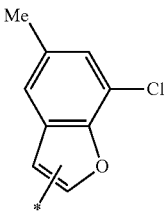
(ar-142) 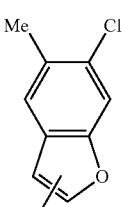
(ar-143) 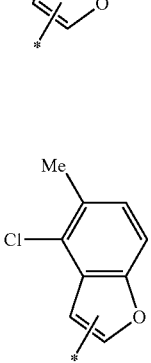

(ar-144)
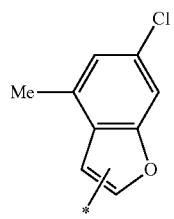
(ar-145)
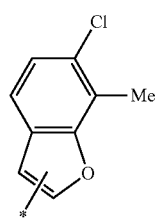
(ar-146)
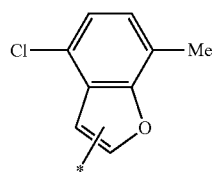
(ar-147)
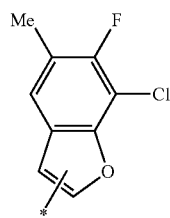
[Chemical 36]
(ar-148)
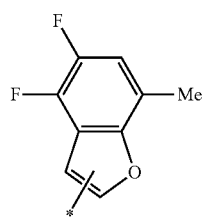
(ar-149)
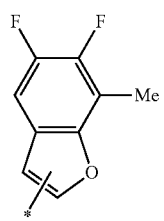
(ar-150)
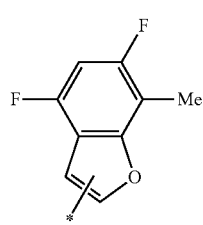
(ar-151)
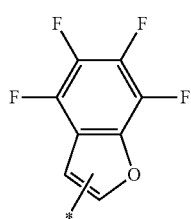
(ar-152)
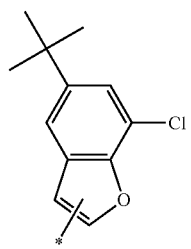
(ar-153)
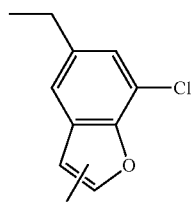
(ar-154)
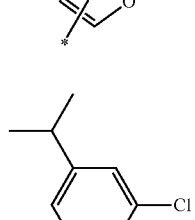
[Chemical 37]
(ar-155)
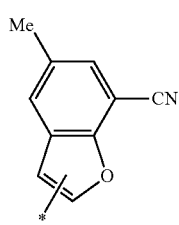
(ar-156)
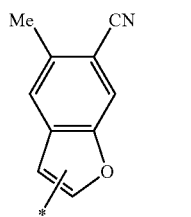

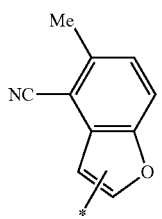 (ar-157)
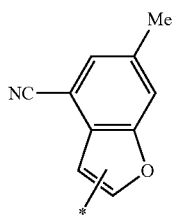 (ar-158)
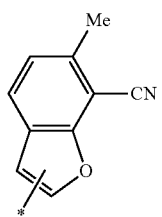 (ar-159)
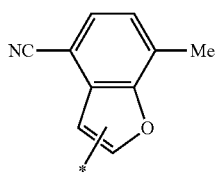 (ar-160)
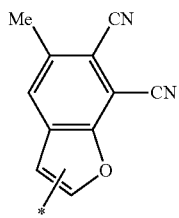 (ar-161)
[Chemical 38]
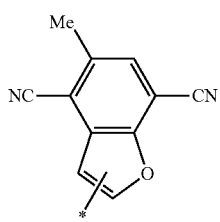 (ar-162)
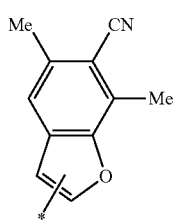 (ar-163)
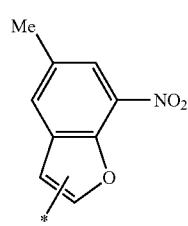 (ar-164)
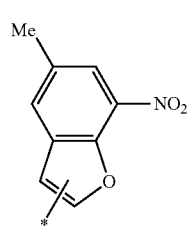 (ar-165)
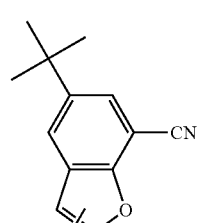 (ar-166)
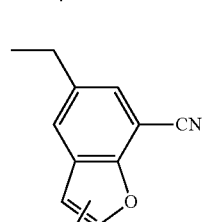 (ar-167)
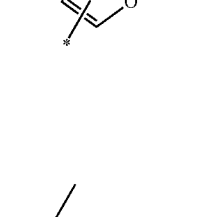 (ar-168)
[Chemical 39]
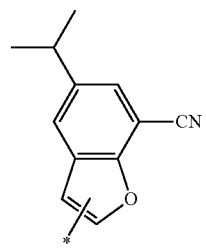 (ar-169)
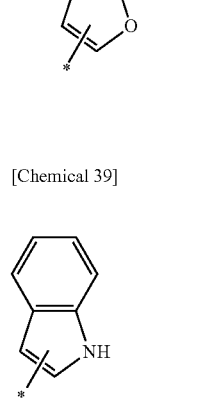

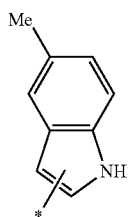
(ar-170)
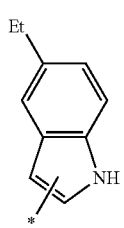
(ar-171)
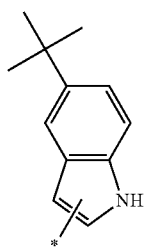
(ar-172)
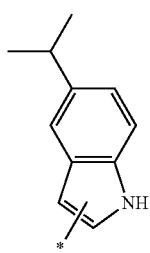
(ar-173)
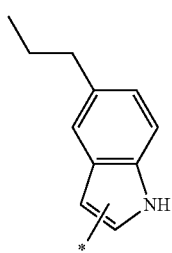
(ar-174)
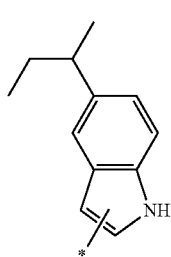
(ar-175)
[Chemical 40]
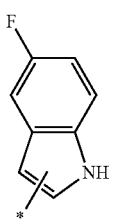
(ar-176)
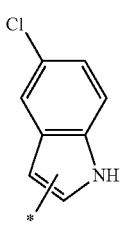
(ar-177)
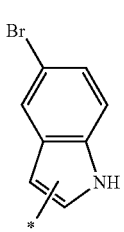
(ar-178)
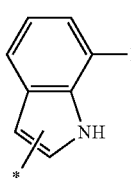
(ar-179)
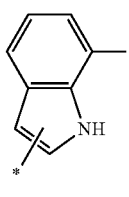
(ar-180)
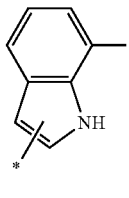
(ar-181)
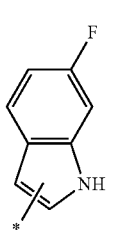
(ar-182)

[Chemical 41]
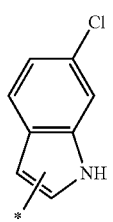 (ar-183)
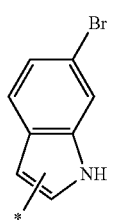 (ar-184)
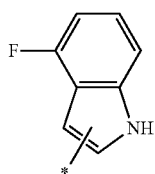 (ar-185)
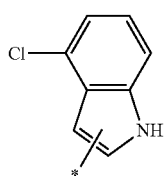 (ar-186)
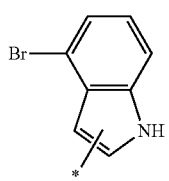 (ar-187)
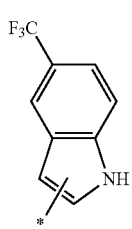 (ar-188)
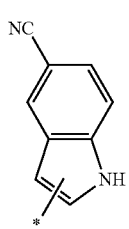 (ar-189)
[Chemical 42]
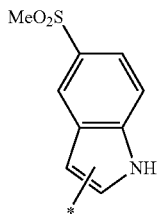 (ar-190)
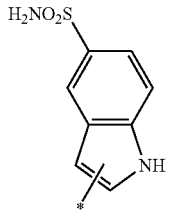 (ar-191)
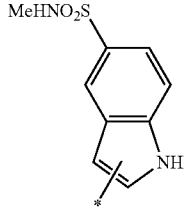 (ar-192)
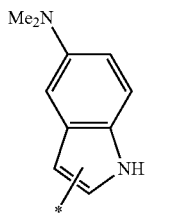 (ar-193)
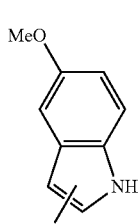 (ar-194)
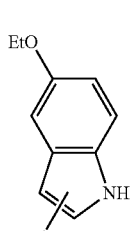 (ar-195)
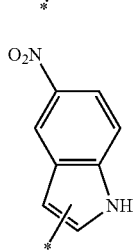 (ar-196)

[Chemical 43]
(ar-197)
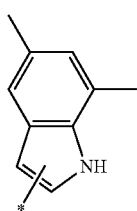
(ar-198)
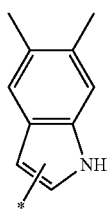
(ar-199)
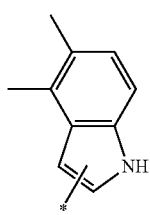
(ar-200)
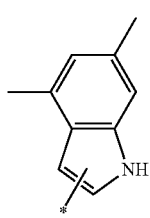
(ar-201)
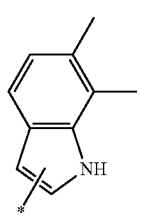
(ar-202)
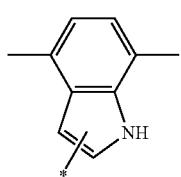
(ar-203)
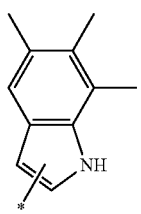
[Chemical 44]
(ar-204)
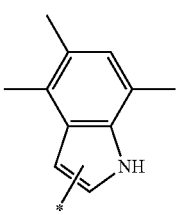
(ar-205)
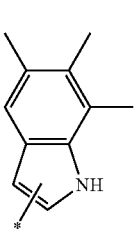
(ar-206)
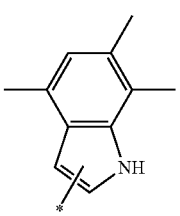
(ar-207)
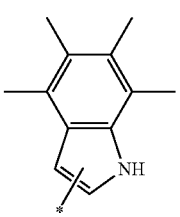
(ar-208)
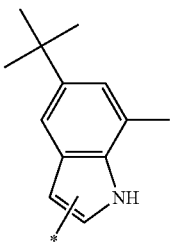
(ar-209)
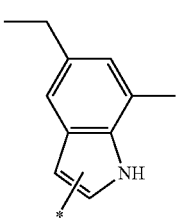

(ar-210) 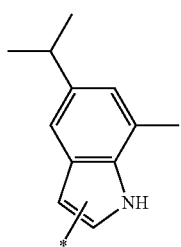
[Chemical 45]
(ar-211) 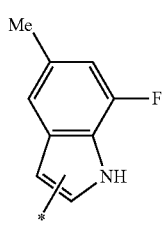
(ar-212) 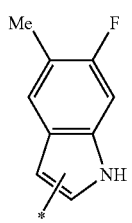
(ar-213) 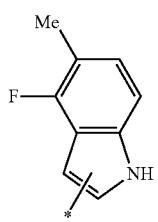
(ar-214) 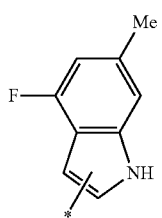
(ar-215) 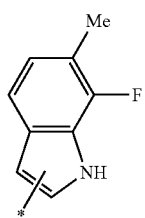
(ar-216) 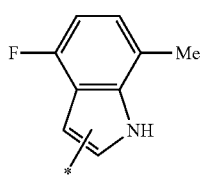
(ar-217) 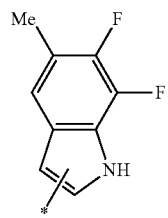
[Chemical 46]
(ar-218) 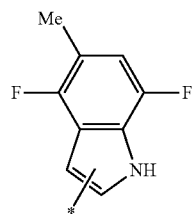
(ar-219) 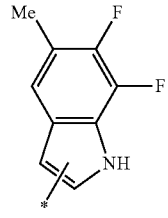
(ar-220) 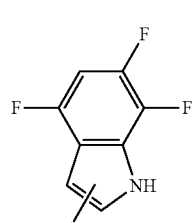
(ar-221) 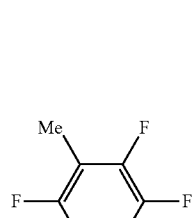
(ar-222) 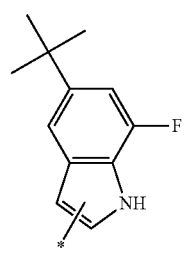

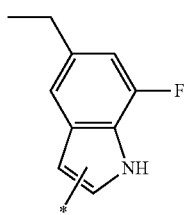 (ar-223)
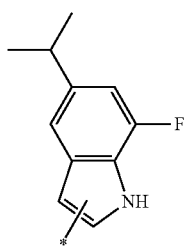 (ar-224)
[Chemical 47]
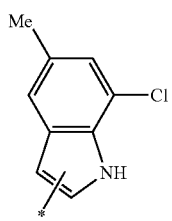 (ar-225)
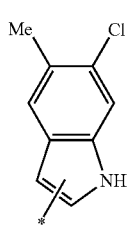 (ar-226)
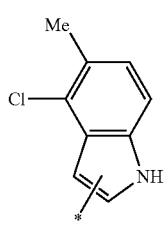 (ar-227)
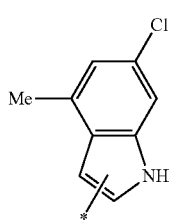 (ar-228)
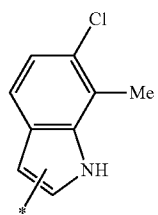 (ar-229)
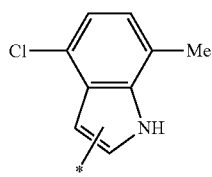 (ar-230)
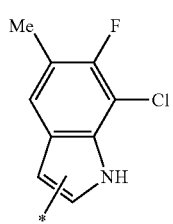 (ar-231)
[Chemical 48]
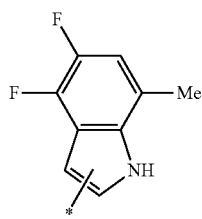 (ar-232)
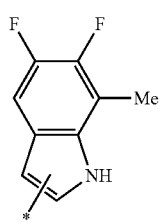 (ar-233)
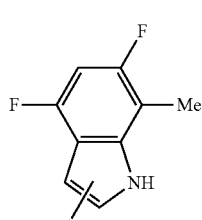 (ar-234)
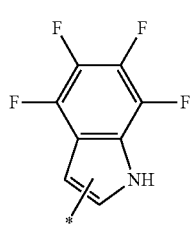 (ar-235)

(ar-236) 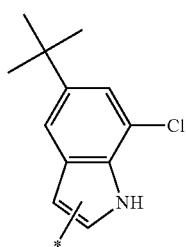
(ar-237) 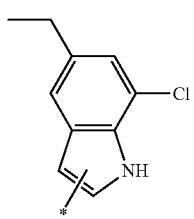
(ar-238) 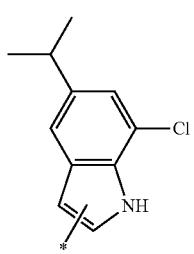
[Chemical 49]
(ar-239) 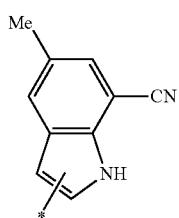
(ar-240) 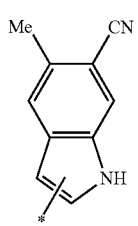
(ar-241) 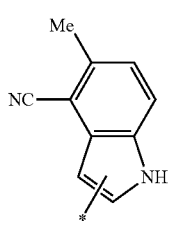
(ar-242) 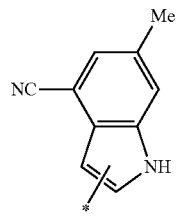
(ar-243) 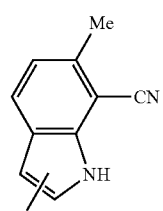
(ar-244) 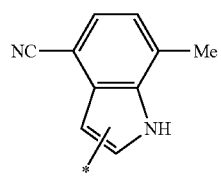
(ar-245) 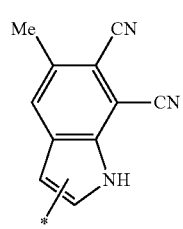
[Chemical 50]
(ar-246) 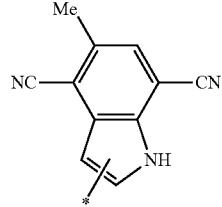
(ar-247) 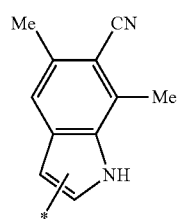
(ar-248) 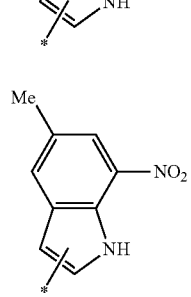

(ar-249)
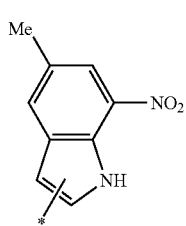
(ar-250)
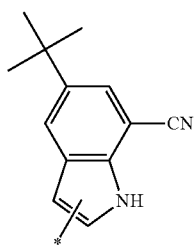
(ar-251)
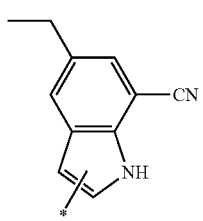
(ar-252)
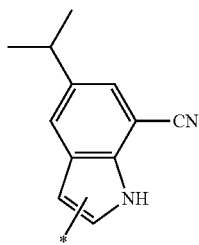
[Chemical 51]
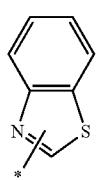
(ar-253)
(ar-254)
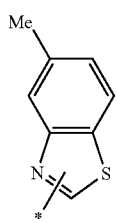
(ar-255)
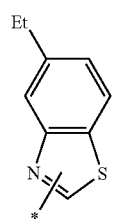
(ar-256)
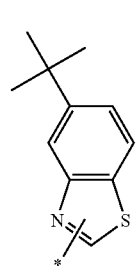
(ar-257)
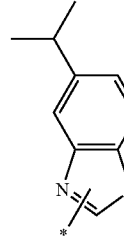
(ar-258)
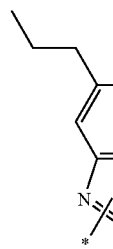
(ar-259)
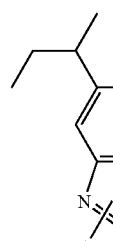
[Chemical 52]
(ar-260)
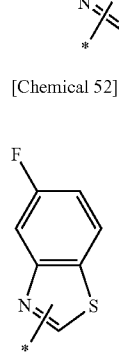

-continued
(ar-261)
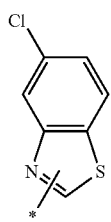
(ar-262)
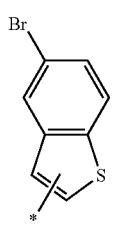
(ar-263)
(ar-264)
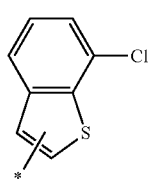
(ar-265)
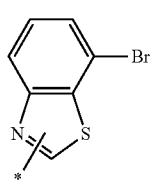
(ar-266)
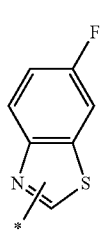
[Chemical 53]
(ar-267)
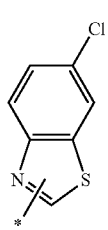
-continued
(ar-268)
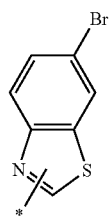
(ar-269)
(ar-270)
(ar-271)
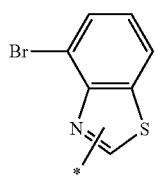
(ar-272)
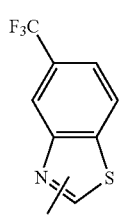
(ar-273)
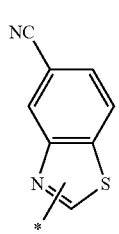
[Chemical 54]
(ar-274)
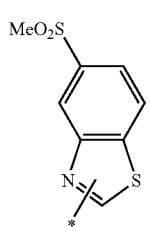

(ar-275) 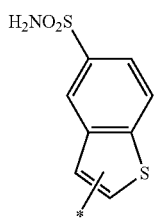
(ar-276) 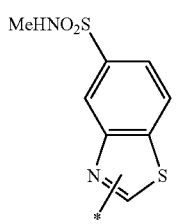
(ar-277) 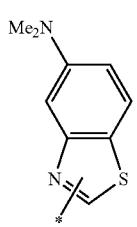
(ar-278) 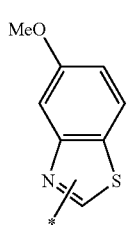
(ar-279) 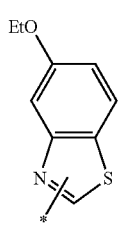
(ar-280) 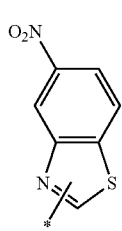
[Chemical 55]
(ar-281) 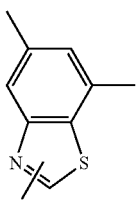
(ar-282) 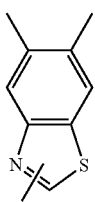
(ar-283) 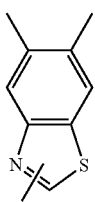
(ar-284) 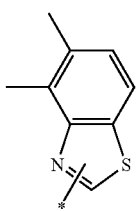
(ar-285) 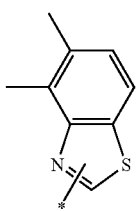
(ar-286) 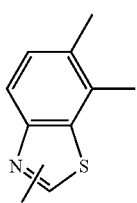
(ar-287) 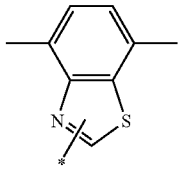

[Chemical 56]
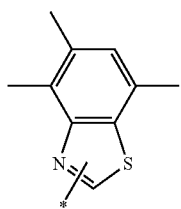 (ar-288)
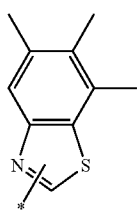 (ar-289)
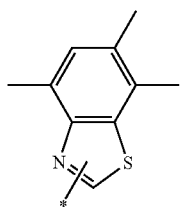 (ar-290)
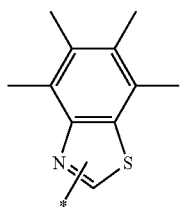 (ar-291)
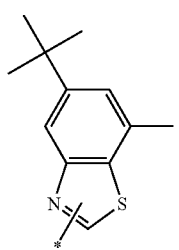 (ar-292)
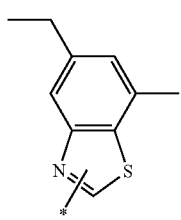 (ar-293)
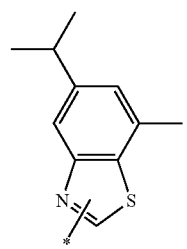 (ar-294)
[Chemical 57]
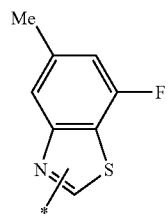 (ar-295)
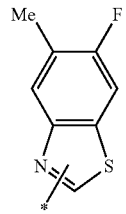 (ar-296)
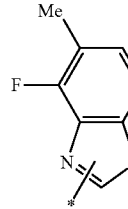 (ar-297)
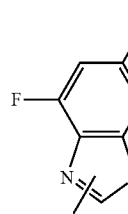 (ar-298)
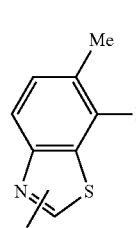 (ar-299)
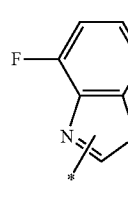 (ar-300)

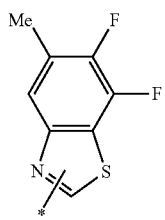 (ar-301)
[Chemical 58]
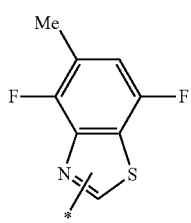 (ar-302)
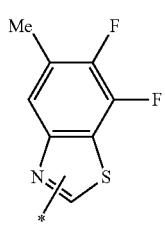 (ar-303)
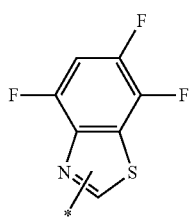 (ar-304)
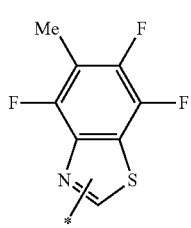 (ar-305)
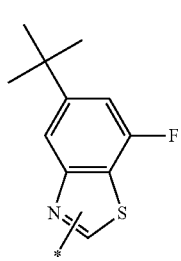 (ar-306)
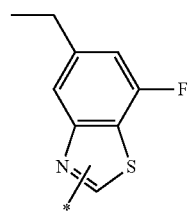 (ar-307)
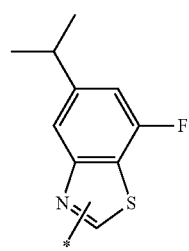 (ar-308)
[Chemical 59]
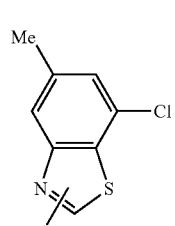 (ar-309)
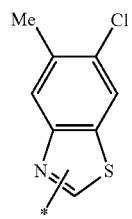 (ar-310)
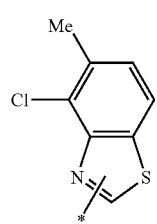 (ar-311)
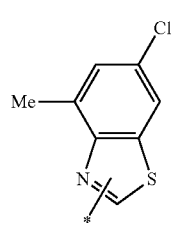 (ar-312)

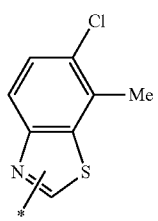 (ar-313)
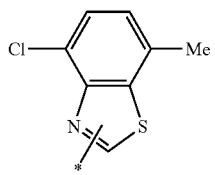 (ar-314)
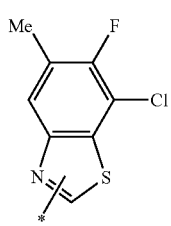 (ar-315)
[Chemical 60]
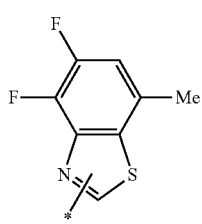 (ar-316)
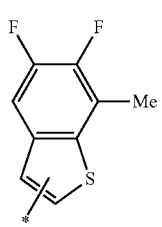 (ar-317)
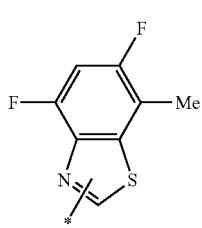 (ar-318)
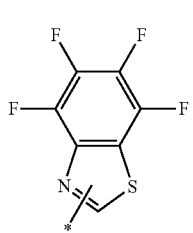 (ar-319)
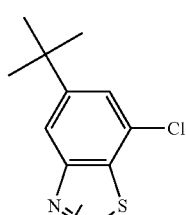 (ar-320)
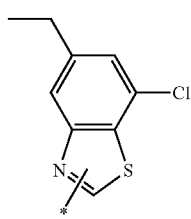 (ar-321)
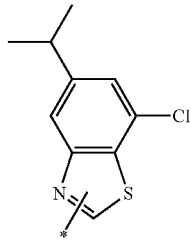 (ar-322)
[Chemical 61]
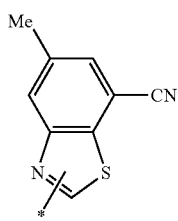 (ar-323)
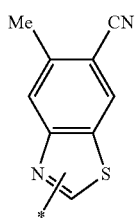 (ar-324)
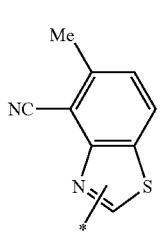 (ar-325)

(ar-326) 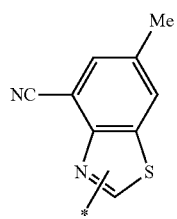
(ar-327) 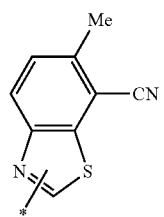
(ar-328) 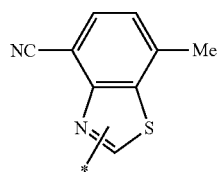
(ar-329) 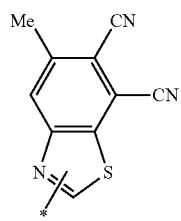
[Chemical 62]
(ar-330) 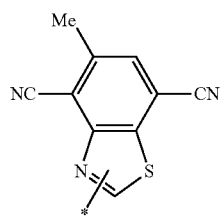
(ar-331) 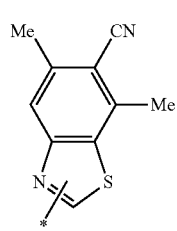
(ar-332) 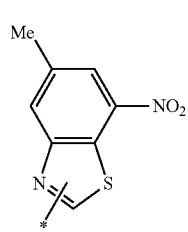
(ar-333) 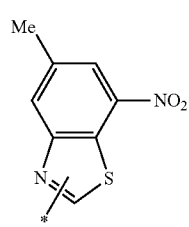
(ar-334) 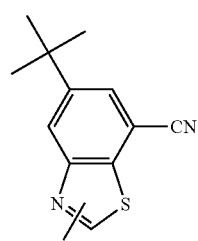
(ar-335) 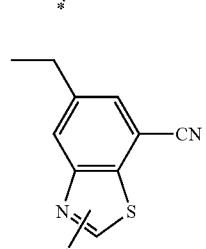
(ar-336) 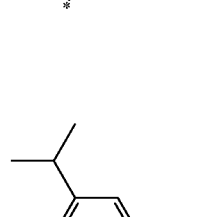
[Chemical 63]
(ar-337) 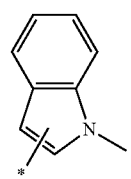
(ar-338) 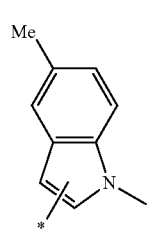

(ar-339)
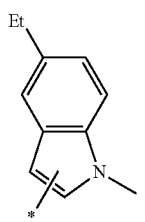
(ar-340)
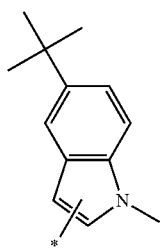
(ar-341)
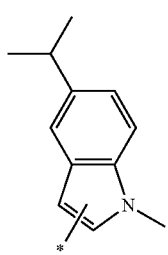
(ar-342)
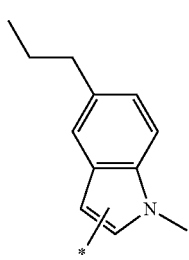
(ar-343)
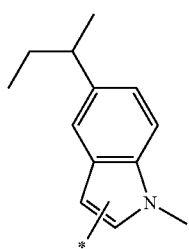
[Chemical 64]
(ar-344)
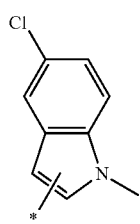
(ar-345)
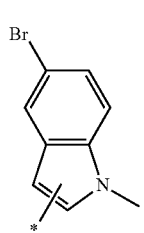
(ar-346)
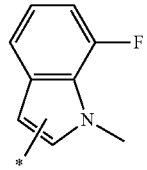
(ar-347)
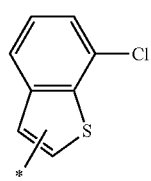
(ar-348)
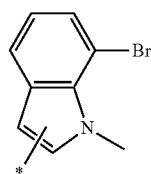
(ar-349)
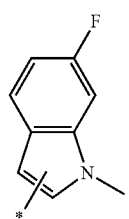
(ar-350)
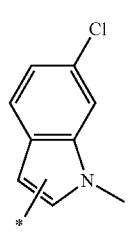
[Chemical 65]
(ar-351)

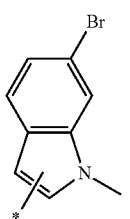 (ar-352)
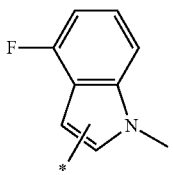 (ar-353)
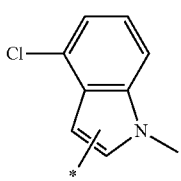 (ar-354)
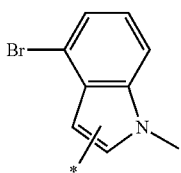 (ar-355)
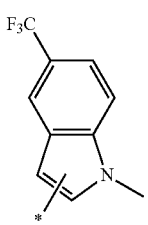 (ar-356)
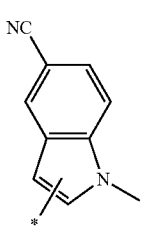 (ar-357)
[Chemical 66]
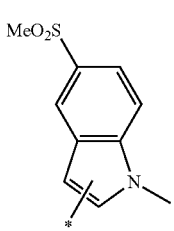 (ar-358)
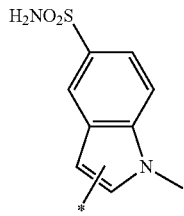 (ar-359)
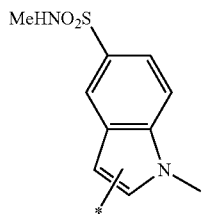 (ar-360)
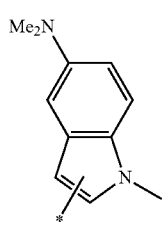 (ar-361)
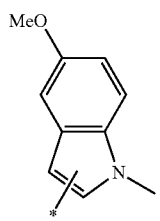 (ar-362)
 (ar-363)
 (ar-364)

[Chemical 67]
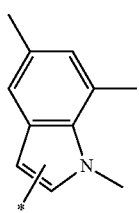
(ar-365)
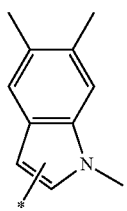
(ar-366)
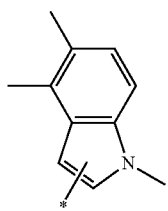
(ar-367)
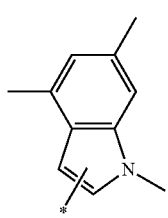
(ar-368)
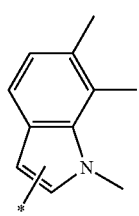
(ar-369)
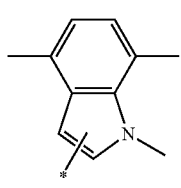
(ar-370)
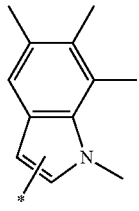
(ar-371)
[Chemical 68]
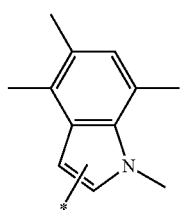
(ar-372)
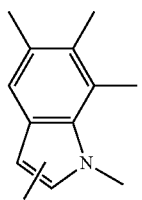
(ar-373)
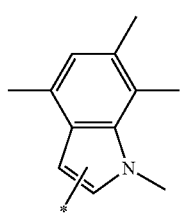
(ar-374)
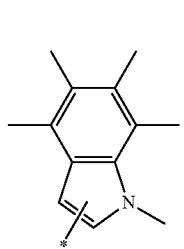
(ar-375)
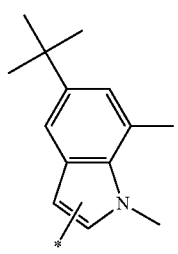
(ar-376)
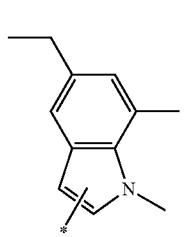
(ar-377)

(ar-378) 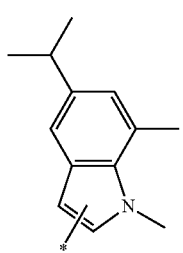
[Chemical 69]
(ar-379) 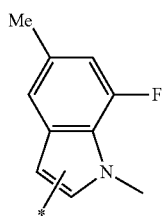
(ar-380) 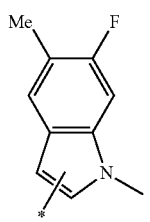
(ar-381) 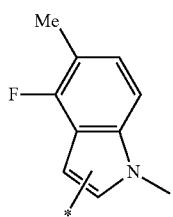
(ar-382) 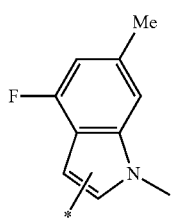
(ar-383) 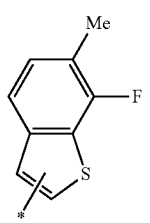
(ar-384) 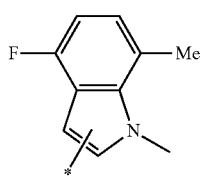
(ar-385) 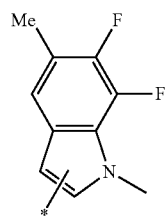
[Chemical 70]
(ar-386) 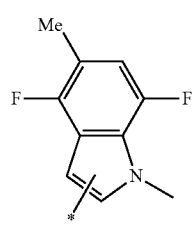
(ar-387) 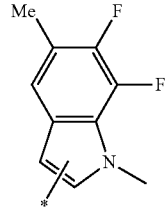
(ar-388) 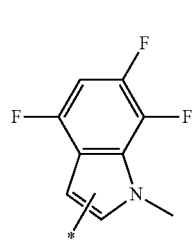
(ar-389) 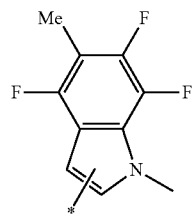
(ar-390) 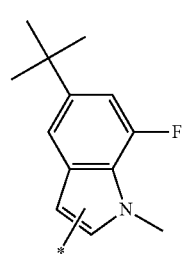

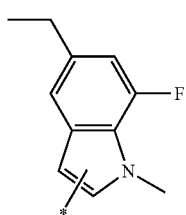 (ar-391)
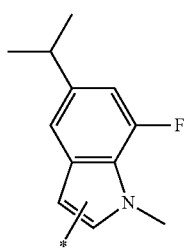 (ar-392)
[Chemical 71]
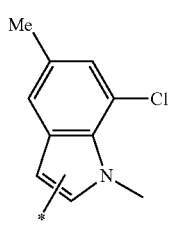 (ar-393)
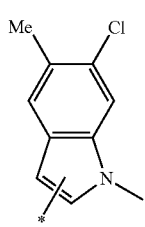 (ar-394)
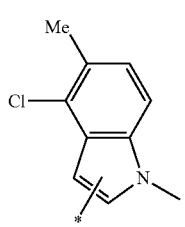 (ar-395)
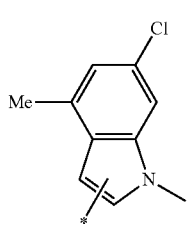 (ar-396)
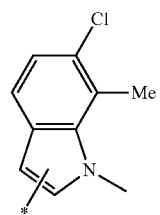 (ar-397)
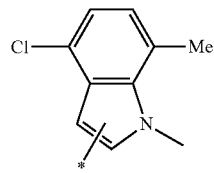 (ar-398)
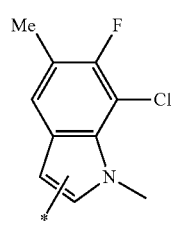 (ar-399)
[Chemical 72]
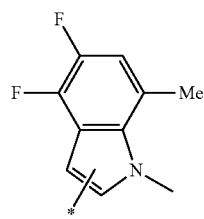 (ar-400)
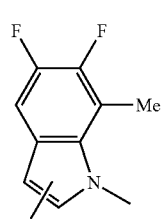 (ar-401)
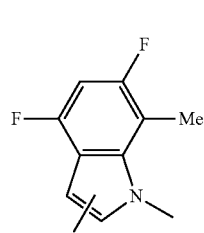 (ar-402)
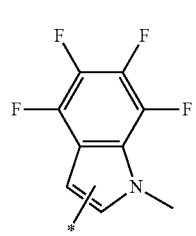 (ar-403)

-continued
(ar-404)
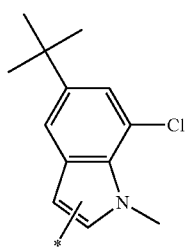
(ar-405)
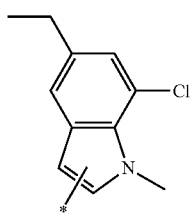
(ar-406)
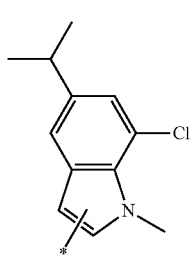
[Chemical 73]
(ar-407)
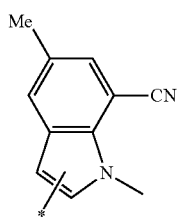
(ar-408)
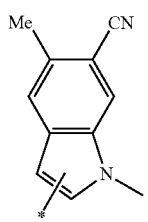
(ar-409)
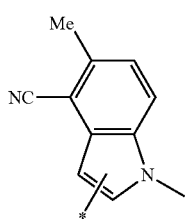
-continued
(ar-410)
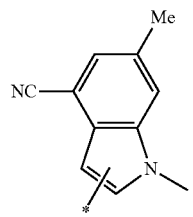
(ar-411)
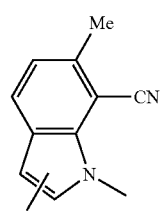
(ar-412)
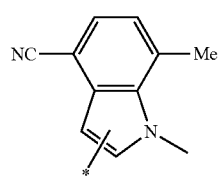
(ar-413)
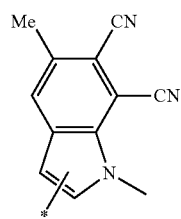
[Chemical 74]
(ar-414)
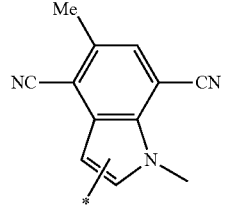
(ar-415)
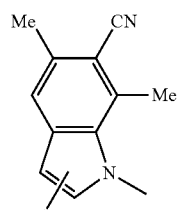
(ar-416)
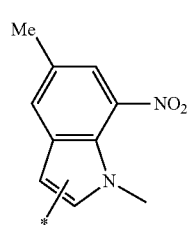

(ar-417) 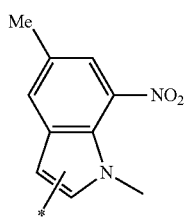
(ar-418) 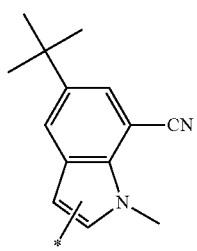
(ar-419) 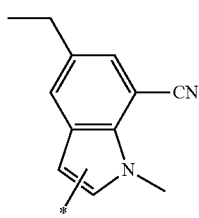
(ar-420) 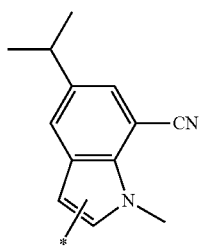
[Chemical 75]
(ar-421) 
(ar-422) 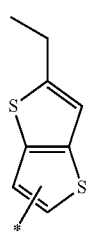
(ar-423) 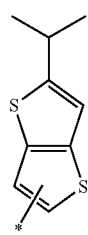
(ar-424) 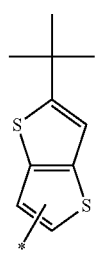
(ar-425) 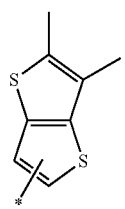
(ar-426) 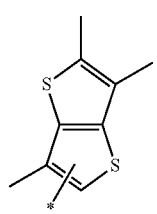
(ar-427) 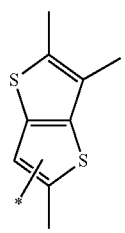
[Chemical 76]
(ar-428) 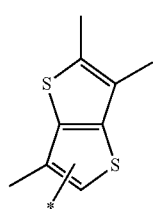

(ar-429) 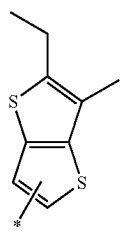
(ar-430) 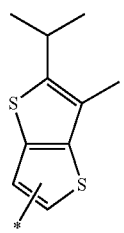
(ar-431) 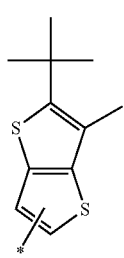
(ar-432) 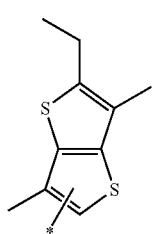
(ar-433) 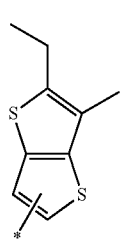
(ar-434) 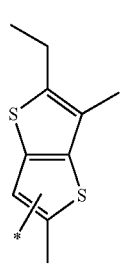
[Chemical 77]
(ar-435) 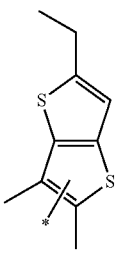
(ar-436)
(ar-437)
(ar-438)
(ar-439)
(ar-440) 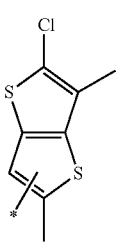

-continued
(ar-441) 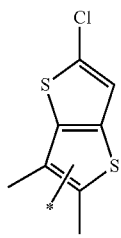
[Chemical 78]
(ar-442) 
(ar-443) 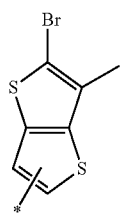
(ar-444) 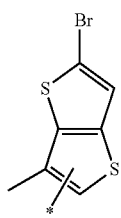
(ar-445) 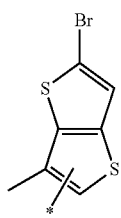
(ar-446) 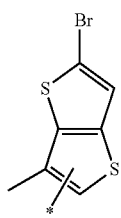
-continued
(ar-447) 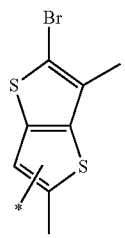
(ar-448) 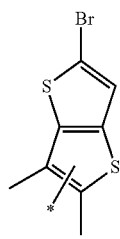
[Chemical 79]
(ar-449) 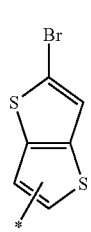
(ar-450) 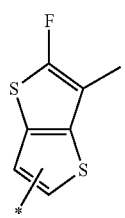
(ar-451) 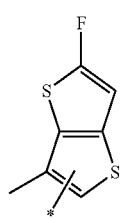
(ar-452) 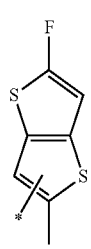

(ar-453) 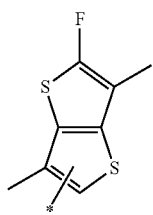
(ar-454) 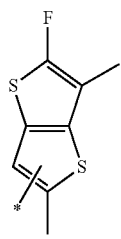
(ar-455) 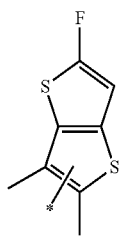
[Chemical 80]
(ar-456) 
(ar-457) 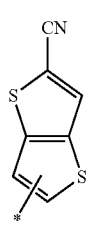
(ar-458) 
(ar-459) 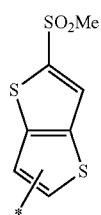
(ar-460) 
(ar-461) 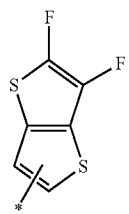
(ar-462) 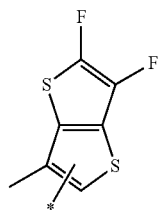
[Chemical 81]
(ar-463) 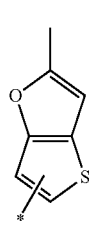
(ar-464) 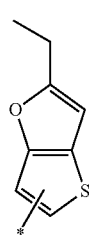

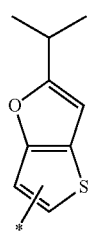
(ar-465)
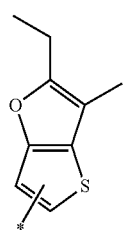
(ar-471)
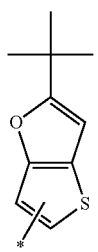
(ar-466)
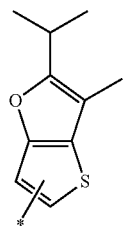
(ar-472)
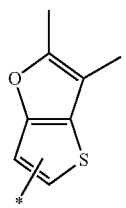
(ar-467)
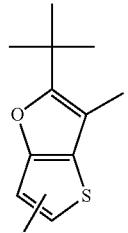
(ar-473)
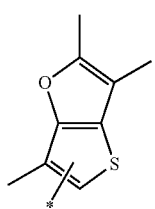
(ar-468)
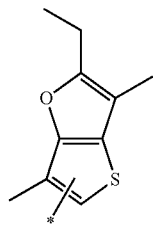
(ar-474)
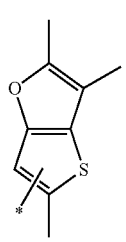
(ar-469)
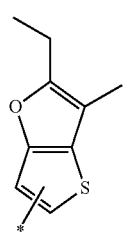
(ar-475)
[Chemical 82]
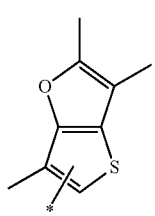
(ar-470)
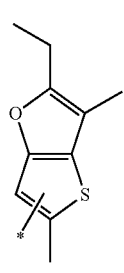
(ar-476)

[Chemical 83]
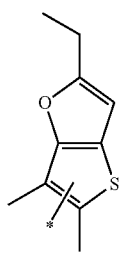 (ar-471)
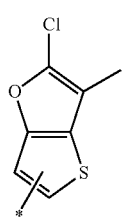 (ar-472)
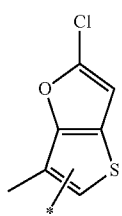 (ar-473)
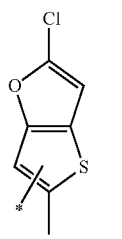 (ar-474)
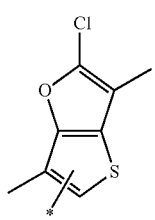 (ar-475)
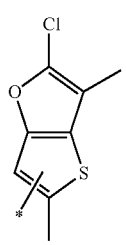 (ar-476)
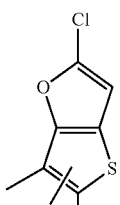 (ar-477)
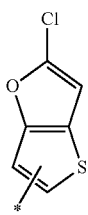 (ar-478)
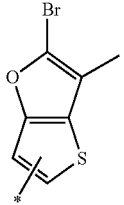 (ar-479)
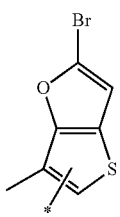 (ar-480)
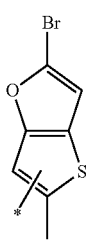 (ar-481)
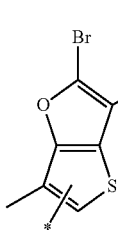 (ar-482)
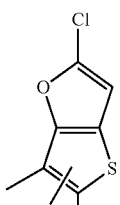 (ar-483)
[Chemical 84]
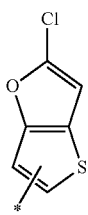 (ar-484)
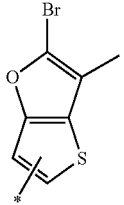 (ar-485)
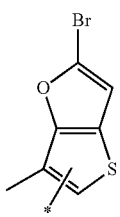 (ar-486)
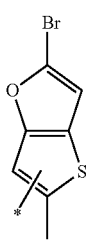 (ar-487)
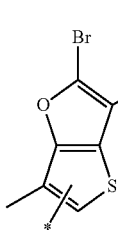 (ar-488)

(ar-489) 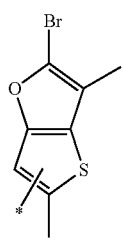
(ar-490) 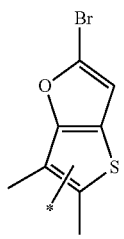
[Chemical 85]
(ar-491) 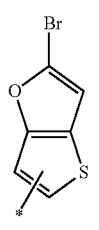
(ar-492) 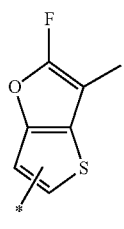
(ar-493) 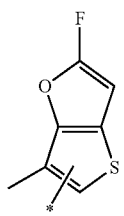
(ar-494) 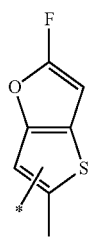
(ar-495) 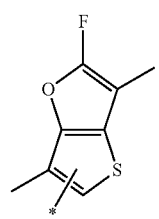
(ar-496) 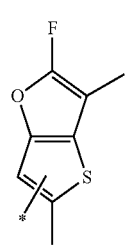
(ar-497) 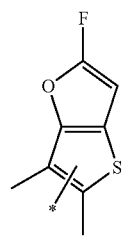
[Chemical 86]
(ar-498) 
(ar-499) 
(ar-500) 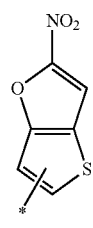

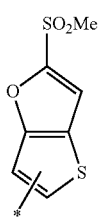 (ar-501)
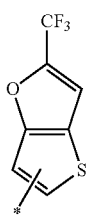 (ar-502)
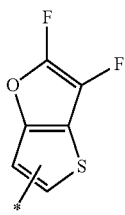 (ar-503)
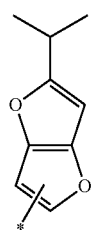 (ar-507)
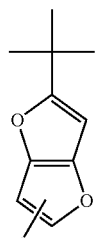 (ar-508)
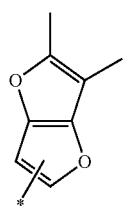 (ar-509)
(ar-504)
[Chemical 87]
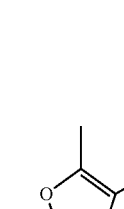 (ar-510)
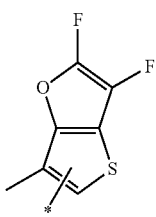 (ar-505)
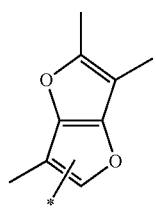 (ar-511)
[Chemical 88]
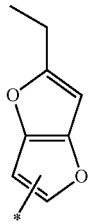 (ar-506)
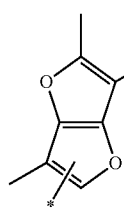 (ar-512)

(ar-513)
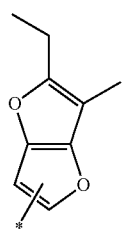
(ar-514)
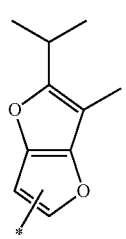
(ar-515)
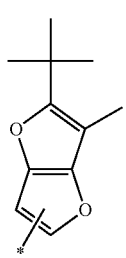
(ar-516)
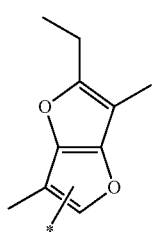
(ar-517)
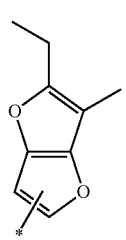
(ar-518)
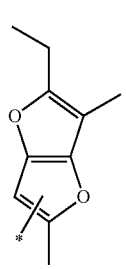
[Chemical 89]
(ar-519)
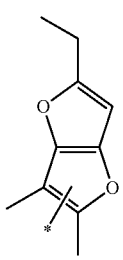
(ar-520)
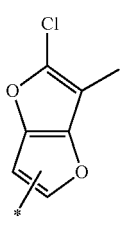
(ar-521)
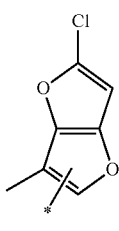
(ar-522)
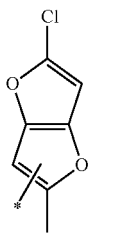
(ar-523)
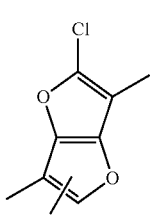
(ar-524)
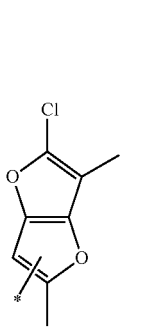

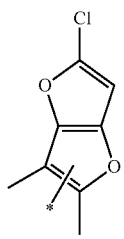
(ar-525)
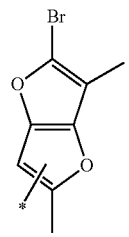
(ar-531)
[Chemical 90]
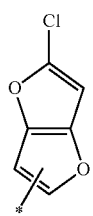
(ar-526)
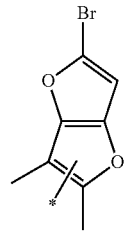
(ar-532)
[Chemical 91]
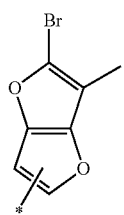
(ar-527)
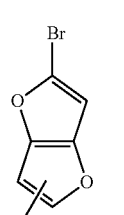
(ar-533)
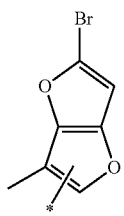
(ar-528)
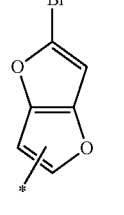
(ar-534)
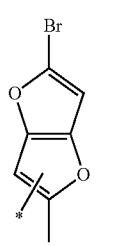
(ar-529)
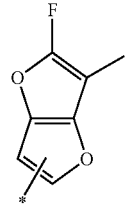
(ar-535)
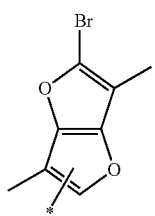
(ar-530)
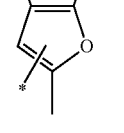
(ar-536)

(ar-537) 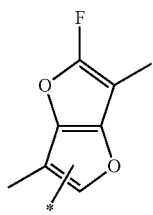
(ar-538) 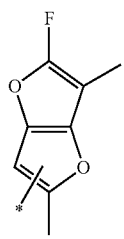
(ar-539) 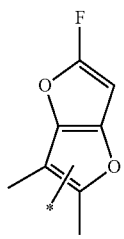
[Chemical 92]
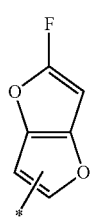
(ar-540)
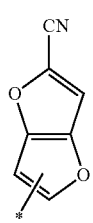
(ar-541)
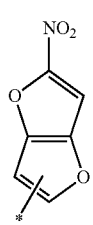
(ar-542)
(ar-543) 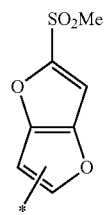
(ar-544) 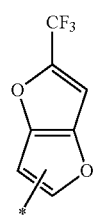
(ar-545) 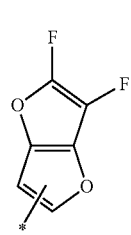
(ar-546) 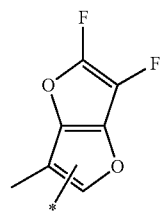
[Chemical 93]
(ar-547) 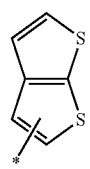
(ar-548) 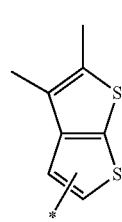
(ar-549) 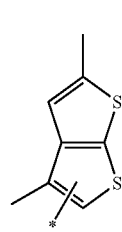

(ar-550) 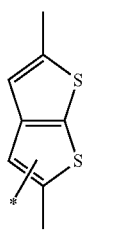
(ar-551) 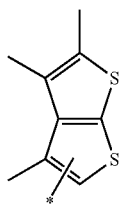
(ar-552) 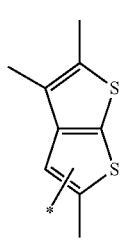
(ar-553) 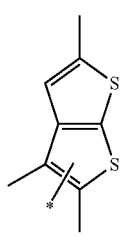
[Chemical 94]
(ar-554) 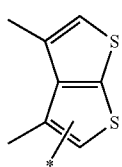
(ar-555) 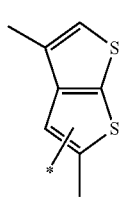
(ar-556) 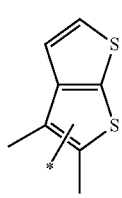
(ar-557) 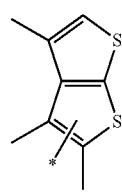
(ar-558) 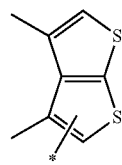
(ar-559) 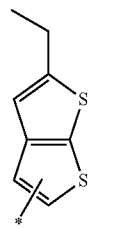
(ar-560) 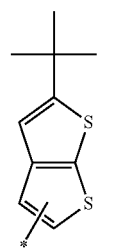
[Chemical 95]
(ar-561) 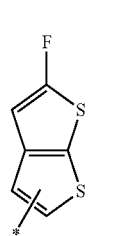
(ar-562) 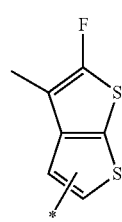
(ar-563) 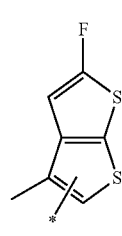

-continued
(ar-564)
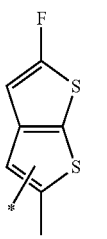
(ar-565)
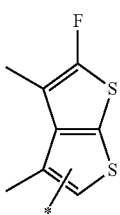
(ar-566)
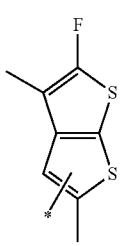
(ar-567)
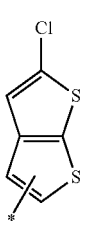
[Chemical 96]
(ar-568)
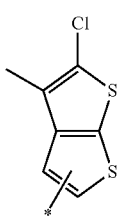
(ar-569)
-continued
(ar-570)
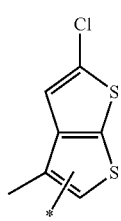
(ar-571)
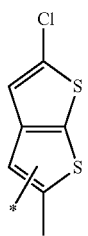
(ar-572)
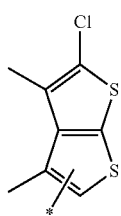
(ar-573)
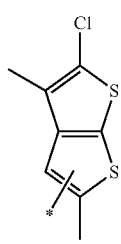
(ar-574)
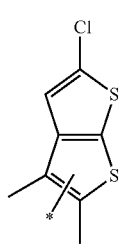
[Chemical 97]
(ar-575)
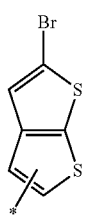

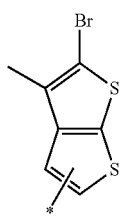 (ar-576)
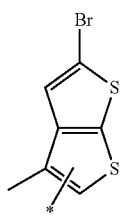 (ar-577)
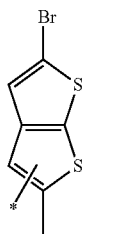 (ar-578)
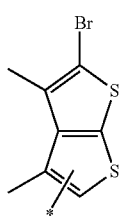 (ar-579)
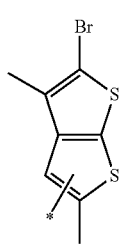 (ar-580)
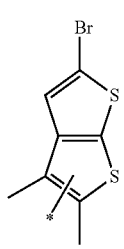 (ar-581)
[Chemical 98]
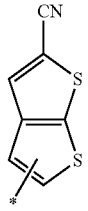 (ar-582)
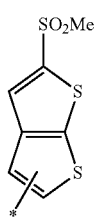 (ar-583)
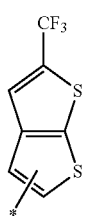 (ar-584)
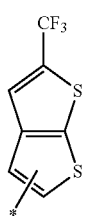 (ar-585)
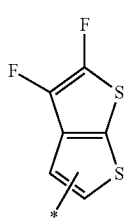 (ar-586)
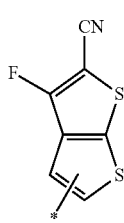 (ar-587)

(ar-588) 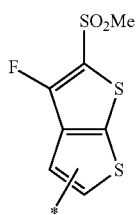
[Chemical 99]
(ar-589) 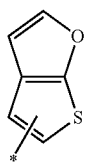
(ar-590) 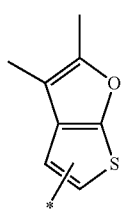
(ar-591) 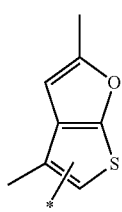
(ar-592) 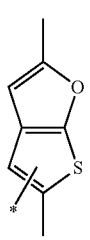
(ar-593) 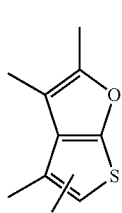
(ar-594) 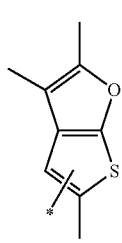
(ar-595) 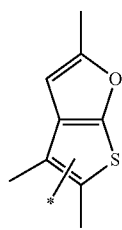
[Chemical 100]
(ar-596) 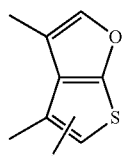
(ar-597) 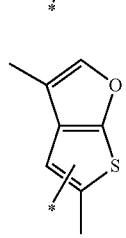
(ar-598) 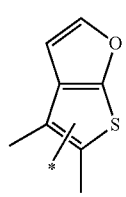
(ar-599) 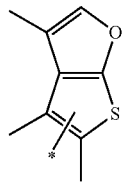
(ar-600) 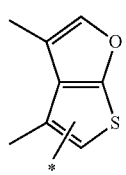
(ar-601) 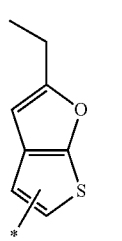

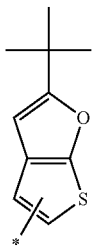
(ar-601)
[Chemical 101]
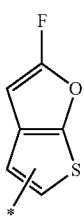
(ar-602)
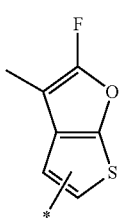
(ar-603)
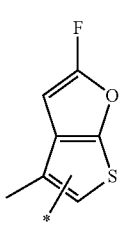
(ar-604)
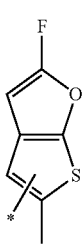
(ar-605)
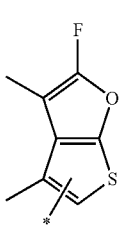
(ar-606)
(ar-607)
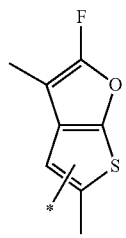
(ar-608)
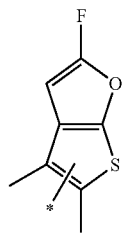
(ar-609)
[Chemical 102]
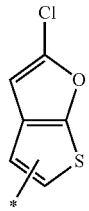
(ar-610)
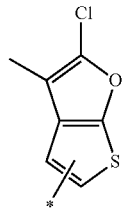
(ar-611)
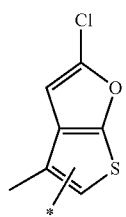
(ar-612)
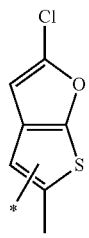
(ar-613)

(ar-614)
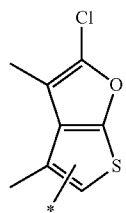
(ar-615)
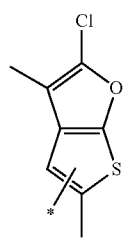
(ar-616)
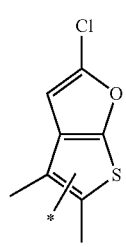
[Chemical 103]
(ar-617)
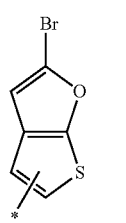
(ar-618)
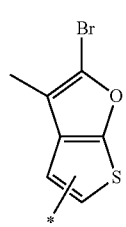
(ar-619)
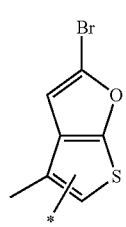
(ar-620)
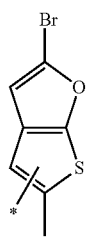
(ar-621)
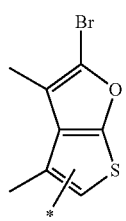
(ar-622)
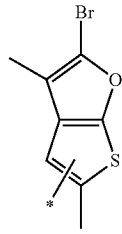
(ar-623)
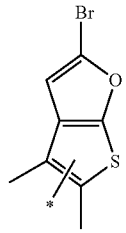
[Chemical 104]
(ar-624)
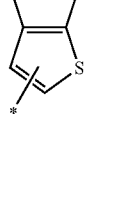
(ar-625)
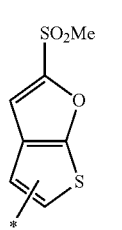

119
-continued
(ar-626)
(ar-627)
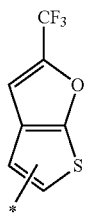
(ar-628)
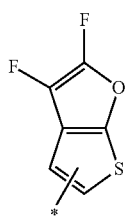
(ar-629)
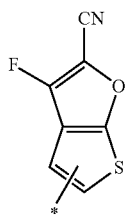
(ar-630)
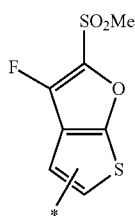
[Chemical 105]
(ar-631)
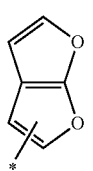
(ar-632)
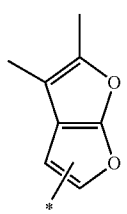
120
-continued
(ar-633)
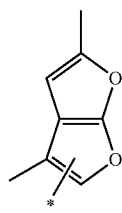
(ar-634)
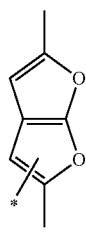
(ar-635)
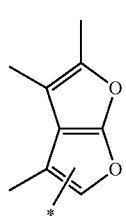
(ar-636)
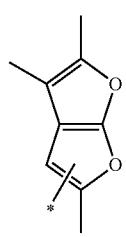
(ar-637)
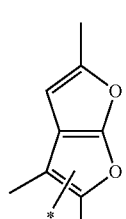
[Chemical 106]
(ar-638)
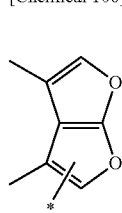
(ar-639)
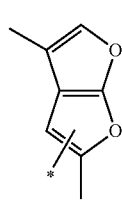

(ar-640) 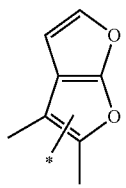
(ar-641) 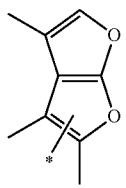
(ar-642) 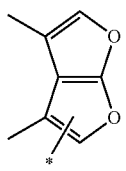
(ar-643) 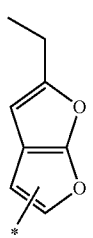
(ar-644) 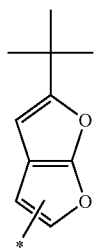
[Chemical 107]
(ar-645) 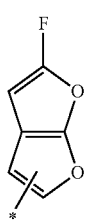
(ar-646) 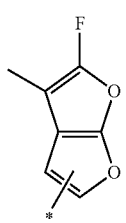
(ar-647) 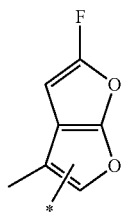
(ar-648) 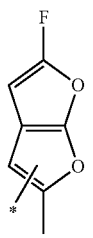
(ar-649) 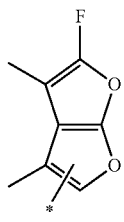
(ar-650) 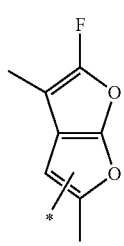
(ar-651) 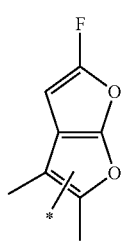
[Chemical 108]
(ar-652) 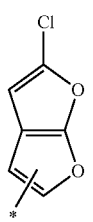

(ar-653)
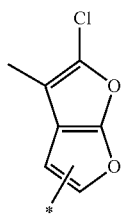
(ar-654)
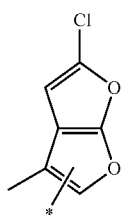
(ar-655)
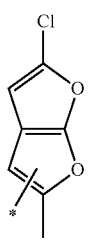
(ar-656)
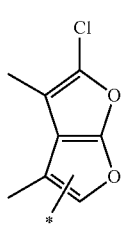
(ar-657)
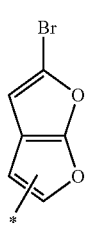
(ar-658)
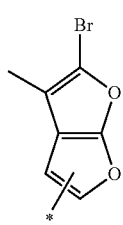
[Chemical 109]
(ar-659)
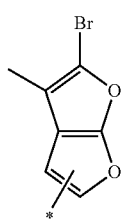
(ar-660)
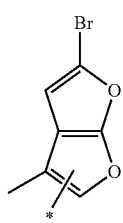
(ar-661)
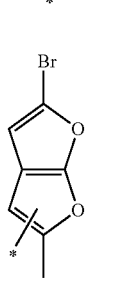
(ar-662)
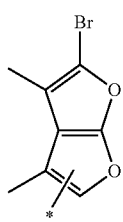
(ar-663)
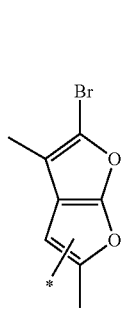
(ar-664)
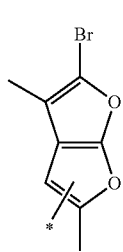

(ar-665) 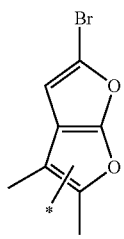
[Chemical 110]
(ar-666) 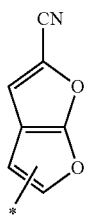
(ar-667) 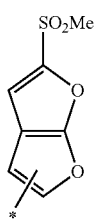
(ar-668) 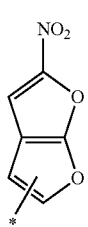
(ar-669) 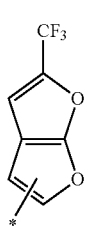
(ar-670) 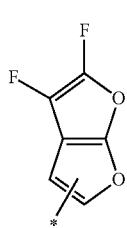
(ar-671) 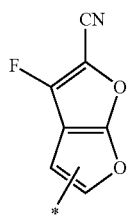
(ar-672) 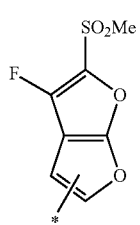
[Chemical 111]
(ar-673) 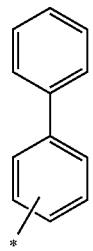
(ar-674) 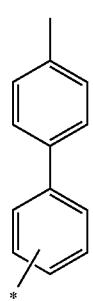
(ar-675) 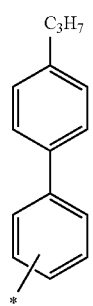

127
-continued
(ar-676)
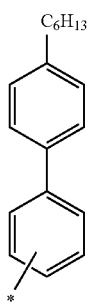
(ar-677)
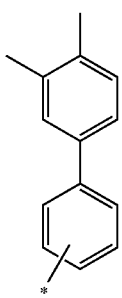
(ar-678)
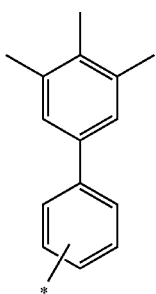
(ar-679)
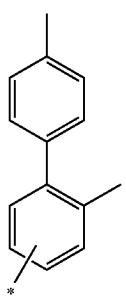
[Chemical 112]
(ar-680)
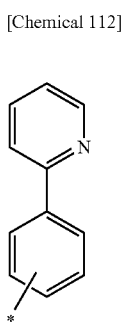
128
-continued
(ar-681)
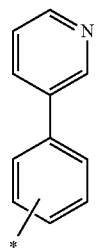
(ar-682)
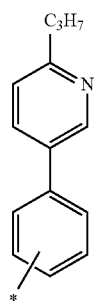
(ar-683)
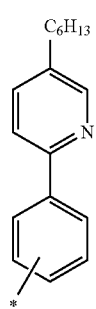
(ar-684)
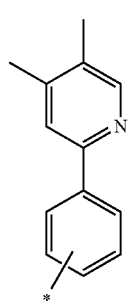
(ar-685)
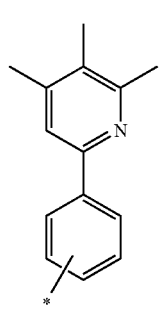

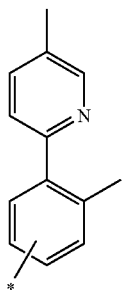
(ar-686)
[Chemical 113]
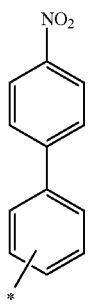
(ar-687)
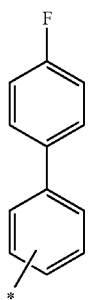
(ar-688)
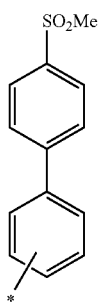
(ar-689)
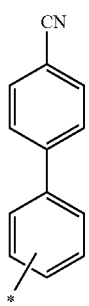
(ar-690)
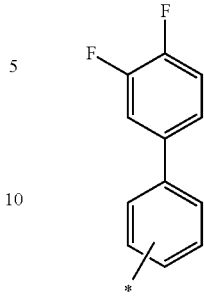
(ar-691)
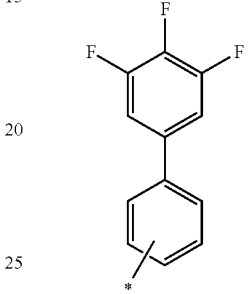
(ar-692)
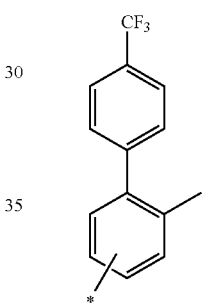
(ar-693)
[Chemical 114]
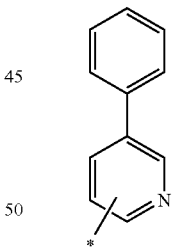
(ar-694)
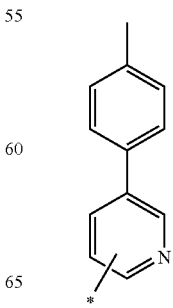
(ar-695)

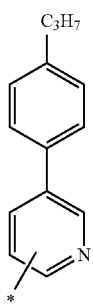

(ar-706) 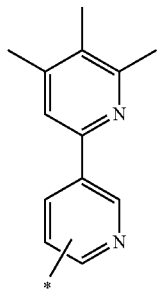
(ar-707) 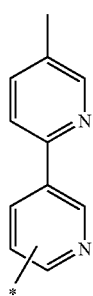
[Chemical 116]
(ar-708) 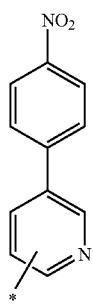
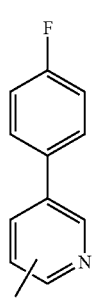
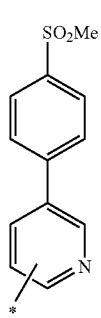
(ar-711) 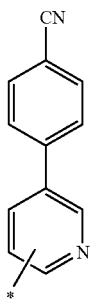
(ar-712) 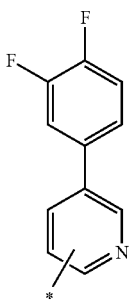
(ar-713) 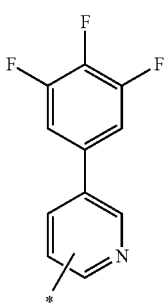
(ar-714) 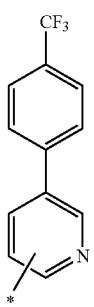
[Chemical 117]
(ar-715) 

(ar-716)
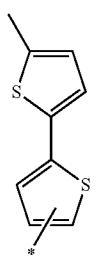
(ar-717)
C₅H₁₁
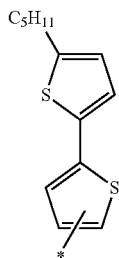
(ar-718)
C₆H₁₃
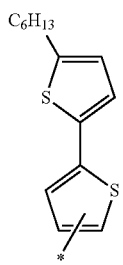
(ar-719)
H₃CS
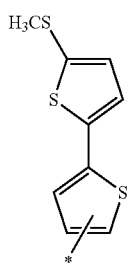
(ar-720)
C₆H₁₃S
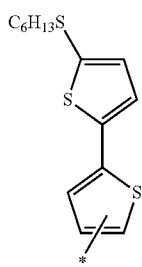
(ar-721)
F
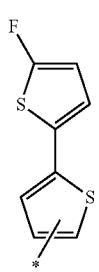
[Chemical 118]
(ar-722)
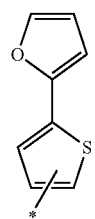
(ar-723)
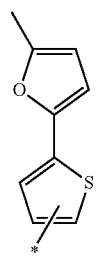
(ar-724)
C₅H₁₁
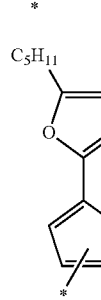
(ar-725)
C₆H₁₃
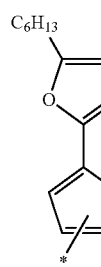
(ar-726)
H₃CS
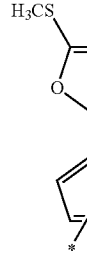
(ar-727)
C₆H₁₃S
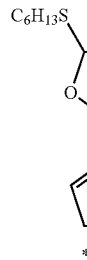

(ar-728)
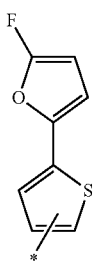
[Chemical 119]
(ar-729)
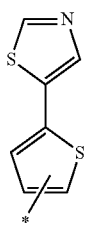
(ar-730)
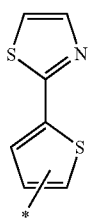
(ar-731)
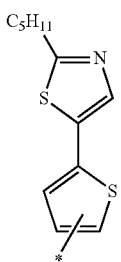
(ar-732)
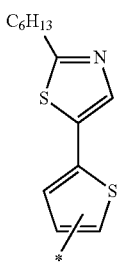
(ar-733)
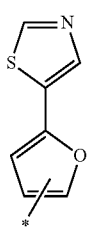
(ar-734)
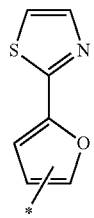
(ar-735)
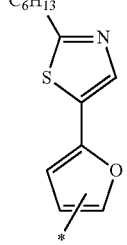
[Chemical 120]
(ar-736)
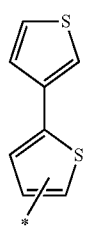
(ar-737)
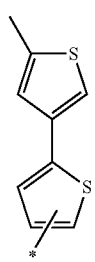
(ar-738)
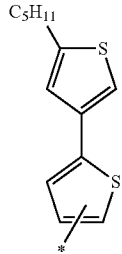
(ar-739)
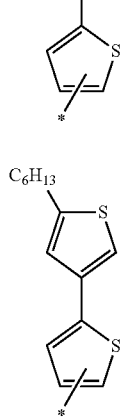

-continued
(ar-740)
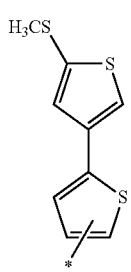
(ar-741)
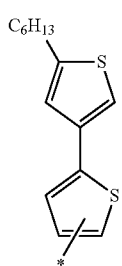
(ar-742)
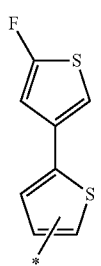
[Chemical 121]
(ar-743)
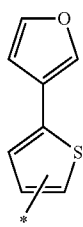
(ar-744)
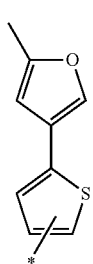
(ar-745)
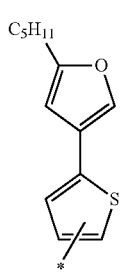
-continued
(ar-746)
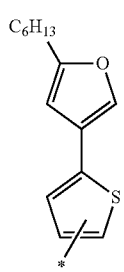
(ar-747)
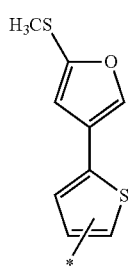
(ar-748)
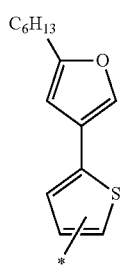
(ar-749)
[Chemical 122]
(ar-750)
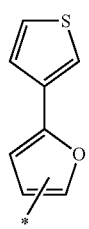
(ar-751)

-continued
(ar-752) 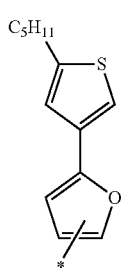
(ar-753) 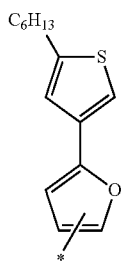
(ar-754) 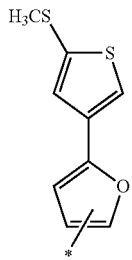
(ar-755) 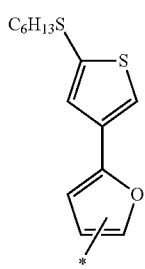
(ar-756) 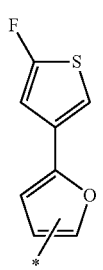
[Chemical 123]
(ar-757) 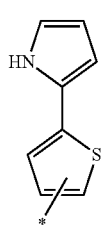
-continued
(ar-758) 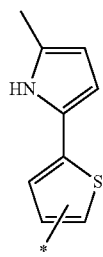
(ar-759) 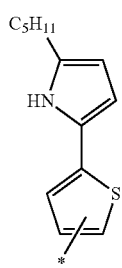
(ar-760) 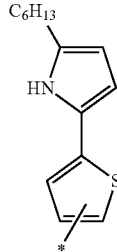
(ar-761) 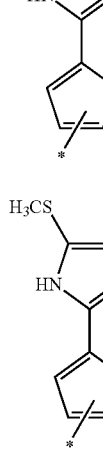
(ar-762) 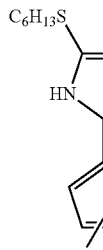
(ar-763) 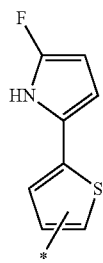

[Chemical 124]
(ar-764)
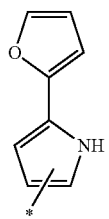
(ar-765)
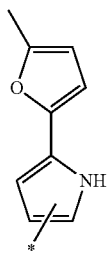
(ar-766)
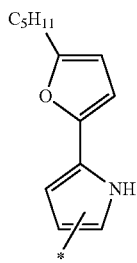
(ar-767)
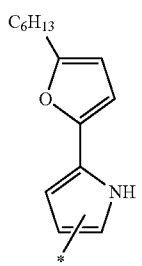
(ar-768)
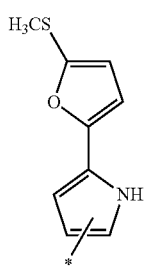
(ar-769)
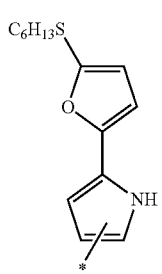
(ar-770)
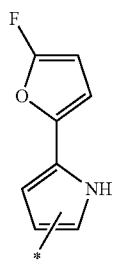
[Chemical 125]
(ar-771)
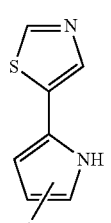
(ar-772)
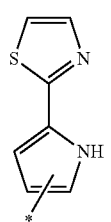
(ar-773)
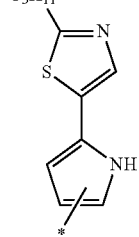
(ar-774)
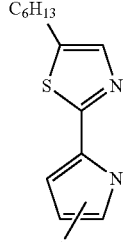
(ar-775)
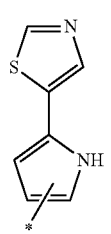

(ar-776) 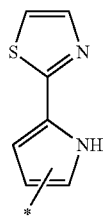
(ar-777) 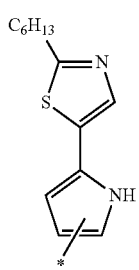
[Chemical 126]
(ar-778) 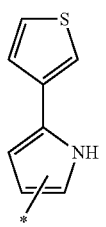
(ar-779) 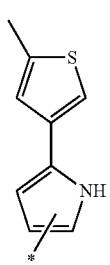
(ar-780) 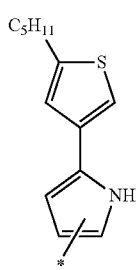
(ar-781) 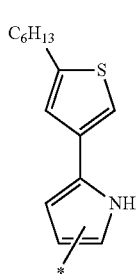
(ar-782) 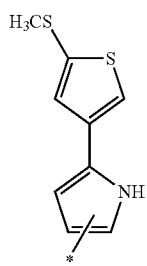
(ar-783) 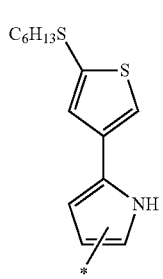
(ar-784) 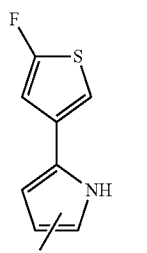
[Chemical 127]
(ar-785) 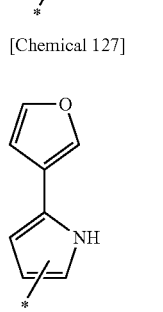
(ar-786) 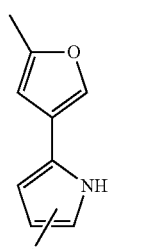
(ar-787) 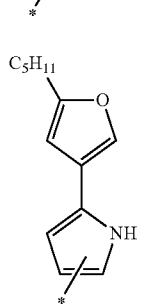

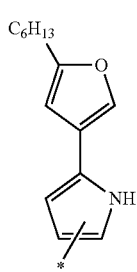 (ar-788)
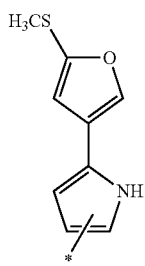 (ar-789)
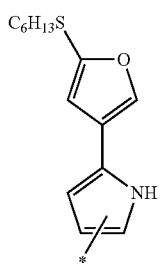 (ar-790)
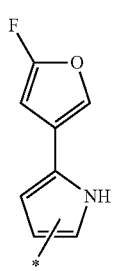 (ar-791)
[Chemical 128]
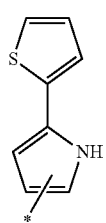 (ar-792)
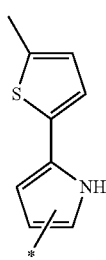 (ar-793)
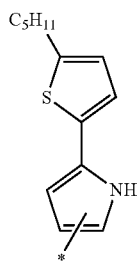 (ar-794)
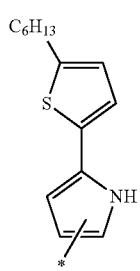 (ar-795)
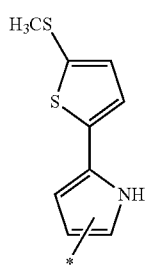 (ar-796)
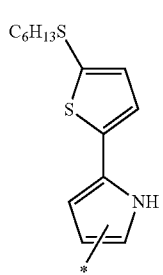 (ar-797)
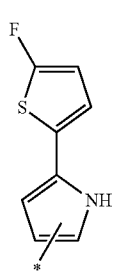 (ar-798)

[Chemical 129]
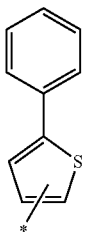 (ar-799)
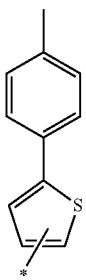 (ar-800)
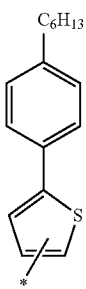 (ar-801)
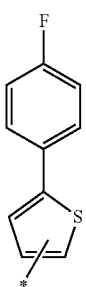 (ar-802)
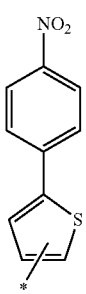 (ar-803)
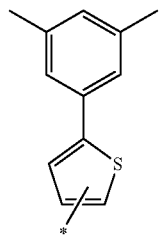 (ar-804)
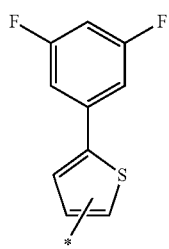 (ar-805)
[Chemical 130]
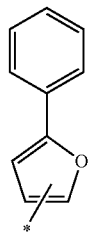 (ar-806)
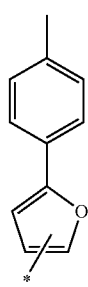 (ar-807)
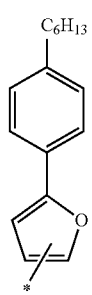 (ar-808)

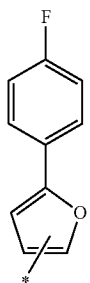
(ar-809)
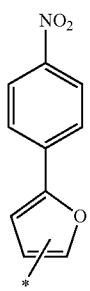
(ar-810)
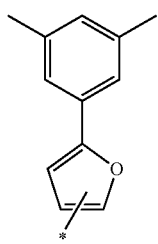
(ar-811)
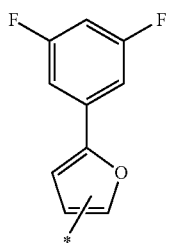
(ar-812)
[Chemical 131]
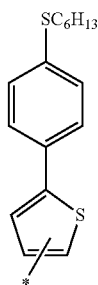
(ar-813)
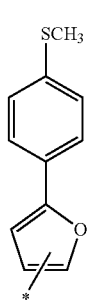
(ar-814)
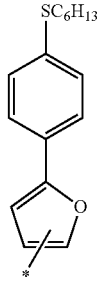
(ar-815)
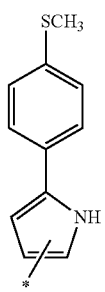
(ar-816)
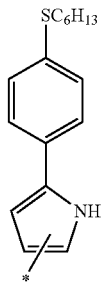
(ar-817)
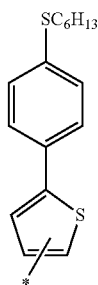
(ar-818)

(ar-819) 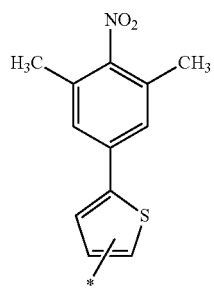
[Chemical 132]
(ar-820) 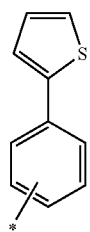
(ar-821) 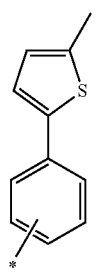
(ar-822) 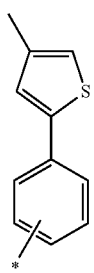
(ar-823) 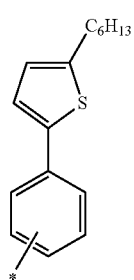
(ar-824) 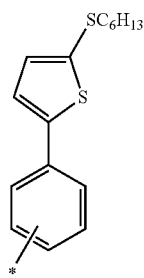
(ar-825) 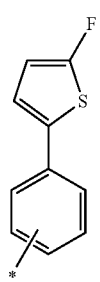
(ar-826) 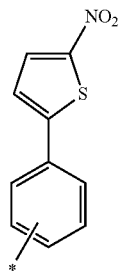
[Chemical 133]
(ar-827) 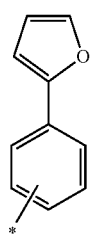
(ar-828) 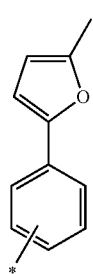

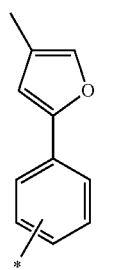 (ar-824)
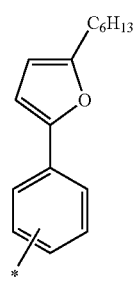 (ar-825)
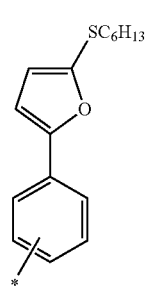 (ar-826)
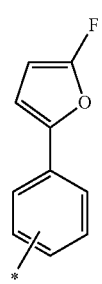 (ar-827)
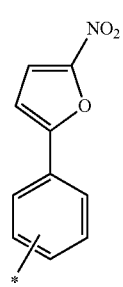 (ar-828)
(ar-829)
[Chemical 134]
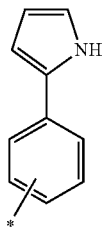 (ar-834)
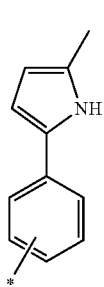 (ar-835)
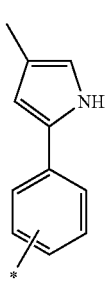 (ar-836)
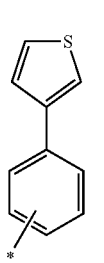 (ar-837)
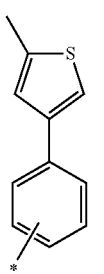 (ar-838)

-continued

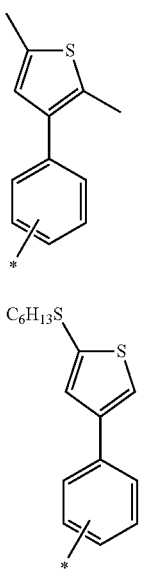

(ar-839)

(ar-840)

In the formulae (A) and (B), $A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms. The number of carbons in the divalent alicyclic hydrocarbon group is preferably 4 to 15, more preferably 5 to 14, more preferably 6 to 12, and for example 6 to 10. The number of carbons in the divalent aromatic hydrocarbon group is preferably 6 to 18, more preferably 6 to 16, more preferably 6 to 14, and for example 6 to 10. A hydrogen atom contained in the alicyclic hydrocarbon group and aromatic hydrocarbon group is optionally substituted with a halogen atom, —$R^3$, —$OR^4$, cyano group, or nitro group. Here, $R^3$ and $R^4$ each independently represent an alkyl group having 1 to 4 carbon atoms and a hydrogen atom contained in the alkyl group is optionally substituted with a fluorine atom.

Examples of the divalent alicyclic hydrocarbon group include a cycloalkanediyl group. —$CH_2$— (methylene group) contained in the alicyclic hydrocarbon group is optionally substituted with —O—, —S—, —NH—, or —$NR^5$— and —CH(—)- contained in the alicyclic hydrocarbon group is optionally substituted with —N(—)-. Here, $R^5$s each independently represent an alkyl group having 1 to 4 carbon atoms and a hydrogen atom contained in the alkyl group is optionally substituted with a fluorine atom.

Examples of the alkyl group having 1 to 4 carbon atoms include a methyl group, ethyl group, propyl group, isopropyl group, butyl group, isobutyl group, sec-butyl group, and tert-butyl group, among which, alkyl groups having 1 to 3 carbon atoms are preferable, alkyl groups having 1 to 2 carbon atoms are more preferable, and a methyl group is particularly preferable.

Examples of the divalent alicyclic hydrocarbon group include groups represented by the formulae (g-1) to (g-4). Examples of the divalent alicyclic hydrocarbon group in which —$CH_2$— contained therein is replaced with —O—, —S—, —NH—, or —$NR^5$— include groups represented by the formulae (g-5) to (g-8). $R^5$ represents a hydrogen atom or an alkyl group having 1 to 4 carbon atoms. Examples of the divalent alicyclic hydrocarbon group in which —CH(—)- contained therein is replaced with —N(—)- include groups represented by the formulae (g-9) to (g-10).

The above divalent alicyclic hydrocarbon group is preferably a five-membered or six-membered alicyclic hydrocarbon group.

[Chemical 135]

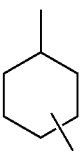

(g-1)

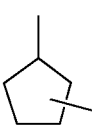

(g-2)

(g-3)

(g-4)

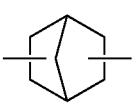

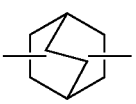

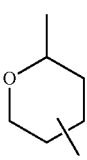

(g-5)

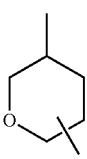

(g-6)

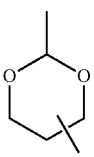

(g-7)

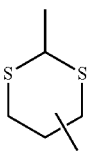

(g-8)

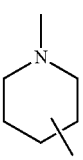

(g-9)

(g-10)

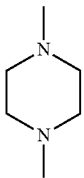

The divalent alicyclic hydrocarbon group is preferably a group represented by the formula (g-1), more preferably a 1,4-cyclohexanediyl group, and particularly preferably a trans-1,4-cyclohexanediyl group.

Examples of the divalent aromatic hydrocarbon group include groups represented by the formulae (a-1) to (a-8). The divalent aromatic hydrocarbon group is preferably a 1,4-phenylene group.

[Chemical 136]

(a-1)
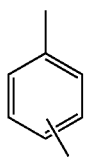

(a-2)
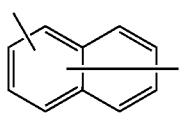

(a-3)
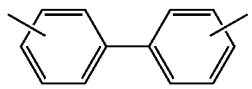

(a-4)
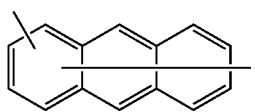

(a-5)
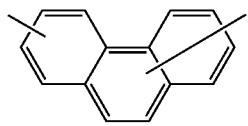

(a-6)
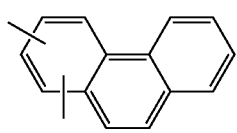

(a-7)
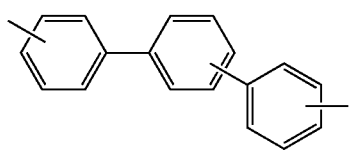

(a-8)
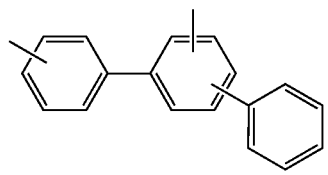

In an embodiment of the present invention, $A^1$ and $A^2$ are each independently preferably a divalent aromatic hydrocarbon group from a viewpoint of production. Also, in an embodiment of the present invention, $G^1$ and $G^2$ are each independently preferably a divalent alicyclic hydrocarbon group and more preferably a trans-cyclohexane-1,4-diyl group, and even more preferably both trans-cyclohexan-1,4-diyl groups from viewpoint of production. Also, $A^1$ and $A^2$ are preferably the same as each other and/or $G^1$ and $G^2$ are preferably the same as each other from the viewpoint of easiness of production of the polymerizable liquid crystal compound and also from the viewpoint that production cost can be reduced. In this case, the description that A1 and $A^2$ are the same as each other means that the both have the same structures with Ar as the center, which is the same to the description that $G^1$ and $G^2$ are the same as each other.

In the formulae (A) and (B), $B^1$, $B^2$, $D^1$, $D^2$, $E^1$, $E^2$, $J^1$, $J^2$, $Y^1$, and $Y^2$ each independently represent —$CR^1R^2$—, —$CH_2$—$CH_2$—, —O—, —S—, —CO—O—, —O—CO—, —O—CO—O—, —C(=S)—O—, —O—C (=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond. Here, $R^1$ and $R^2$ each independently represent a hydrogen atom, a fluorine atom, or an alkyl group having 1 to 4 carbon atoms.

$B^1$ and $B^2$ are each independently preferably —O—, —S—, —O—CO—, —CO—O—, —O—C(=S)—, —C(=S)—O—, —CO—$NR^1$—, —$NR^2$—CO—, —O—$CH_2$—, —$CH_2$—O—, —S—$CH_2$—, or —$CH_2$— S— and more preferably —O—, —O—CO—, or —CO— O— from a viewpoint of production. $B^1$ and $B^2$ are preferably the same as each other from the viewpoint of easiness of production of the polymerizable liquid crystal compound and also from the viewpoint that production cost can be reduced. In this case, the description that $B^1$ and $B^2$ are the same as each other means that the both have the same structures with Ar as the center. When $B^1$ is, for example, —O—CO—, $B^2$ which is the same as $B^1$ is —CO—O—.

$D^1$, $D^2$, $E^1$, $E^2$, $J^1$, and $J^2$ are each independently preferably —O—, —S—, —O—CO—, —CO—O—, —O—C (=S)—, —C(=S)—O—, —CO—$NR^1$—, —$NR^2$—CO—, —O—$CH_2$—, —$CH_2$—O—, —S—$CH_2$—, or —$CH_2$— S— and more preferably —O—, —O—CO—, or —CO— O— from a viewpoint of production. $D^1$ and $D^2$ are preferably the same as each other, $J^1$ and $J^2$ are preferably the same as each other, and/or $E^1$ and $E^2$ are preferably the same as each other from the viewpoint of easiness of production of the polymerizable liquid crystal compound and also from the viewpoint that production cost can be reduced. In this case, the description that $D^1$ and $D^2$ are the same as each other means that the both have the same structures with Ar as the center, which is the same to the description that $J^1$ and $J^2$ are the same as each other and the description that $E^1$ and $E^2$ are the same as each other.

$Y^1$ and $Y^2$ are each independently preferably —O—, —S—, —O—CO—, —CO—O—, —O—C(=S)—, —C(=S)—O—, —CO—$NR^1$—, —$NR^2$—CO—, —O—CH$_2$—, —CH$_2$—O—, —S—CH$_2$—, or —CH$_2$—S— and more preferably —O—, —O—CO—, or —CO—O— from viewpoint of a production. Y$^1$ and Y$^2$ are preferably the same as each other from the viewpoint of easiness of production of the polymerizable liquid crystal compound and also from the viewpoint that production cost can be reduced. In this case, the description that Y$^1$ and Y$^2$ are the same as each other means that Y$^1$ and Y$^2$ have the same structures with Ar as the center.

In the formulae (A) and (B), m1 and m2 each independently denote an integer from 0 to 3, preferably an integer from 0 to 2, more preferably an integer from 1 to 2, and for example, an integer of 1. In a preferred embodiment of the present invention, m1 and m2 are preferably the same as each other from the viewpoint of easiness of production of the polymerizable liquid crystal compound and also from the viewpoint that production cost can be reduced.

In the formula (B), n1 and n2 each independently denote an integer from 0 to 3, preferably an integer from 0 to 2, and more preferably an integer from 0 to 1. Also, the sum of n1 and n2 is 1 to 6, preferably 1 to 3, for example, 1 to 2, and particularly 1. If the sum of n1 and n2 is the above upper limit or less, the solubility of the polymerizable liquid crystal compound (B) in a solvent is improved. If the sum of n1 and n2 is the above lower limit or more, this can produce an effect on reduction in the precipitation of the polymerizable liquid crystal compound. It is to be noted that a plurality of polymerizable liquid crystal compounds (B) may be used and, in this case, the averages of n1 and n2 each independently denote an integer from 0 to 3, preferably an integer from 0 to 2, and for example, an integer from 1 to 2 or 0 to 1. The sum of n1 and n2 in the polymerizable liquid crystal compound (B) can be determined, for example, by the charge amount of a raw material in a production process, measurement of LC-MS, and the like.

In the formulae (A) and (B), F$^1$ and F$^2$ each independently represent an alkanediyl group having 1 to 16, preferably 2 to 15, more preferably 3 to 12, even more preferably 4 to 11, and for example, 4 to 7 carbon atoms or a single bond. A hydrogen atom contained in the alkanediyl group is optionally substituted with —OR$^9$ or a halogen atom and —CH$_2$— contained in the alkanediyl group is optionally substituted with —O— or —CO—. R$^9$ represents an alkyl group having 1 to 4 carbon atoms and a hydrogen atom contained in the alkyl group is optionally substituted with a fluorine atom. F$^1$ and F$^2$ are preferably the same as each other from the viewpoint of easiness of production of the polymerizable liquid crystal compound and also from the viewpoint that production cost can be reduced. Here, the description that F$^1$ and F$^2$ are the same as each other means that F$^1$ and F$^2$ have the same structures with Ar as the center.

In the formula (B), Z$^1$ and Z$^2$ each independently represent an alkanediyl group having 1 to 16, preferably 3 to 15, more preferably 4 to 13, even more preferably 5 to 12, and for example, 6 to 11 carbon atoms or a single bond. A hydrogen atom contained in the alkanediyl group is optionally substituted with —OR$^9$ or a halogen atom and —CH$_2$— contained in the alkanediyl group is optionally substituted with —O— or —CO—. R$^9$ represents an alkyl group having 1 to 4 carbon atoms and a hydrogen atom contained in the alkyl group is optionally substituted with a fluorine atom. Z$^1$ and Z$^2$ are preferably the same as each other from the viewpoint of easiness of production of the polymerizable liquid crystal compound and also from the viewpoint that production cost can be reduced. Here, the description that Z$^1$ and Z$^2$ are the same as each other means that Z$^1$ and Z$^2$ have the same structures with Ar as the center.

In the formulae (A) and (B), P$^1$ and P$^2$ each independently represent a hydrogen atom or a polymerizable group and at least one of P$^1$ and P$^2$ represents a polymerizable group and preferably P$^1$ and P$^2$ represent polymerizable groups. The polymerizable group is a group including a group allowed to participate in a polymerization reaction. Examples of the group allowed to participate in a polymerization reaction include a vinyl group, p-(2-phenylethenyl)phenyl group, acryloyl group, acryloyloxy group, methacryloyl group, methacryloyloxy group, carboxyl group, methylcarbonyl group, hydroxyl group, carbamoyl group, alkylamino group having 1 to 4 carbon atoms, amino group, formyl group, —N=C=O, —N=C=S, oxyranyl group, and oxetanyl group.

The polymerizable group is preferably a radical polymerizable group or cationic polymerizable group in the point of adaptability to photopolymerization, is preferably an acryloyl group, acryloyloxy group, methacryloyl group, or methacryloyloxy group in the point of easy handlability and easiness of production, and is more preferably an acryloyl group or acryloyloxy group in the point of high polymerization ability.

In the formula (B), X$^1$ and X$^2$ each independently represent a divalent alicyclic hydrocarbon group having 3 to 16, preferably 4 to 14, more preferably 5 to 12, and, for example, 6 to 10 carbon atoms, provided that a hydrogen atom contained in the alicyclic hydrocarbon group is optionally substituted with a halogen atom, —R$^6$, —OR$^7$, cyano group, or nitro group, —CH$_2$— contained in the alicyclic hydrocarbon group is optionally substituted with, —O—, —S—, —NH—, or —NR$^8$—, and —CH(—)- contained in the alicyclic hydrocarbon group is optionally substituted with —N(—)-. Here, R$^8$ represents an alkyl group having 1 to 4 carbon atoms and a hydrogen atom contained in the alkyl group is optionally substituted with a fluorine atom. Examples of the divalent alicyclic hydrocarbon group in X$^1$ and X$^2$ include substituents exemplified as the divalent alicyclic hydrocarbon group in A$^1$, A$^2$, G$^1$, and G$^2$. Particularly, X$^1$ and X$^2$ are independently preferably a trans-cyclohexane-1,4-diyl group. R$^6$ and R$^7$ each independently represent an alkyl group having 1 to 4 carbon atoms and a hydrogen atom contained in the alkyl group is optionally substituted with a fluorine atom. Since X$^1$ and X$^2$ are independently a divalent alicyclic hydrocarbon group having the aforementioned number of carbon atoms, the precipitation of the polymerizable liquid crystal compound (A) can be more reduced. In this case, X$^1$ and X$^2$ are preferably the same as each other from the viewpoint of easiness of production of the polymerizable liquid crystal compound and also from the viewpoint that production cost can be reduced. Here, the description that X$^1$ and X$^2$ are the same as each other means that X$^1$ and X$^2$ have the same structures with Ar as the center. G$^1$, G$^2$, X$^1$, and X$^2$ are preferably the same as each other and more preferably trans-cyclohexane-1,4-diyl groups from the viewpoint of the orientation of the polymerizable liquid crystal compound.

In an embodiment of the present invention, the above polymerizable liquid crystal compound (B) is provided. The polymerizable liquid crystal compound (B) may be used as a polymerizable liquid crystal compound for producing a retardation film and particularly, as an additive for a liquid crystal composition containing the aforementioned polymerizable liquid crystal compound (A). The addition of the polymerizable liquid crystal compound (B) in the composition containing various kinds of polymerizable liquid crystal compound can reduce the precipitation of the polymerizable liquid crystal compound. For example, the addition of the polymerizable liquid crystal compound (B) in the composition containing the polymerizable liquid crystal compound (A) can reduce the precipitation of the polymerizable liquid crystal compound (A) when the composition is dissolved in a solvent. This reason is considered to be that the polymerizable liquid crystal compound (B) stabilizes the supersaturated state of the polymerizable liquid crystal compound (A) under heating in a solution prepared by dissolving the polymerizable liquid crystal compounds (A) and (B), though not constrained by a specific theory. Although there is a technique of introducing a substituent such as a long-chain alkyl or the like in a polymerizable liquid crystal compound as a measure for improving the solubility of a polymerizable liquid crystal compound in a solvent, such a technique causes the disturbance of the orientation of the liquid crystal compound by the existence of the introduced substituent, with the result that it becomes difficult to produce a retardation film from the polymerizable liquid crystal compound. However, because, according to the present invention, the precipitation of the polymerizable liquid crystal compound contained in the liquid crystal composition can be reduced without introducing any substituent such as a long-chain alkyl by adding the polymerizable liquid crystal compound (B), it is advantageous from the viewpoint that the preservation stability of the liquid crystal composition when the composition is dissolved in a solvent is improved and also, the orientation defects of a retardation film to be obtained can be reduced. In this case, the improvement in preservation stability also ensures that the coating stability of the liquid crystal composition can be improved.

The liquid crystal composition of the present invention includes the polymerizable liquid crystal compounds (A) and (B). Ar, $A^1$, $A^2$, $B^1$, $B^2$, $D^1$, $D^2$, $E^1$, $E^2$, $F^1$, $F^2$, $G^1$, $G^2$, $P^1$, $P^2$, m1, and m2 in the formula (A) representing the polymerizable liquid crystal compound (A) may be the same as or different from Ar, $A^1$, $A^2$, $B^1$, $B^2$, $D^1$, $D^2$, $E^1$, $E^2$, $F^1$, $F^2$, $G^1$, $G^2$, $P^1$, $P^2$, m1, and m2 in the formula (B) representing the polymerizable liquid crystal compound (B). In a preferred embodiment of the present invention, Ar, $A^1$, $A^2$, $B^1$, $B^2$, $D^1$, $D^2$, $E^1$, $E^2$, $F^1$, $F^2$, $G^1$, $G^2$, $P^1$, $P^2$, m1, and m2 in the formula (A) representing the polymerizable liquid crystal compound (A) are the same as Ar, $A^1$, $A^2$, $B^1$, $B^2$, $D^1$, $D^2$, $E^1$, $E^2$, $F^1$, $F^2$, $G^1$, $G^2$, $P^1$, $P^2$, m1, and m2 in the formula (B) representing the polymerizable liquid crystal compound (B). In this case, when the liquid crystal composition containing the polymerizable liquid crystal compounds (A) and (B) is added in a solvent, the effect of a reduction in the precipitation of the polymerizable liquid crystal compound is improved and the preparations of the polymerizable liquid crystal compounds (A) and (B) to be contained in the liquid crystal composition of the present invention can be easily made in one-pot at the same time, enabling a very simple preparation of the liquid crystal composition of the present invention, which is economically advantageous.

A retardation film constituted from a polymer of the above polymerizable liquid crystal compound (A) kept in an oriented state preferably exhibits inverse wavelength dispersibility. If a retardation film constituted from a polymer of the polymerizable liquid crystal compound (A) kept in an oriented state exhibits inverse wavelength dispersibility, this is preferable because this enables uniform conversion of polarized light in a wide wavelength range. The inverse wavelength dispersibility is proved in the case where [Re (450 nm)/Re(550 nm)]<1, whereas positive wavelength dispersibility is proved in the case where [Re(450 nm)/Re(550 nm)]≥1.

The maximum absorption wavelength ($\lambda_{max}$) of the polymerizable liquid crystal compound (A) is preferably 300 to 400 nm, more preferably 315 to 385 nm, and even more preferably 320 to 380 nm. If the maximum absorption wavelength of the polymerizable liquid crystal compound (A) is the above lower limit or more, a retardation film constituted from a polymer of the polymerizable liquid crystal compound (A) kept in an oriented state tends to exhibit inverse wavelength dispersibility. If the maximum absorption wavelength ($\lambda_{max}$) of the polymerizable liquid crystal compound (A) is the above upper limit or less, absorption in the visible region is reduced, so that coloring of a film can be avoided.

The above polymerizable liquid crystal compound (A) has five or more ring structures on its principal chain. When the polymerizable liquid crystal compound (A) has five or more ring structures on its principal chain, the thermal stability of a liquid crystal phase can be improved. In this case, the upper limit of the number of ring structures on the principal chain of the polymerizable liquid crystal compound (A) is usually 12 or more and, for example, 9 or less.

Examples of the polymerizable liquid crystal compound (A) include the following compounds.

[Chemical 137]

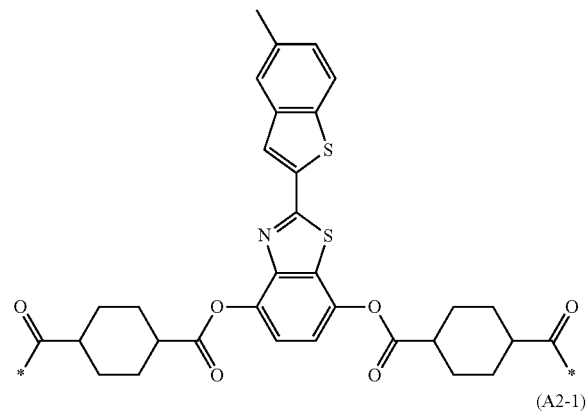

(A2-1)

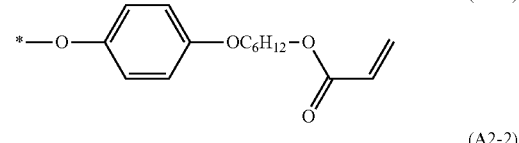

(A2-2)

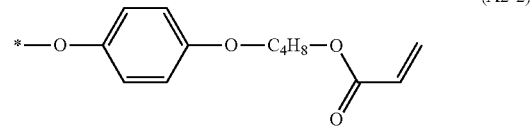

(A2-3)

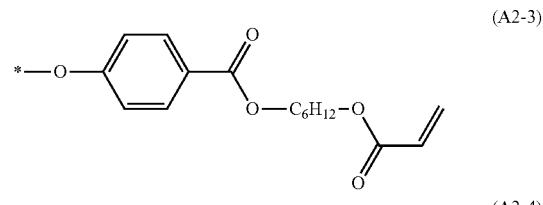

(A2-4)

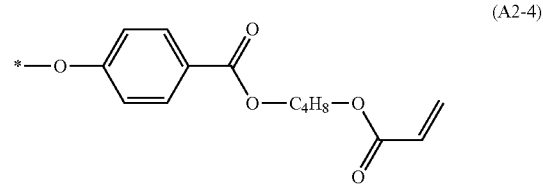

(A2-5) 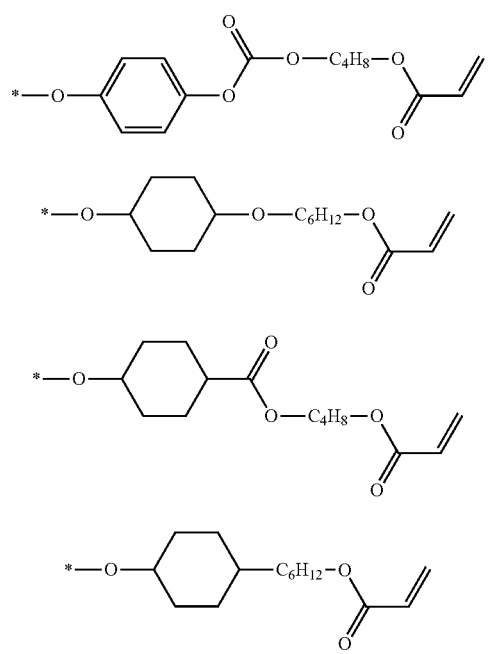
(A2-6)
(A2-7)
(A2-8)
[Chemical 138]
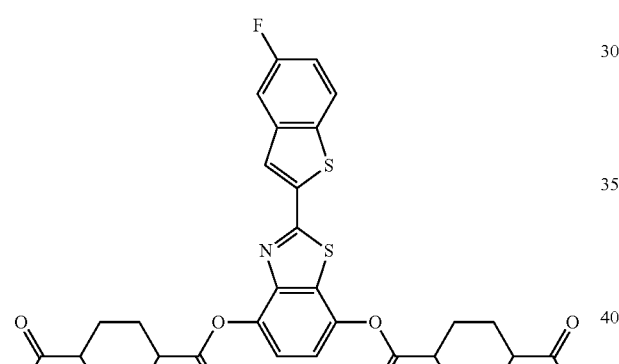
(A4-1) 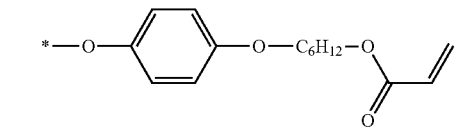
(A4-2)
(A4-3) 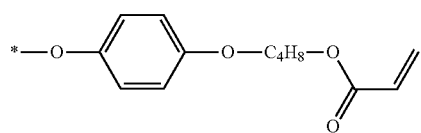
(A4-4) 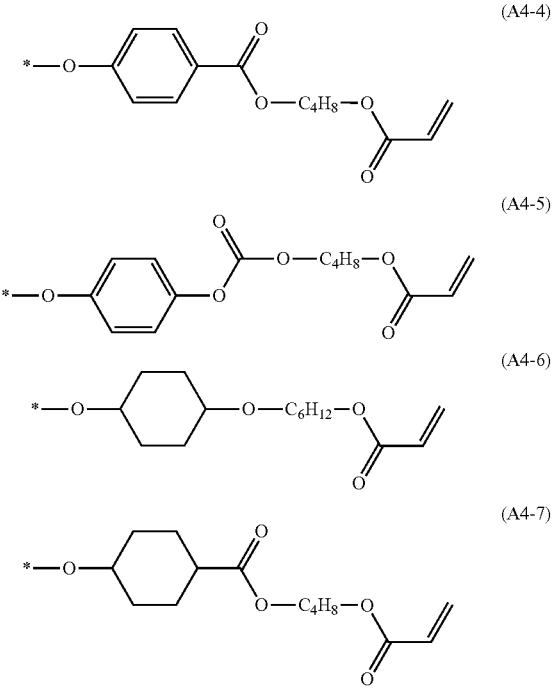
(A4-5)
(A4-6)
(A4-7)
(A4-8)
[Chemical 139]
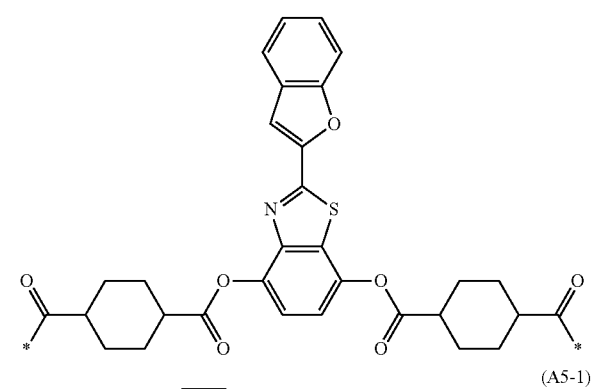
(A5-1) 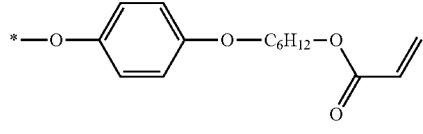
(A5-2) 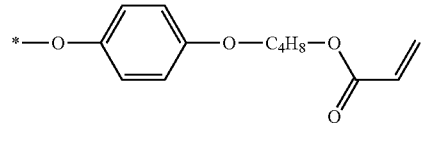
(A5-3) 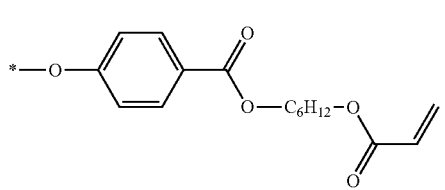

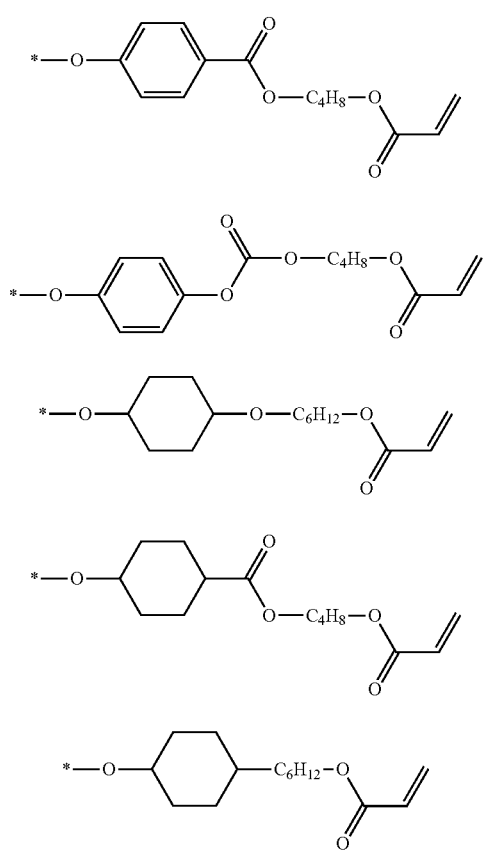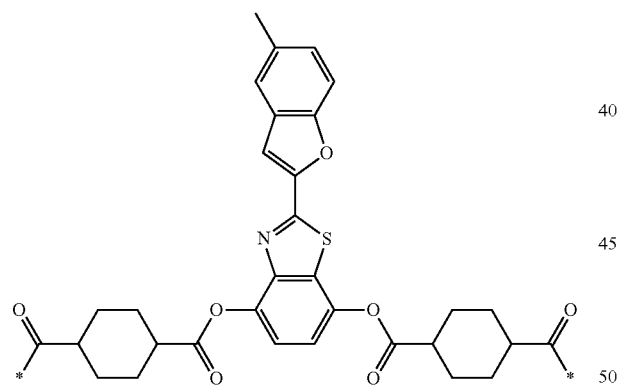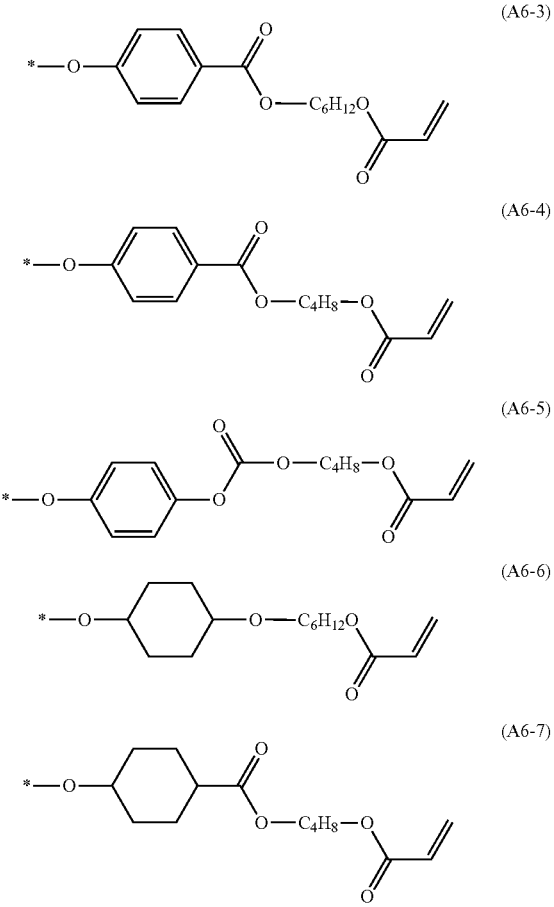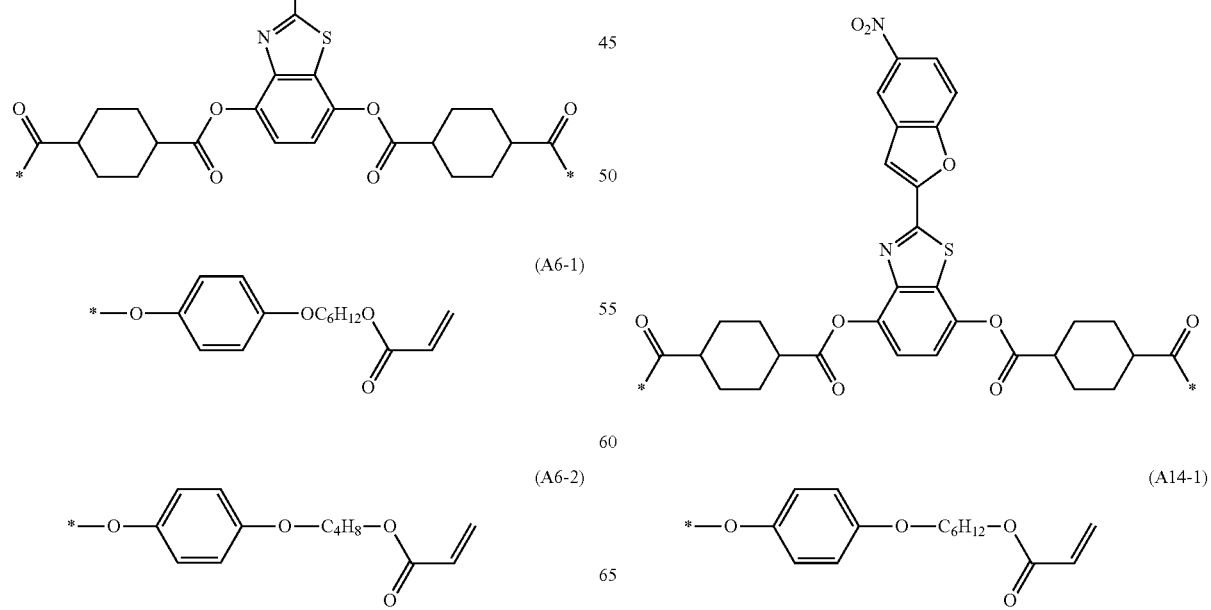

-continued
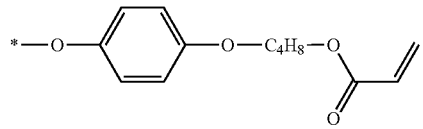 (A14-2)
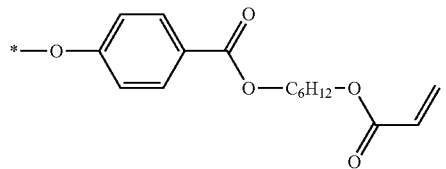 (A14-3)
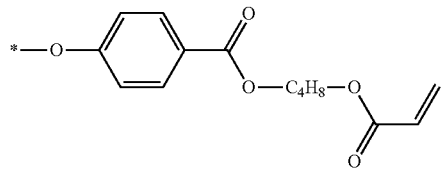 (A14-4)
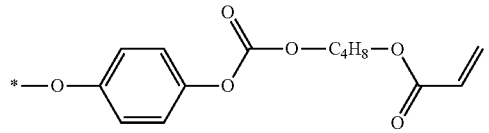 (A14-5)
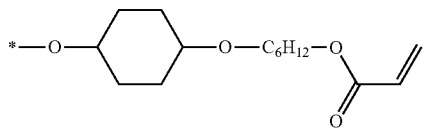 (A14-6)
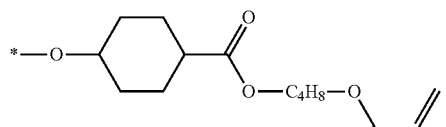 (A14-7)
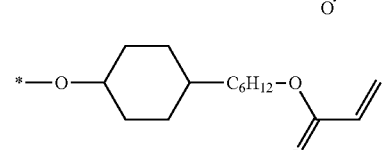 (A14-8)
[Chemical 142]
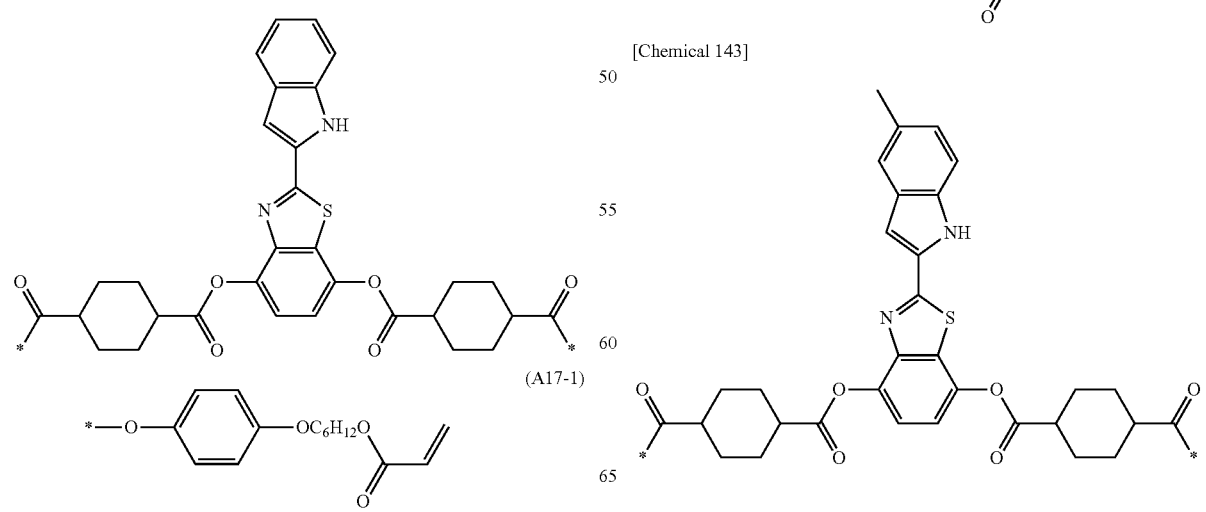
-continued
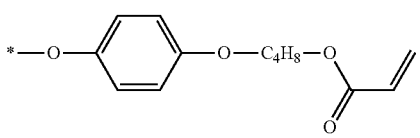 (A17-2)
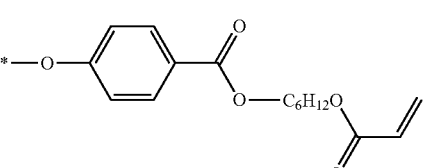 (A17-3)
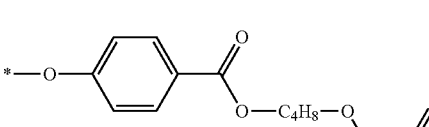 (A17-4)
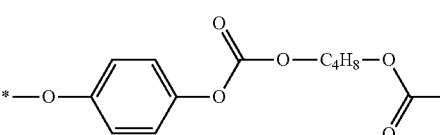 (A17-5)
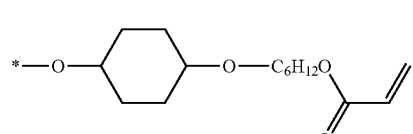 (A17-6)
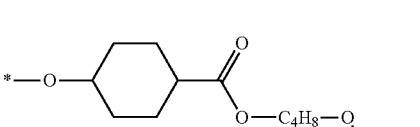 (A17-7)
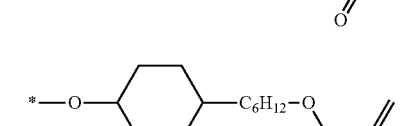 (A17-8)
(A17-1)
[Chemical 143]
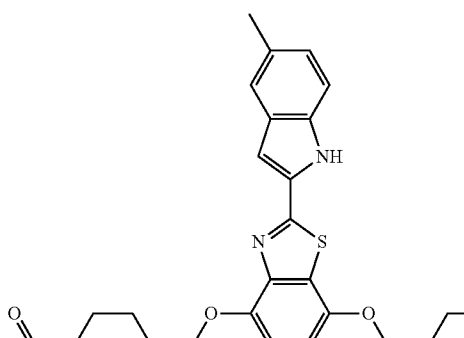

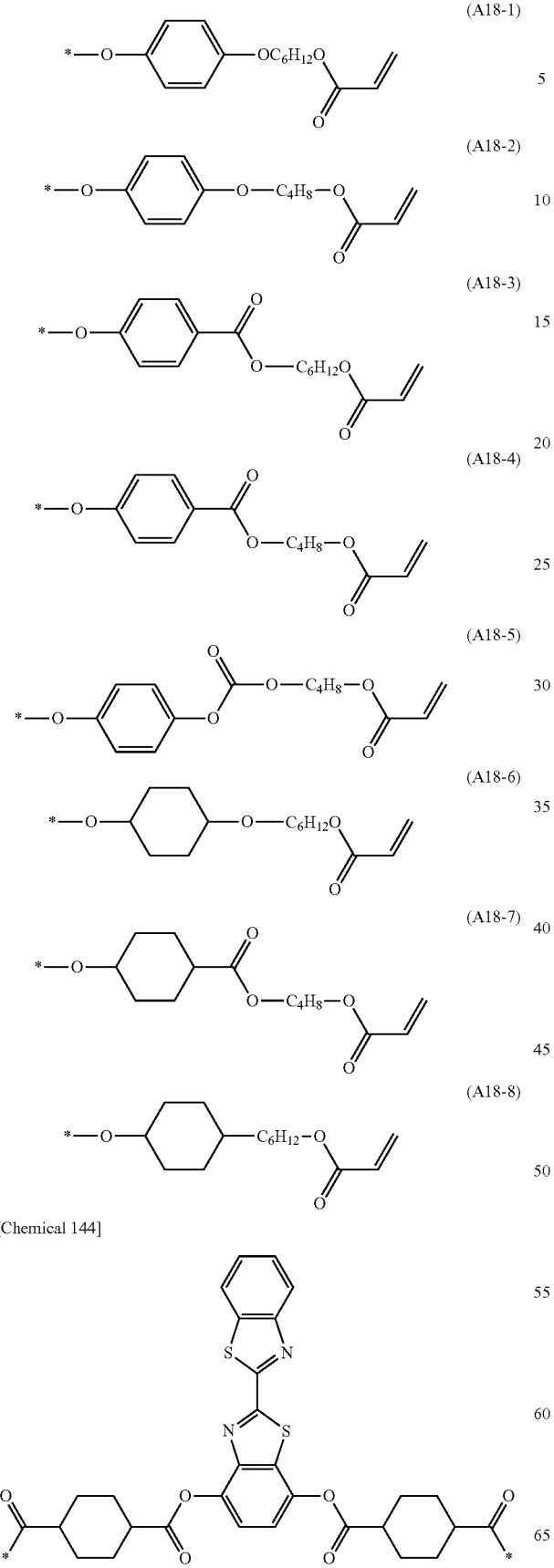

[Chemical 145]
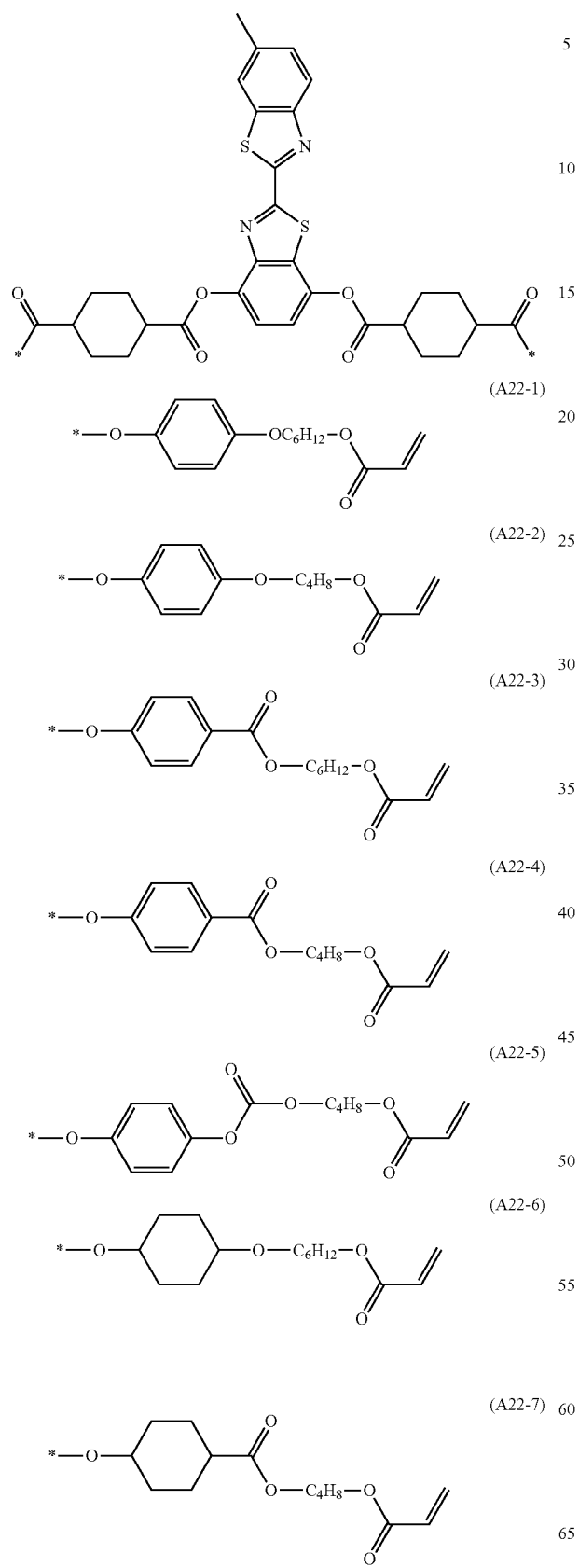
(A22-1)
(A22-2)
(A22-3)
(A22-4)
(A22-5)
(A22-6)
(A22-7)
(A22-8)
[Chemical 146]
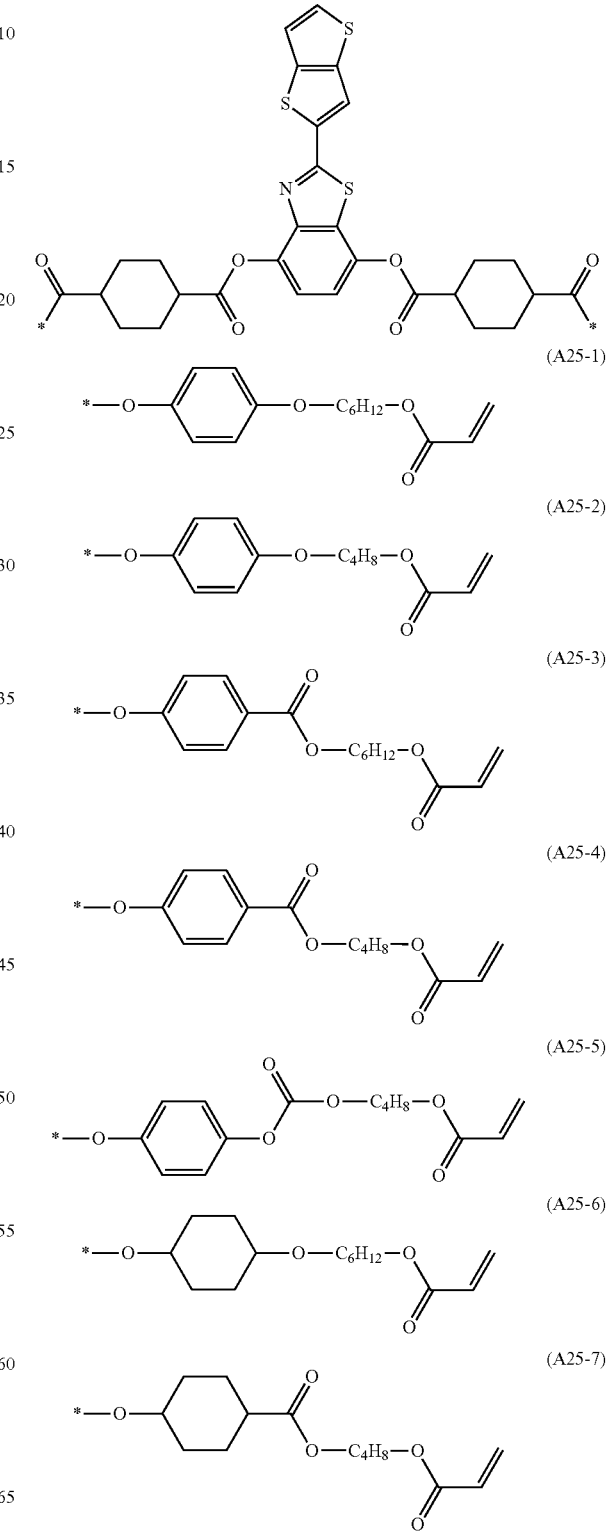
(A25-1)
(A25-2)
(A25-3)
(A25-4)
(A25-5)
(A25-6)
(A25-7)

(A25-8)
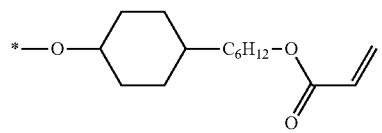
[Chemical 147]
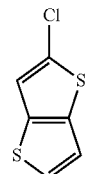
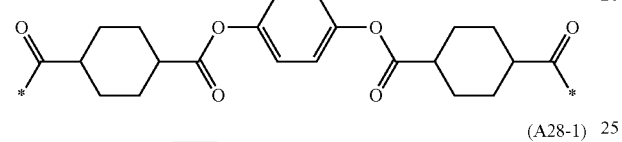
(A28-1)
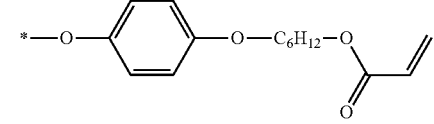
(A28-2)
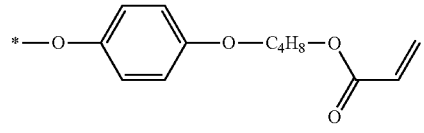
(A28-3)
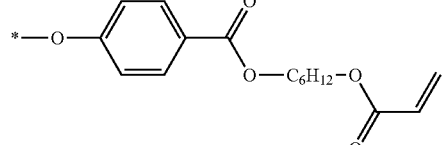
(A28-4)
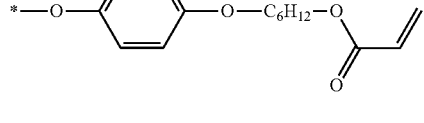
(A28-5)
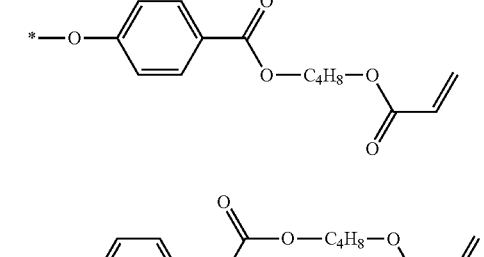
(A28-6)
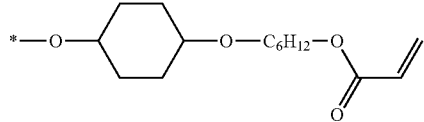
(A28-7)
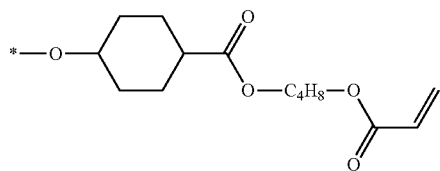
(A28-8)
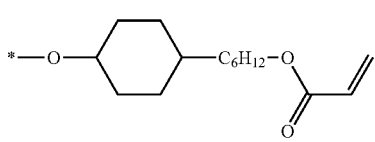
[Chemical 148]
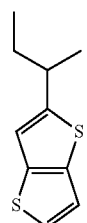
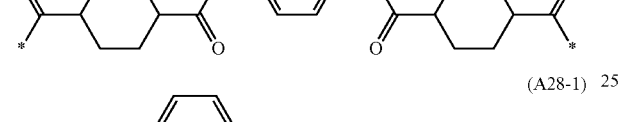
(A31-1)
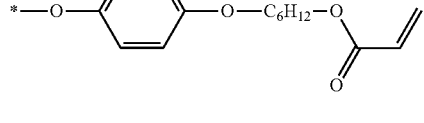
(A31-2)
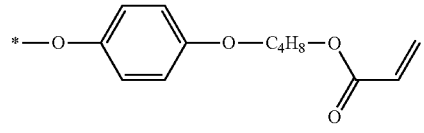
(A31-3)
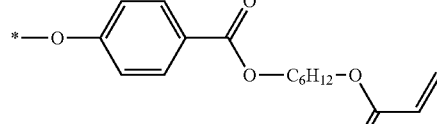
(A31-4)
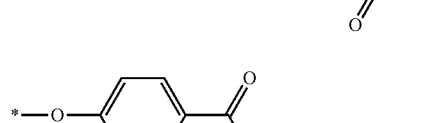
(A31-5)
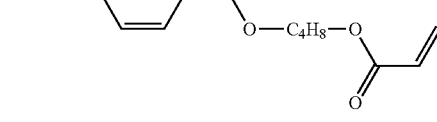

-continued
(A31-6) 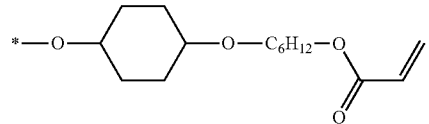
(A31-7) 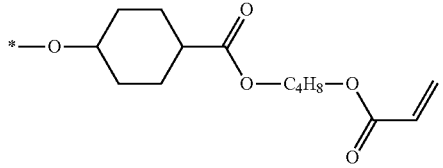
(A31-8) 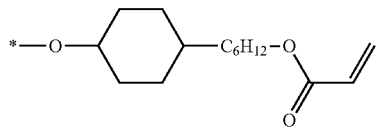
[Chemical 149]
-continued
(A33-6) 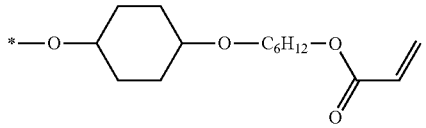
(A33-7) 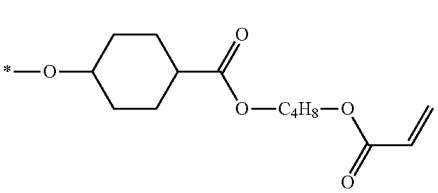
(A33-8) 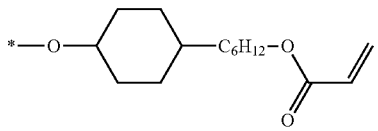
[Chemical 150]
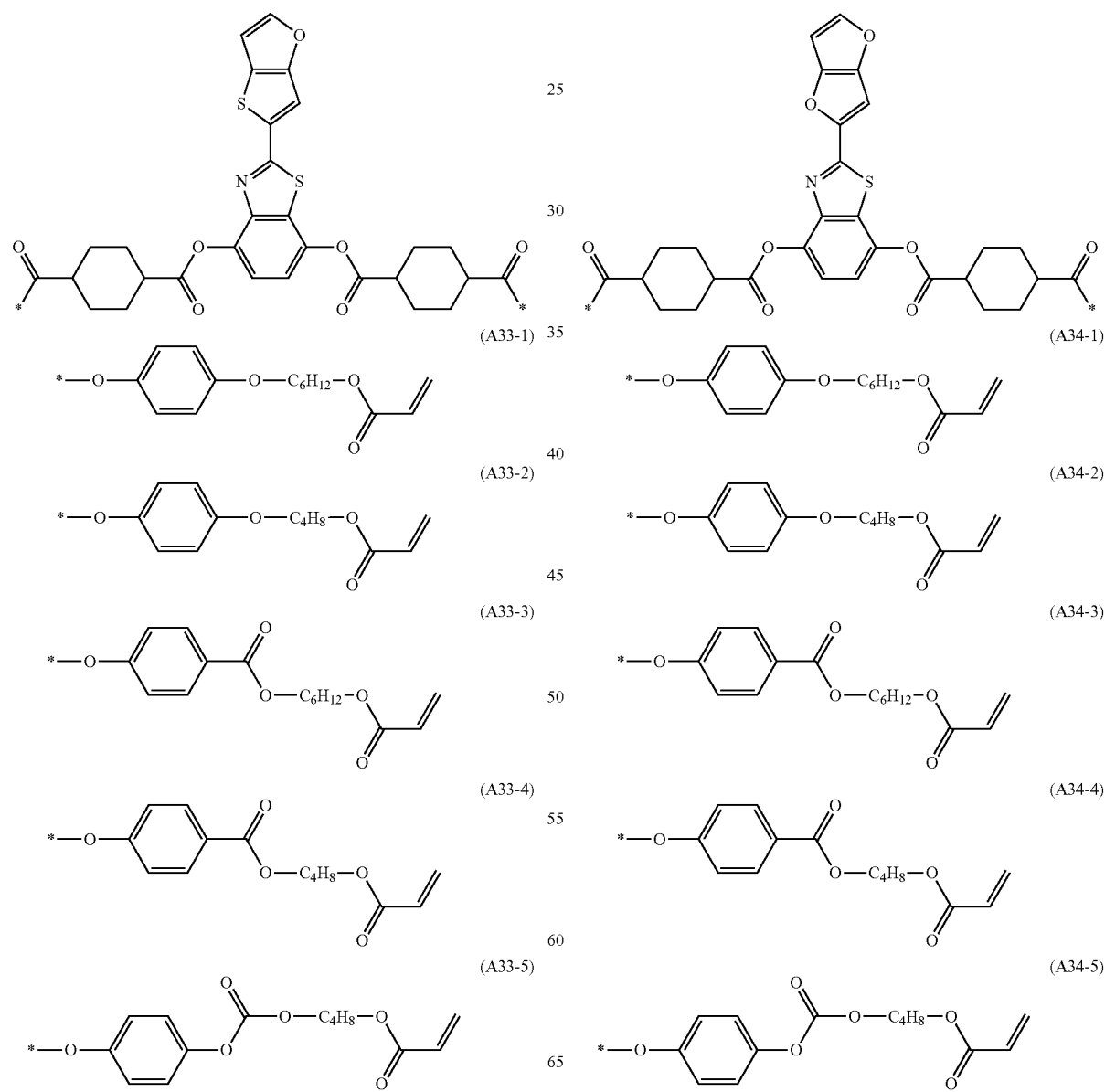
(A33-1)
(A33-2)
(A33-3)
(A33-4)
(A33-5)
(A34-1)
(A34-2)
(A34-3)
(A34-4)
(A34-5)

(A34-6) 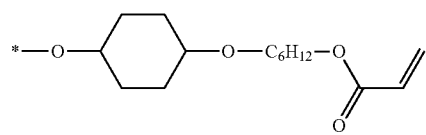
(A34-7) 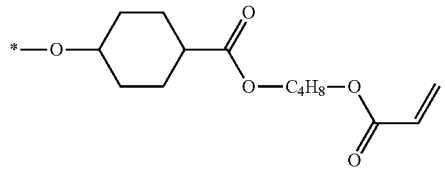
(A34-8) 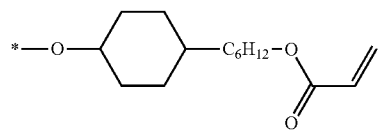
[Chemical 151]
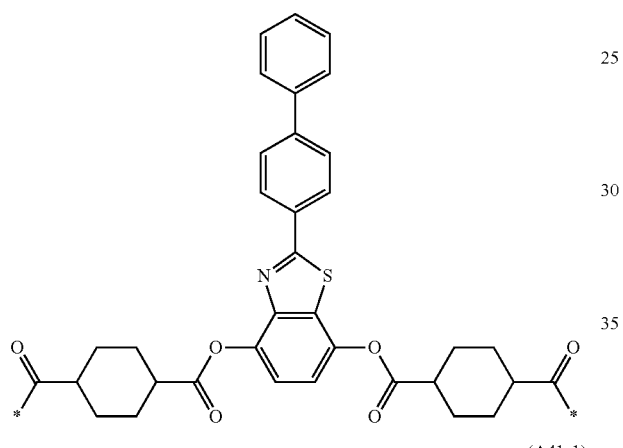
(A41-1) 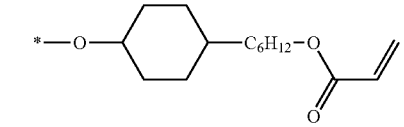
(A41-2) 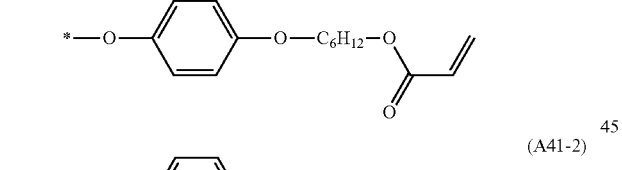
(A41-3) 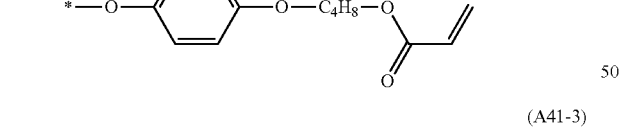
(A41-4) 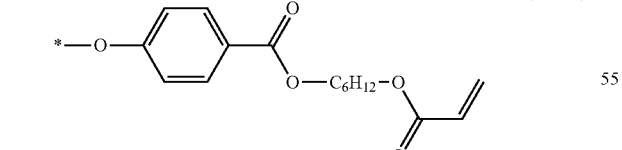
(A41-5) 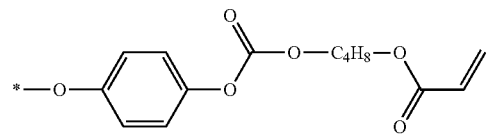
(A41-6) 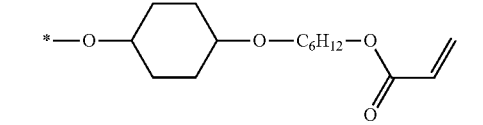
(A41-7) 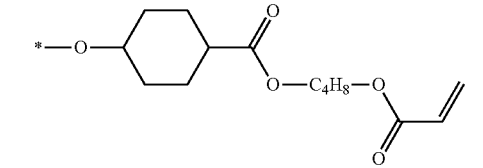
(A41-8) 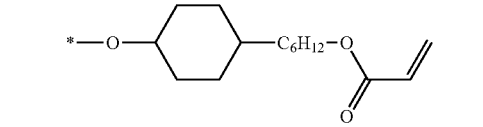
[Chemical 152]
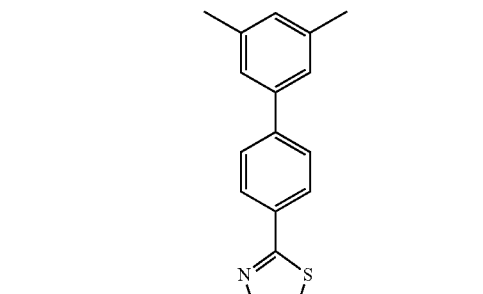
(A42-1) 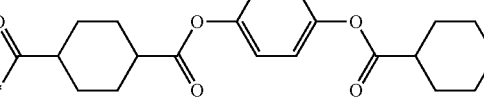
(A42-2) 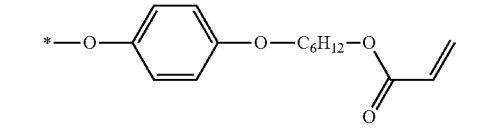
(A42-3) 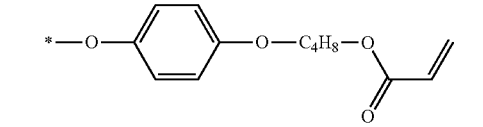

-continued
(A42-4)
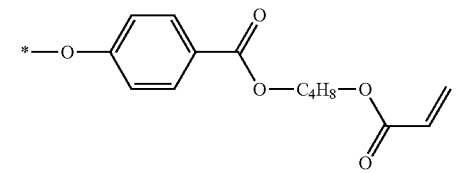
(A42-5)
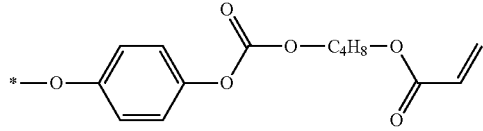
(A42-6)
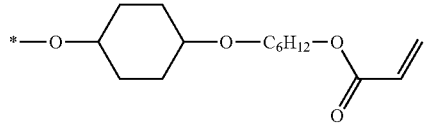
(A42-7)
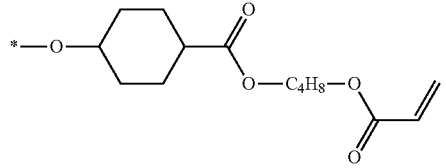
(A42-8)
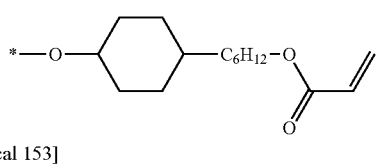
[Chemical 153]
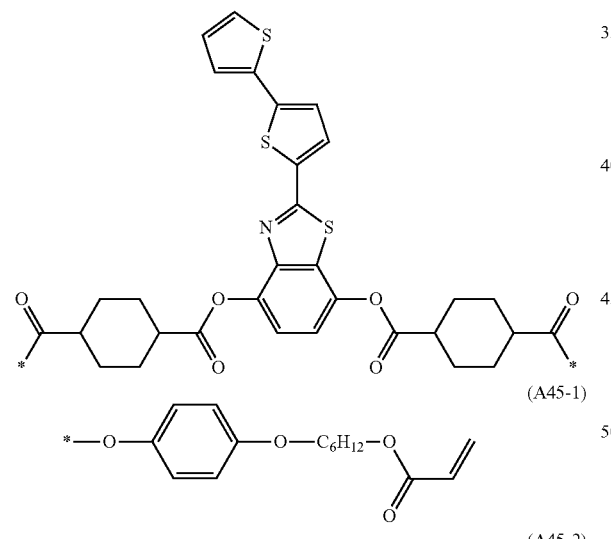
(A45-1)
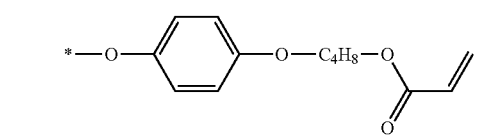
(A45-2)
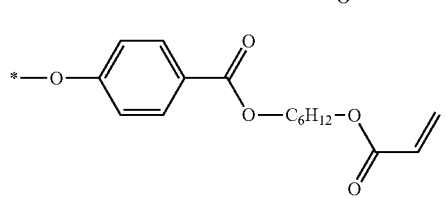
(A45-3)
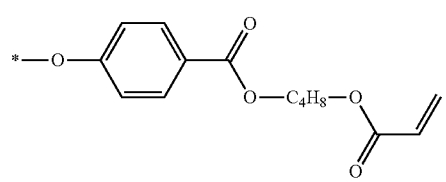
-continued
(A45-4)
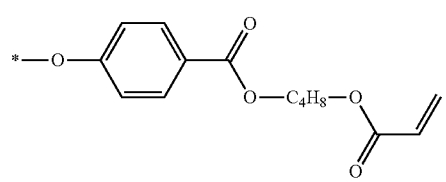
(A45-5)
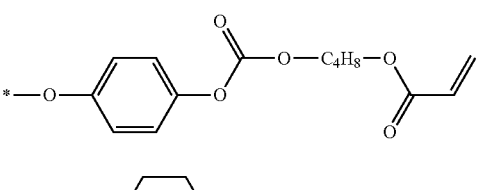
(A45-6)
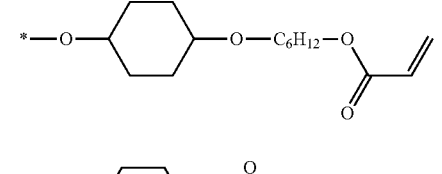
(A45-7)
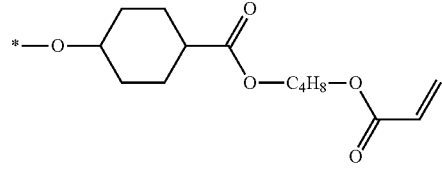
(A45-8)
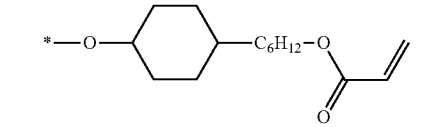
[Chemical 154]
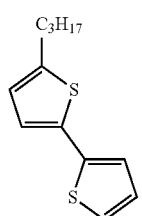
(A47-1)
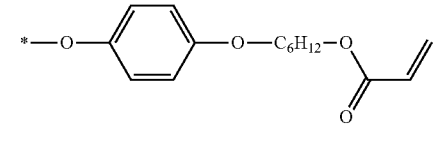
(A47-2)
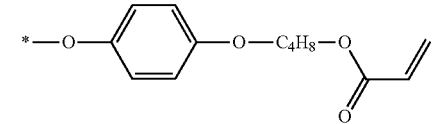

(A47-3) 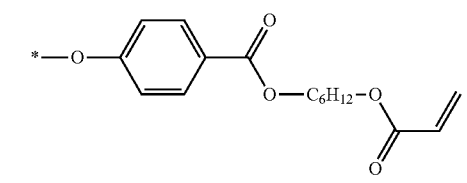
(A47-4) 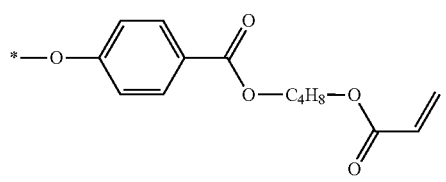
(A47-5) 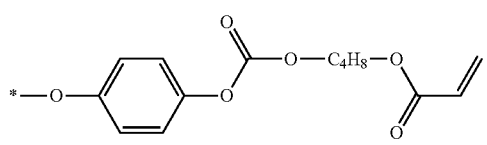
(A47-6) 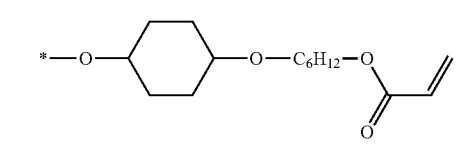
(A47-7) 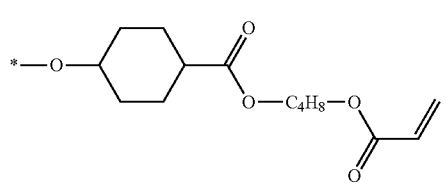
(A47-8) 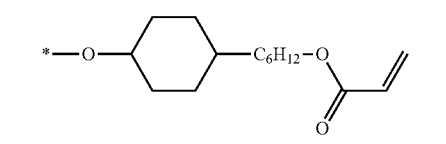
[Chemical 155]
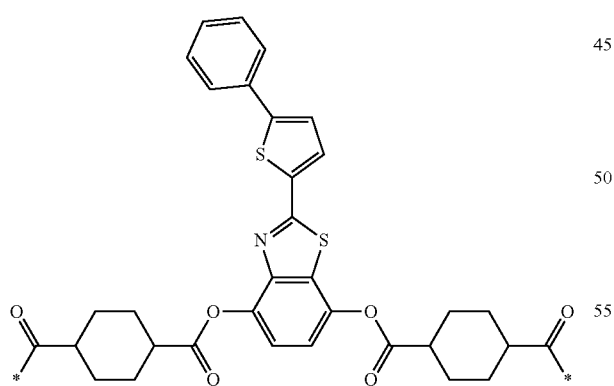
(A49-1) 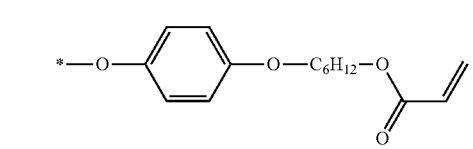
(A49-2) 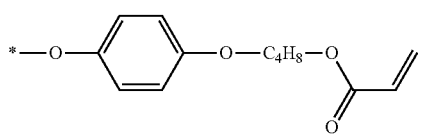
(A49-3) 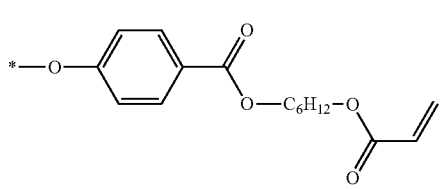
(A49-4) 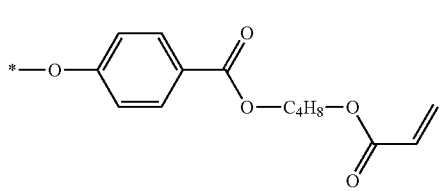
(A49-5) 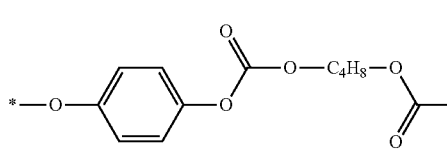
(A49-6) 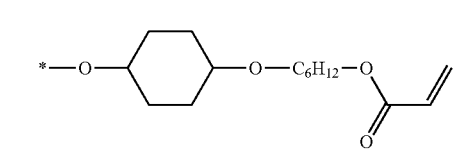
(A49-7) 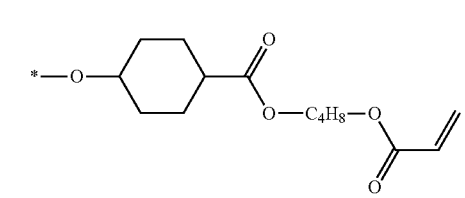
(A49-8) 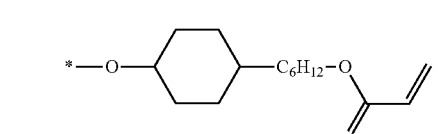
[Chemical 156]
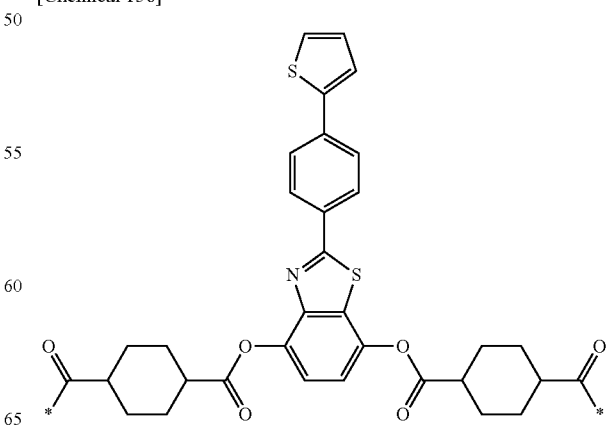

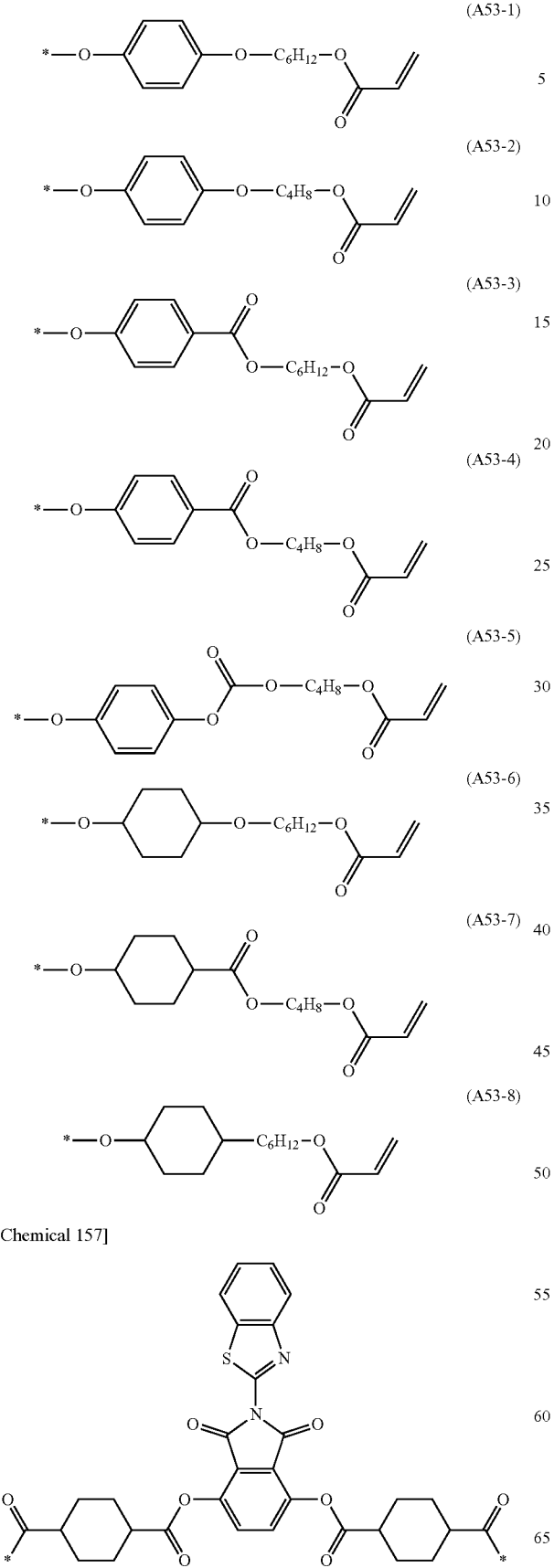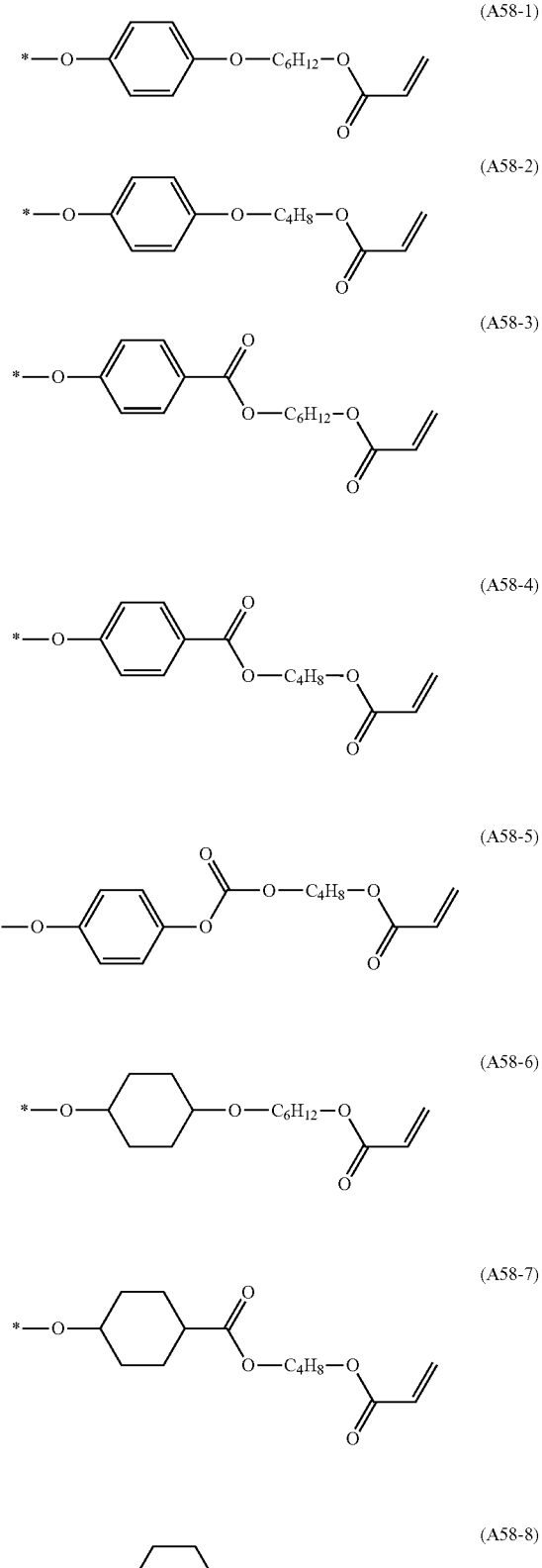

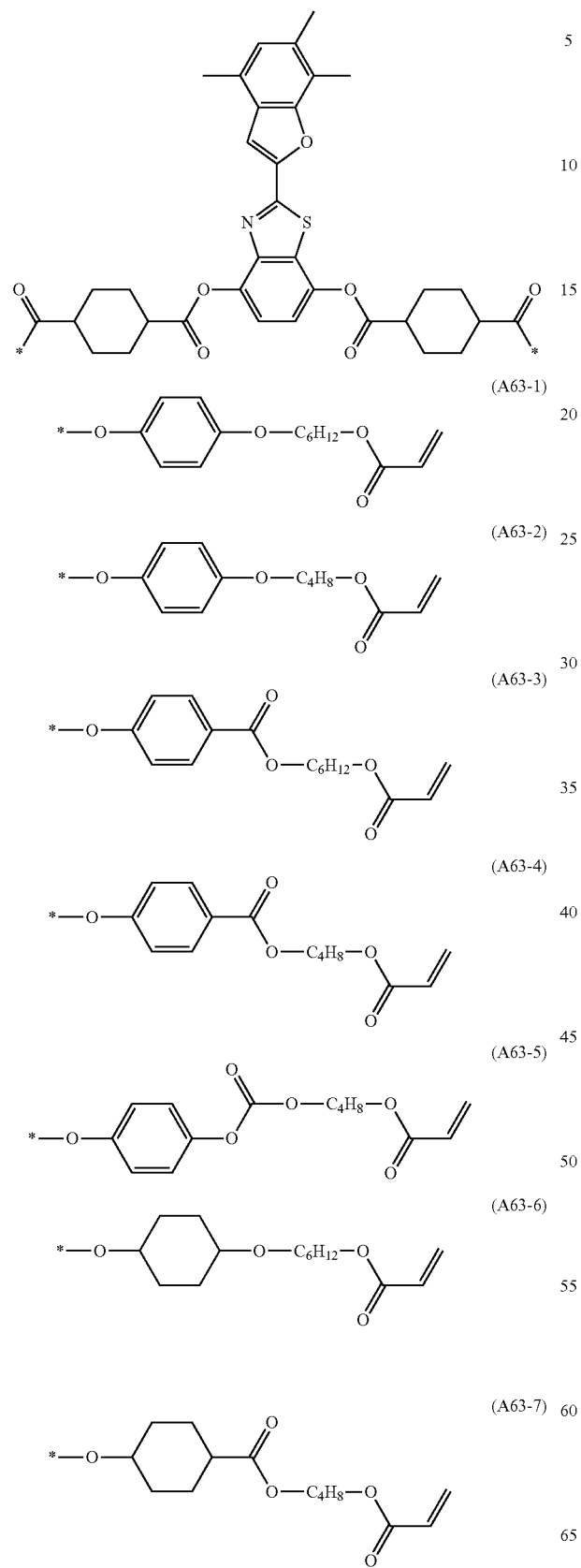
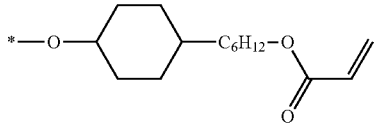
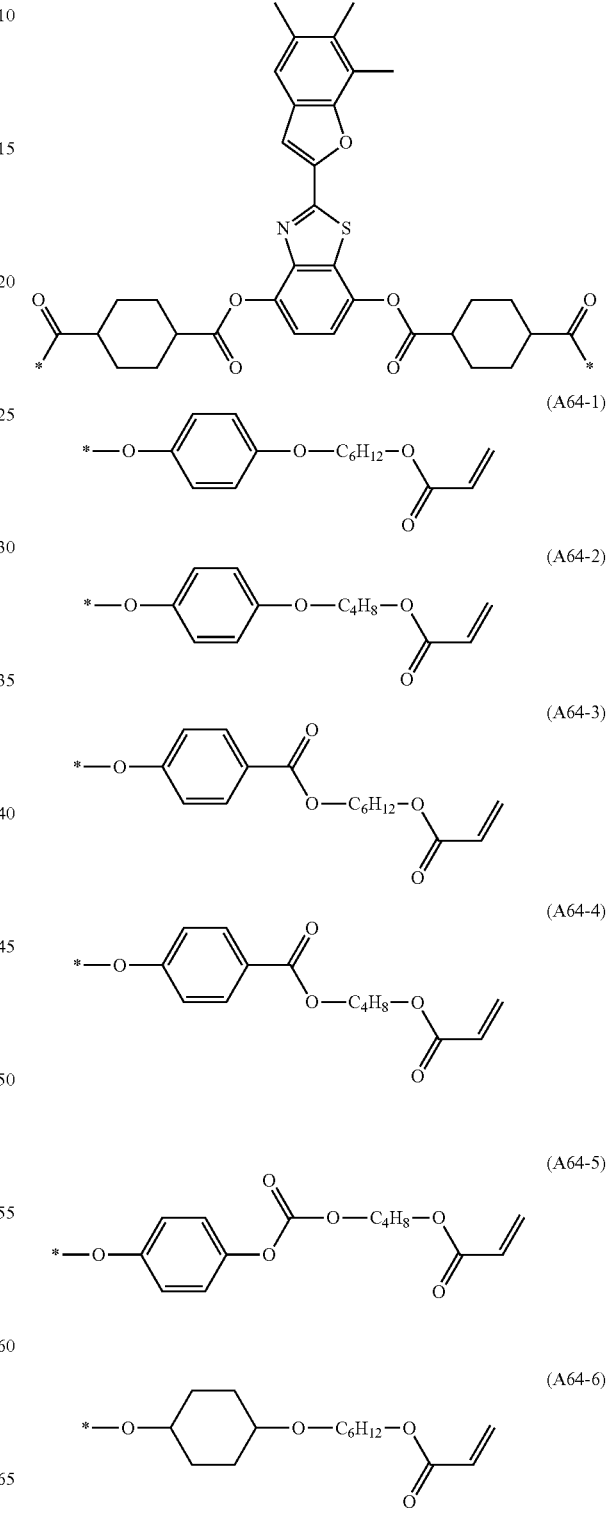

(A64-7) 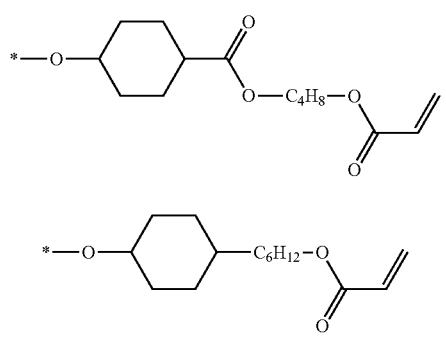
(A64-8) 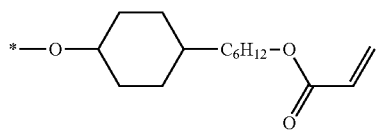
[Chemical 160]
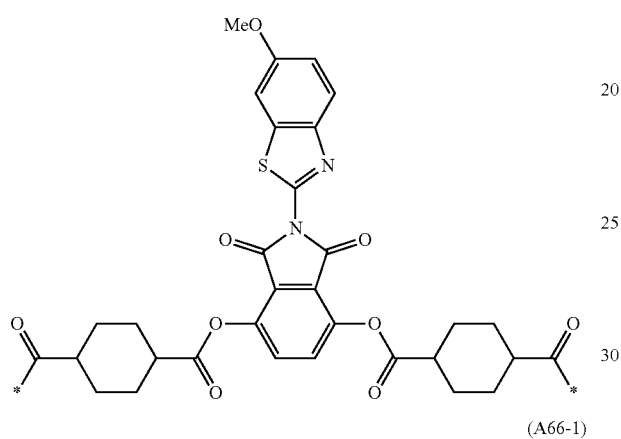
(A66-1) 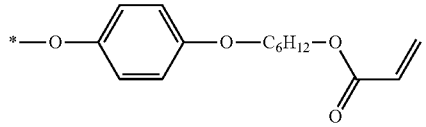
(A66-2) 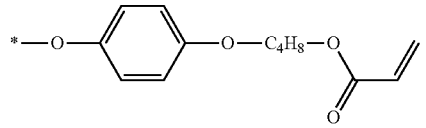
(A66-3) 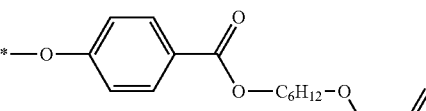
(A66-4) 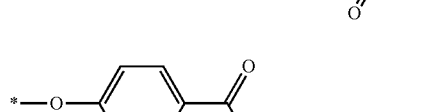
(A66-5) 
(A66-6) 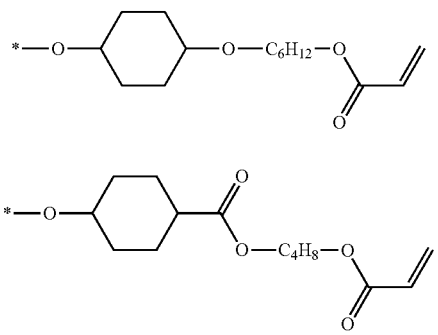
(A66-7) 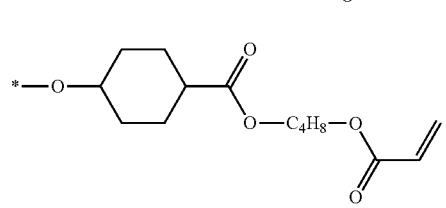
(A66-8) 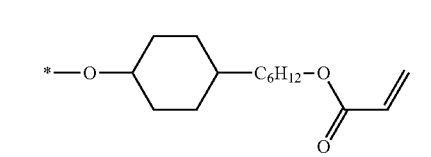
[Chemical 161]
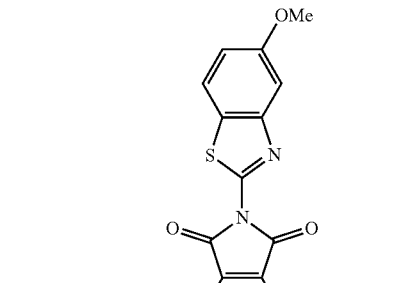
(A67-1) 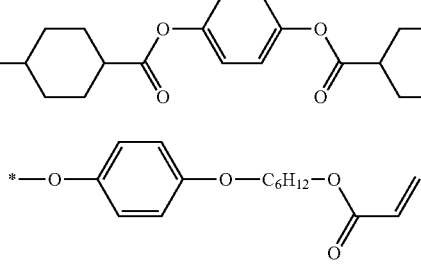
(A67-2) 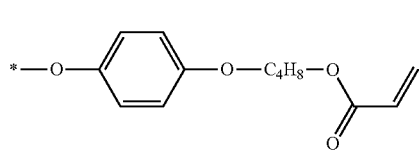
(A67-3) 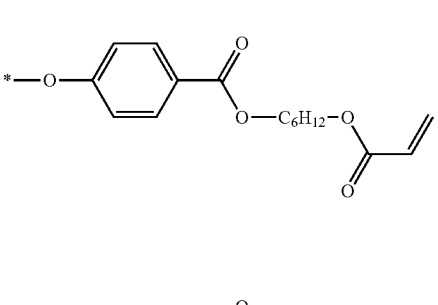
(A67-4) 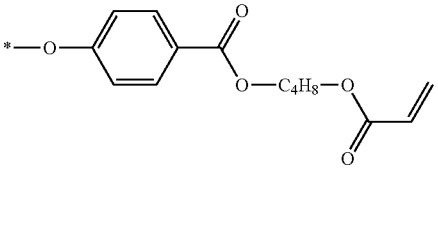

(A67-5)
(A67-6)
(A67-7)
(A67-8)
[Chemical 162]
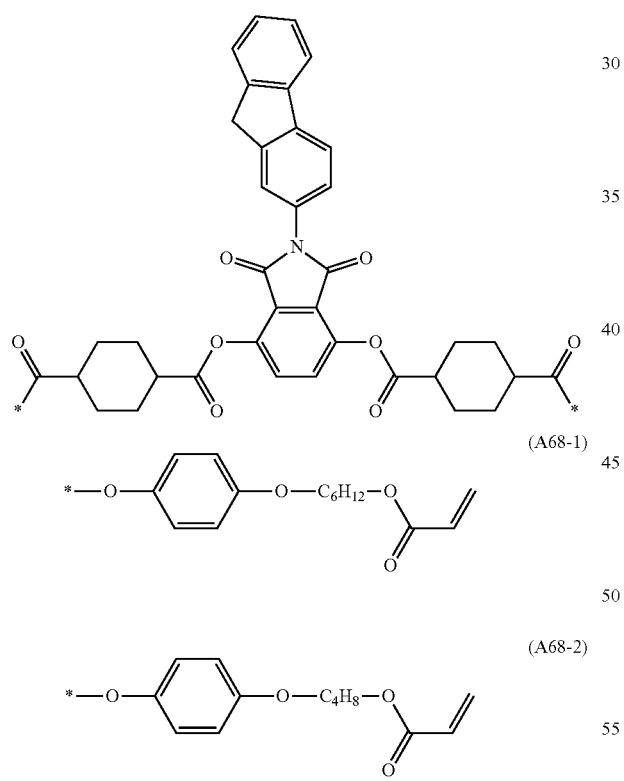
(A68-1)
(A68-2)
(A68-3)
(A68-4)
(A68-5)
(A68-6)
(A68-7)
(A68-8)
[Chemical 163]
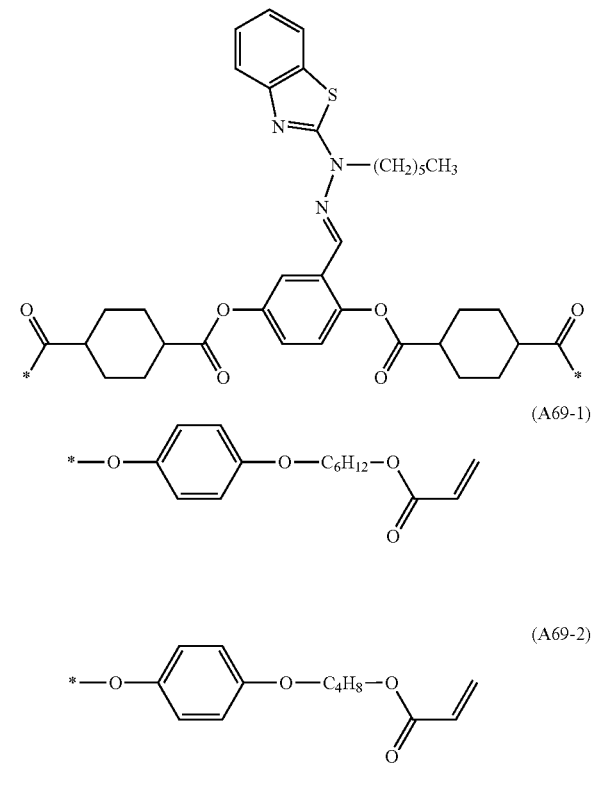
(A69-1)
(A69-2)

(A69-3) 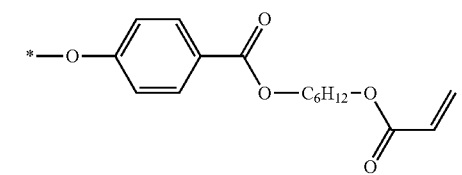
(A69-4) 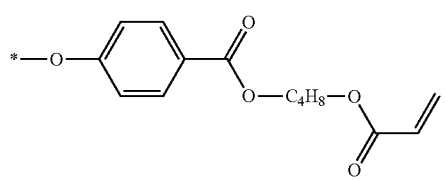
(A69-5) 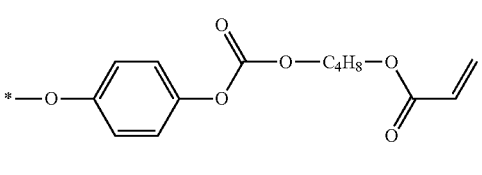
(A69-6) 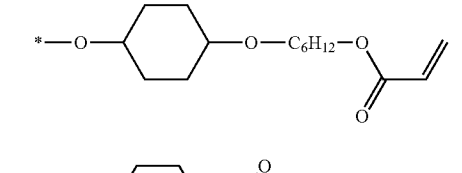
(A69-7) 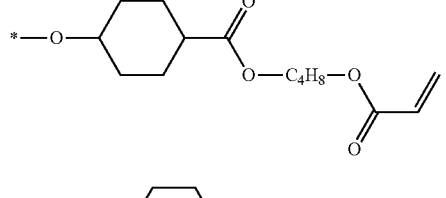
(A69-8) 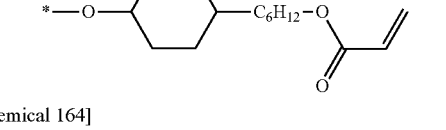
[Chemical 164]
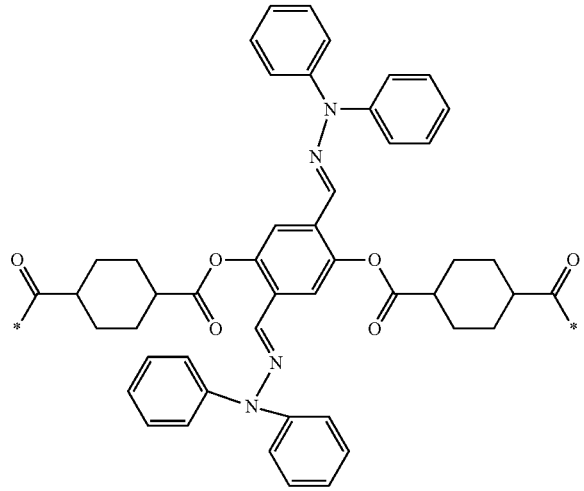
(A70-1) 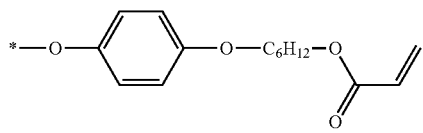
(A70-2) 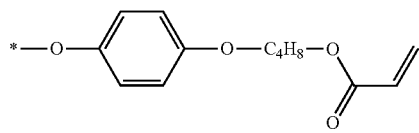
(A70-3) 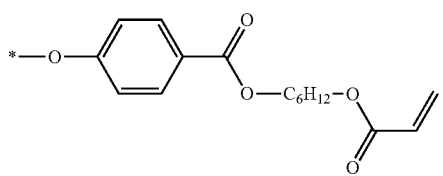
(A70-4) 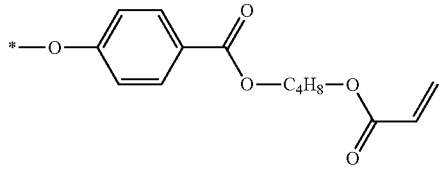
(A70-5) 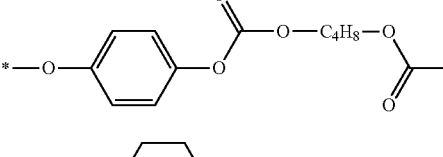
(A70-6) 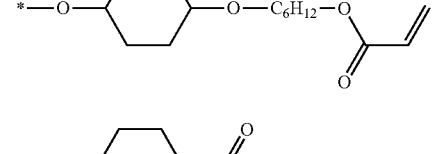
(A70-7) 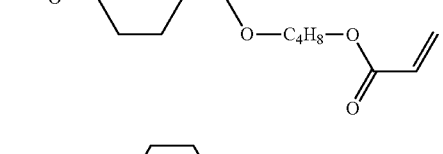
(A70-8) 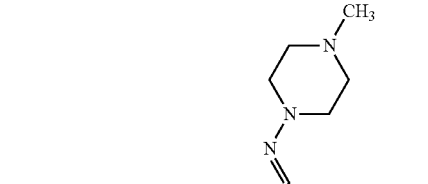
[Chemical 165]
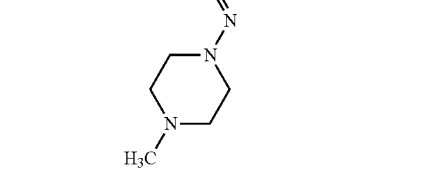

-continued
(A71-1)
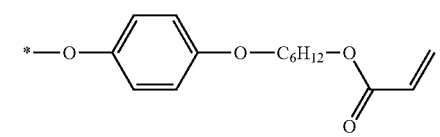
(A71-2)
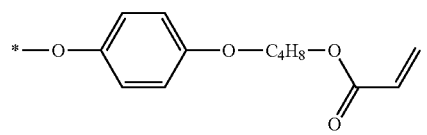
(A71-3)
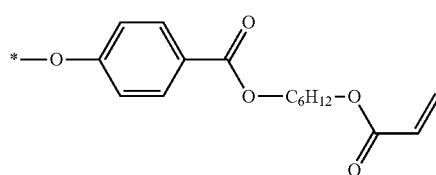
(A71-4)
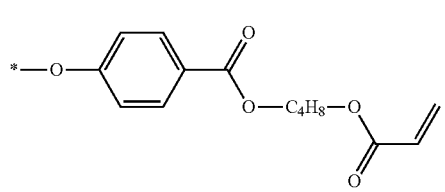
(A71-5)
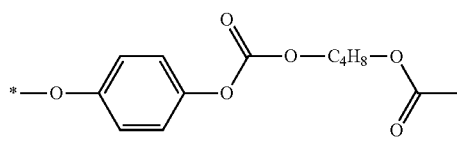
(A71-6)
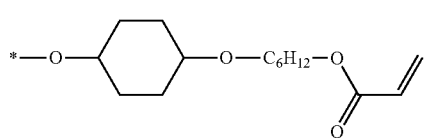
(A71-7)
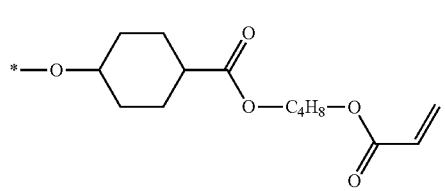
(A71-8)
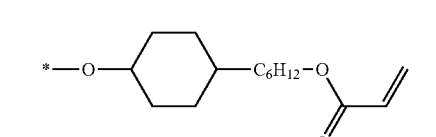
[Chemical 166]
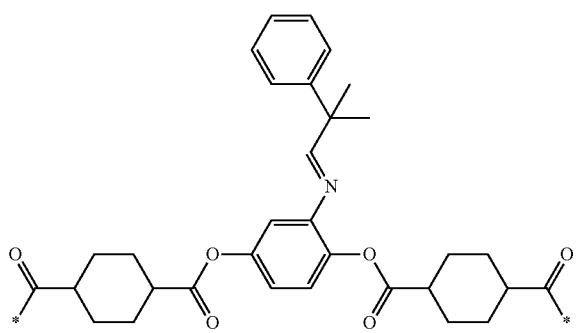
-continued
(A80-1)
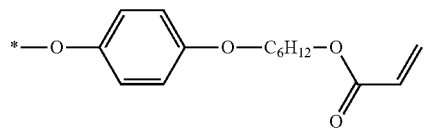
(A80-2)
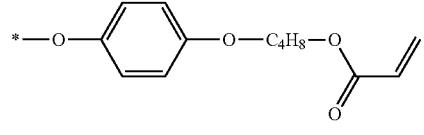
(A80-3)
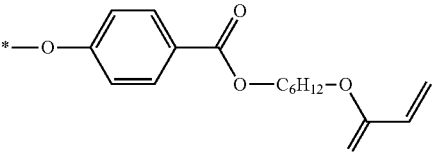
(A80-4)
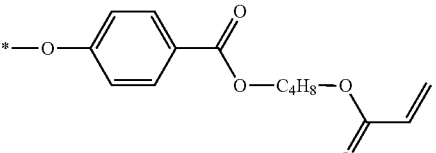
(A80-5)
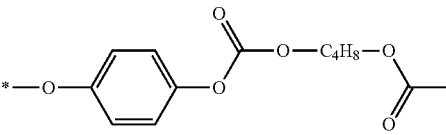
(A80-6)
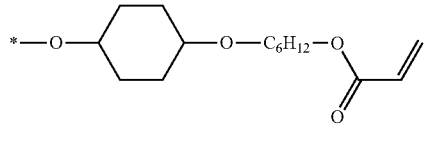
(A80-7)
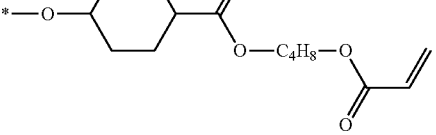
(A80-8)
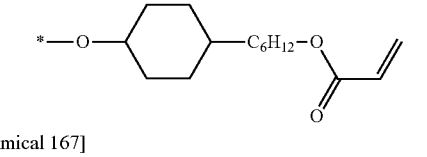
[Chemical 167]
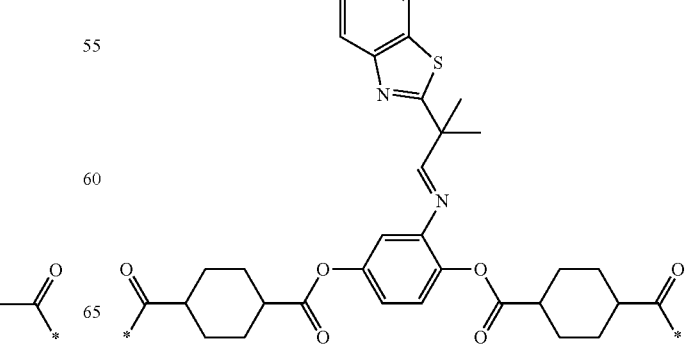

(A81-1) 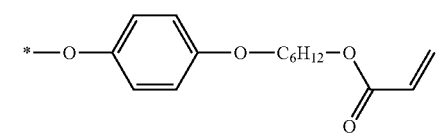
(A81-2) 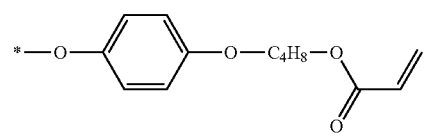
(A81-3) 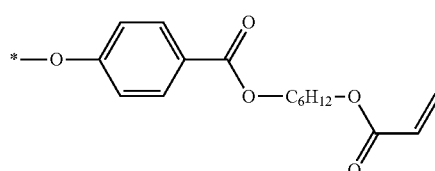
(A81-4) 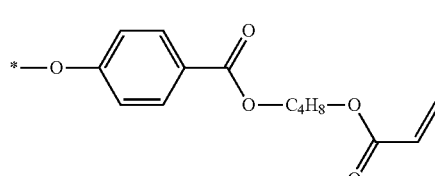
(A81-5) 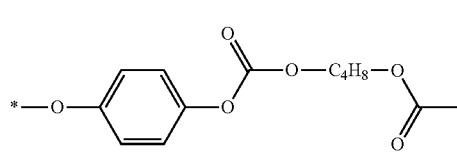
(A81-6) 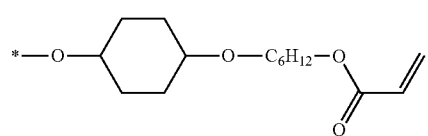
(A81-7) 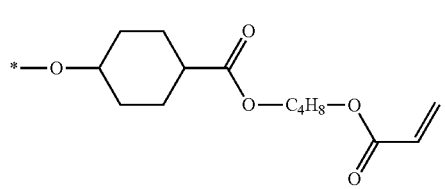
(A81-8) 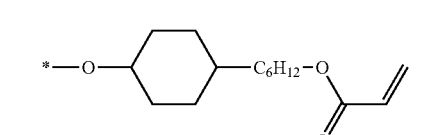
[Chemical 168]
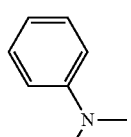
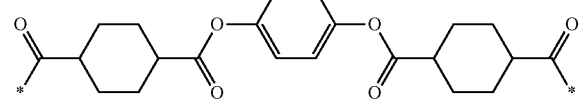
(A82-1) 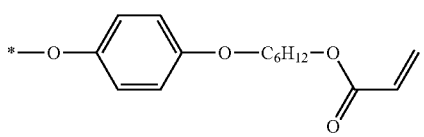
(A82-2) 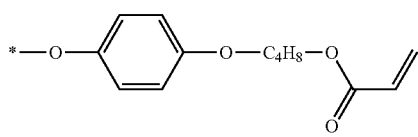
(A82-3) 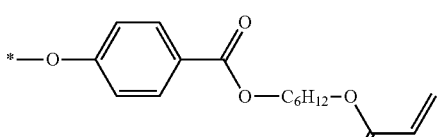
(A82-4) 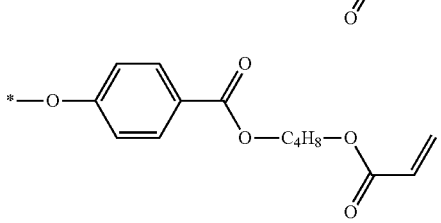
(A82-5) 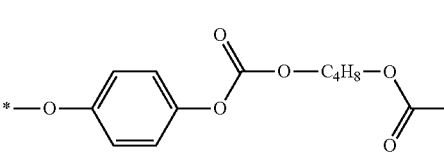
(A82-6) 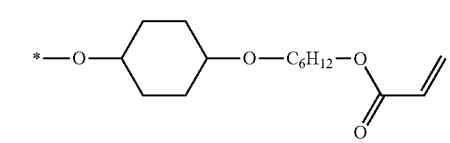
(A82-7) 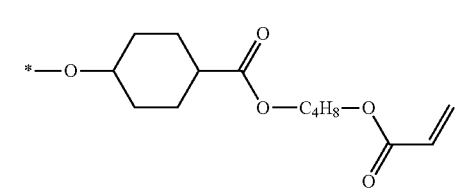
(A82-8) 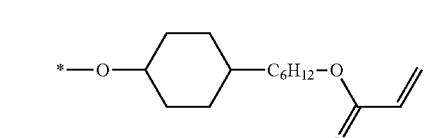
[Chemical 169]
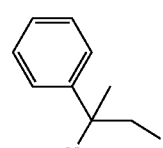
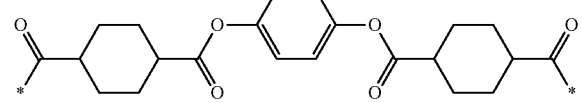

-continued
(A83-1) 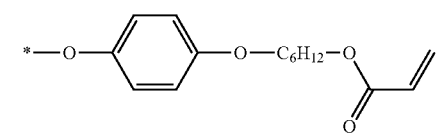
(A83-2) 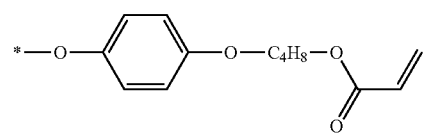
(A83-3) 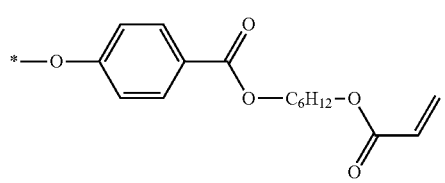
(A83-4) 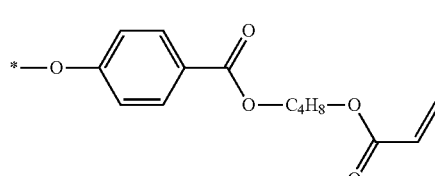
(A83-5) 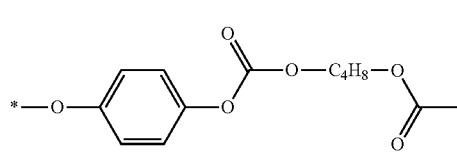
(A83-6) 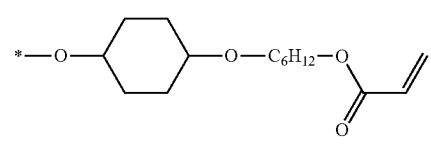
(A83-7) 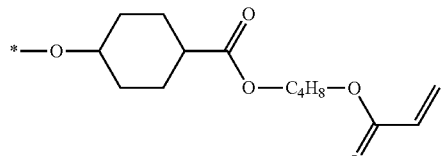
(A83-8) 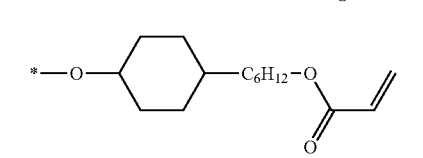
[Chemical 170]
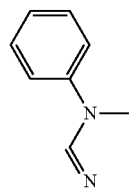
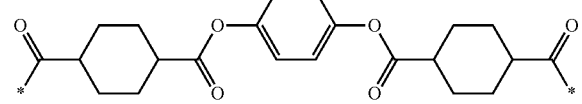
-continued
(A84-1) 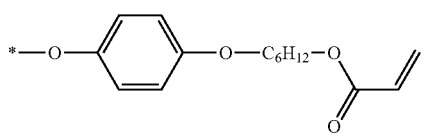
(A84-2) 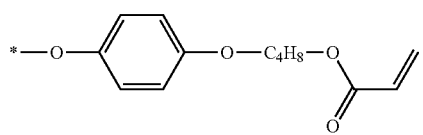
(A84-3) 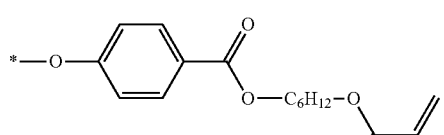
(A84-4) 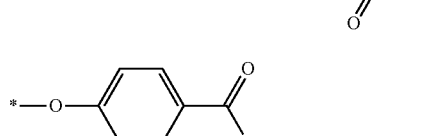
(A84-5) 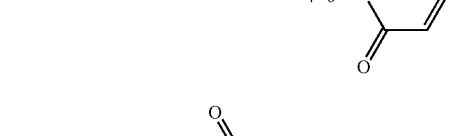
(A84-6) 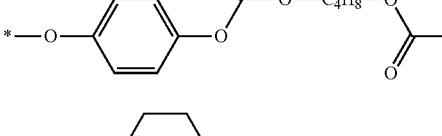
(A84-7) 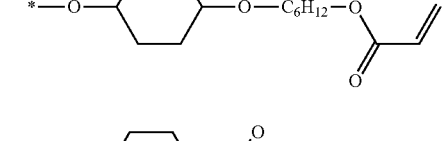
(A84-8) 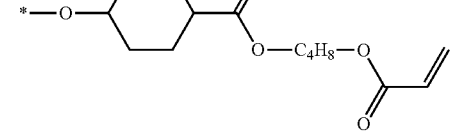
[Chemical 171]
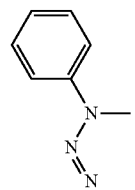
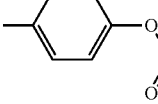

-continued (A85-1)
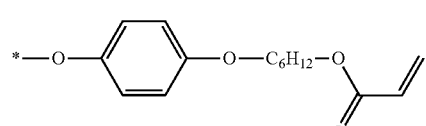

(A85-2)
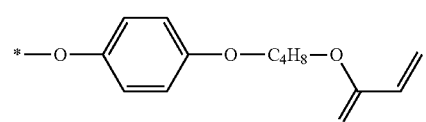

(A85-3)
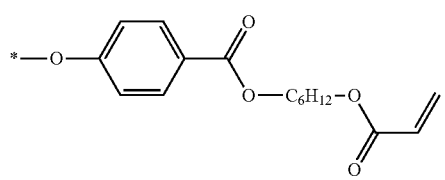

(A85-4)
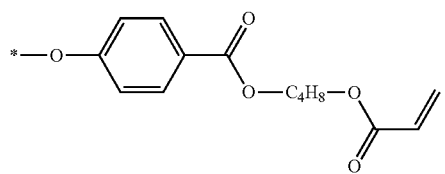

(A85-5)
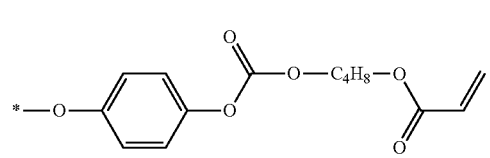

(A85-6)
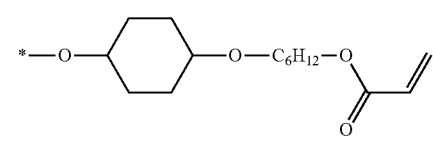

(A85-7)
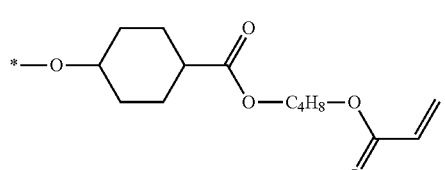

(A85-8)
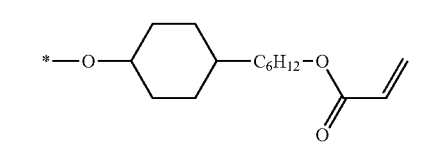

The above polymerizable liquid crystal compound (B) has five or more and preferably six or more ring structures on its principal chain. When the number of ring structures of the polymerizable liquid crystal compound (B) on its principal chain is the above lower limit or more, this can produce the effect of reducing the precipitation of the polymerizable liquid crystal compound (A). In this case, the upper limit of the number of ring structures on the principal chain of the polymerizable liquid crystal compound (B) is usually 20 or less and, for example, 15 or less.

A retardation film constituted from a polymer of the above polymerizable liquid crystal compound (B) kept in an oriented state preferably exhibits inverse wavelength dispersibility. If a retardation film constituted from a polymer of the polymerizable liquid crystal compound (B) kept in an oriented state exhibits inverse wavelength dispersibility, this offers resistance to a large influence on inverse wavelength dispersibility caused by the polymerizable liquid crystal compound (A) contained in the liquid crystal composition when producing the retardation film using the liquid crystal composition of the present invention.

The maximum absorption wavelength ($\lambda_{max}$) of the polymerizable liquid crystal compound (B) is preferably 300 to 400 nm, more preferably 315 to 385 nm, and even more preferably 320 to 380 nm. If the maximum absorption wavelength of the polymerizable liquid crystal compound (B) is the above lower limit or more, a retardation film constituted from a polymer of the polymerizable liquid crystal compound (B) kept in an oriented state tends to exhibit inverse wavelength dispersibility. If the maximum absorption wavelength ($\lambda_{max}$) of the polymerizable liquid crystal compound (B) is the above upper limit or less, absorption in the visible region is reduced, so that coloring of a film can be avoided.

The weight average molecular weight of the polymerizable liquid crystal compound (B) measured by gel permeation chromatography (GPC) is preferably 1000 to 3000, more preferably 1500 to 3000, and even more preferably 2000 to 3000. When the weight average molecular weight of the polymerizable liquid crystal compound (B) is in the above range, this is preferable because the polymerizable liquid crystal compound (B) scarcely precipitates in a coating solution. In this case, the weight average molecular weight of the polymerizable liquid crystal compound (B) may be calculated, for example, in terms of polyethylene standard by using gel permeation chromatography (GPC).

Examples of the polymerizable liquid crystal compound (B) include compounds represented by the following formulae.

k in the following formulae denotes an integer from 1 to 16, preferably an integer from 4 to 14, and an integer from 6 to 12, and n1 and n2 each independently denote an integer from 0 to 3, provided that the sum of n1 and n2 is 1 to 6, preferably 1 to 3, for example, 1 to 2, and particularly 1. Also, the cyclohexane ring is preferably a trans isomer.

[Chemical 172]
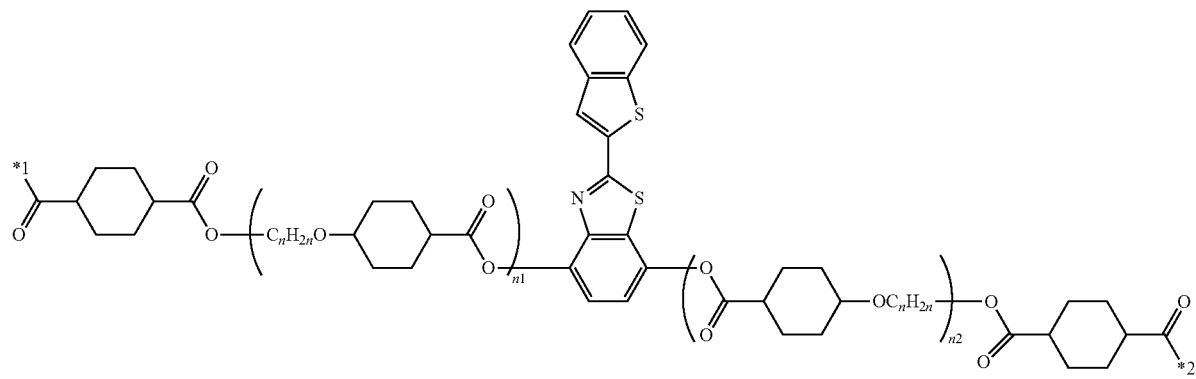
[Chemical 173]
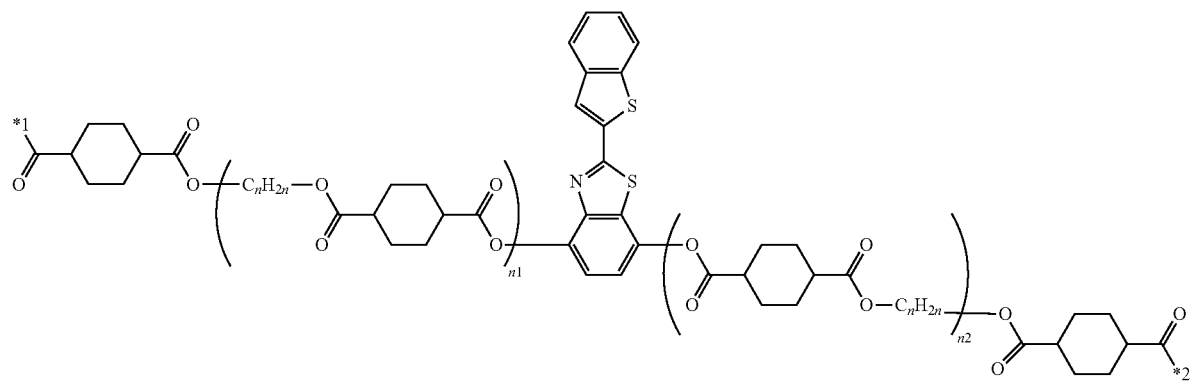
[Chemical 174]
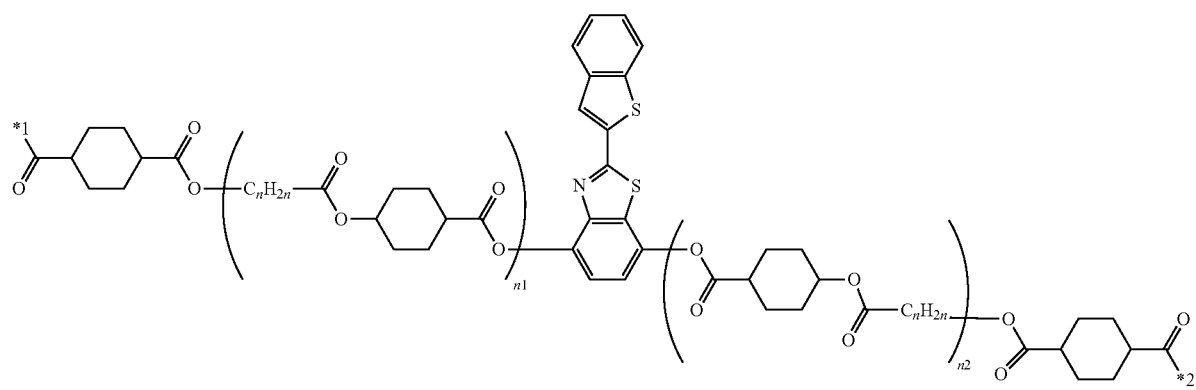
[Chemical 175]
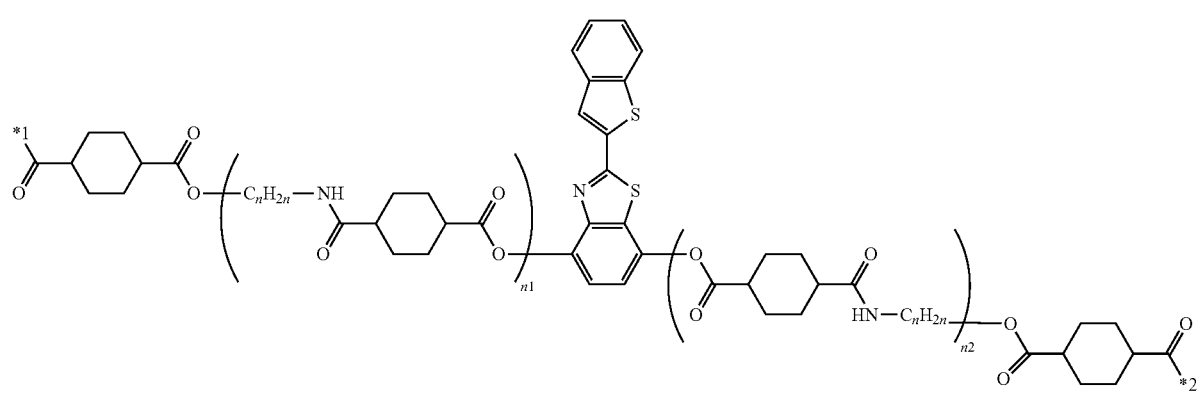

[Chemical 176]
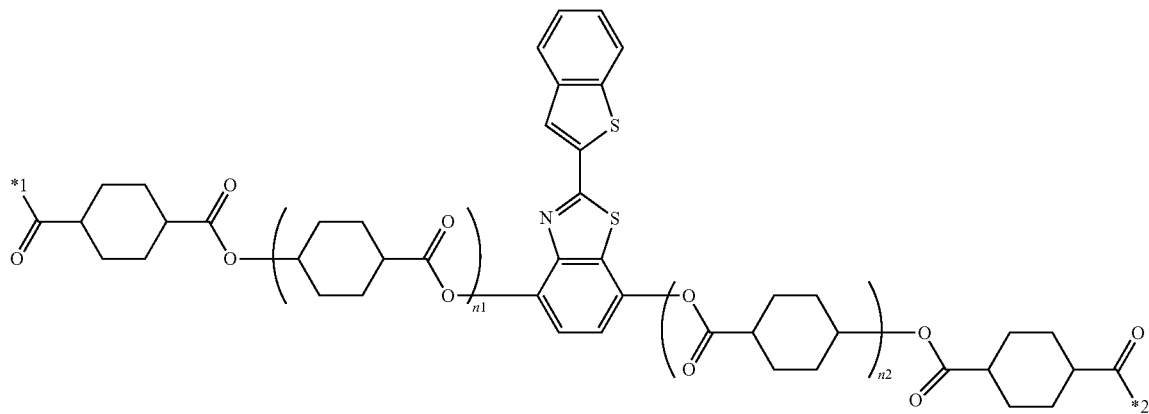
[Chemical 177]
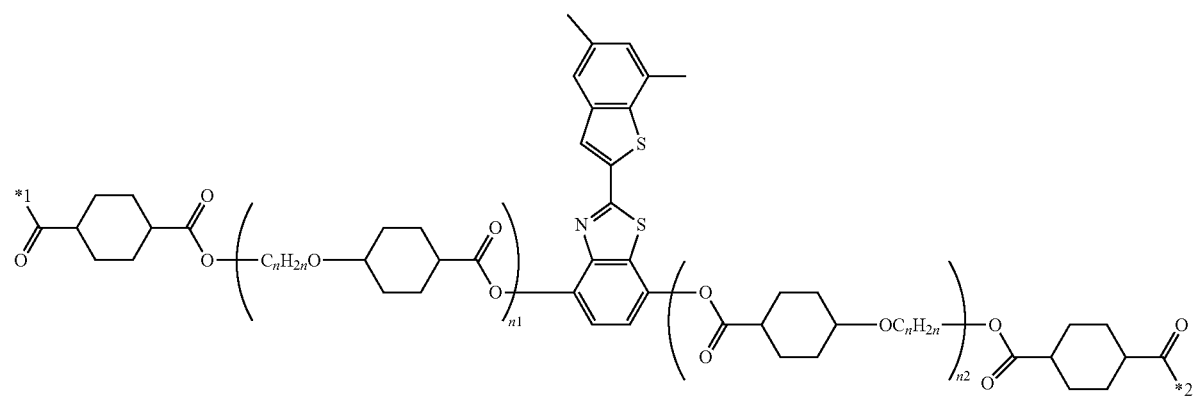
[Chemical 178]
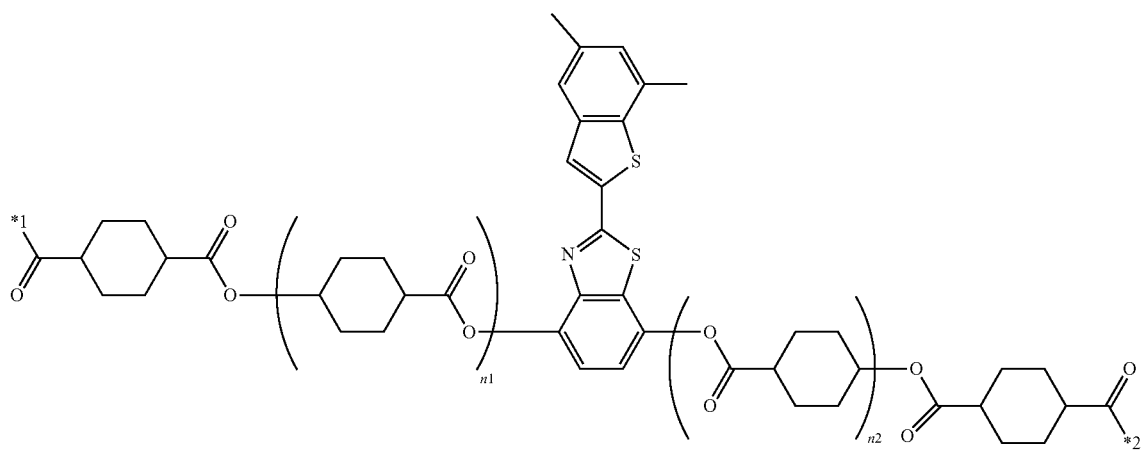

-continued
[Chemical 179]
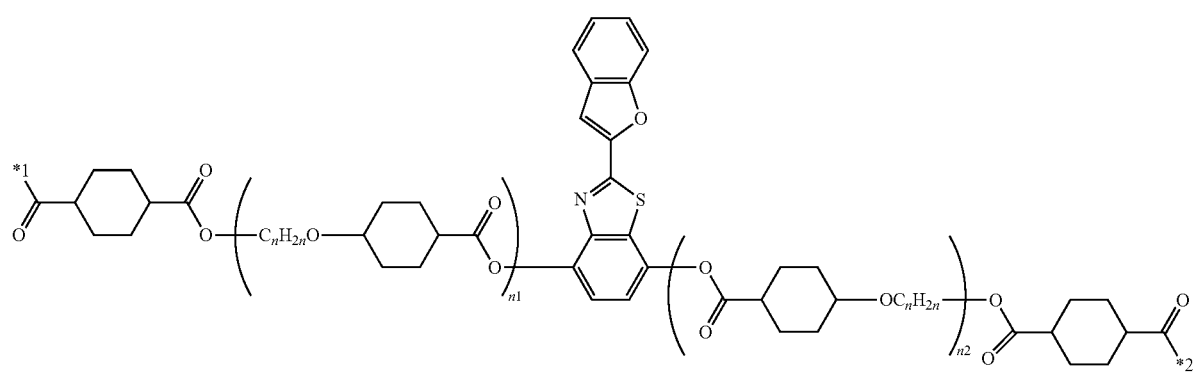
[Chemical 180]
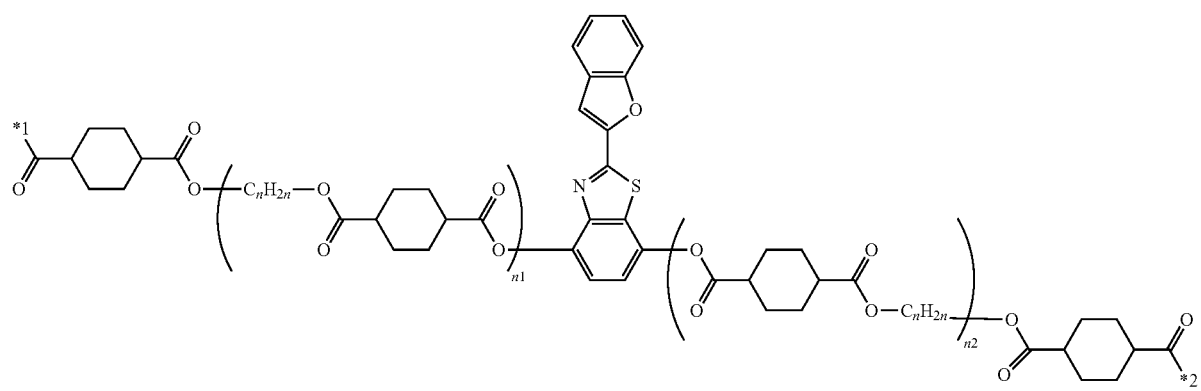
[Chemical 181]
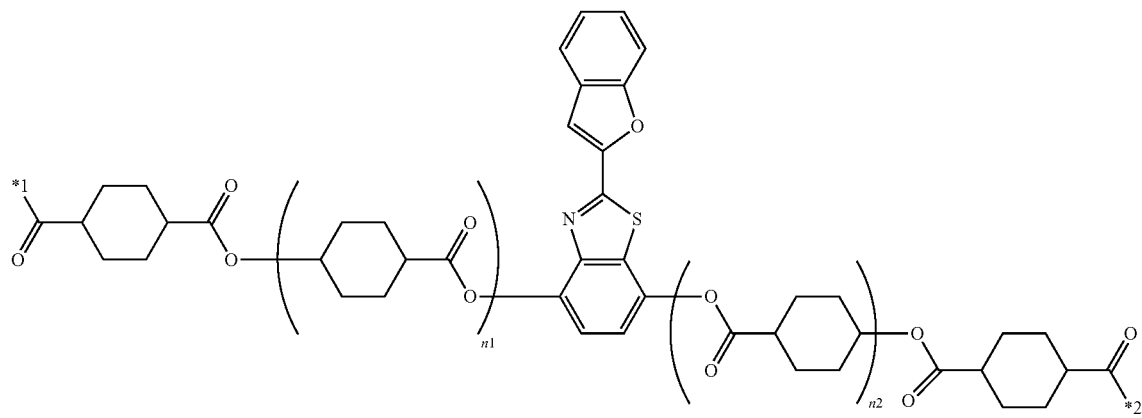
[Chemical 182]
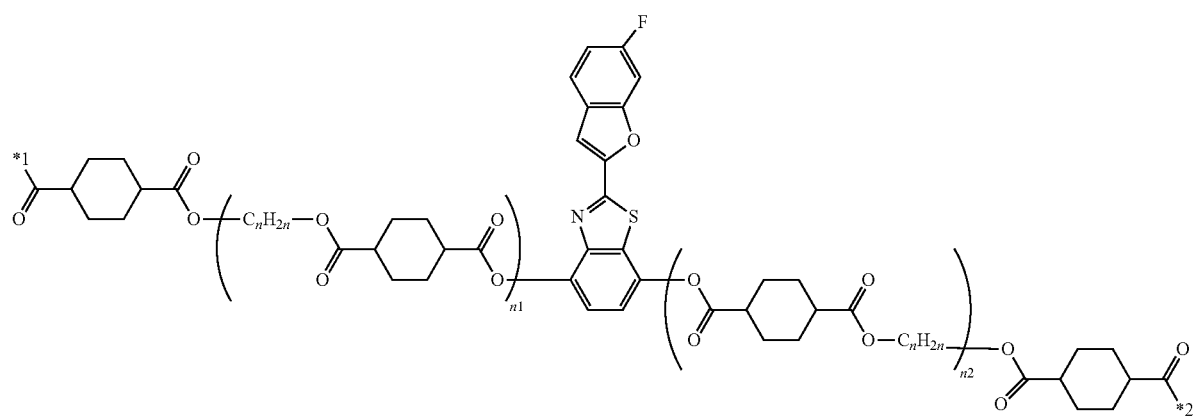

[Chemical 183]
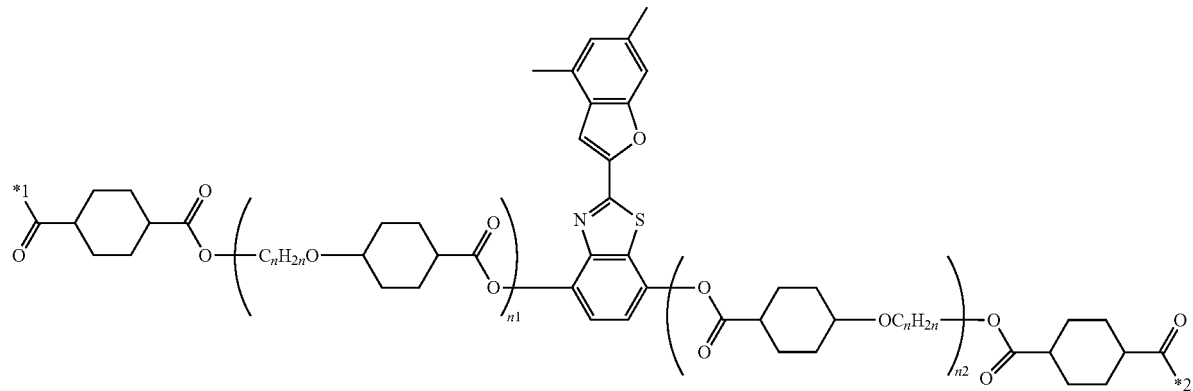
[Chemical 184]
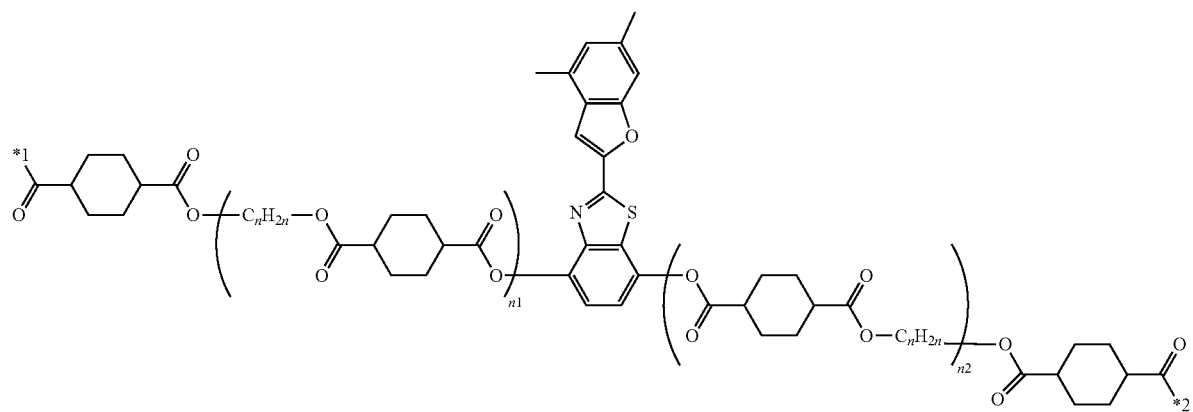
[Chemical 185]
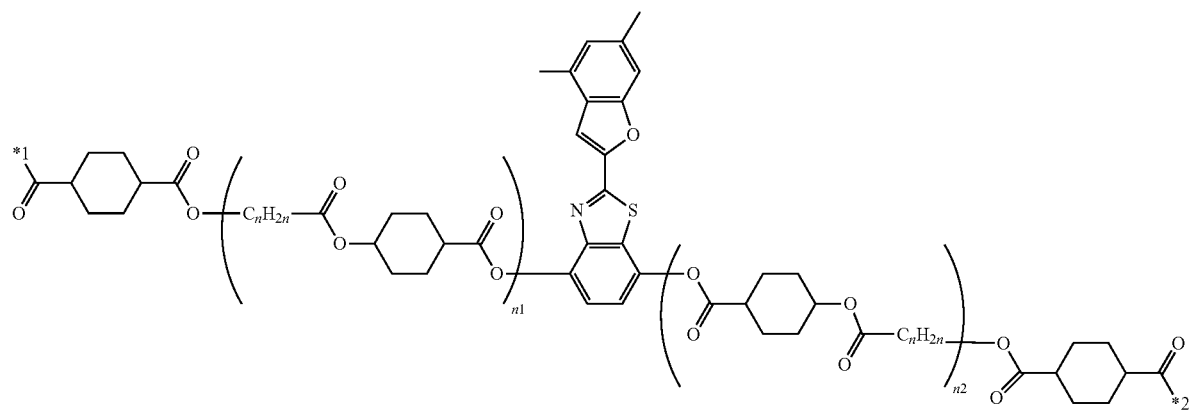

[Chemical 186]
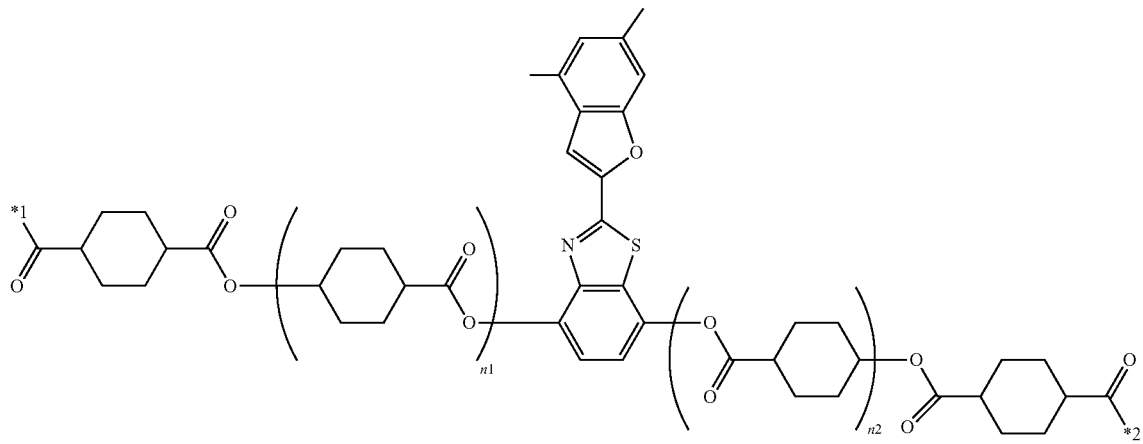
[Chemical 187]
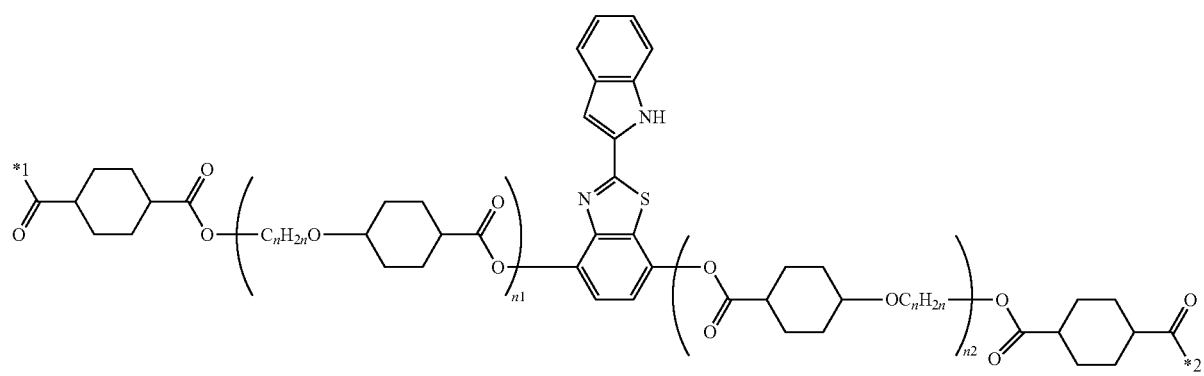
[Chemical 188]
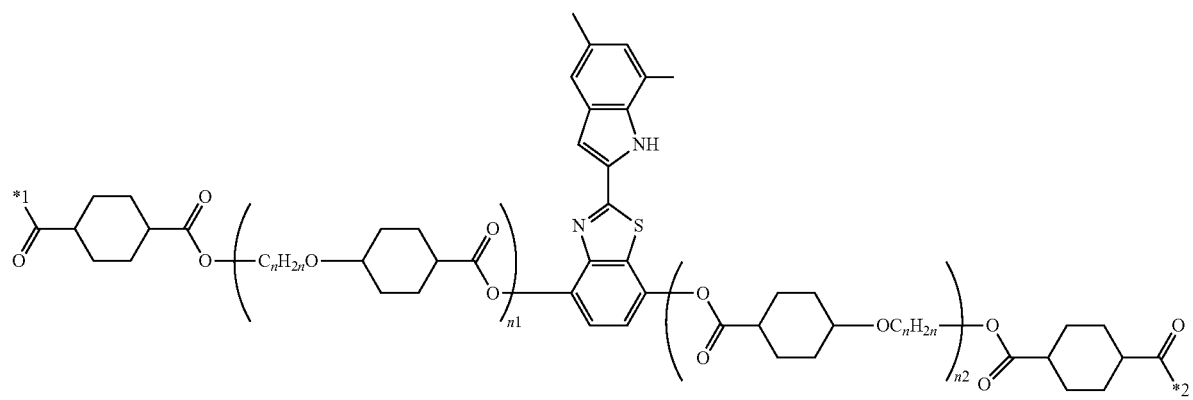
[Chemical 189]
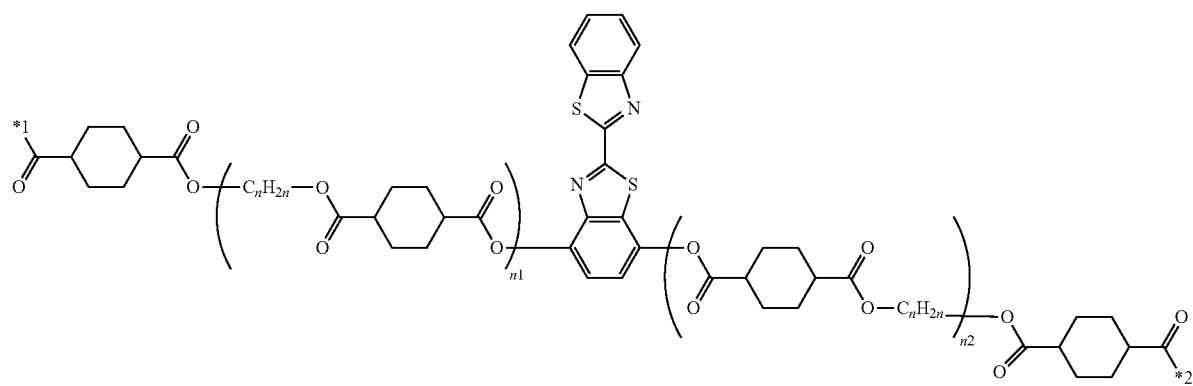

[Chemical 190]
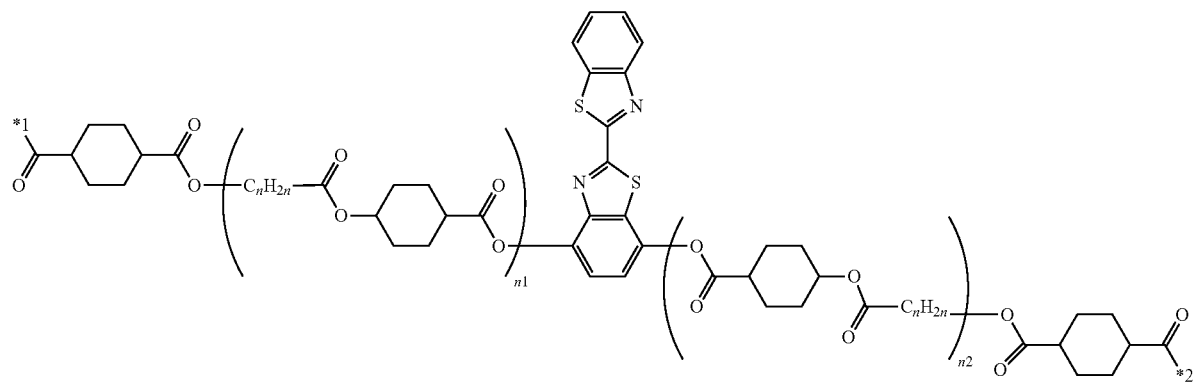
[Chemical 191]
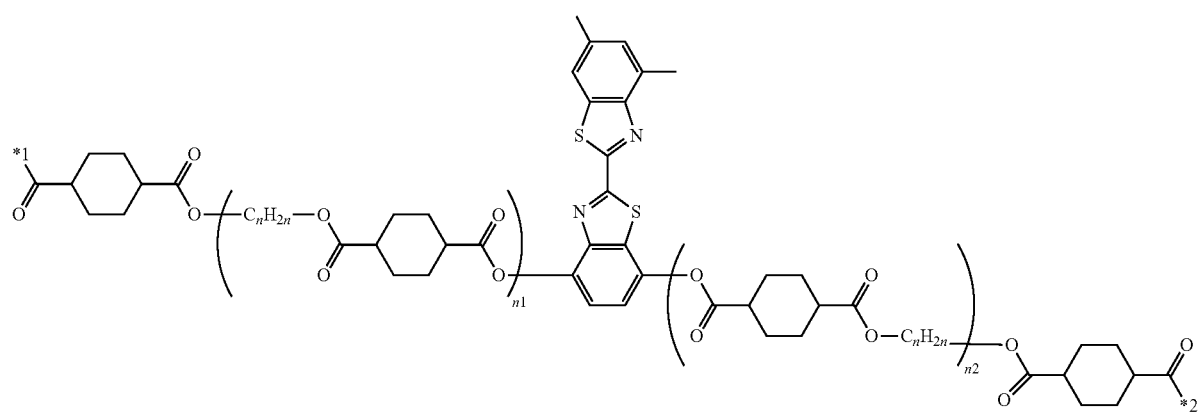
[Chemical 192]
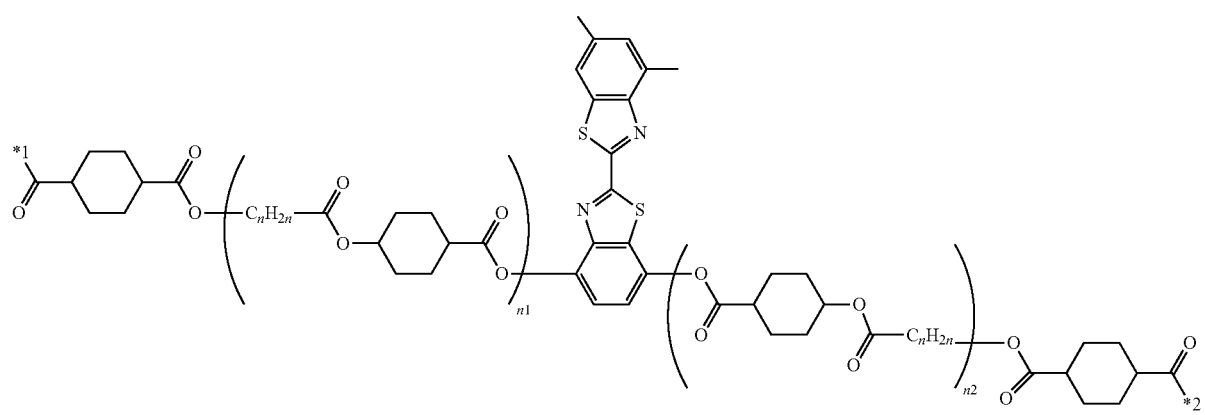
[Chemical 193]
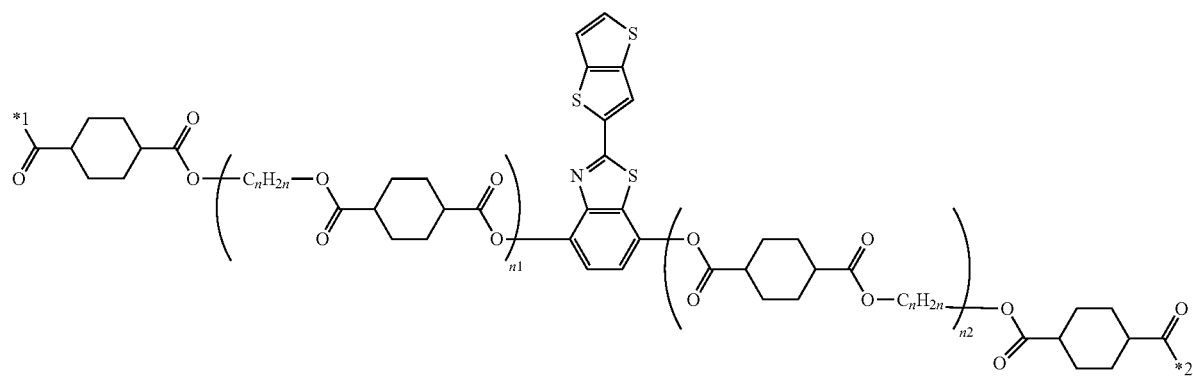

[Chemical 194]
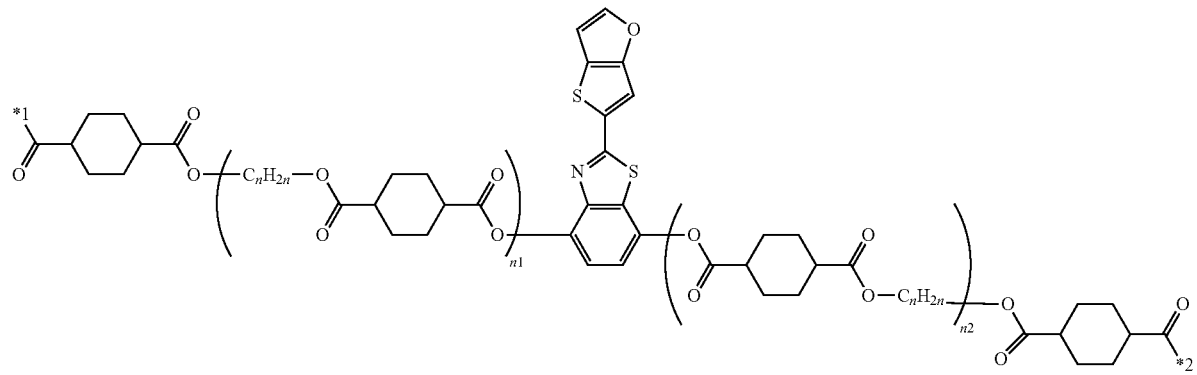
[Chemical 195]
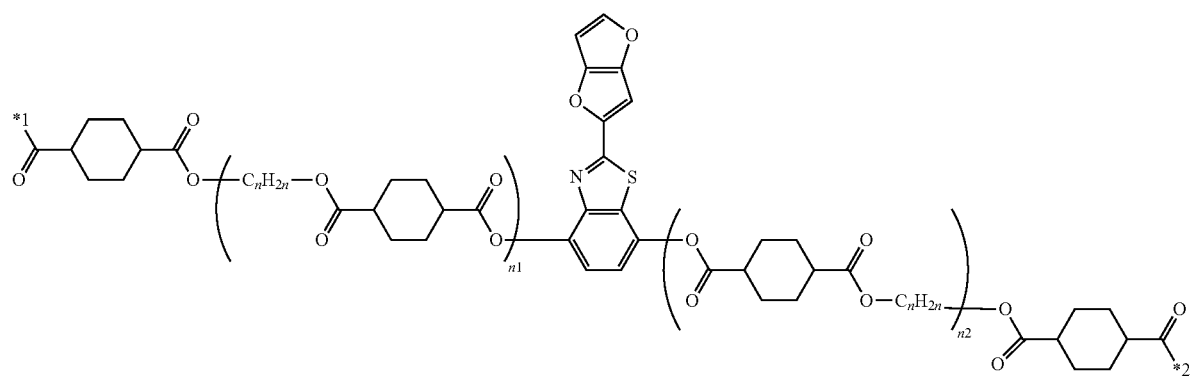
[Chemical 196]
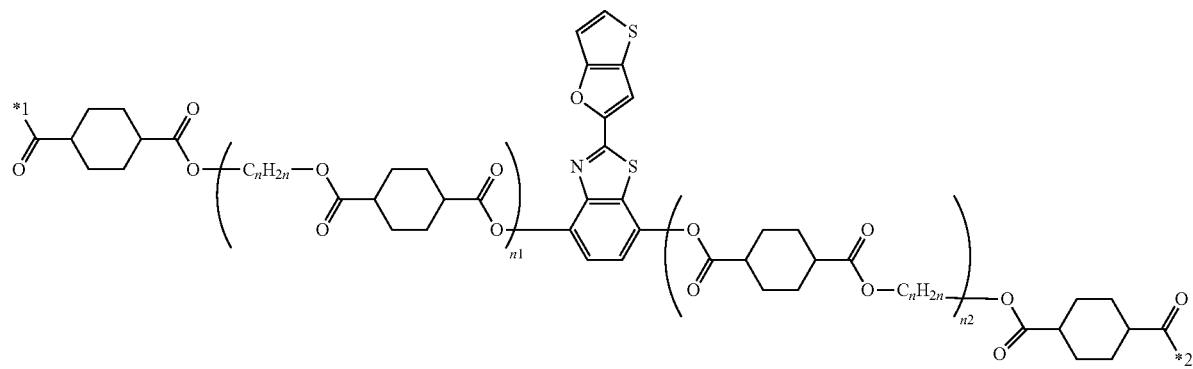
[Chemical 197]
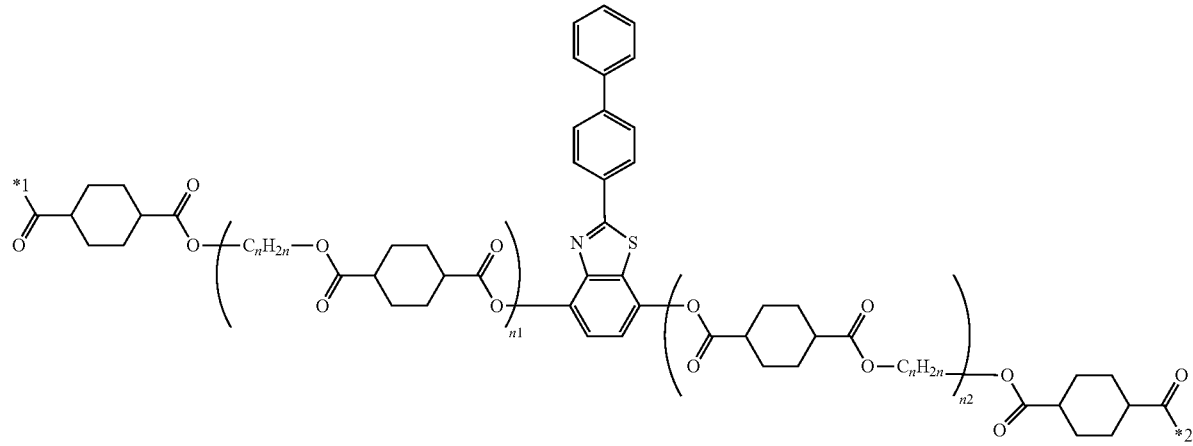

[Chemical 198]
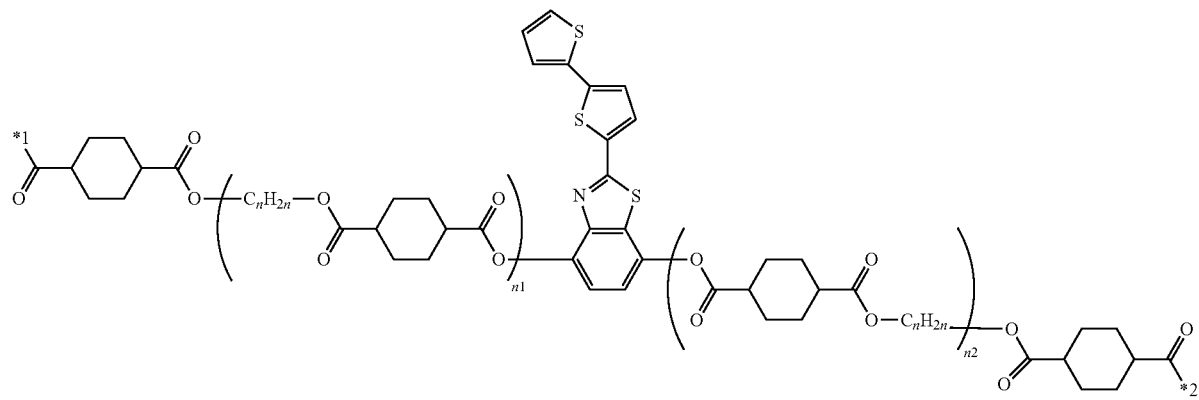
[Chemical 199]
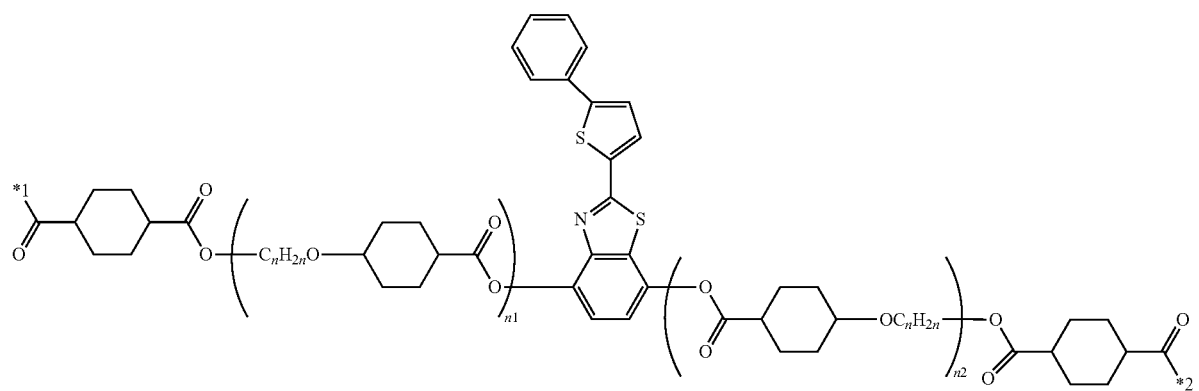
[Chemical 200]
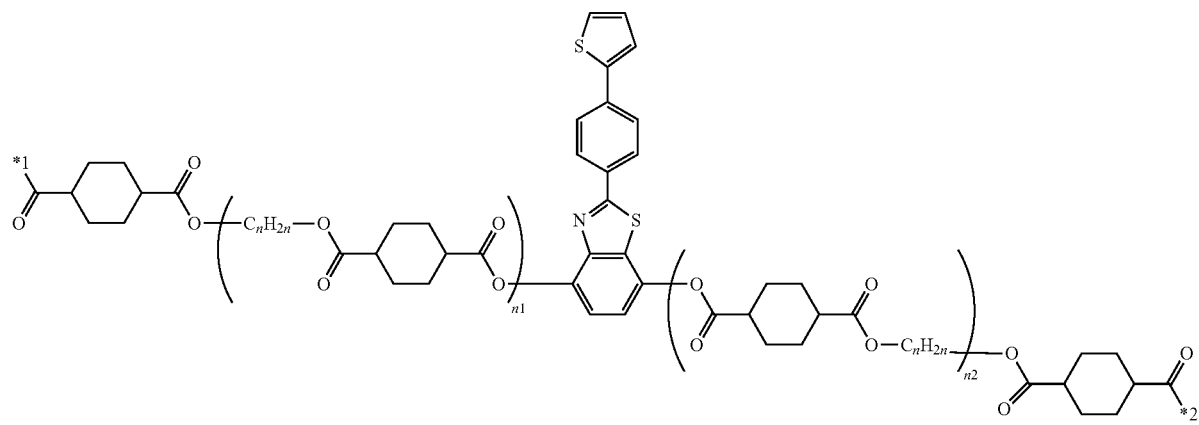

-continued
[Chemical 201]
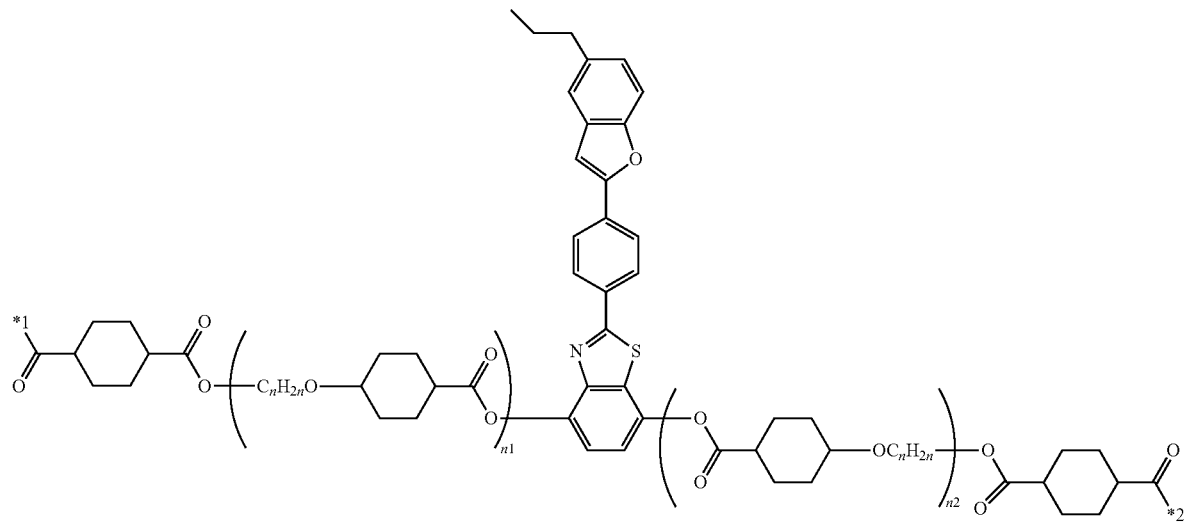
[Chemical 202]
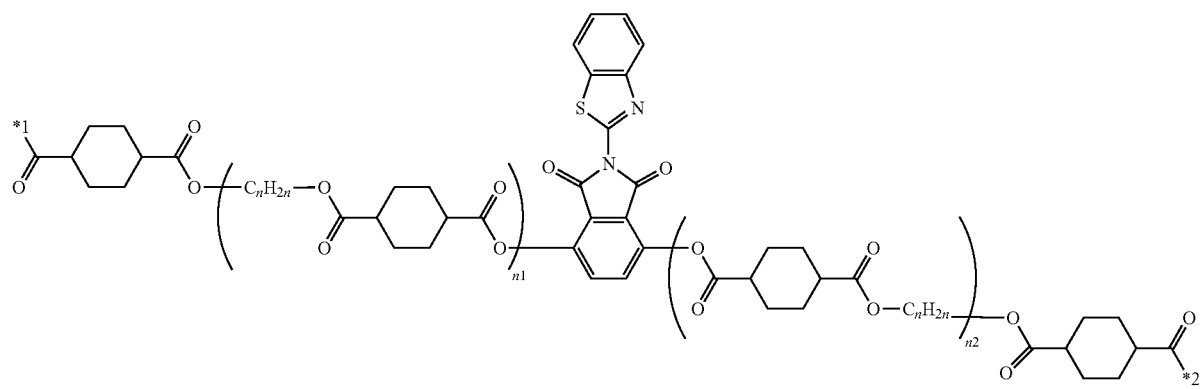
[Chemical 203]
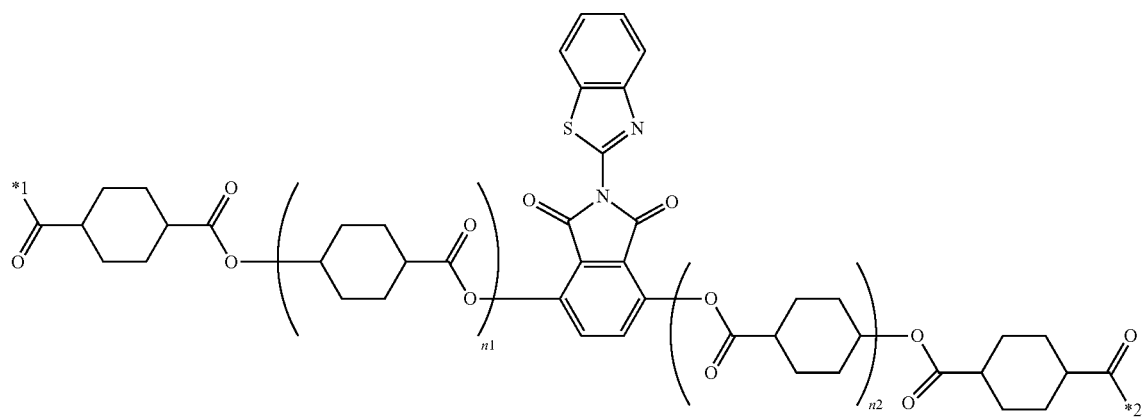

-continued
[Chemical 204]
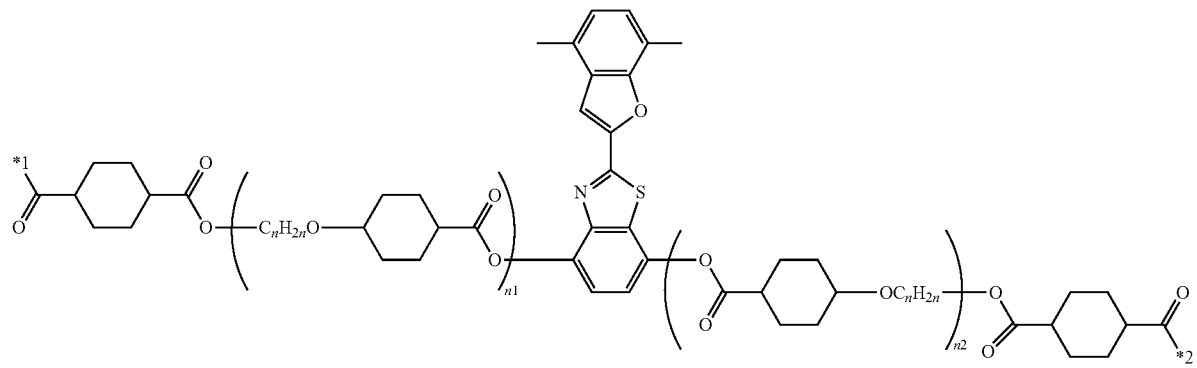
[Chemical 205]
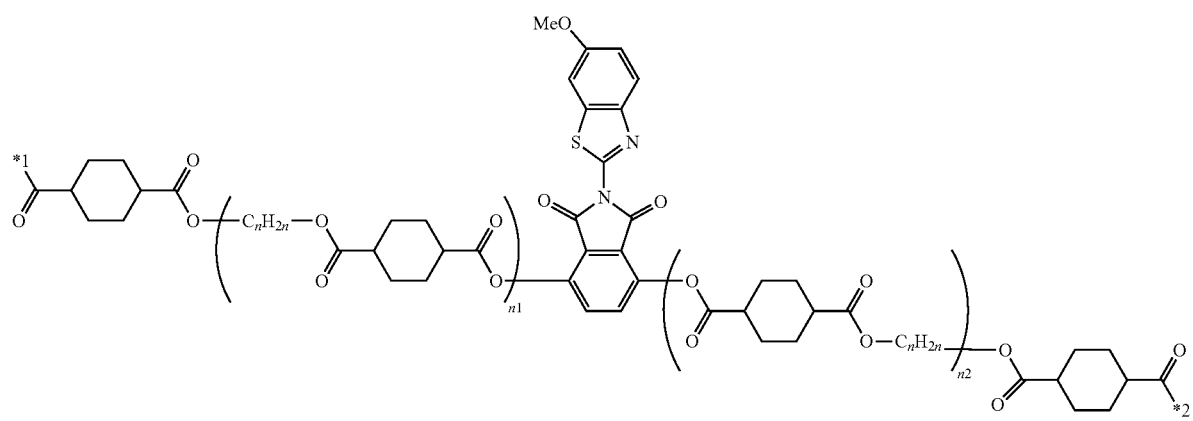
[Chemical 206]
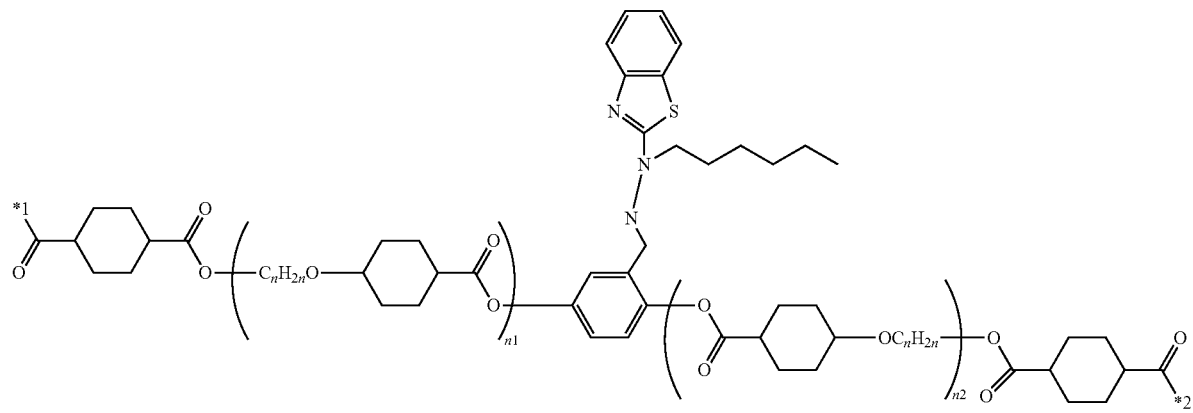

[Chemical 207]
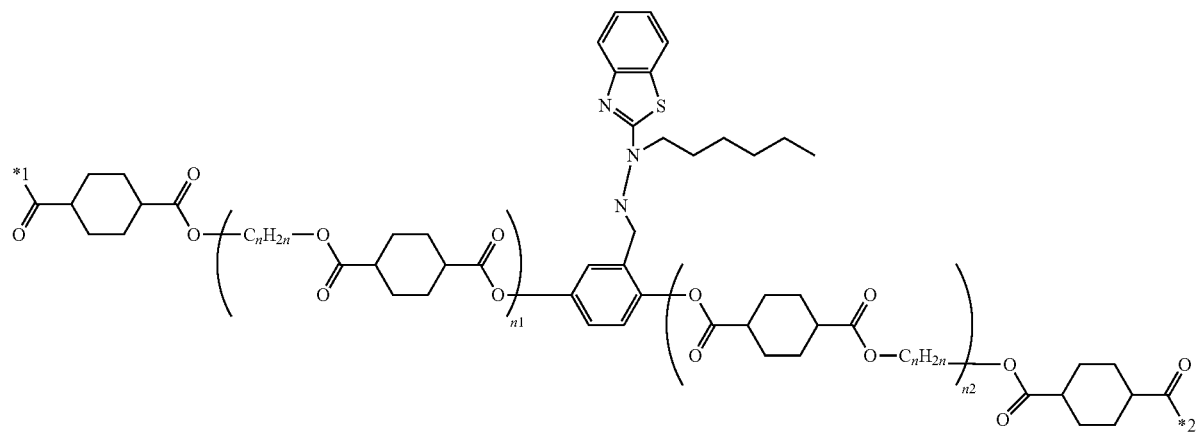
[Chemical 208]
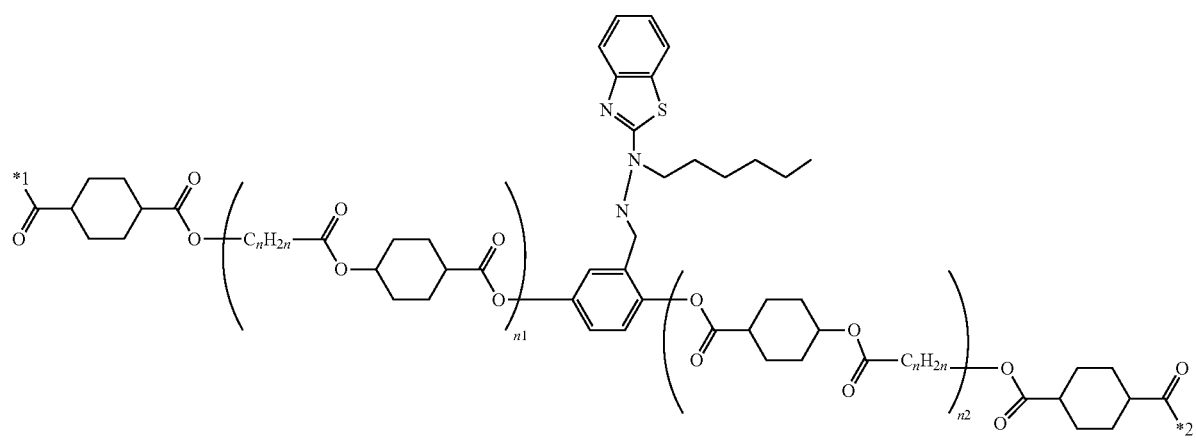
[Chemical 209]
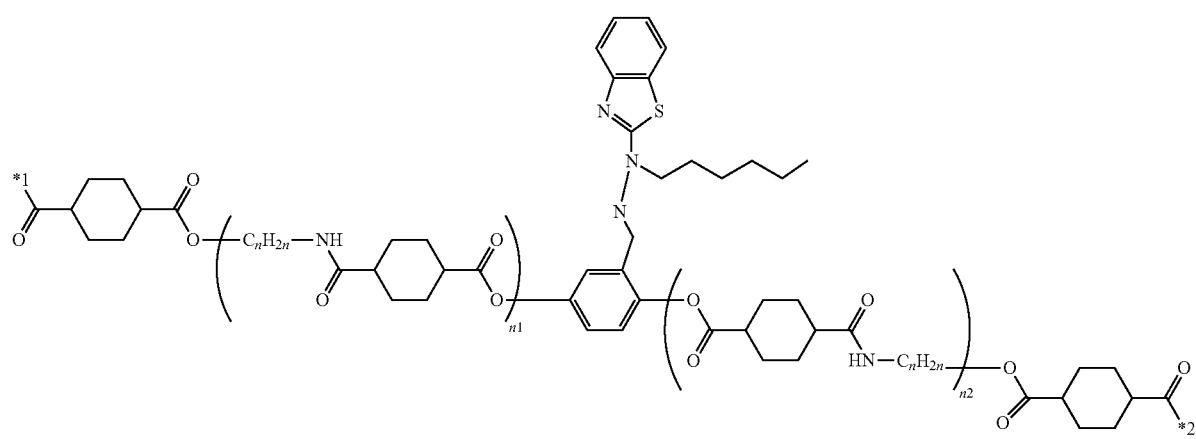

-continued
[Chemical 210]
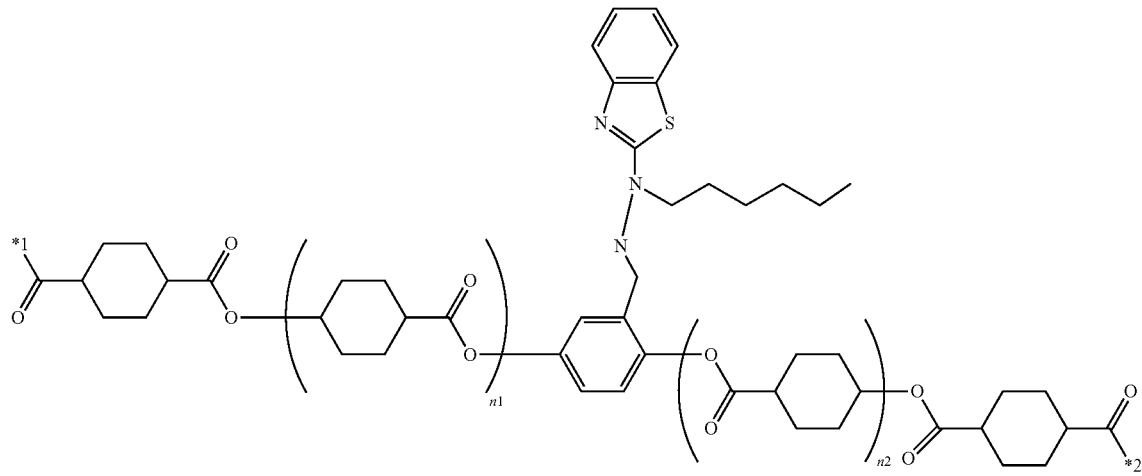
[Chemical 211]
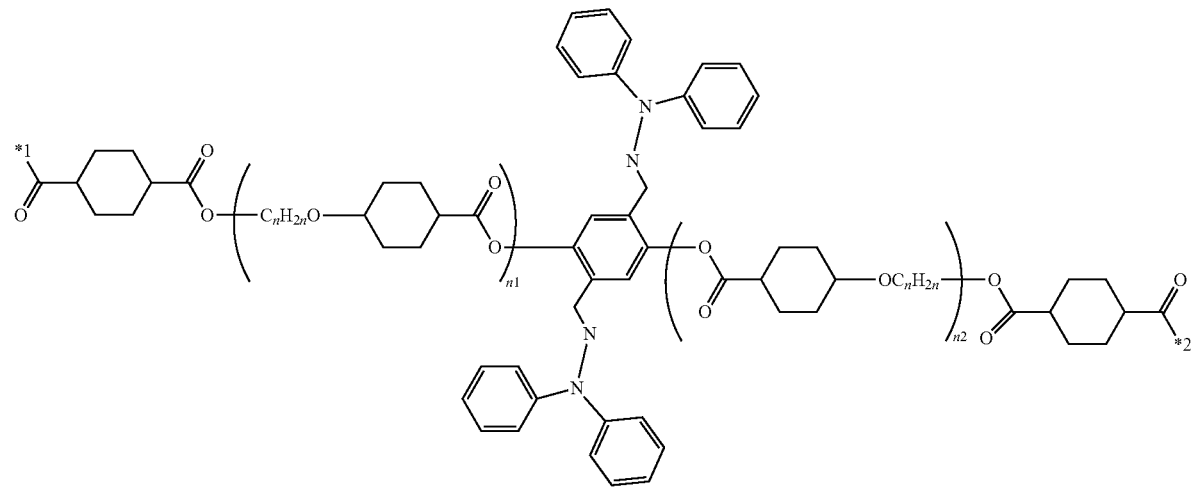
[Chemical 212]
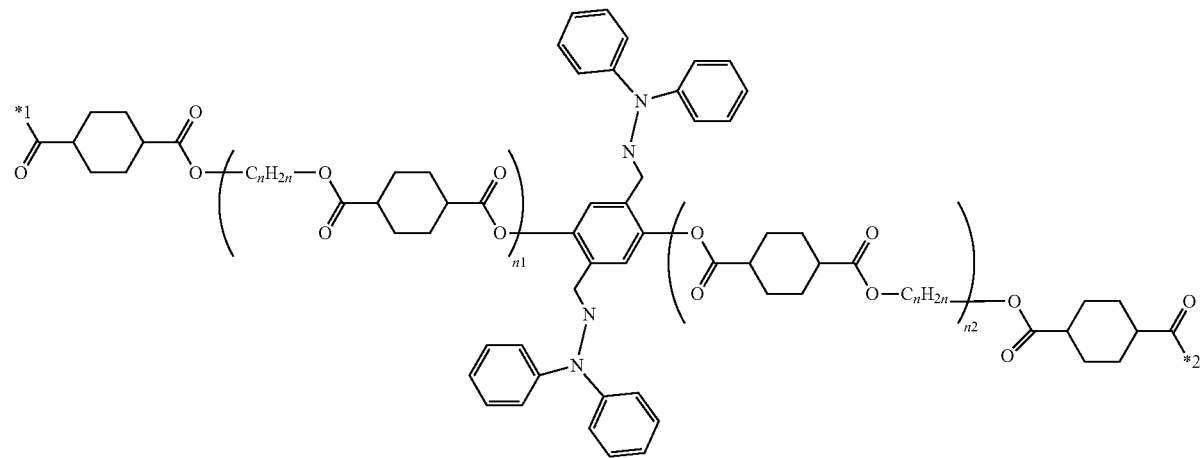

[Chemical 213]
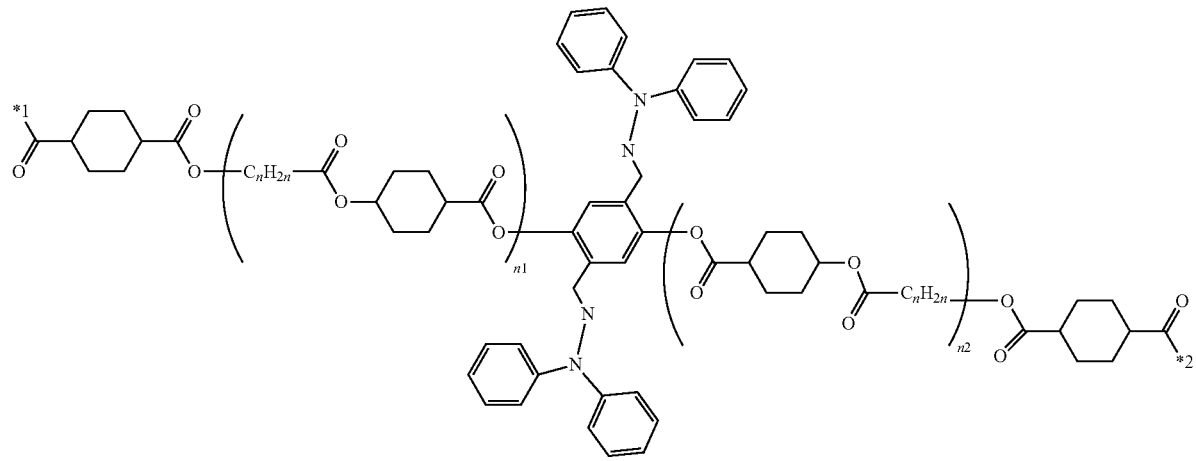
[Chemical 214]
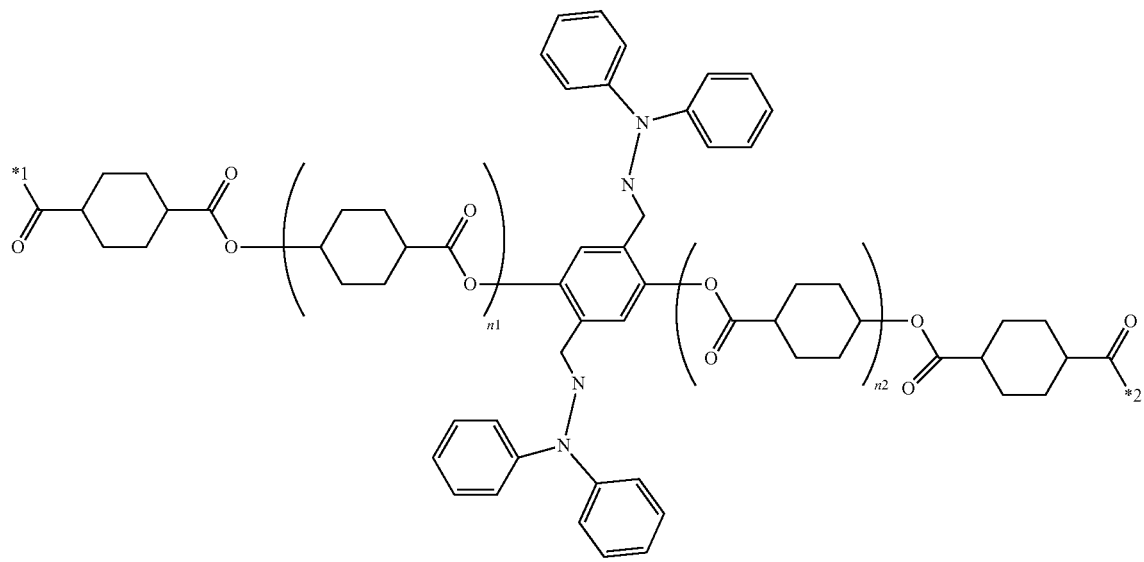
[Chemical 215]
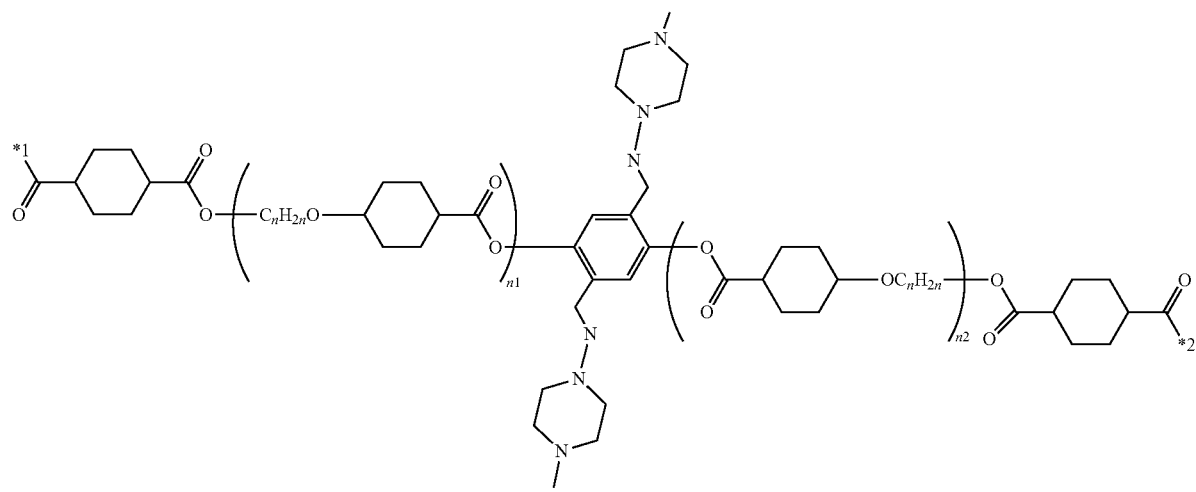

[Chemical 216]
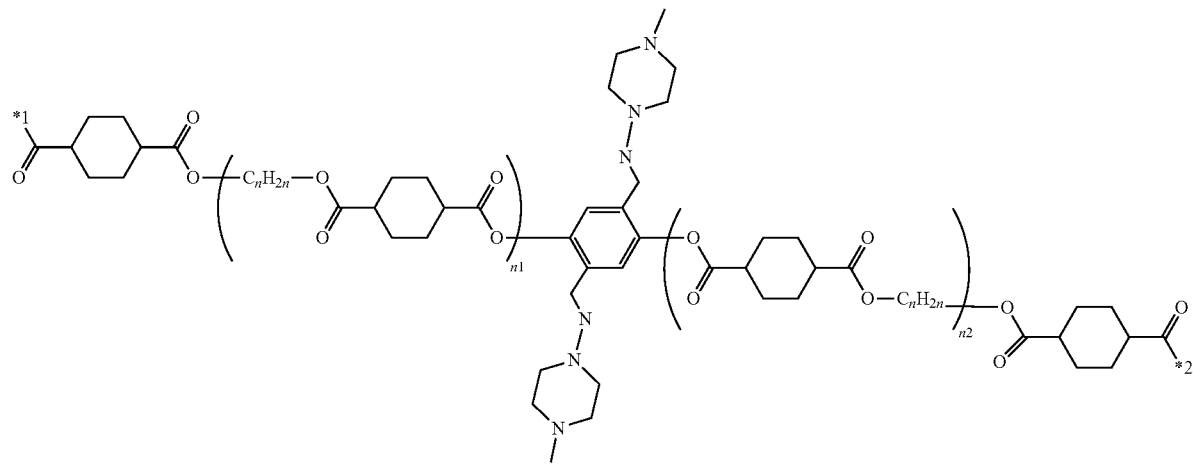
[Chemical 217]
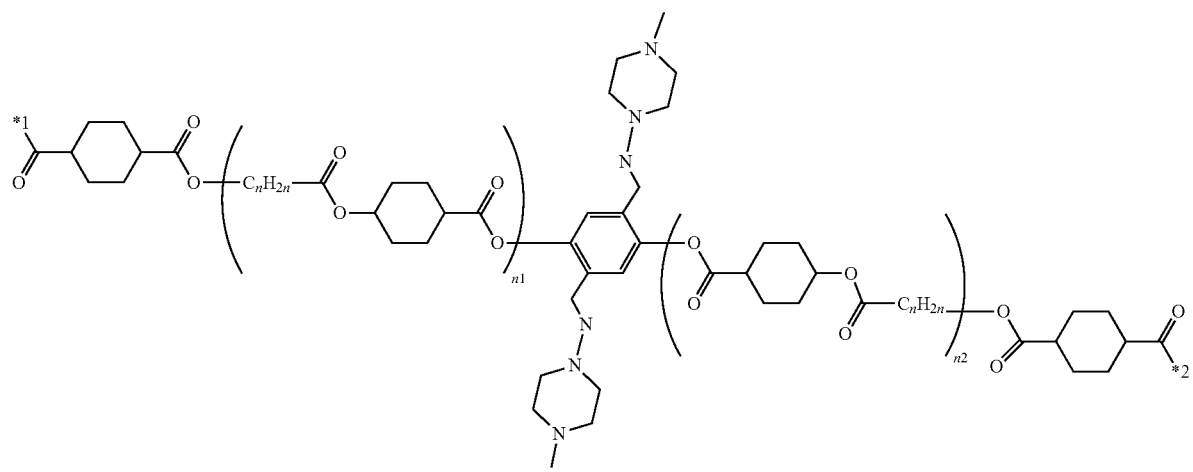
[Chemical 218]
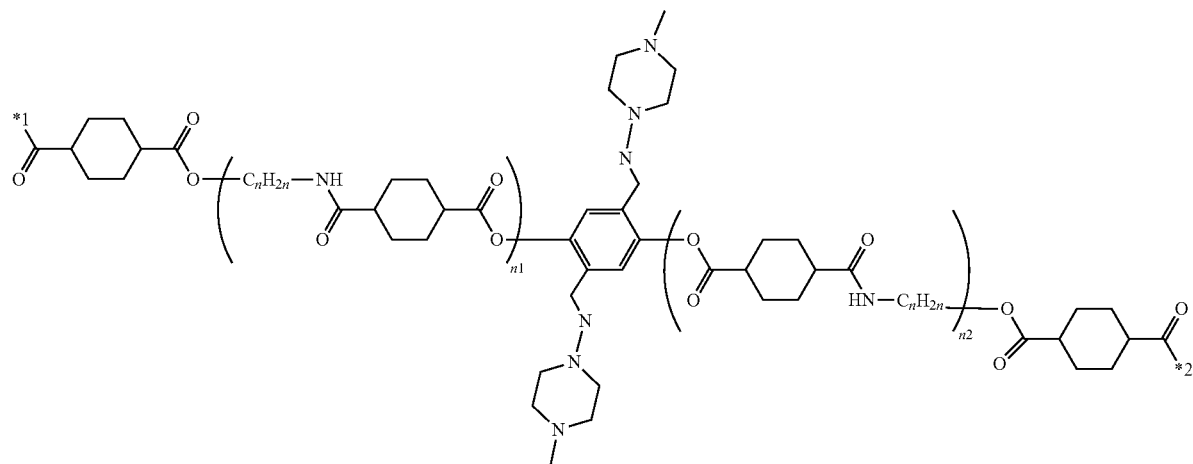

[Chemical 219]

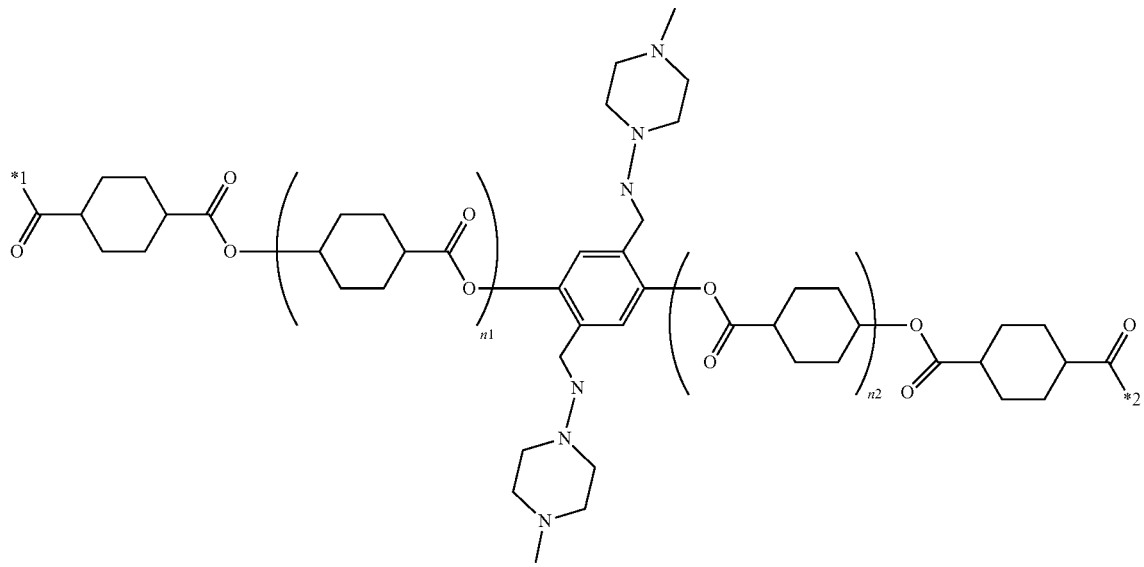

The structures connected to (*1) and (*2) in the above formulae are shown below. The (*1) or (*2) portion in the above formulae is connected to the (*) portion in the following formulae.

[Chemical 220]

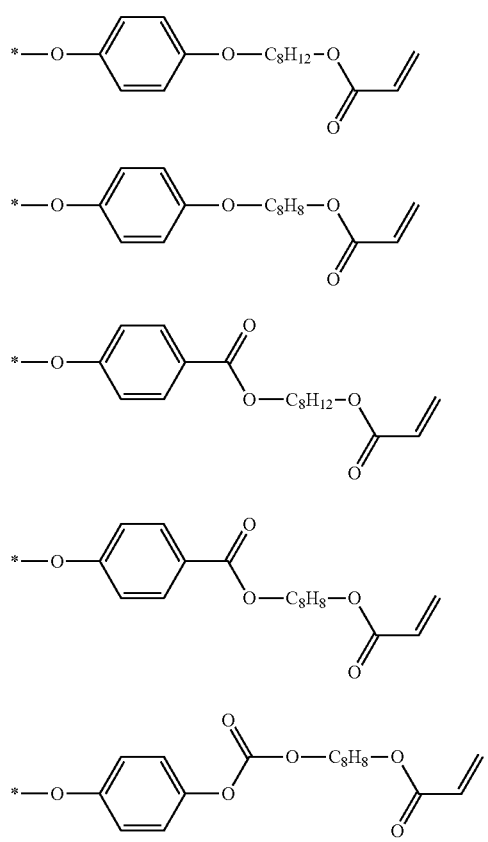

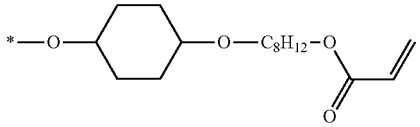

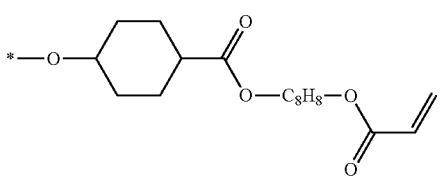

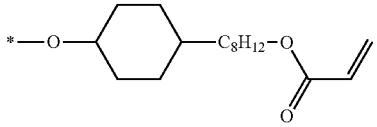

Combinations of the structures connected to (*1) and (*2) are shown below.

TABLE 1

| Structure connected to (*1) | Structure connected to (*2) |
| --- | --- |
| a | Any one of a to h |
| b | Any one of a to h |
| C | Any one of a to h |
| d | Any one of a to h |
| e | Any one of a to h |
| f | Any one of a to h |
| g | Any one of a to h |
| h | Any one of a to h |

With regard to the content of the polymerizable liquid crystal compound (B) in the liquid crystal composition of the present invention, the area percentage of the polymerizable liquid crystal compound (B) measured by gel permeation chromatography (GPC) is preferably 0.1% to 40%, more preferably 0.5% to 30%, even more preferably 0.6% to 25%, even more preferably 0.7% to 20%, and, for example, 1% to 15% based on the total peak area of the polymerizable liquid crystal compounds (A) and (B). When the area percentage of the polymerizable liquid crystal compound (B) in the liquid crystal composition is the above lower limit or more, the polymerizable liquid crystal compound scarcely precipitates during storage when the liquid crystal composition of the present invention is dissolved in various solvents. When the content of the polymerizable liquid crystal compound (B) in the liquid crystal composition is the above upper limit or less, a retardation film constituted from a polymer of the liquid crystal composition kept in an oriented state tends to develop inverse wavelength dispersibility.

The maximum absorption wavelength ($\lambda_{max}$) of the liquid crystal composition is preferably 300 to 400 nm, more preferably 315 to 385 nm, and even more preferably 320 to 380 nm. If the maximum absorption wavelength ($\lambda_{max}$) of the liquid crystal composition is the above lower limit or more, a retardation film constituted from a polymer of the liquid crystal composition kept in an oriented state tends to exhibit inverse wavelength dispersibility. If the maximum absorption wavelength ($\lambda_{max}$) of the liquid crystal composition is the above upper limit or less, absorption in the visible region is reduced, so that coloring of a film can be avoided.

No particular limitation is imposed on a method of producing the liquid crystal composition and the polymerizable liquid crystal compounds (A) and (B) may be produced either separately or simultaneously in one-pot. It is preferable to produce the polymerizable liquid crystal compounds (A) and (B) in one-pot simultaneously from an industrial point of view. An example of the method of producing the liquid crystal composition of the present invention will be explained below.

In an embodiment of the present invention, the liquid crystal composition of the present invention which contains;
a polymerizable liquid crystal compound (A-1) which is a kind of polymerizable liquid crystal compound (A) and is represented by the formula (A-1); and

[Chemical 221]

(A-1)

a polymerizable liquid crystal compound (B-1) which is a kind of polymerizable liquid crystal compound (B) and is represented by the formula (B-1):

[Chemical 222]

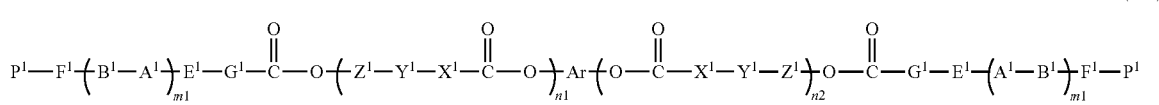

(B-1)

can be produced by a method involving the following steps:

a step (a) of reacting a carboxylic acid compound (C) represented by the formula (C):

[Chemical 223]

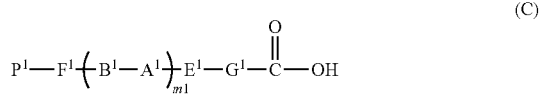

(C)

with a carboxylic acid compound (D) represented by the formula (D):

[Chemical 224]

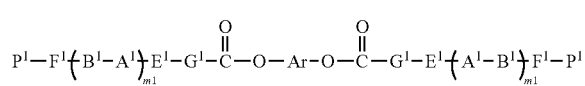

(D)

to obtain a mixture containing a carboxylic acid compound (E) represented by the formula (E) and the carboxylic acid compound (C); and

[Chemical 225]

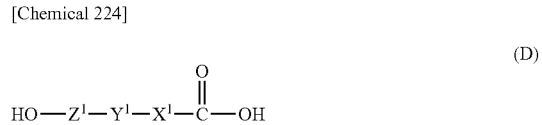

(E)

a step (b) of reacting the mixture containing the carboxylic acid compound (E) and the carboxylic acid compound (C) with an alcohol compound (F) represented by the following formula (F) to obtain a liquid crystal composition containing the polymerizable liquid crystal compound (A) and the polymerizable liquid crystal compound (B):

[Chemical 226]

HO—Ar—OH        (F)

In this case, Ar, $A^1$, $B^1$, $E^1$, $F^1$, $G^1$, $P^1$, $X^1$, $Y^1$, $Z^1$, m1, n1, and n2 in the formulae (A-1), (B-1), (C), (D), (E), and (F) are the same as those defined above.

The carboxylic acids (C) may be used either independently or in combinations of two or more. When two or more carboxylic acids (C) are used, the polymerizable liquid crystal compounds (A) and (B) respectively having right and left structures differing from each other with Ar as the center can be obtained. Examples of the carboxylic acid compound (C) include compounds represented by the formulae (R-1) to (R-104).

n in the formulae (R-1) to (R-104) denotes an integer from 1 to 16, preferably an integer from 2 to 10, more preferably an integer from 4 to 8, and, for example, 6. Also, the cyclohexane ring is preferably a trans isomer.

[Chemical 227]
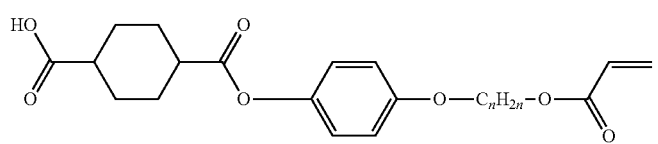 (R-1)
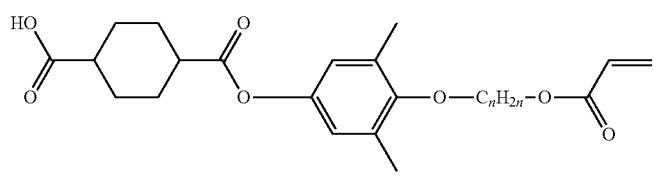 (R-2)
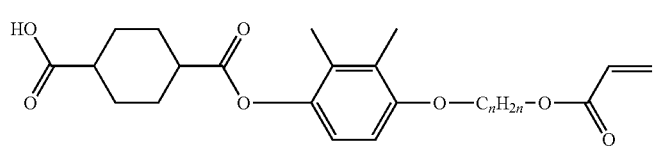 (R-3)
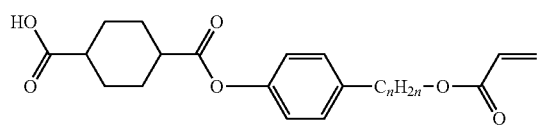 (R-4)   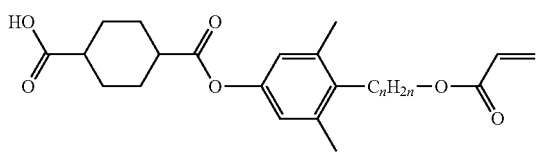 (R-5)
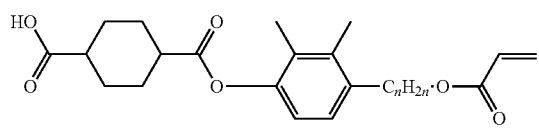 (R-6)
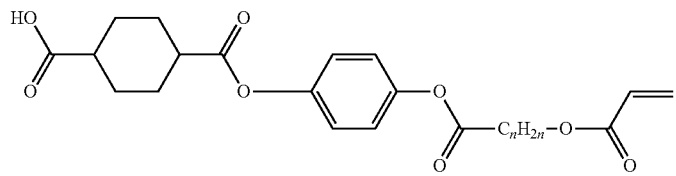 (R-7)
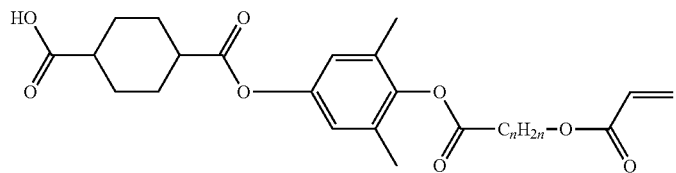 (R-8)
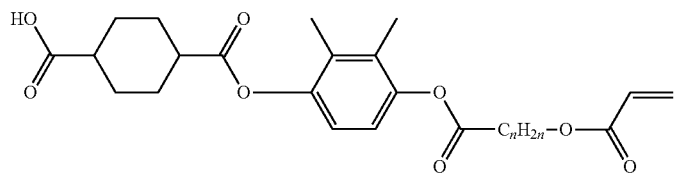 (R-9)
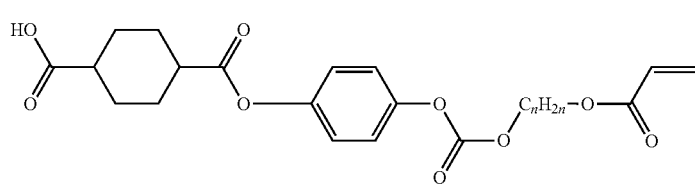 (R-10)

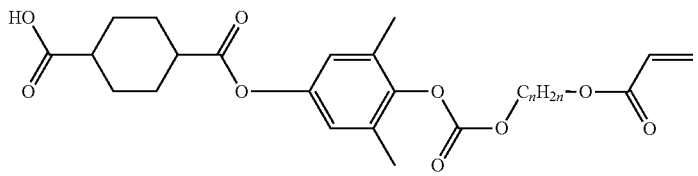
(R-11)
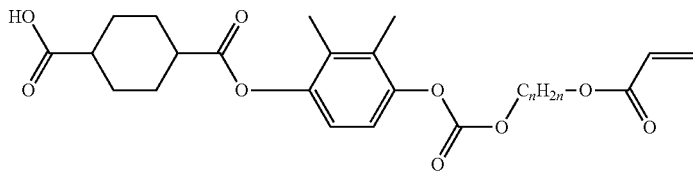
(R-12)
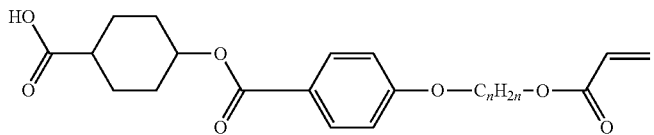
(R-13)
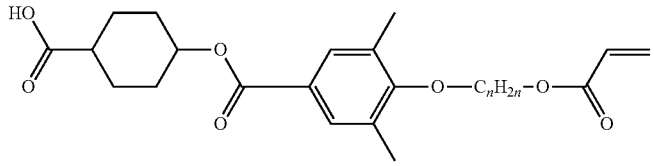
(R-14)
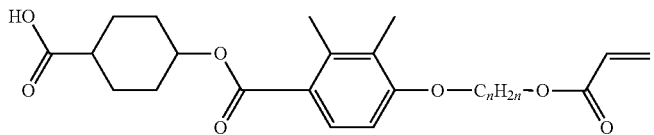
(R-15)
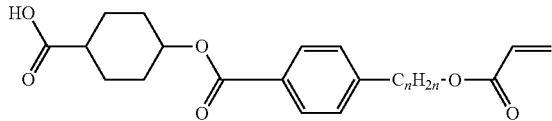
(R-16)
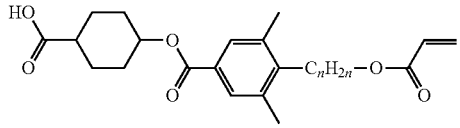
(R-17)
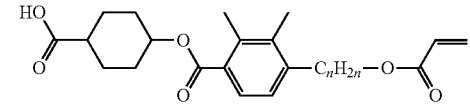
(R-18)
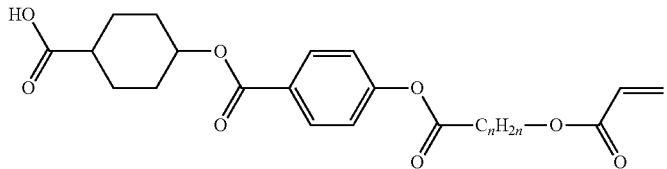
(R-19)
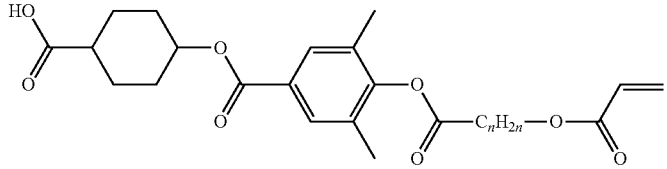
(R-20)

-continued
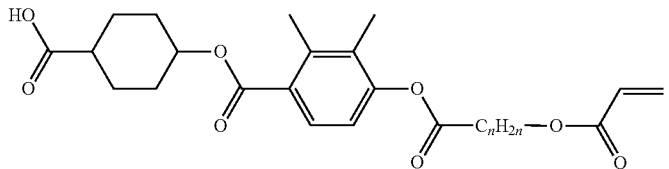
(R-21)
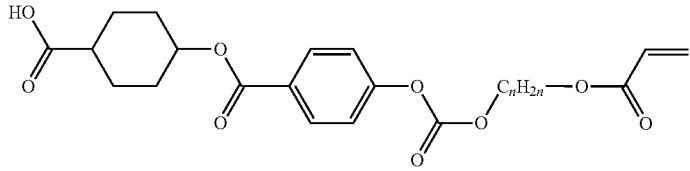
(R-22)
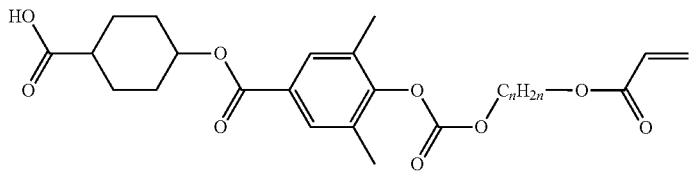
(R-23)
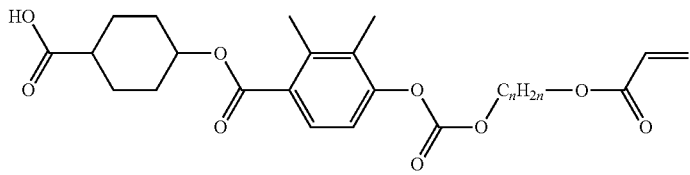
(R-24)
[Chemical 228]
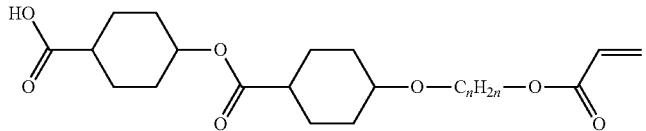
(R-25)
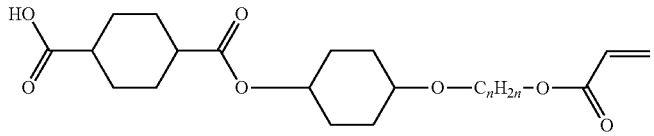
(R-26)
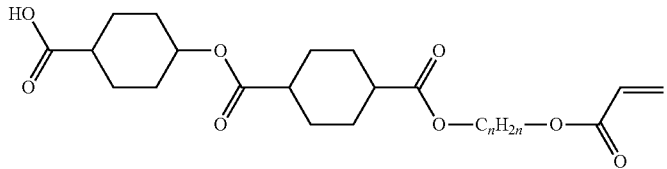
(R-27)
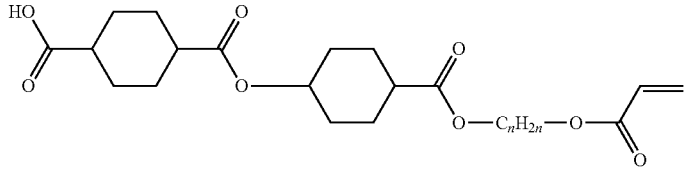
(R-28)
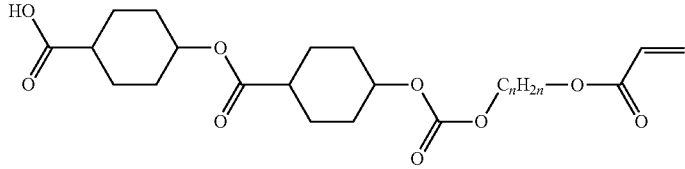
(R-29)

-continued
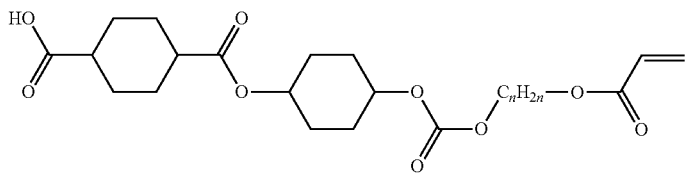
(R-30)
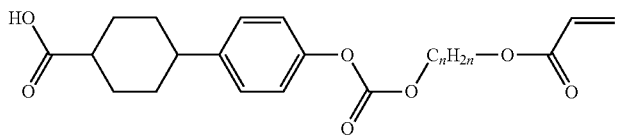
(R-31)
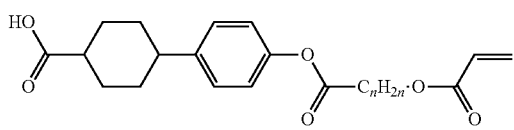
(R-32)
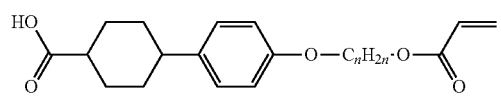
(R-33)
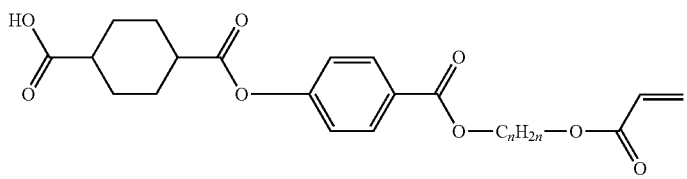
(R-34)
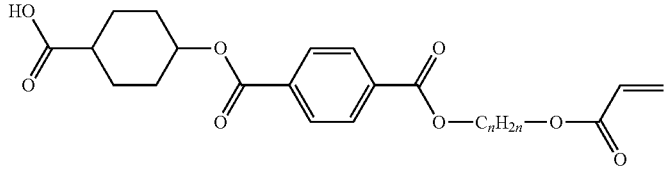
(R-35)
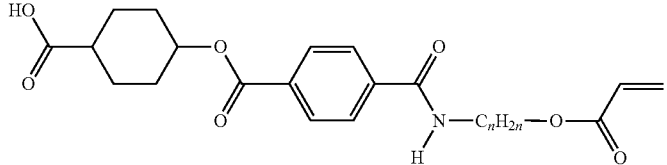
(R-36)
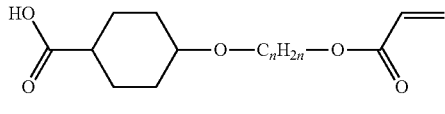
(R-37)
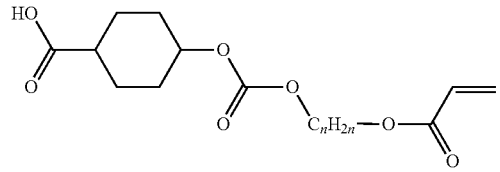
(R-38)
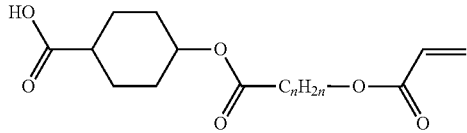
(R-39)
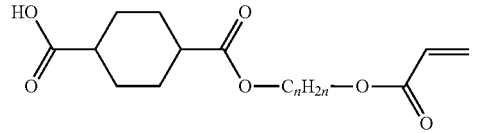
(R-40)
[Chemical 229]
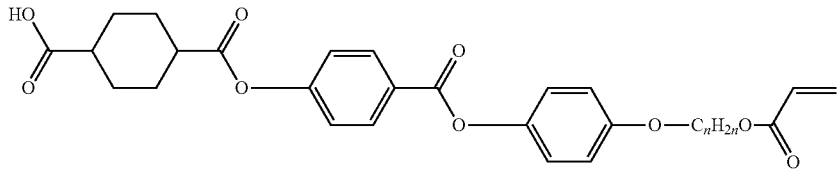
(R-41)

-continued
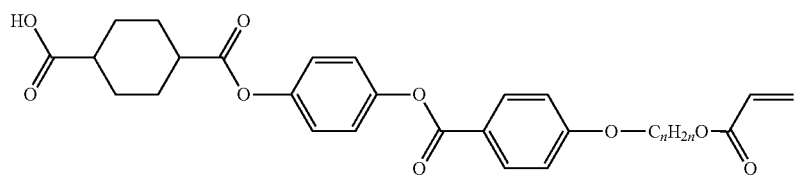 (R-42)
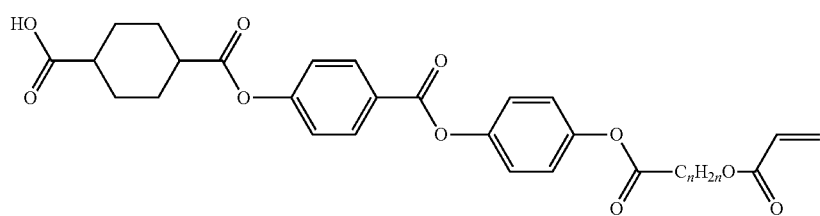 (R-43)
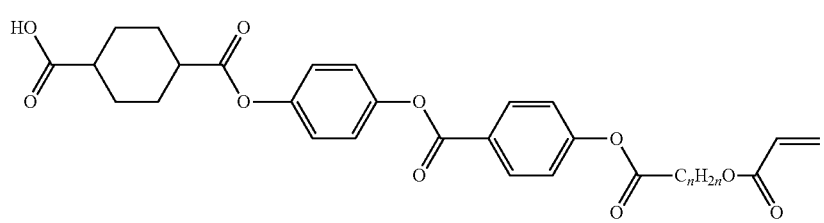 (R-44)
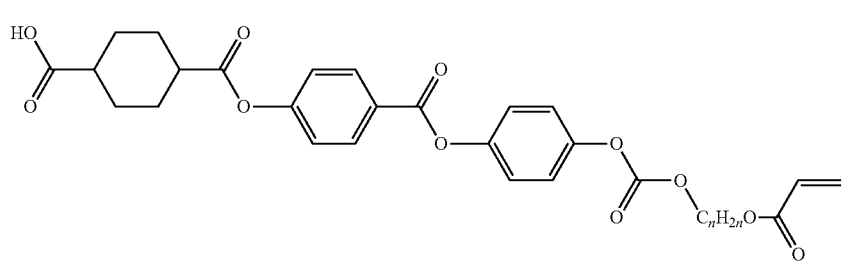 (R-45)
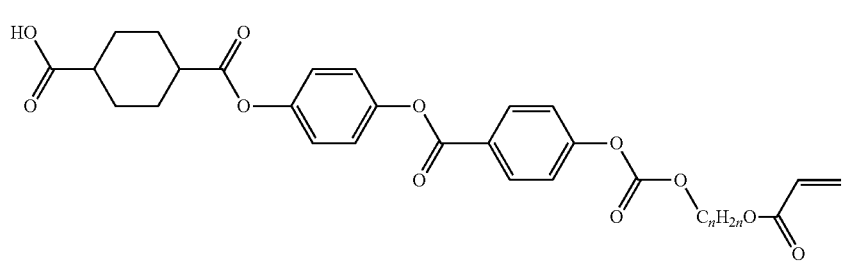 (R-46)
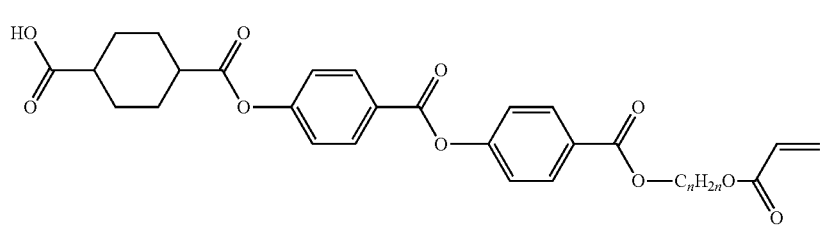 (R-47)
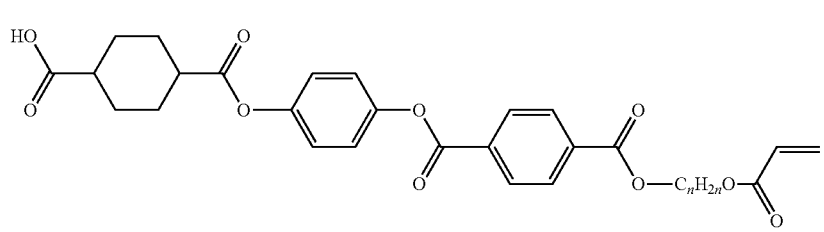 (R-48)

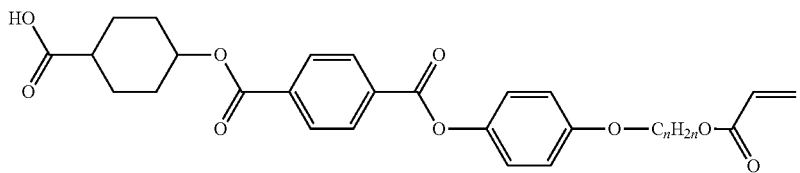
(R-49)
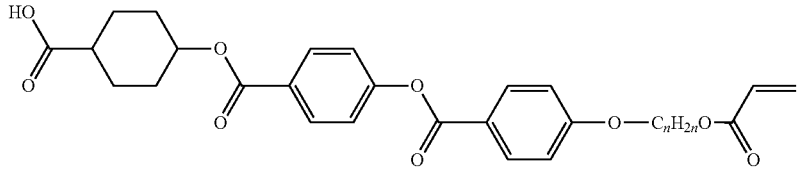
(R-50)
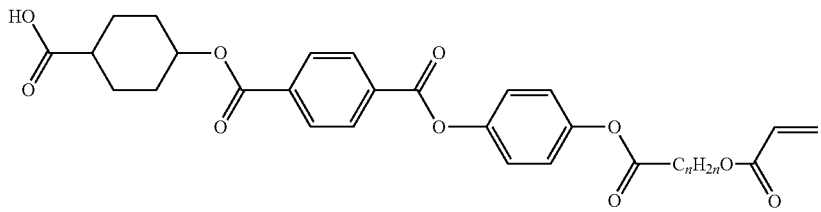
(R-51)
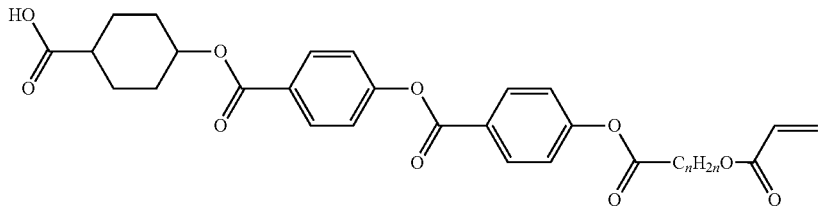
(R-52)
[Chemical 230]
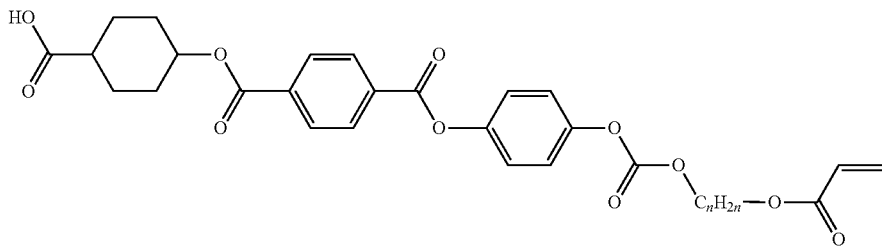
(R-53)
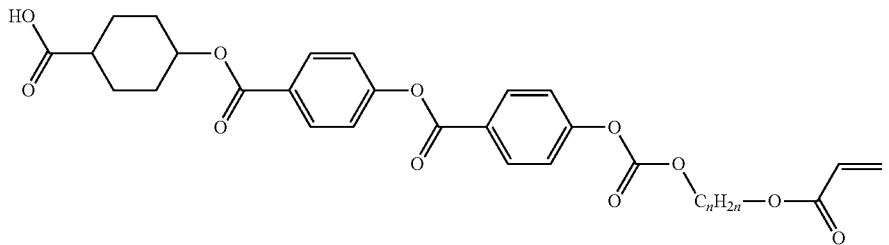
(R-54)
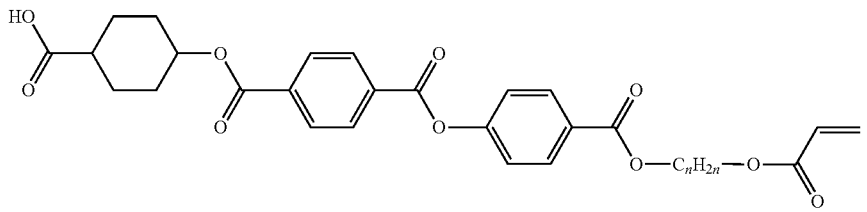
(R-55)

-continued
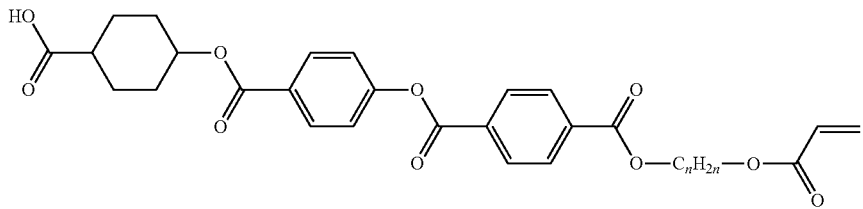
(R-56)
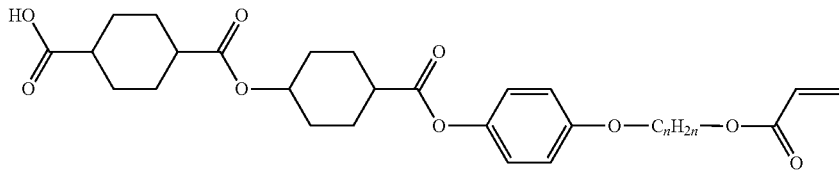
(R-57)
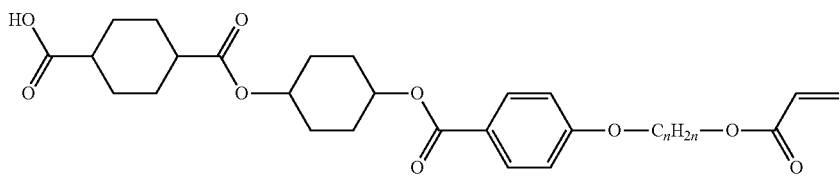
(R-58)
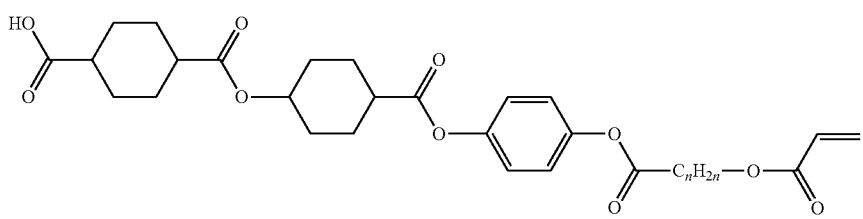
(R-59)
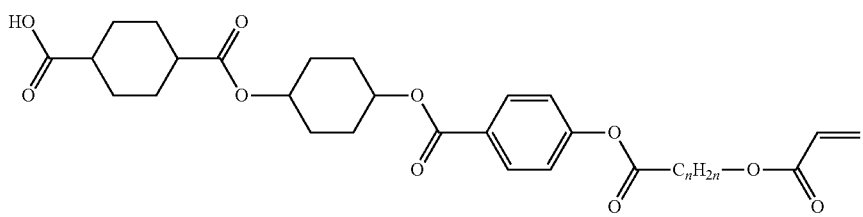
(R-60)
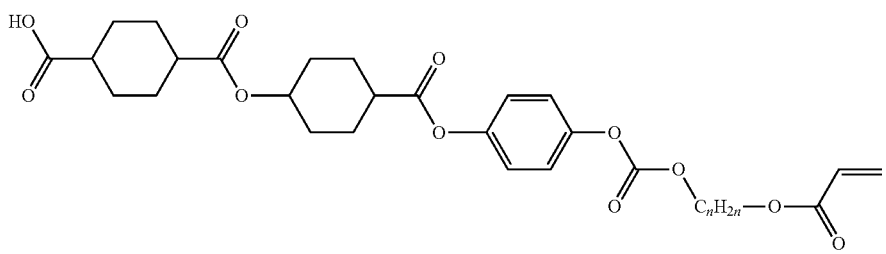
(R-61)
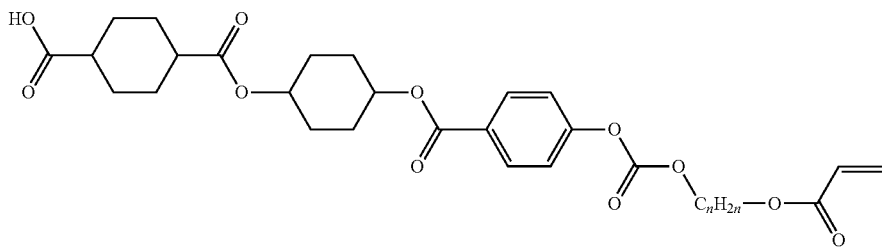
(R-62)

-continued
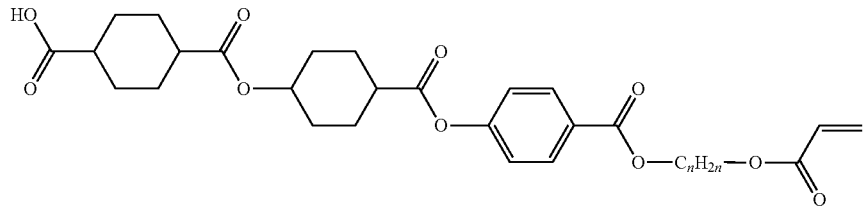
(R-63)
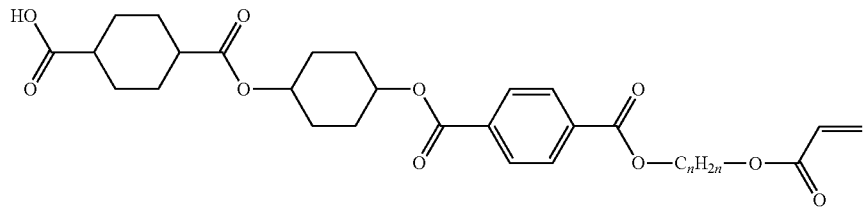
(R-64)
[Chemical 231]
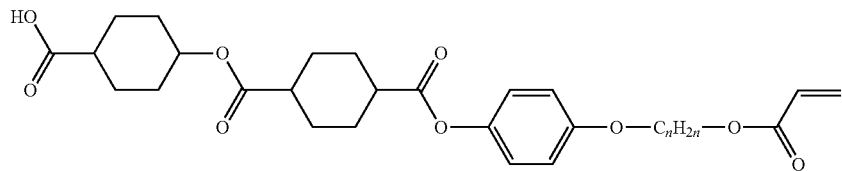
(R-65)
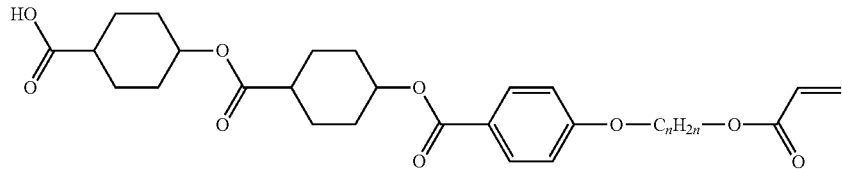
(R-66)
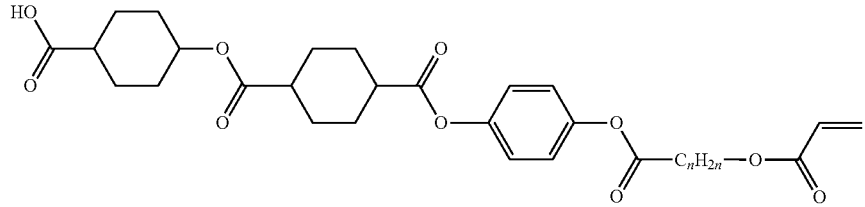
(R-67)
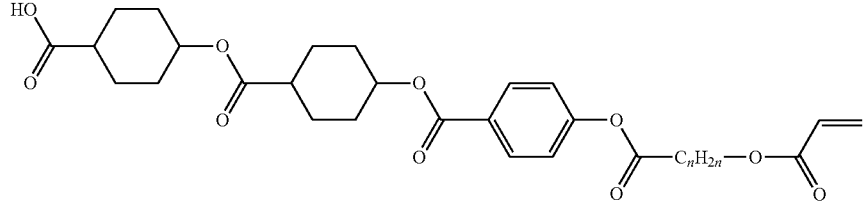
(R-68)
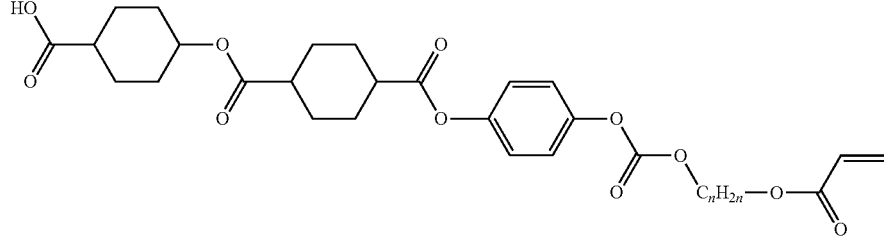
(R-69)

-continued
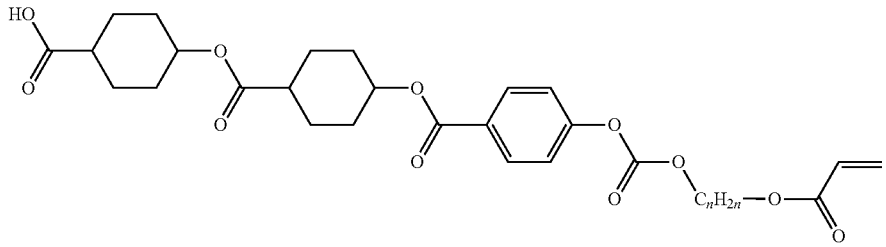
(R-70)
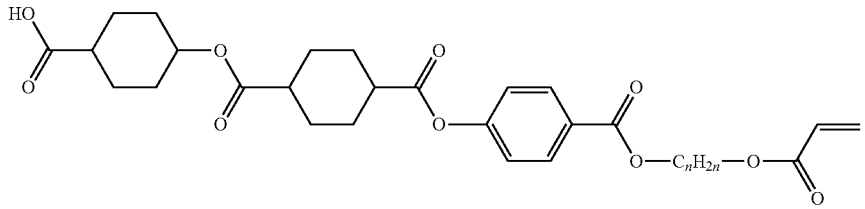
(R-71)
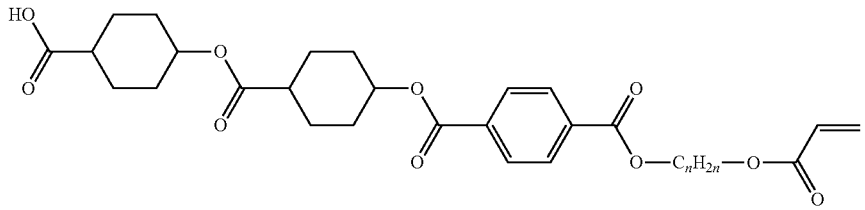
(R-72)
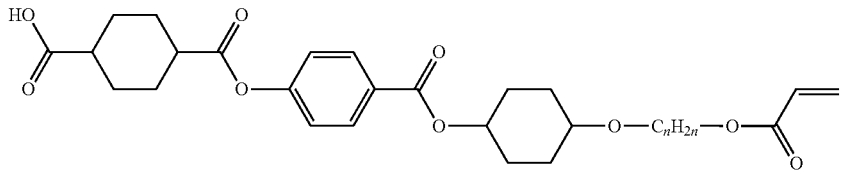
(R-73)
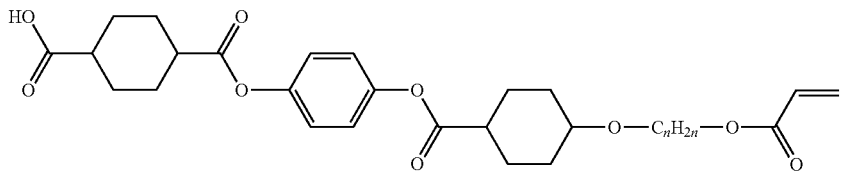
(R-74)
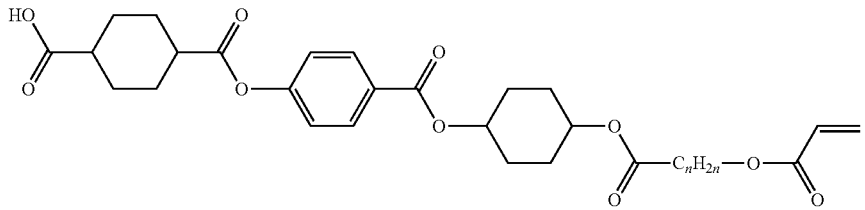
(R-75)
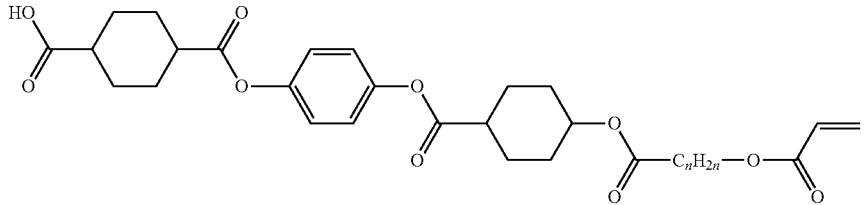
(R-76)

-continued
[Chemical 232]
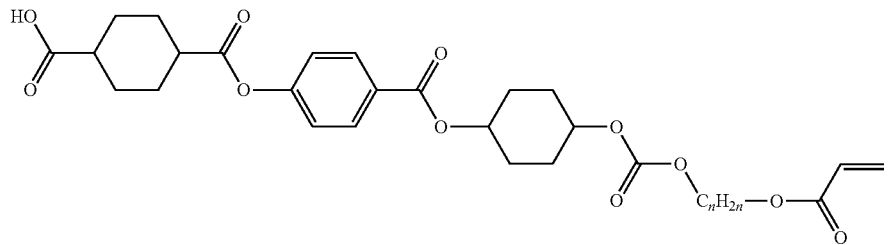
(R-77)
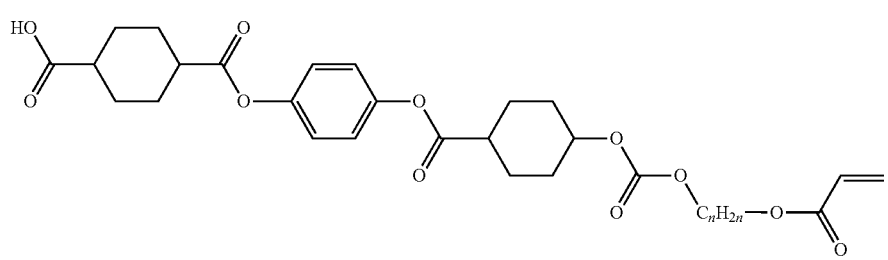
(R-78)
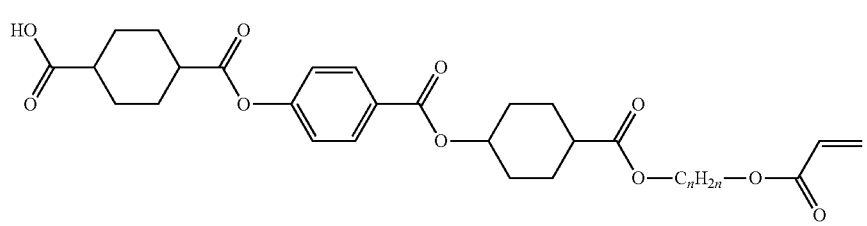
(R-79)
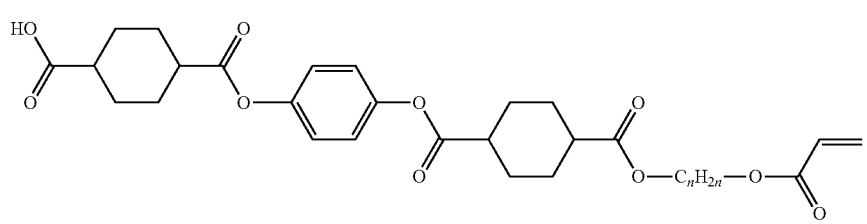
(R-80)
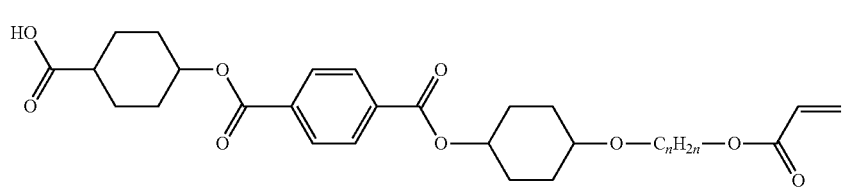
(R-81)
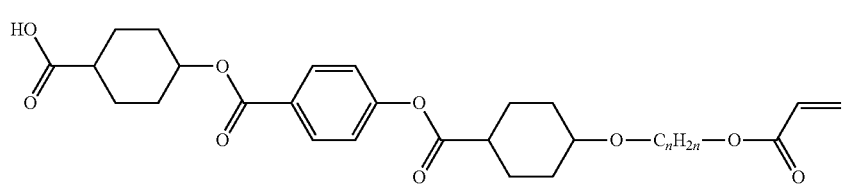
(R-82)
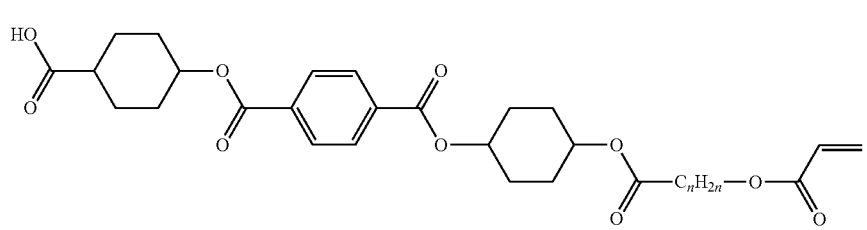
(R-83)

-continued
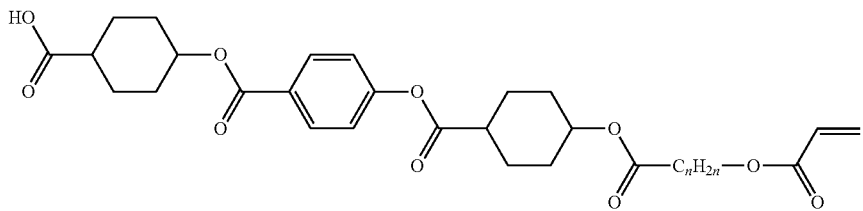
(R-84)
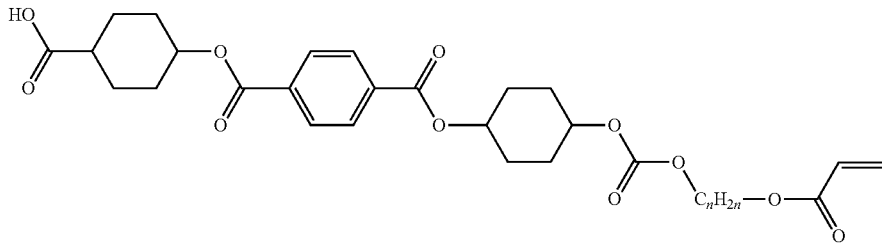
(R-85)
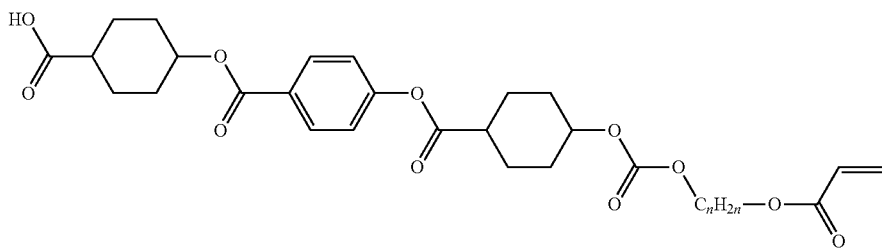
(R-86)
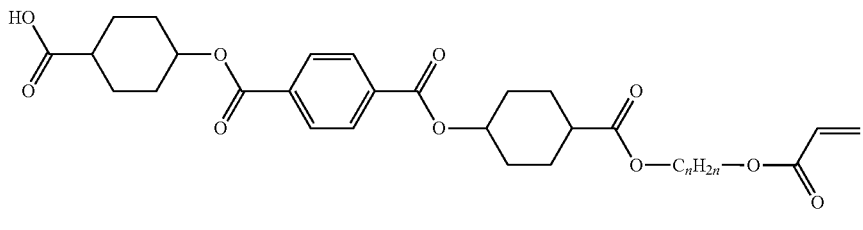
(R-87)
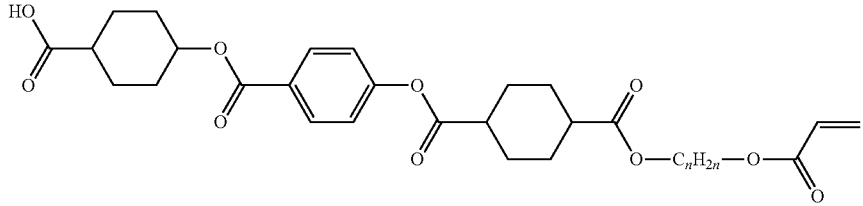
(R-88)
[Chemical 233]
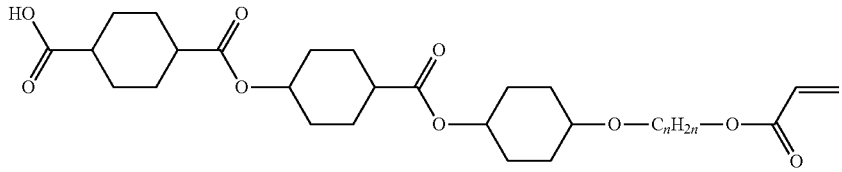
(R-89)
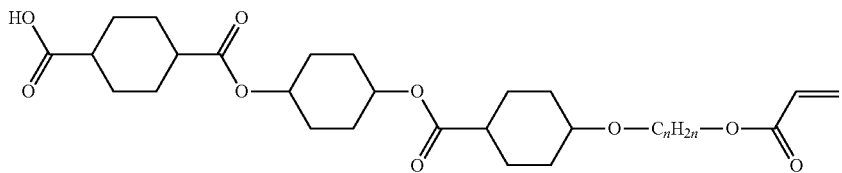
(R-90)

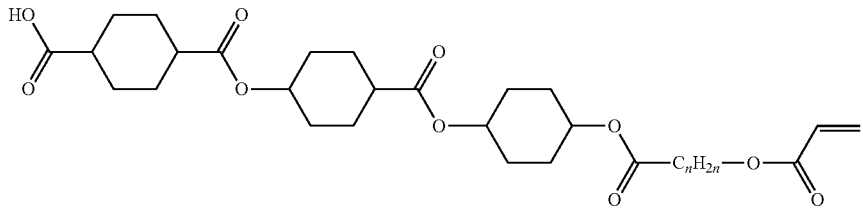
(R-91)
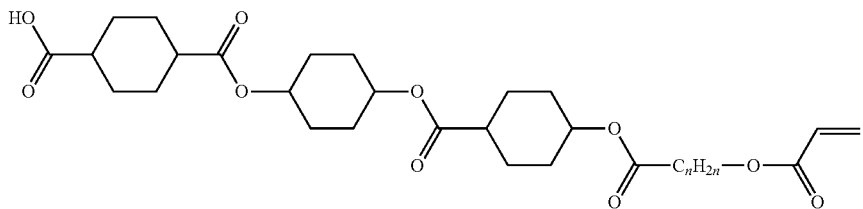
(R-92)
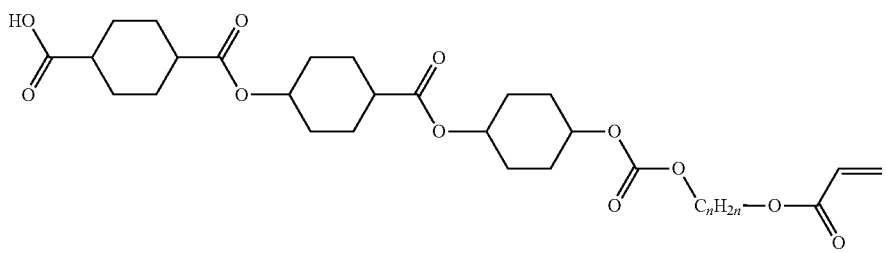
(R-93)
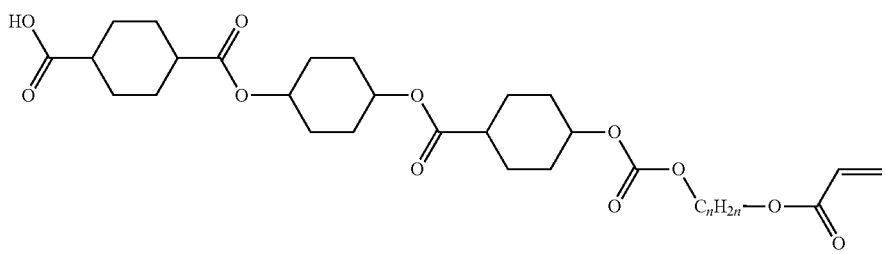
(R-94)
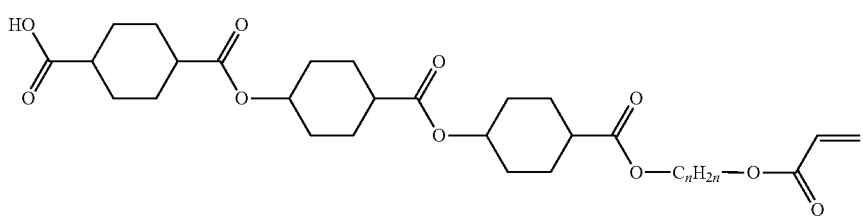
(R-95)
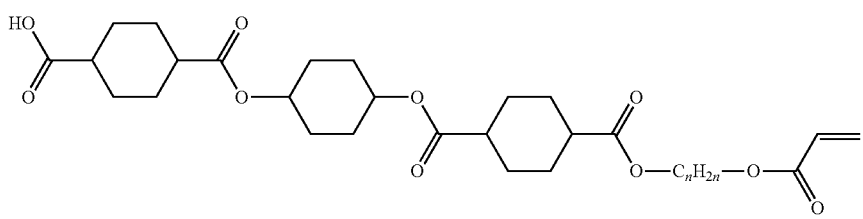
(R-96)
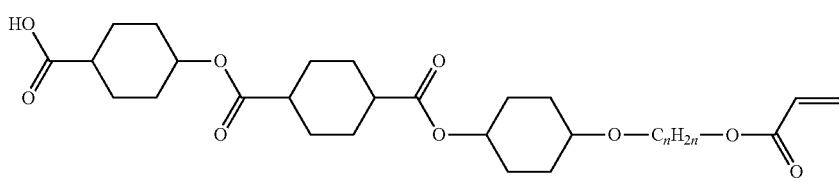
(R-97)

-continued
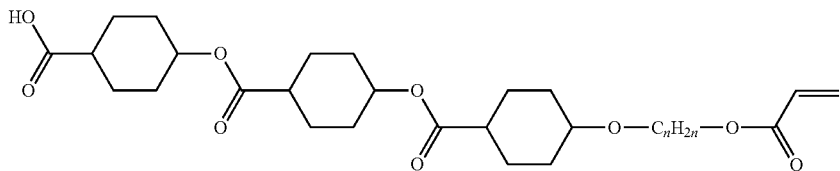
(R-98)
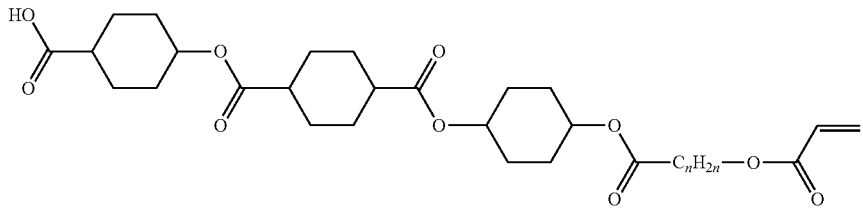
(R-99)
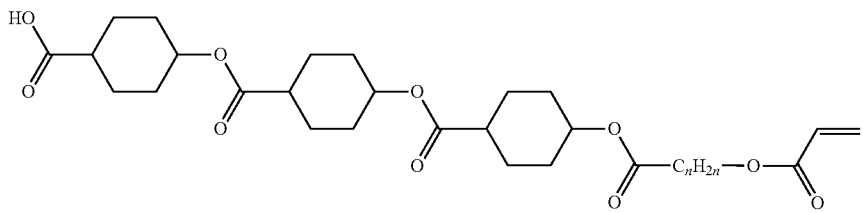
(R-100)
[Chemical 234]
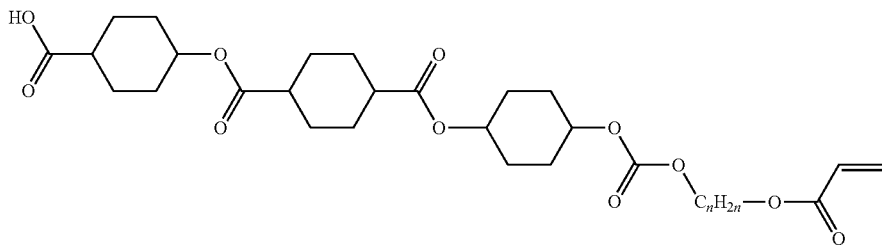
(R-101)
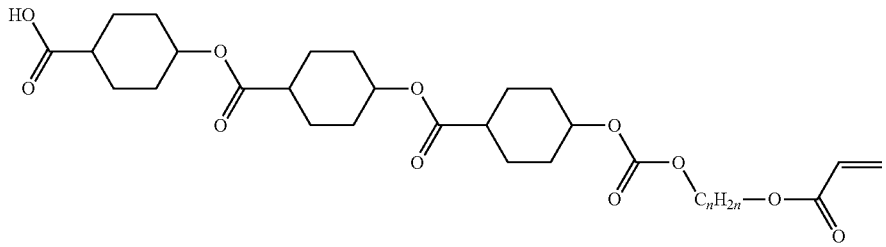
(R-102)
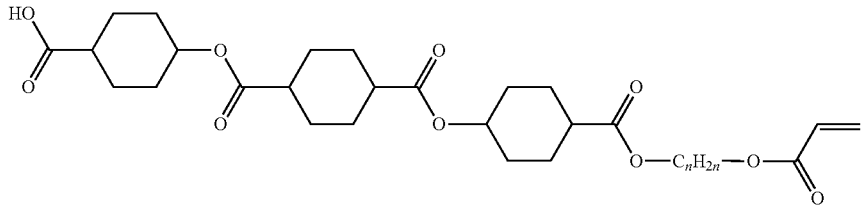
(R-103)
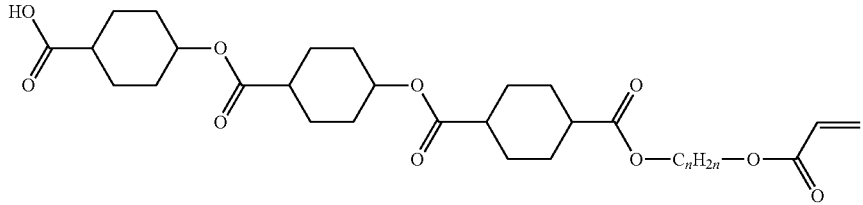
(R-104)

The carboxylic acid compounds (D) may be used either independently or in combinations of two or more. When two or more carboxylic acid compounds (D) are used, the alcohol compound (E) having right and left structures differing from each other with Ar as the center can be obtained. Examples of the carboxylic acid compound (D) include compounds represented by the formulae (D1-1) to (D7-5).

n in the formulae (D1-1) to (D7-5) denotes an integer from 1 to 16, preferably an integer from 4 to 14, and more preferably an integer from 6 to 12. $R^{15}$ and $R^{16}$ each independently represent a methyl group, an ethyl group, or a propyl group. Also, the cyclohexane ring is preferably a trans isomer.

[Chemical 235]

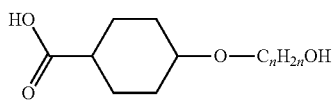 (D1-1)

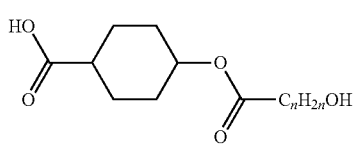 (D1-2)

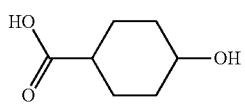 (D1-3)

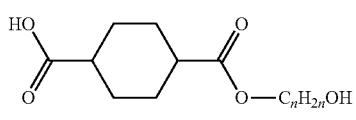 (D1-4)

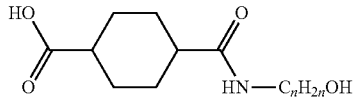 (D1-5)

[Chemical 236]

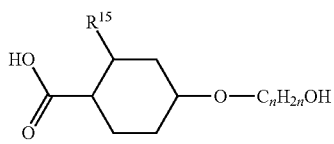 (D2-1)

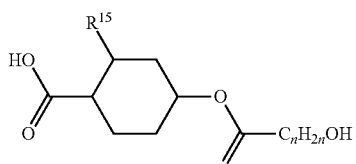 (D2-2)

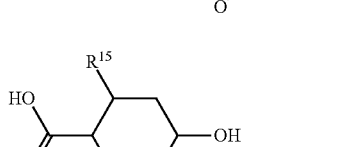 (D2-3)

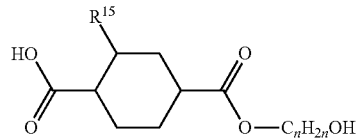 (D2-4)

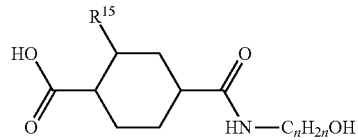 (D2-5)

[Chemical 237]

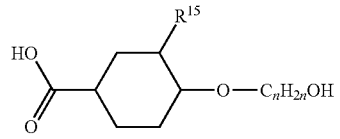 (D3-1)

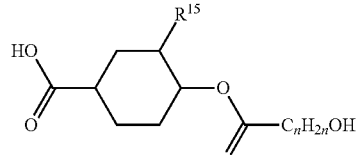 (D3-2)

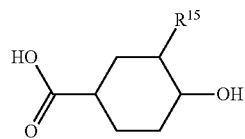 (D3-3)

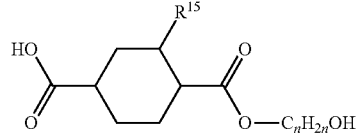 (D3-4)

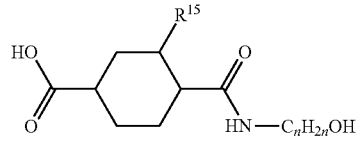 (D3-5)

[Chemical 238]

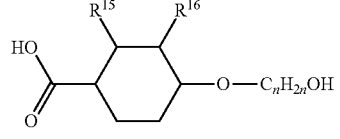 (D4-1)

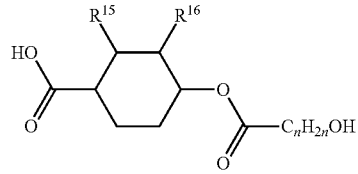 (D4-2)

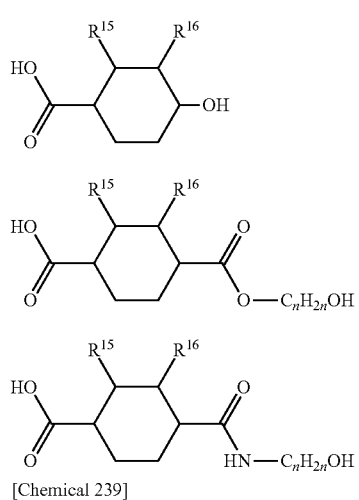
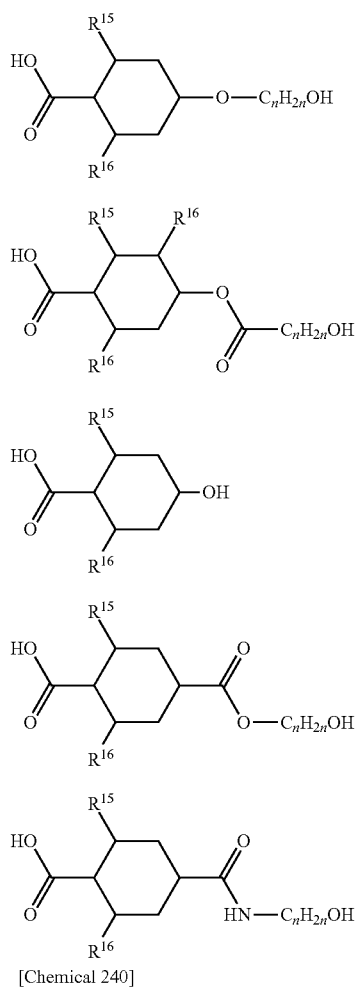
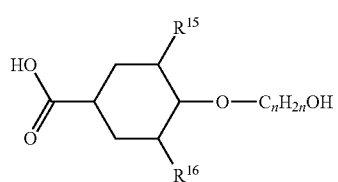
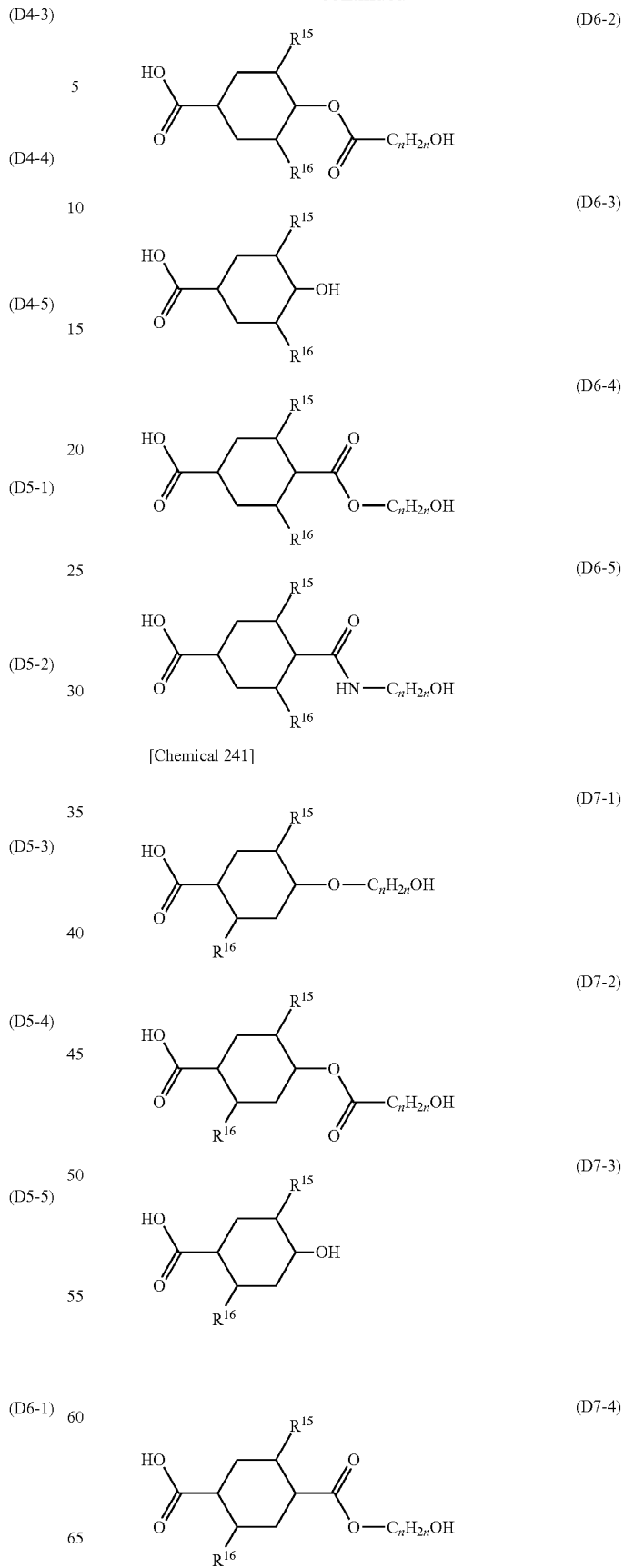

-continued

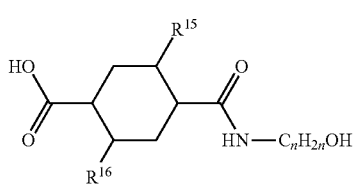

(D7-5)

The alcohol compound (F) may be a compound in which two hydroxyl groups are bonded with the aromatic group Ar. Examples of the aromatic group Ar include the same ones as those defined above and, for example, compounds represented by the formulae (Ar-1) to (Ar-14) in which two (*) portions are hydroxyl groups. The alcohol compounds (F) may be used either singly or in combinations of two or more.

<Step (a)>

In the step (a), an esterification reaction between the carboxylic acid compound (C) and the carboxylic acid compound (D) is undergone. The esterification reaction is preferably undergone in the presence of a condensing agent. The esterification reaction can be undergone efficiently and rapidly by undergoing the esterification reaction in the presence of a condensing agent.

Examples of the condensing agent include carbodiimide compounds such as 1-cyclohexyl-3-(2-morpholinoethyl)carbodiimidemetho-para-toluene sulfonate, dicyclohexylcarbodiimide, diisopropylcarbodiimide, 1-ethyl-3-(3-dimethylaminopropyl)carbodiimide, 1-ethyl-3-(3-dimethylaminopropyl)carbodiimide hydrochloride (water-soluble carbodiimide: commercially available as WSC), bis(2,6-diisopropylphenyl)carbodiimide, and bis(trimethylsilyl)carbodiimide, 2-methyl-6-nitrobenzoic acid anhydride, 2,2'-carbonylbis-1H-imidazole, 1,1'-oxalyldiimidazole, diphenylphosphorylazide, 1(4-nitrobenzenesulfonyl)-1H-1,2,4-triazole, 1H-benzotriazole-1-yl-oxytripyrrolidinophosphonium hexafluorophosphate, 1H-benzotriazole-1-yl-oxytris(dimethylamino)phosphonium hexafluorophosphate, N,N,N',N'-tetramethyl-O—(N-succinimidyl)uronium tetrafluoroborate, N-(1,2,2,2-tetrachloroethoxycarbonyloxy)succinimide, N-carbobenzoxysuccinimide, O-(6-chlorobenzotriazole-1-yl)-N,N,N',N'-tetramethyluronium tetrafluoroborate, O-(6-chlorobenzotriazole-1-yl)-N,N,N',N'-tetramethyluronium hexafluorophosphate, 2-bromo-1-ethylpyridinium tetrafluoroborate, 2-chloro-1,3-dimethylimidazolinium chloride, 2-chloro-1,3-dimethylimidazolinium hexafluorophosphate, 2-chloro-1-methylpyridinium iodide, 2-chloro-1-methylpyridinium paratoluenesulfonate, 2-fluoro-1-methylpyridinium paratoluenesulfonate, and pentachlorophenyl trichloroacetate.

The condensing agent is preferably a carbodiimide compound, 2,2'-carbonylbis-1H-imidazole, 1,1'-oxalyldiimidazole, diphenylphosphorylazide, 1H-benzotriazole-1-yl-oxytripyrrolidinophosphonium hexafluorophosphate, 1H-benzotriazole-1-yl-oxytris(dimethylamino)phosphonium hexafluorophosphate, N,N,N',N'-tetramethyl-O—(N-succinimidyl)uronium tetrafluoroborate, N-(1,2,2,2-tetrachloroethoxycarbonyloxy)succinimide, O-(6-chlorobenzotriazole-1-yl)-N,N,N',N'-tetramethyluronium hexafluorophosphate, 2-bromo-1-ethylpyridinium tetrafluoroborate, 2-chloro-1,3-dimethylimidazolinium chloride, 2-chloro-1,3-dimethylimidazolinium hexafluorophosphate, 2-chloro-1-methylpyridinium iodide, or 2-chloro-1-methylpyridinium paratoluenesulfonate.

The condensing agent is more preferably a carbodiimide compound, 2,2'-carbonylbis-1H-imidazole, 1H-benzotriazole-1-yl-oxytripyrrolidinophosphonium hexafluorophosphate, 1H-benzotriazole-1-yl-oxytris(dimethylamino)phosphonium hexafluorophosphate, N,N,N',N'-tetramethyl-O—(N-succinimidyl)uronium tetrafluoroborate, O-(6-chlorobenzotriazole-1-yl)-N,N,N',N'-tetramethyluronium hexafluorophosphate, 2-chloro-1,3-dimethylimidazolinium chloride, or 2-chloro-1-methylpyridinium iodide, and even more preferably a carbodiimide compound from an economical point of view.

Among carbodiimide compounds, dicyclohexylcarbodiimide, diisopropylcarbodiimide, 1-ethyl-3-(3-dimethylaminopropyl)carbodiimide, 1-ethyl-3-(3-dimethylaminopropyl)carbodiimide hydrochloride (water-soluble carbodiimide: commercially available as WSC), and bis(2,6-diisopropylphenyl)carbodiimide are preferable.

The amount of the condensing agent to be used is usually 0.5 to 3 mol based on 1 mol of the carboxylic acid compound (C).

In the esterification reaction, N-hydroxysuccinimide, benzotriazole, paranitrophenol, 3,5-dibutyl-4-hydroxytoluene, and the like may be added as additives and mixed. The amount of the additives to be used is preferably 0.01 to 0.1 mol based on 1 mol of the carboxylic acid compound (C).

The esterification reaction may be undergone in the presence of a catalyst. Examples of the catalyst include N,N-dimethylaminopyridine, N,N-dimethylaniline, and dimesithylammonium pentafluorobenzensulfonate. Among these catalysts, N,N-dimethylaminopyridine and N,N-dimethylaniline are preferable, and N,N-dimethylaminopyridine is more preferable. The amount of the catalyst to be used is preferably 0.01 to 0.1 mol based on 1 mol of carboxylic acid compound (C).

The esterification reaction is usually undergone in a solvent. Examples of the solvent include ketone type solvents such as acetone, methyl ethyl ketone, cyclopentanone, cyclohexanone, methyl amyl ketone, and methyl isobutyl ketone; aliphatic hydrocarbon solvents such as pentane, hexane, and heptane; aromatic hydrocarbon solvents such as toluene, xylene, benzene, and chlorobenzene; nitrile type solvents such as acetonitrile; ether type solvents such as tetrahydrofuran and dimethoxyethane; ester type solvents such as ethyl lactate; halogenated hydrocarbon solvents such as chloroform and dichloromethane; and aprotic polar solvents such as dimethylsulfoxide, N-methyl-2-pyyrolidone, N,N-dimethylformamide, N,N-dimethylacetamide, and hexamethylphosphorictriamide. These solvents may be used either independently or in combinations of two or more.

The solvent is preferably an aromatic hydrocarbon solvent such as toluene, xylene, benzene, or chlorobenzene; ether type solvent such as tetrahydrofuran or dimethoxyethane; or halogenated hydrocarbon solvent such as chloroform or dichloromethane and more preferably a halogenated hydrocarbon solvent such as chloroform or dichloromethane.

The amount of the carboxylic acid compound (D) to be used is preferably 0.001 to 0.5 mol, more preferably 0.008 to 0.4 mol, even more preferably 0.006 to 0.3 mol, and, for example, 0.005 to 0.2 mol based on 1 mol of the carboxylic acid compound (C). When the amount of the carboxylic acid compound (D) to be used is the aforementioned lower limit or more, the yield of the polymerizable liquid crystal compound (B) is improved. Also, when the amount of the carboxylic acid compound (D) to be used is the aforementioned upper limit or less, an after-treatment operation for removing unreacted carboxylic acid compound (D) can be easily performed and there is therefore a tendency toward high productivity.

The amount of the solvent to be used is preferably 0.5 to 50 parts by mass, more preferably 1 to 20 parts by mass, and even more preferably 2 to 10 parts by mass based on the total 1 part by mass of the carboxylic acid compounds (C) and (D).

In the step (a), the temperature of the esterification reaction is preferably −20 to 100° C., more preferably −10 to 50° C., and even more preferably −5 to 30° C. The time required for the esterification reaction is preferably 1 min to 72 hr, more preferably 1 to 48 hr, and more preferably 1 to 24 hr. There is a tendency that the reaction yield is improved and the productivity is more increased by undergoing the esterification reaction in the aforementioned temperature and time ranges.

<Step (b)>

In the step (b), a mixture containing the carboxylic acid compound (C), carboxylic acid compound (D), and solvent which are obtained in the step (a) and, depending on the case, a condensing agent or additives, or a catalyst is reacted with the alcohol compound (F). In this reaction, an esterification reaction between the alcohol compound (F) and carboxylic acid compound (C) and an esterification reaction between the alcohol compound (F) and carboxylic acid compound (E) are caused. In these esterification reactions, the condensing agent and catalyst which are used in the step (a) can be used without changes and it is therefore unnecessary to add a condensing agent and catalyst again, which is industrially advantageous. The reaction conditions (for example, reaction temperature, reaction time) in the step (b) are the same as those in the step (a).

The amount of the alcohol compound (F) to be used is preferably 0.2 to 0.8 mol, more preferably 0.3 to 0.7 mol, even more preferably 0.35 to 0.6 mol, and, for example, 0.4 to 0.5 mol based on the total 1 mol of the carboxylic acid compounds (C) and (D). If the amount of the alcohol compound (F) to be used is the above lower limit or more, the alcohol compound (F) is restrained from being deficient with improved yield. Also, if the amount of the alcohol compound (F) to be used is the above upper limit or less, the amount of unreacted alcohol compound (F) is reduced, allowing easy refining.

A liquid crystal composition containing the polymerizable liquid crystal compounds (A) and (B) is obtained by the above reaction. Such a liquid crystal composition can be refined by filtration, decantation, or the like.

The production method of the present invention may involve a step (c) of reacting an alcohol compound (c1) represented by the formula (c1):

[Chemical 242]

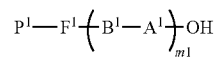
(c1)

with a dicarboxylic acid compound (c2) represented by the formula (c2):

[Chemical 243]

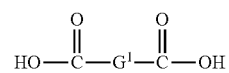
(c2)

to obtain a carboxylic acid compound (C-1) represented by the formula (C-1):

[Chemical 244]

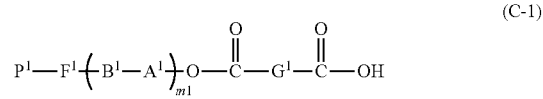
(C-1)

The alcohol compounds (c1) and dicarboxylic acid compounds (c2) may be respectively used either independently or in combinations of two or more. The carboxylic acid compound (C-1) is a kind of carboxylic acid compound (C).

Examples of the alcohol compound (c1) include compounds represented by the formulae (3-1-a) to (3-36-e).

[Chemical 245]

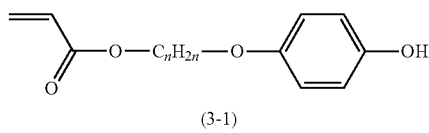

(3-1)

(3-1-a) n = 4
(3-1-b) n = 6
(3-1-c) n = 8
(3-1-d) n = 11
(3-1-e) n = 12

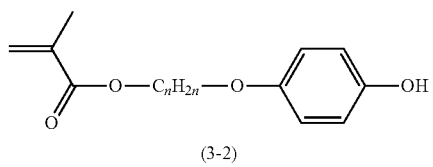

(3-2)

(3-2-a) n = 4
(3-2-b) n = 6
(3-2-c) n = 8
(3-2-d) n = 11
(3-2-e) n = 12

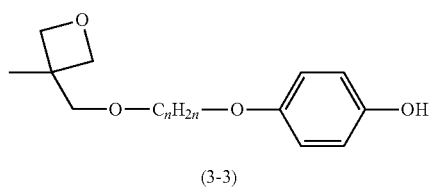

(3-3)

(3-3-a) n = 4
(3-3-b) n = 6
(3-3-c) n = 8
(3-3-d) n = 11
(3-3-e) n = 12

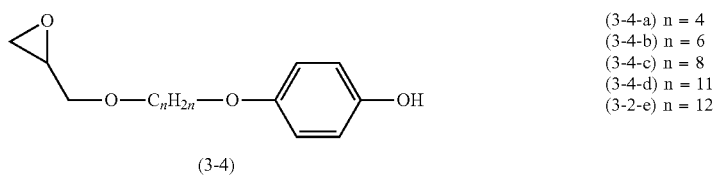
(3-4-a) n = 4
(3-4-b) n = 6
(3-4-c) n = 8
(3-4-d) n = 11
(3-2-e) n = 12
(3-4)
[Chemical 246]
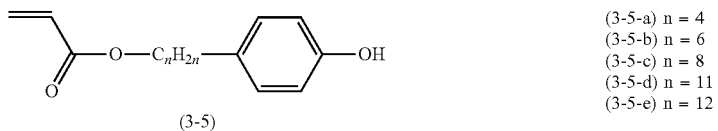
(3-5-a) n = 4
(3-5-b) n = 6
(3-5-c) n = 8
(3-5-d) n = 11
(3-5-e) n = 12
(3-5)
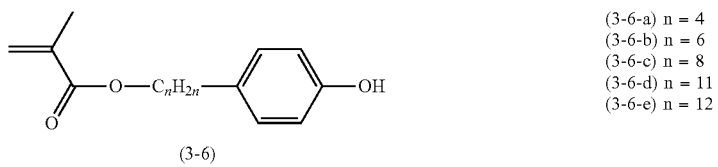
(3-6-a) n = 4
(3-6-b) n = 6
(3-6-c) n = 8
(3-6-d) n = 11
(3-6-e) n = 12
(3-6)
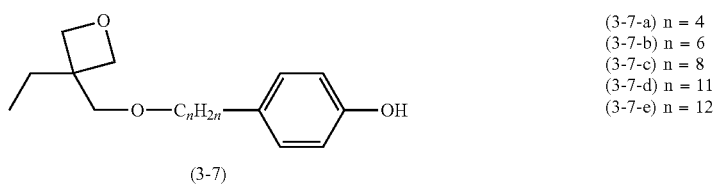
(3-7-a) n = 4
(3-7-b) n = 6
(3-7-c) n = 8
(3-7-d) n = 11
(3-7-e) n = 12
(3-7)
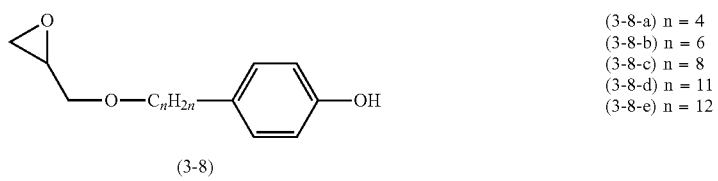
(3-8-a) n = 4
(3-8-b) n = 6
(3-8-c) n = 8
(3-8-d) n = 11
(3-8-e) n = 12
(3-8)
[Chemical 247]
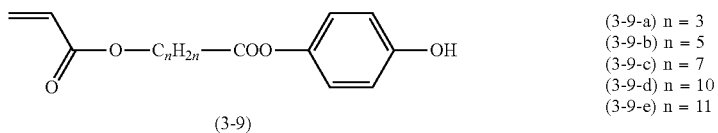
(3-9-a) n = 3
(3-9-b) n = 5
(3-9-c) n = 7
(3-9-d) n = 10
(3-9-e) n = 11
(3-9)
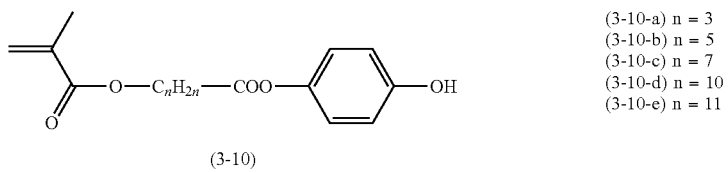
(3-10-a) n = 3
(3-10-b) n = 5
(3-10-c) n = 7
(3-10-d) n = 10
(3-10-e) n = 11
(3-10)
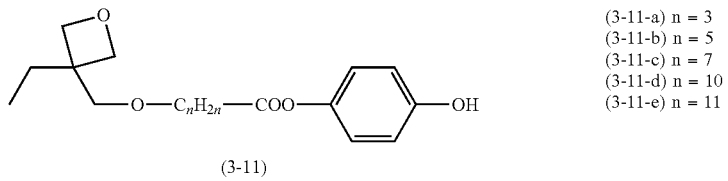
(3-11-a) n = 3
(3-11-b) n = 5
(3-11-c) n = 7
(3-11-d) n = 10
(3-11-e) n = 11
(3-11)

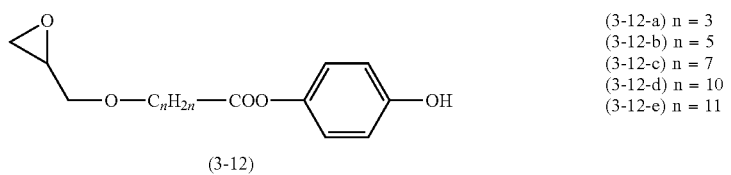
(3-12)
(3-12-a) n = 3
(3-12-b) n = 5
(3-12-c) n = 7
(3-12-d) n = 10
(3-12-e) n = 11
[Chemical 248]
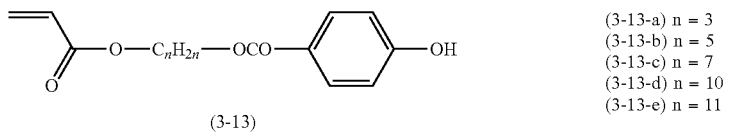
(3-13)
(3-13-a) n = 3
(3-13-b) n = 5
(3-13-c) n = 7
(3-13-d) n = 10
(3-13-e) n = 11
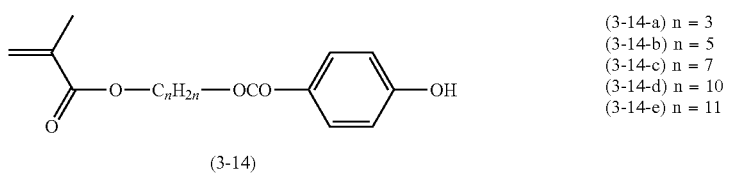
(3-14)
(3-14-a) n = 3
(3-14-b) n = 5
(3-14-c) n = 7
(3-14-d) n = 10
(3-14-e) n = 11
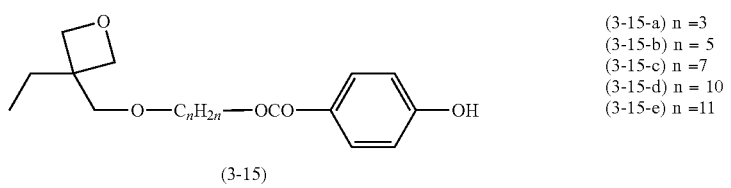
(3-15)
(3-15-a) n = 3
(3-15-b) n = 5
(3-15-c) n = 7
(3-15-d) n = 10
(3-15-e) n = 11
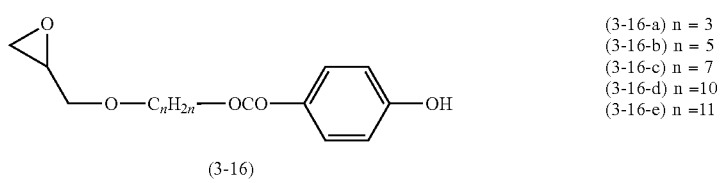
(3-16)
(3-16-a) n = 3
(3-16-b) n = 5
(3-16-c) n = 7
(3-16-d) n = 10
(3-16-e) n = 11
[Chemical 249]
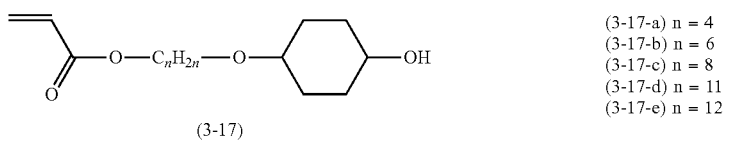
(3-17)
(3-17-a) n = 4
(3-17-b) n = 6
(3-17-c) n = 8
(3-17-d) n = 11
(3-17-e) n = 12
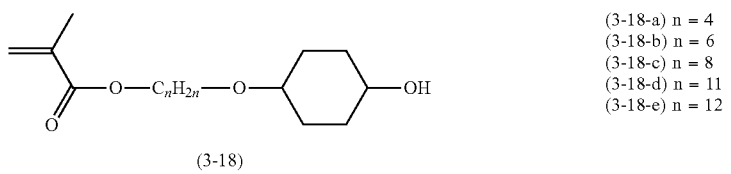
(3-18)
(3-18-a) n = 4
(3-18-b) n = 6
(3-18-c) n = 8
(3-18-d) n = 11
(3-18-e) n = 12
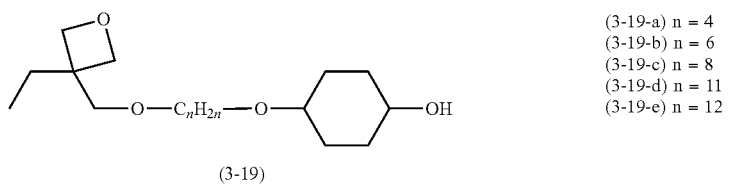
(3-19)
(3-19-a) n = 4
(3-19-b) n = 6
(3-19-c) n = 8
(3-19-d) n = 11
(3-19-e) n = 12

-continued
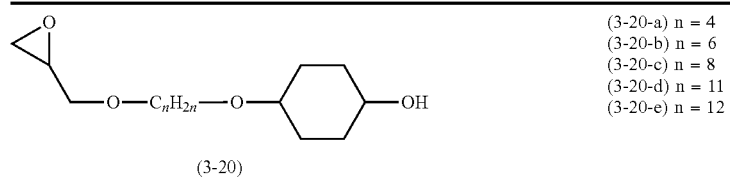
(3-20)
(3-20-a) n = 4
(3-20-b) n = 6
(3-20-c) n = 8
(3-20-d) n = 11
(3-20-e) n = 12
[Chemical 250]
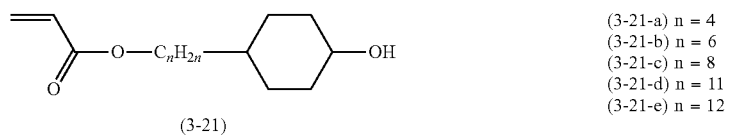
(3-21)
(3-21-a) n = 4
(3-21-b) n = 6
(3-21-c) n = 8
(3-21-d) n = 11
(3-21-e) n = 12
(3-22)
(3-22-a) n = 4
(3-22-b) n = 6
(3-22-c) n = 8
(3-22-d) n = 11
(3-22-e) n = 12
(3-23)
(3-23-a) n = 4
(3-23-b) n = 6
(3-23-c) n = 8
(3-23-d) n = 11
(3-23-e) n = 12
(3-24)
(3-24-a) n = 4
(3-24-b) n = 6
(3-24-c) n = 8
(3-24-d) n = 11
(3-24-e) n = 12
[Chemical 251]
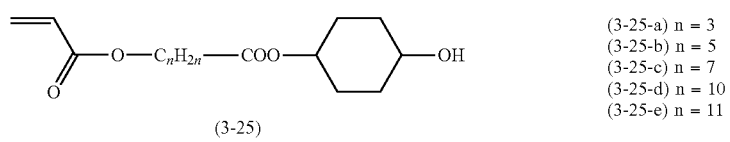
(3-25)
(3-25-a) n = 3
(3-25-b) n = 5
(3-25-c) n = 7
(3-25-d) n = 10
(3-25-e) n = 11
(3-26)
(3-26-a) n = 3
(3-26-b) n = 5
(3-26-c) n = 7
(3-26-d) n = 10
(3-26-e) n = 11
(3-27)
(3-27-a) n = 3
(3-27-b) n = 5
(3-27-c) n = 7
(3-27-d) n = 10
(3-27-e) n = 11
(3-28)
(3-28-a) n = 3
(3-28-b) n = 5
(3-28-c) n = 7
(3-28-d) n = 10
(3-28-e) n = 11

-continued
[Chemical 252]
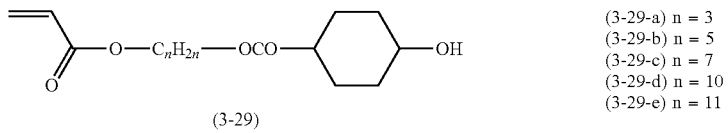
(3-29)
(3-29-a) n = 3
(3-29-b) n = 5
(3-29-c) n = 7
(3-29-d) n = 10
(3-29-e) n = 11
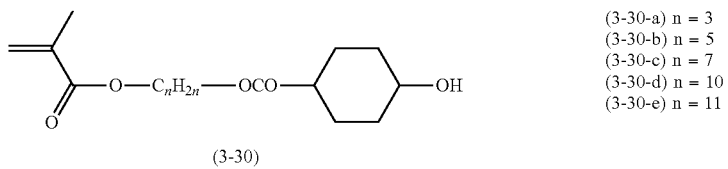
(3-30)
(3-30-a) n = 3
(3-30-b) n = 5
(3-30-c) n = 7
(3-30-d) n = 10
(3-30-e) n = 11
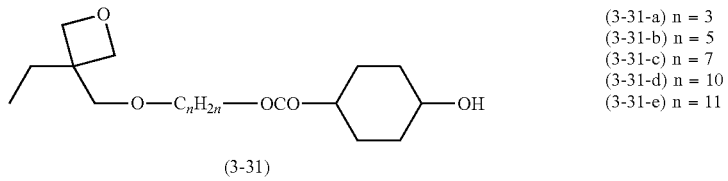
(3-31)
(3-31-a) n = 3
(3-31-b) n = 5
(3-31-c) n = 7
(3-31-d) n = 10
(3-31-e) n = 11
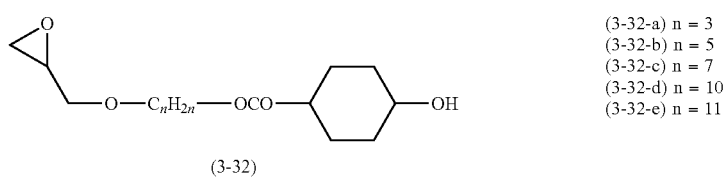
(3-32)
(3-32-a) n = 3
(3-32-b) n = 5
(3-32-c) n = 7
(3-32-d) n = 10
(3-32-e) n = 11
[Chemical 253]
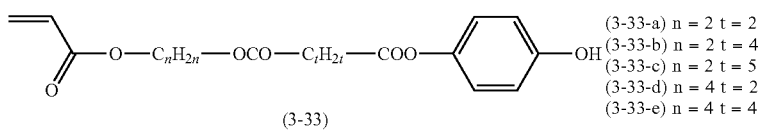
(3-33)
(3-33-a) n = 2 t = 2
(3-33-b) n = 2 t = 4
(3-33-c) n = 2 t = 5
(3-33-d) n = 4 t = 2
(3-33-e) n = 4 t = 4
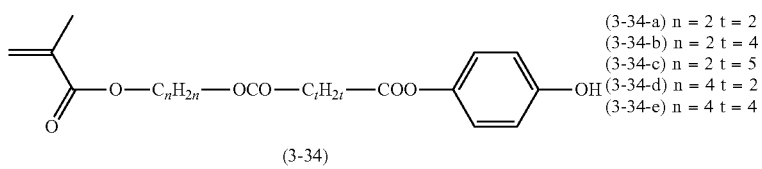
(3-34)
(3-34-a) n = 2 t = 2
(3-34-b) n = 2 t = 4
(3-34-c) n = 2 t = 5
(3-34-d) n = 4 t = 2
(3-34-e) n = 4 t = 4
[Chemical 254]
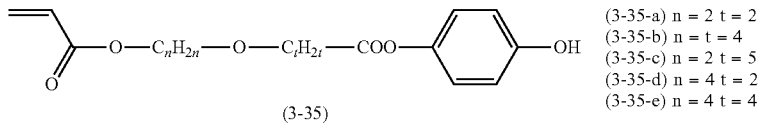
(3-35)
(3-35-a) n = 2 t = 2
(3-35-b) n = t = 4
(3-35-c) n = 2 t = 5
(3-35-d) n = 4 t = 2
(3-35-e) n = 4 t = 4
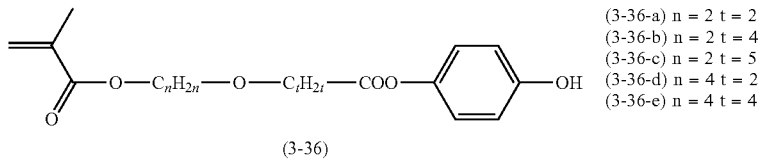
(3-36)
(3-36-a) n = 2 t = 2
(3-36-b) n = 2 t = 4
(3-36-c) n = 2 t = 5
(3-36-d) n = 4 t = 2
(3-36-e) n = 4 t = 4

Examples of the dicarboxylic acid compound (c2) include compounds represented by the formula (4-1).

[Chemical 255]

(4-1)

In the above formula, $A^3$ and $A^4$ each independently represent a divalent alicyclic hydrocarbon group or a divalent aromatic hydrocarbon group, provide that a hydrogen atom contained in the divalent alicyclic hydrocarbon group or divalent aromatic hydrocarbon group is optionally substituted with a halogen atom, alkyl group which has 1 to 4 carbon atoms and may be substituted with a halogen atom, alkoxy group which has 1 to 4 carbon atoms and may be substituted with a halogen atom, cyano group, or nitro group, —$CH_2$— contained in the alicyclic hydrocarbon group is optionally replaced with —O—, —S—, or —$N(R^{14})$—, and —CH(—)- contained in the alicyclic hydrocarbon group is optionally replaced with —N(—)-. $R^{14}$ represents a hydrogen atom or an alkyl group having 1 to 4 carbon atoms.

$B^3$ represents a single bond or a divalent connecting group.

q denotes an integer from 1 to 3. r denotes an integer from 1 to 3. s denotes 0 or 1. In this case, when q is 1, r is 2 or 3.

Examples of $A^3$ and $A^4$ include the same ones as those exemplified as $A^1$ and $A^2$ and examples of $B^3$ include the same ones as those exemplified as $B^1$ and $B^2$. q is preferably 1, r is preferably 2, and s is preferably 0.

The dicarboxylic acid compound (c2) is preferably a compound (4-2) represented by the formula (4-2) and more preferably a compound (4-3) represented by the formula (4-3).

[Chemical 256]

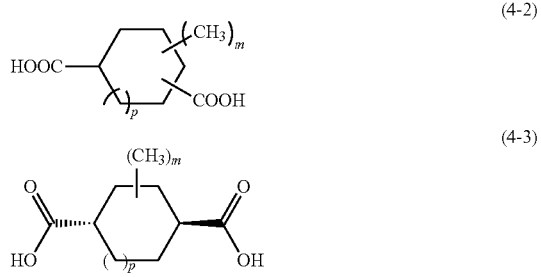

In the formula, m denotes an integer from 0 to 3. p denotes 0 or 1.

Examples of the dicarboxylic acid compound (c2) include 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 3-methyl-1,2-cyclopentanedicarboxylic acid, 2-methyl-1,3-cyclopentanedicarboxylic acid, 3,4-dimethyl-1,2-cyclohexanedicarboxylic acid, 2-methyl-1,4-cyclohexanedicarboxylic acid, 2,5-dimethyl-1,4-cyclohexanedicarboxylic acid, 2,6-dimethyl-1,4-cyclohexanedicarboxylic acid, 4,4'-biphenyldicarboxylic acid, 2,2'biphenyldicarboxylic acid, 1,3-adamantanedicarboxylic acid, anthraquinone-2,3-dicarboxylic acid, azobenzene-3,3'-dicarboxylic acid, azobenzene-4,4'-dicarboxylic acid, benzophenone-4,4'-dicarboxylic acid, 2,2'-biquinoline-4,4'-dicarboxylic acid, 2,2'-bipyridine-3,3'-dicarboxylic acid, 2,2'-bipyridine-4,4'-dicarboxylic acid, 2,2'-bipyridine-5,5'-dicarboxylic acid, 2,2'-bipyridine-6,6'-dicarboxylic acid, chelidamic acid, chelidonic acid, 1,1'-cyclobutanedicarboxylic acid, 1,1'-cyclopropanedicarboxylic acid, epoxysuccinic acid, 4-cyclohexene-1,2-dicarboxylic acid, diphenyl ether-4,4'-dicarboxylic acid, 2,5-thiophenedicarboxylic acid, 2,3-pyridinedicarboxylic acid, 2,6-pyridinedicarboxylic acid, 2,5-furandicarboxylic acid, 1,1'-ferrocenedicarboxylic acid, 1,2-benzenedicarboxylic acid, 1,3-benzenedicarboxylic acid, 1,4-benzenedicarboxylic acid, 1,4-naphthalenedicarboxylic acid, 2,3-naphthalenedicarboxylic acid, 2,6-naphthalenedicarboxylic acid, 2,2'-dithiodibenzoic acid, and 2,3-norbornanedicarboxylic acid, among which 1,4-cyclohexanedicarboxylic acid is preferable and trans-1,4-cyclohexanedicarboxylic acid is more preferable.

The liquid crystal composition of the present invention may contain a solvent. Because the precipitation of crystals of polymerizable liquid crystal compounds and particularly, the polymerizable liquid crystal compound (A) contained in the liquid crystal composition is reduced during storage when the liquid crystal composition of the present invention is dissolved in a solvent, the occurrence of defects of a retardation film produced using the liquid crystal composition can be reduced. The liquid crystal composition of the present invention is more reduced in the precipitation of crystals as compared with the case of excluding the polymerizable liquid crystal compound (B) even under the condition where, for example, cyclopentanone is used as the solvent. Further, even if the polymerizable liquid crystal compound (B) is present, the liquid crystal composition offers resistance to an adverse influence on the quality of a retardation film to be obtained and therefore, has high industrial workability, making possible to obtain a high-quality retardation film.

The solvent that the liquid crystal composition of the present invention may contain may be one that can dissolve the polymerizable liquid crystal compounds (A) and (B) and is inert to the polymerization reaction. Examples of the organic solvent include alcohol solvents such as methanol, ethanol, ethylene glycol, isopropyl alcohol, propylene glycol, methyl cellosolve, butyl cellosolve, or propylene glycol monomethyl ether; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; non-chlorinated aliphatic hydrocarbon solvents such as pentane, hexane, and heptane; non-chlorinated aromatic hydrocarbon solvents such as toluene, xylene, and phenol; nitrile solvents such as acetonitrile; ether solvents such as tetrahydrofuran and dimethoxyethane; chlorinated solvents such as chloroform and chlorobenzene; and amide solvents such as N-methylpyrrolidone (NMP) or N,N-dimethylformamide (DMF), among which, ester solvents, ketone solvents, non-chlorinated aromatic hydrocarbon solvents, ether solvents, and amide solvents are preferable, ketone solvents and amide solvents are more preferable, and amide solvents are even more preferable. These organic solvents may be used either independently or in combinations of two or more.

The content of an organic solvent in the liquid crystal composition of the present invention is preferably 100 to 10000 parts by mass, more preferably 200 to 5000 parts by mass, and more preferably 500 to 2500 parts by mass based on 100 parts by mass of the polymerizable liquid crystal compound (A).

The liquid crystal composition of the present invention is superior in preservation stability when dissolved in the above solvent. In the case where the solvent is, for example, an amide solvent (for example, N-methylpyrrolidone) or ketone solvent (for example, cyclopentanone), the precipitation of the polymerizable liquid crystal compound can be restrained for a long period of time (for example, 24 hr or more, and preferably 72 hr or more) even if the content of the solvent is 2500 parts by mass or less, for example 1500 parts by mass or less, and particularly 1000 parts by mass or less based on 100 parts by mass of the polymerizable liquid crystal compound (A).

The liquid crystal composition of the present invention may contain a polymerization initiator, polymerization inhibitor, photosensitizer, and/or leveling agent according to the need.

Polymerization Initiator

Examples of the polymerization initiator include photopolymerization initiators and thermal polymerization initiators. In the present invention, the polymerization initiator is preferably a photopolymerization initiator. Examples of the photopolymerization initiator include benzoins, benzophenones, benzylketals, α-hydroxyketones, α-aminoketones, iodonium salts, and sulfonium salts. Specifically, examples of the photopolymerization initiator may include Irgacure 907, Irgacure 184, Irgacure 651, Irgacure 819, Irgacure 250, and Irgacure 369 (the above products are all manufactured by Ciba Japan Ltd.), SEIKUOL BZ, SEIKUOL Z, and SEIKUOL BEE (the above products are all manufactured by Seiko Chemical Co., Ltd.), Kayacure BP100 (manufactured by Nippon Kayaku Co., Ltd.), Kayacure UVI-6992 (manufactured by Dow Corning Corp.), and Adeka Optomer SP-152 and Adeka Optomer SP-170 (the above products are all manufactured by ADEKA Corporation).

The content of the polymerization initiator is, for example, 0.1 to 30 parts by mass and preferably 0.5 to 10 parts by mass based on 100 parts by mass of the polymerizable liquid crystal compound (A). If the content is in the above range, the polymerizable liquid crystal compounds (A) and (B) can be polymerized without disturbing the orientation of the liquid crystal compound.

Polymerization Inhibitor

Examples of the polymerization inhibitor may include hydroquinone or hydroquinones having a substituent such as an alkyl ether; catechols having a substituent (for example, alkyl ethers) such as butylcatechol; pyrogallols; radical scavengers such as a 2,2,6,6-tetramethyl-1-piperidinyloxy radical; thiophenols; β-naphthylamines, and β-naphthols.

The polymerization of the polymerizable liquid crystal compounds (A) and (B) can be controlled by using the polymerization inhibitor and therefore, the stability of a retardation film to be obtained can be improved. Also, the amount of the polymerization inhibitor to be used is usually 0.05 to 30 parts by mass and preferably 0.1 to 10 parts by mass based on 100 parts by mass of the polymerizable liquid crystal compound (A). If the amount is in the above range, the polymerizable liquid crystal compounds (A) and (B) can be polymerized without disturbing the orientation of the liquid crystal compound.

Photosensitizer

Examples of the photosensitizer may include xanthones such as xanthone and thioxanthone, anthracene and anthracenes having a substituent such as alkyl ethers; phenothiazine; and rubrene.

The polymerization of the polymerizable liquid crystal compounds (A) and (B) can be highly sensitized by using the photosensitizer. The amount of the photosensitizer to be used is, for example, 0.05 to 30 parts by mass and preferably 0.1 to 10 parts by mass based on 100 parts by mass of the polymerizable liquid crystal compound (A). If the amount is in the above range, the polymerizable liquid crystal compounds (A) and (B) can be polymerized without disturbing the orientation of the liquid crystal compound.

Leveling Agent

Examples of the leveling agent may include radiation curable paint additives (manufactured by BYK Japan KK: BYK-352, BYK-353, and BYK-361N), paint additives (manufactured by Dow Corning Toray Co., Ltd.: SH28PA, DC11PA, and ST80PA), paint additives (manufactured by Shin-Etsu Chemical Co., Ltd.: KP321, KP323, X22-161A, and KF6001), and fluorine type additives (manufactured by DIC Corporation: F-445, F-470, and F-479).

A retardation film to be obtained can be smoothed by using a leveling agent. Also, the use of the retardation film ensures that, for example, the fluidity of the liquid crystal composition can be controlled in the course of producing a retardation film and also the crosslinking density of a retardation film to be obtained by polymerizing the polymerizable liquid crystal compounds (A) and (B) can be adjusted. Specifically, the amount of the leveling agent is, for example, 0.05 to 30 parts by mass and preferably 0.05 to 10 parts by mass based on 100 parts by mass of the polymerizable liquid crystal compound (A). If the amount is in the above range, the polymerizable liquid crystal compounds (A) and (B) can be polymerized without disturbing the orientation of the liquid crystal compound.

In a preferred embodiment of the present invention, a retardation film (hereinafter also referred to as "retardation film of the present invention") constituted from a polymer of the above liquid crystal composition kept in an oriented state is provided. The degree of wavelength dispersion Re (450 nm)/Re (550 nm) of retardation film of the present invention is preferably 0.8 or more and less than 1, more preferably 0.8 or more and less than 0.97, and even more preferably 0.8 or more and less than 0.95. When the degree of wavelength dispersion Re (450 nm)/Re (550 nm) of the retardation film of the present invention is the above lower limit or more, this allows circular polarization conversion in a short-wavelength region around 450 nm, which is preferable. When the degree of wavelength dispersion Re (450 nm)/Re (550 nm) of the retardation film of the present invention is less than the above upper limit, a retardation film to be obtained exhibits inverse wavelength dispersibility, which is preferable.

The retardation film of the present invention has excellent transparency and can be used in various optical displays. The thickness of the retardation film is preferably 0.1 to 10 μm and more preferably 0.5 to 3 μm in view of reducing photoelasticity.

The retardation value (Re (550 nm)) of a retardation film to be obtained at a wavelength of 550 nm is 113 to 163 nm, more preferably 130 to 150 nm, and particularly preferably about 135 nm to 150 nm when the retardation film of the present invention is used for a λ/4 plate. The exhibition of a retardation value falling in the above range is made possible by controlling the structure derived from the polymerizable liquid crystal compounds (A) and (B) and the film thickness of the retardation film.

The structure derived from the polymerizable liquid crystal compounds (A) and (B) and the film thickness of the retardation film are properly selected to use the retardation film of the present invention as a VA (Vertical Alignment) mode optical film. It is preferable to control the structure derived from the polymerizable liquid crystal compounds (A) and (B) and the film thickness of the retardation film in such a manner that Re (550 nm) becomes preferably about 40 to 100 nm and more preferably about 60 to 80 nm.

A polarizing plate (hereinafter also referred to as "polarizing plate of the present invention") and particularly, an elliptically polarizing plate and circularly polarizing plate are provided by combining the retardation film of the present invention with a polarizing film. In these elliptically polarizing plate and circularly polarizing plate, the retardation film of the present invention is applied to the polarizing film. Also, in the present invention, a broadband circularly polarizing plate can be provided, which is produced by further applying the retardation film of the present invention as a broadband λ/4 plate to the elliptically polarizing plate or circularly polarizing plate.

In one embodiment of the present invention, an optical display including the polarizing plate of the present invention, for example, a reflection type liquid crystal display and organic electroluminescence (EL) display may be used. Examples of the above FPD may include, though not particularly limited to, liquid crystal display devices (LCDs) and organic EL display devices.

The optical display in the present invention is provided with the polarizing plate of the present invention and examples of the optical display may include liquid crystal display devices each provided with a laminated product obtained by laminating the polarizing plate of the present invention and a liquid crystal panel on each other and organic EL display devices each provided with an organic EL panel obtained by laminating the polarizing plate of the present invention and a luminous layer on each other.

In this case, the retardation film in the present invention means a film used to convert linearly polarizing light into circularly polarizing light or elliptically polarizing light or to convert, on the contrary, circularly polarizing light or elliptically polarizing light into linearly polarizing light. The retardation film of the present invention contains a polymer of the liquid crystal composition of the present invention. Specifically, the retardation film of the present invention contains a polymer constituted from a structural unit derived from the polymerizable liquid crystal compound (A) and a structural unit derived from the polymerizable liquid crystal compound (B).

A method of producing the retardation film of the present invention will be explained below.

First, additives such as the aforementioned solvent, polymerization initiator, polymerization inhibitor, photosensitizer, and/or leveling agent are added, according to the need, in the liquid crystal composition containing the polymerizable liquid crystal compounds (A) and (B) to prepare a mixture solution (coating solution). It is preferable to contain a solvent because this makes film formation easy in particularly the formation of a film and it is also preferable to contain a polymerization initiator because the polymerization initiator works to cure the obtained retardation film.

The viscosity of the mixture solution containing the liquid crystal composition of the present invention is preferably adjusted to, for example, 10 Pa·s or less and preferably about 0.1 to 7 Pa·s so as to apply the solution easily.

The concentration of a solid content in the above mixture solution is, for example, 5 to 50% by mass, preferably 5 to 30% by mass, and more preferably 5% to 25%. In this case, the term "solid content" means a component excluding solvents from the mixture solution (liquid crystal composition). When the concentration of a solid content is the above lower limit or more, the retardation film does not become excessively thin and there is therefore tendency that birefringence required for the optical compensation of a liquid crystal panel is given. Also, when the concentration of a solid content is the above upper limit or less, this tends to be resistant to the occurrence of uneven film thickness of the retardation film because the viscosity of the mixture solution is low.

When, in succession, the mixture solution containing the liquid crystal composition of the present invention is applied to a support substrate and dried, an unpolymerized film is obtained. In the case where the unpolymerized film exhibits a liquid crystal phase such as a nematic phase, a retardation film to be obtained has birefringence based on monodomain orientation. Because the unpolymerized film is oriented at a temperature as low as about 0 to 120° C. and preferably 25 to 80° C., a support substrate that does not always have sufficient heat resistance may be used. Also, because the unpolymerized film is not crystallized even if it is further cooled to about 30 to 10° C. after oriented, it is handled easily.

In this case, if the coating amount and concentration of the mixture solution are properly controlled, the film thickness can be controlled so as to give a desired retardation value. In the case of a mixture solution in which the amounts of the polymerizable liquid crystal compounds (A) and (B) are fixed to be constant, the retardation value (Re (λ)) of the retardation film to be obtained is determined according to the formula (I) and therefore, the film thickness d may be controlled to obtain a desired Re (λ).

$$Re(\lambda) = d \times \Delta n(\lambda) \qquad (I)$$

wherein Re (λ) represents a retardation value at a wavelength of λ nm, d represents a film thickness, and Δn (λ) represents a birefringence at a wavelength of λ nm.

Examples of a method for applying the mixture solution to a support substrate include a extrusion coating method, direct gravure coating method, reverse gravure coating method, CAP coating method, and a die coating method. Also, applying methods using a coater such as a dip coater, bar coater, or spin coater are given.

Examples of the support substrate may include may include glass, a plastic sheet, plastic film, and translucent film. Examples of the translucent film include films of polyolefin such as polyethylene, polypropylene, or norbornane type polymers, polyvinyl alcohol films, polyethylene terephthalate films, polymethacrylate films, polyacrylate films, cellulose ester films, polyethylene naphthalate films, polycarbonate films, polysulfone films, polyether sulfone films, polyether ketone films, polyphenylene sulfide films, and polyphenylene oxide films.

The retardation film of the present invention can be easily handled without any breakage by using the support substrate even in steps such as a lamination step, conveying step, and storing step in which the strength of the retardation film is required.

Also, it is preferable to form an orientation film on the support substrate to coat the surface of the orientation film with the mixture solution containing the liquid crystal composition of the present invention. The orientation film is preferably made from a polymer or a composition containing a polymer because it is desirable that the film have solvent tolerance that is resistance to the dissolution of the film in the mixture solution when applying the mixture solution containing the liquid crystal composition of the present invention and the like, the film have heat resistance when removing a solvent and performing heat treatment for orientation, and the film be free from peeling caused by friction or the like during rubbing.

Examples of the above polymer include polymers such as polyamide and gelatins having an amide bond in its molecule, polyimide having an imide bond in its molecule and polyamic acid which is a hydrolysate of the polyimide, polyvinyl alcohol, alkyl-modified polyvinyl alcohol, polyacrylamide, polyoxazole, polyethyleneimine, polystyrene, polyvinylpyrrolidone, polyacrylic acid, and polyacrylates. These polymers may be used either independently, as mixtures of two or more, or as copolymers of two or more. These polymers can be easily obtained by polycondensation based on dehydration or deamination, chain polymerization such as radical polymerization, anionic polymerization, and cationic polymerization, coordination polymerization, ring-opening polymerization.

These polymers may be dissolved in a solvent prior to coating. Examples of the solvent include, though not particularly limited to, water; alcohols such as methanol, ethanol, ethylene glycol, isopropyl alcohol, propylene glycol, methyl cellosolve, butyl cellosolve, and propylene glycol monomethyl ether, ester type solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; non-chlorinated type aliphatic hydrocarbon solvents such as pentane, hexane, and heptane; non-chlorinated aromatic hydrocarbon solvents such as toluene and xylene; nitrile solvents such as acetonitrile; ether solvents such as tetrahydrofuran and dimethoxyethane; and chlorinated solvents such as chloroform and chlorobenzene. These solvents may be used either independently or in combinations of two or more.

A commercially available orientation film material may be used as it is to form the orientation film. Examples of the commercially available orientation film material include SUNEVER (trademark, produced by Nissan Chemical Industries, Ltd.) and OPTMER (trademark, produced by JSR Corporation).

If such an orientation film is used, it is unnecessary to control refractive index by means of extension and therefore, in-plane scatter of birefringence is reduced. Therefore, the use of the orientation film produces the effect of providing a large retardation film capable of coping with increase in size of a flat panel display device (FPD) on the support substrate.

With regard to a method for forming an orientation film on the above support substrate, a solution prepared from a commercially available orientation film material and a compound that is a material of the orientation film is applied, followed by annealing, whereby an orientation film can be formed on the support substrate.

The thickness of the orientation film to be obtained in this manner is, for example, 10 nm to 10000 nm and preferably 10 nm to 1000 nm. If the thickness is in the above range, the polymerizable liquid crystal compounds (A) and (B) and the like can be oriented at a desired angle on the orientation film.

Also, these orientation films may be rubbed or irradiated with polarized UV rays according to the need. The polymerizable liquid crystal compounds (A) and (B) and the like can be oriented in a desired direction by forming the orientation film.

For example, a method in which a rotated rubbing roll with a rubbing cloth wound thereon is brought into contact with the orientation film mounted on a stage and carried may be used as a method for rubbing the orientation film.

As mentioned above, an unpolymerized film (liquid crystal layer) may be laminated on the orientation film laminated on a proper support substrate in a step of preparing the unpolymerized film. This method is more reduced in production cost than a method in which a liquid crystal cell is produced and a liquid crystal composition is injected into the liquid crystal cell. Moreover, this method enables the production of a film as a roll film.

Though a solvent may be dried while undergoing polymerization, it is preferable to dry almost of the solvent before the polymerization from the viewpoint of film formation. Examples of a method for removing a solvent by drying include methods such as natural drying, air drying, and vacuum drying. Specifically, the heating temperature is preferably 10 to 120° C. and more preferably 25 to 80° C. Also, the heating time is preferably 10 sec to 60 min and more preferably 30 sec to 30 min. As the above support substrate, a support substrate which has unnecessarily sufficient heat resistance can be used if the heating temperature and heating time are each in the above range.

Next, the unpolymerized film obtained above is polymerized to cure. Thus, a film in which the orientation of the polymerizable liquid crystal compounds (A) and (B) is fixed, that is, a film (hereinafter also referred to as "polymerized film") containing a polymer of the liquid crystal composition of the present invention is produced. This enables production of a polymerized film which is reduced in variation of refractive index in the plane direction of the film and increased in variation of refractive index in the normal direction of the film.

A method of polymerizing the unpolymerized film is determined depending on the kinds of polymerizable liquid crystal compounds (A) and (B). The unpolymerized film can be polymerized by photopolymerization if a polymerizable group contained in the polymerizable liquid crystal compounds (A) and (B) is a photopolymerizable group or by thermopolymerization if the polymerizable group is a thermally polymerizable group. In the present invention, it is preferable to polymerize the unpolymerized film by, particularly, photopolymerization. Because the unpolymerized film can be polymerized at a low temperature by photopolymerization, the range of selection of heat resistance of the support substrate is broadened. Also, the production is made industrially easy. Also, the photopolymerization is preferable from the viewpoint of film formation. The photopolymerization is performed by irradiating the unpolymerized film with visible light, ultra violet light, or laser light. The light irradiation in which irradiation with ultraviolet light particularly preferable from the viewpoint of handleability may be performed with heating at a temperature at which the polymerizable liquid crystal compounds (A) and (B) take a liquid crystal phase. At this time, the polymerized film may be patterned by masking.

Moreover, the retardation film of the present invention is thinner than a stretched film providing retardation by stretching a polymer.

The method of producing a retardation film of the present invention may further include a step of peeling the support substrate. If such a structure is adopted, a laminate to be obtained is a film including an orientation film and a retardation film. The production method of the present invention may further includes a step of peeling the orientation film in addition to the step of peeling the support substrate. A retardation film can be obtained by adopting such a structure.

EXAMPLES

The present invention will be explained in more detail by way of examples. In the examples, "%" and "parts" are "% by mass" and "parts by mass", unless otherwise noted.

The condition of analysis in gel permeation chromatography (GPC) are shown below. In this case, the molecular weight was converted in terms of polystyrene.

<Condition of GPC Analysis>

Measuring instrument: HLC-8220 (TOSOH CORPORATION)
Column: TSK gel SuperMultipore HZ-N (3 columns)
Column temperature: 40° C.
Inlet oven: 40° C.
Mobile phase: tetrahydrofuran
Analysis time: 20 min
Sample pump flow rate: 0.35 mL/min
Reference pump flow rate: 0.35 mL/min
Injection rate: 10 μm
Detection: ultraviolet absorption (wavelength: 254 nm)

The area percentage of the polymerizable liquid crystal compound (B) was calculated according to the following formula based on the results of GPC measured as mentioned above.

[Numeral 1]

$$\text{Area percentage of Polymerizable liquid crystal compound}(B) = \frac{\text{Area of Polymerizable liquid crystal compound}(B)}{\text{Area of Polymerizable liquid crystal compound}(A) + \text{Area of Polymerizable liquid crystal compound}(B)} \times 100$$

Example 1

A mixture of a polymerizable liquid crystal compound (A-1) represented by the formula (A-1) and a polymerizable liquid crystal compound (B-1) represented by the formula (B-1) was produced in the following manner.

[Chemical 257]

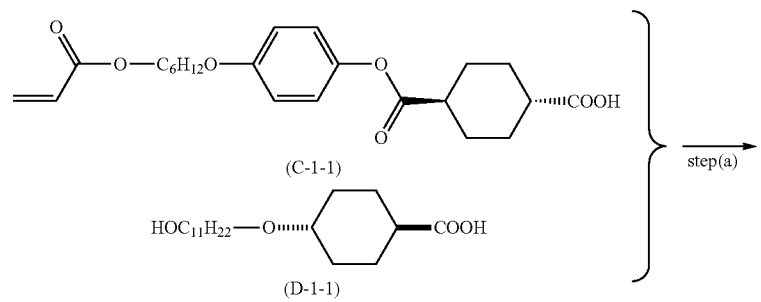

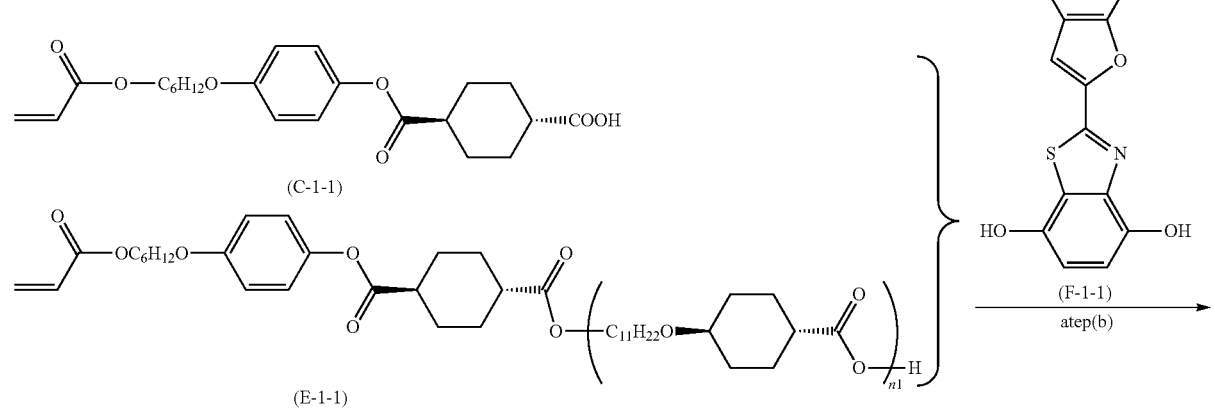

-continued

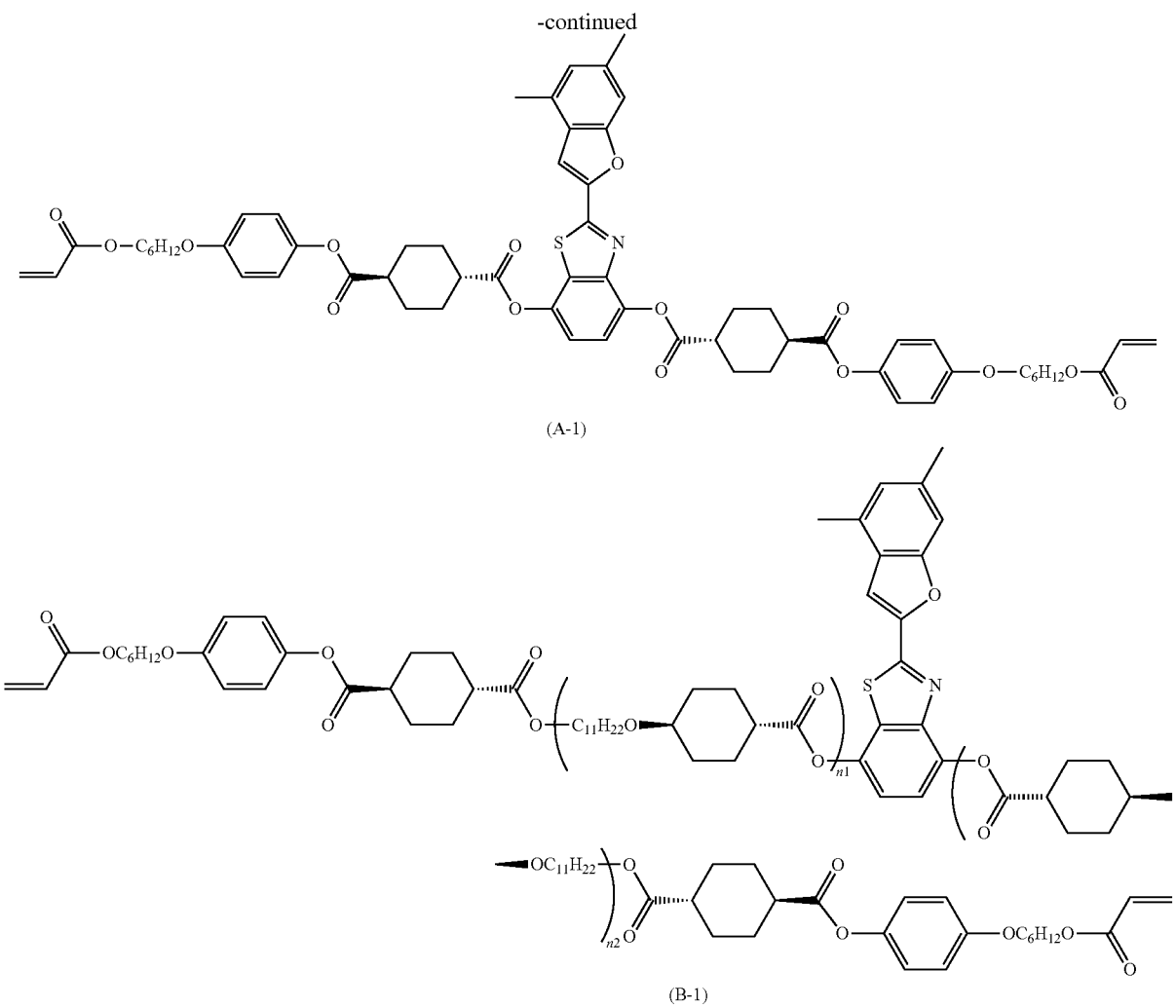

(A-1)

(B-1)

<Step (a)>

In a 100 mL-four-neck flask equipped with a Dimroth cooling tube and a temperature gage, in which the inside atmosphere was replaced with a nitrogen atmosphere, 11.3 g of a compound (C-1-1) synthesized with reference to Patent Document (JP-A-2010-31223), 0.09 g of a compound (D-1-1) synthesized with reference to a treatise (Lub et al. Recl. Trav. Chim. Pays-Bas, 115, 321-328 (1996)), 0.16 g of N,N-dimethylaminopyridine (hereinafter abbreviated as DMAP, manufactured by Wako Pure Chemical Industries, Ltd.), 0.20 g of 3,5-dibutyl-4-hydroxytoluene (hereinafter abbreviated as BHT, manufactured by Wako Pure Chemical Industries, Ltd.), and 58 g of chloroform (manufactured by Kanto Chemical Co., Inc.) were mixed and 4.05 g of diisopropylcarbodiimide (hereinafter abbreviated as IPC, manufactured by Wako Pure Chemical Industries, Ltd.) was added to the mixture by a dropping funnel to undergo reaction at 0° C. for 30 min.

<Step (b)>

The mixture obtained in the step (a) was reacted with 4.00 g of a compound (F-1-1) synthesized with reference to Patent Document (JP-A-2011-207765) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 11.1 g of a liquid crystal composition (1) which was a mixture of the compounds (A-1) and (B-1). The yield of the compound (A-1) was 75% based on the compound (F-1-1). In this case, the maximum absorption wavelength was measured using a ultra-violet and visible spectrophotometer (UV3150, manufactured by Shimadzu Corporation), to find that the maximum absorption wavelength of the compound (A-1) was 352 nm, the maximum absorption wavelength of the compound (B-1) was 352 nm, and the maximum absorption wavelength of the liquid crystal composition (1) was 352 nm. In this case, the sum of n1 and n2 in the formula (B-1) was 1 and specifically, n1=1 and n2=0 or n1=0 and n2=1 from the production steps.

With regard to the obtained liquid crystal composition (1), the weight average molecular weight and area percentage of the compound (B-1) were measured using GPC (based on polystyrene). The results are shown in Table 3.

Also, the obtained liquid crystal composition (1) was used to evaluate the preservation stability when dissolved in a solvent as mentioned below. The results are shown in Table 3.

<Evaluation of Preservation Stability>

A vial tube was charged with the liquid crystal composition (1), a polymerization initiator, a leveling agent, a polymerization inhibitor, and a solvent and the mixture was stirred at 80° C. for 30 min by using a carousel. The obtained solution was stored at 25° C. to visually confirm whether or not crystals precipitated. The results are shown in Table 3.

Each charge amount of the polymerization initiator, leveling agent, and polymerization inhibitor based on 100 parts by mass of the polymerizable liquid crystal compound (A) is shown in Table 2. Also, the charge amount of the solvent was so designed that the ratio of the polymerizable liquid crystal compound (A) was 13% by mass based on the total amount of the solvent.

TABLE 2

|  | Polymerization initiator (parts by mass) | Leveling agent (parts by mass) | Polymerization inhibitor (parts by mass) |
|---|---|---|---|
| Example 1 | 6.0 | 0.1 | 0.2 |

Polymerization initiator: 2-benzyl-2-dimethylamino-1-(4-morpholinophenyl)butan-1-one (Irgacure 369; manufactured by BASF Japan Ltd.)

Leveling agent: polyacrylate compound (BYK-361N; manufactured by BYK Japan KK)

Polymerization inhibitor: BHT (manufactured by Wako Pure Chemical Industries, Ltd.)

Solvent: N-methylpyrrolidone (NMP, manufactured by Kanto Chemical Co., Inc.)

The standard of evaluation is as follows.
1: Precipitation is observed immediately after warming
2: No precipitation is observed 24 hr after warming
3: No precipitation is observed 48 hr after warming
4: No precipitation is observed 72 hr after warming Examples 2 to 6

Liquid crystal compositions (2) to (6) were obtained in the same manner as in Example 1 except that the charge amount of the compound (D-1-1) was altered to that shown in Table 2. Each of the obtained liquid crystal compositions (2) to (6) was used to evaluate preservation stability and the weight average molecular weight and area percentage of the compound (B-1) were measured in the same manner as in Example 1. The results are shown in Table 3. Also, the maximum absorption wavelengths of the liquid crystal compositions (2) to (6) are shown in Table 2.

TABLE 3

|  | Charge amount of Compound (D-1-1) (g) | Maximum absorption wavelength of Liquid crystal composition ($\lambda_{max}$) |
|---|---|---|
| Example 2 | 0.42 | 352 nm |
| Example 3 | 0.85 | 352 nm |
| Example 4 | 1.70 | 352 nm |
| Example 5 | 3.39 | 352 nm |
| Example 6 | 3.82 | 352 nm |

Example 7

A mixture of a polymerizable liquid crystal compound (A-1) represented by the formula (A-1) and a polymerizable liquid crystal compound (B-2) represented by the formula (B-2) was synthesized in the following manner.

[Chemical 258]

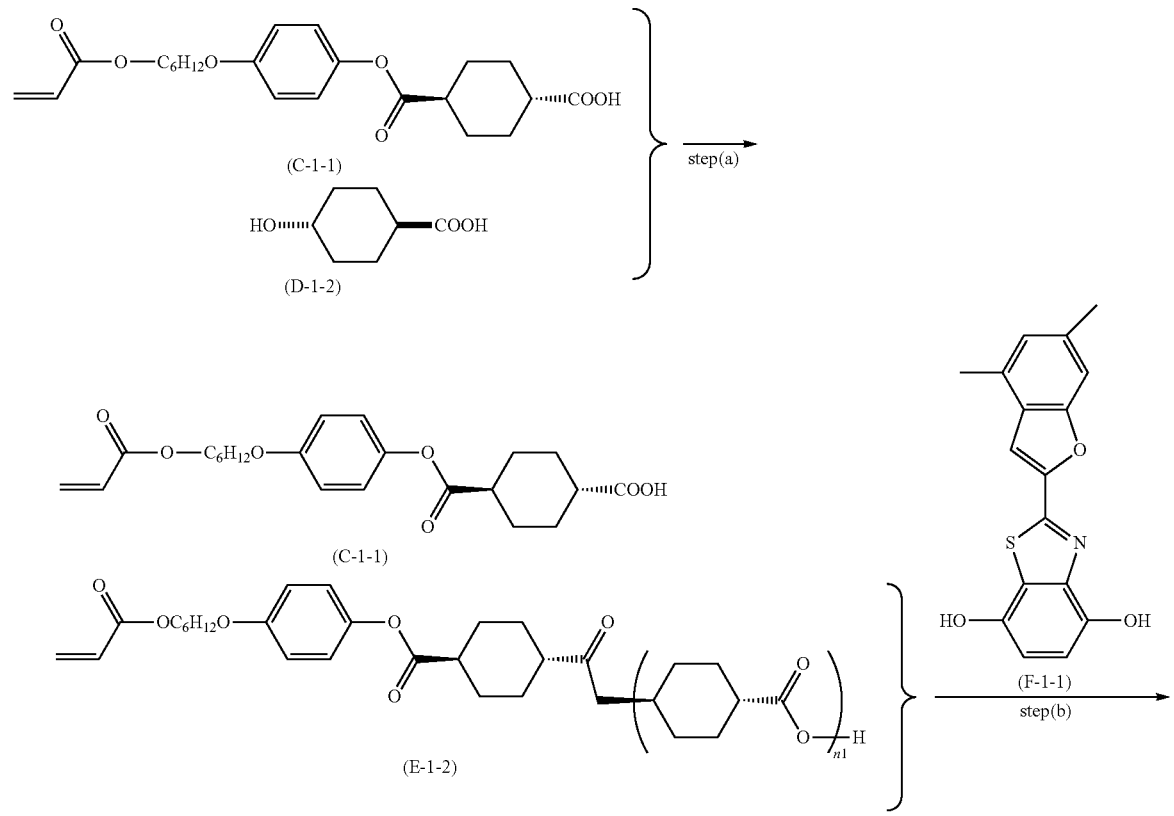

-continued

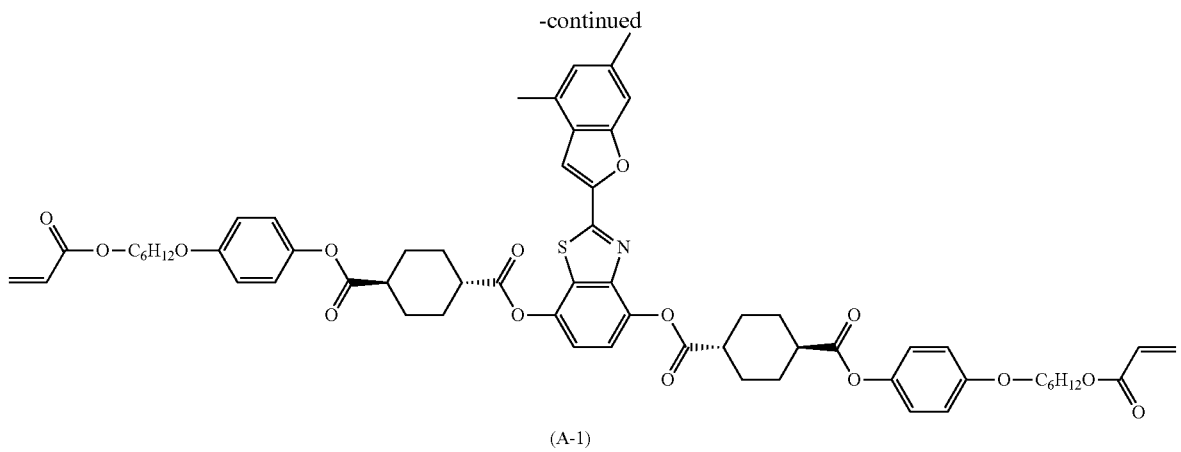

(A-1)

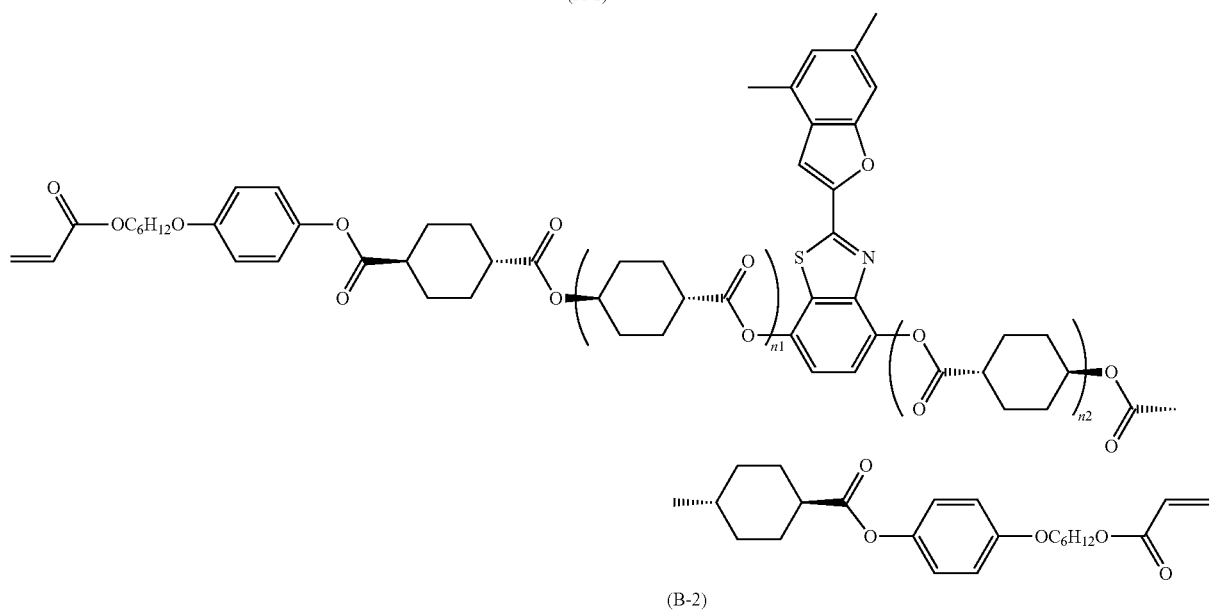

(B-2)

<Step (a)>

In a 100 mL-four-neck flask equipped with a Dimroth cooling tube and a temperature gage, in which the inside atmosphere was replaced with a nitrogen atmosphere, 11.3 g of a compound (C-1-1) synthesized with reference to Patent Document (JP-A-2010-31223), 0.39 g of a compound (D-1-2) (manufactured by Tokyo Chemical Industry Co., Ltd.), 0.16 g of DMAP (manufactured by Wako Pure Chemical Industries, Ltd.), and 0.20 g of BHT (manufactured by Wako Pure Chemical Industries, Ltd.), and 58 g of chloroform (manufactured by Kanto Chemical Co., Inc.) were mixed and 4.05 g of IPC (manufactured by Wako Pure Chemical Industries, Ltd.) was added to the mixture by a dropping funnel to undergo reaction at 0° C. for 30 min.
<Step (b)>

The mixture obtained in the step (a) was reacted with 4.00 g of a compound (F-1-1) synthesized with reference to Patent Document (JP-A-2011-207765) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 13.1 g of a liquid crystal composition (7) which was a mixture of the compounds (A-1) and (B-2). The yield of the compound (A-1) was 74% based on the compound (F-1-1). Also, the maximum absorption wavelength of the compound (A-1) was 352 nm, the maximum absorption wavelength of the compound (B-2) was 352 nm, and the maximum absorption wavelength of the liquid crystal composition (7) was 352 nm. In this case, the sum of n1 and n2 in the formula (B-2) was 1 and specifically, n1=1 and n2=0 or n1=0 and n2=1 from the production steps.

The obtained liquid crystal composition (7) was used to evaluate the preservation stability and also, the weight average molecular weight and area percentage of the compound (B-2) were measured in the same manner as in Example 1. The results are shown in Table 3.

Example 8

A mixture of a polymerizable liquid crystal compound (A-2) represented by the formula (A-2) and a polymerizable liquid crystal compound (B-3) represented by the formula (B-3) was synthesized in the following manner.

[Chemical 259]
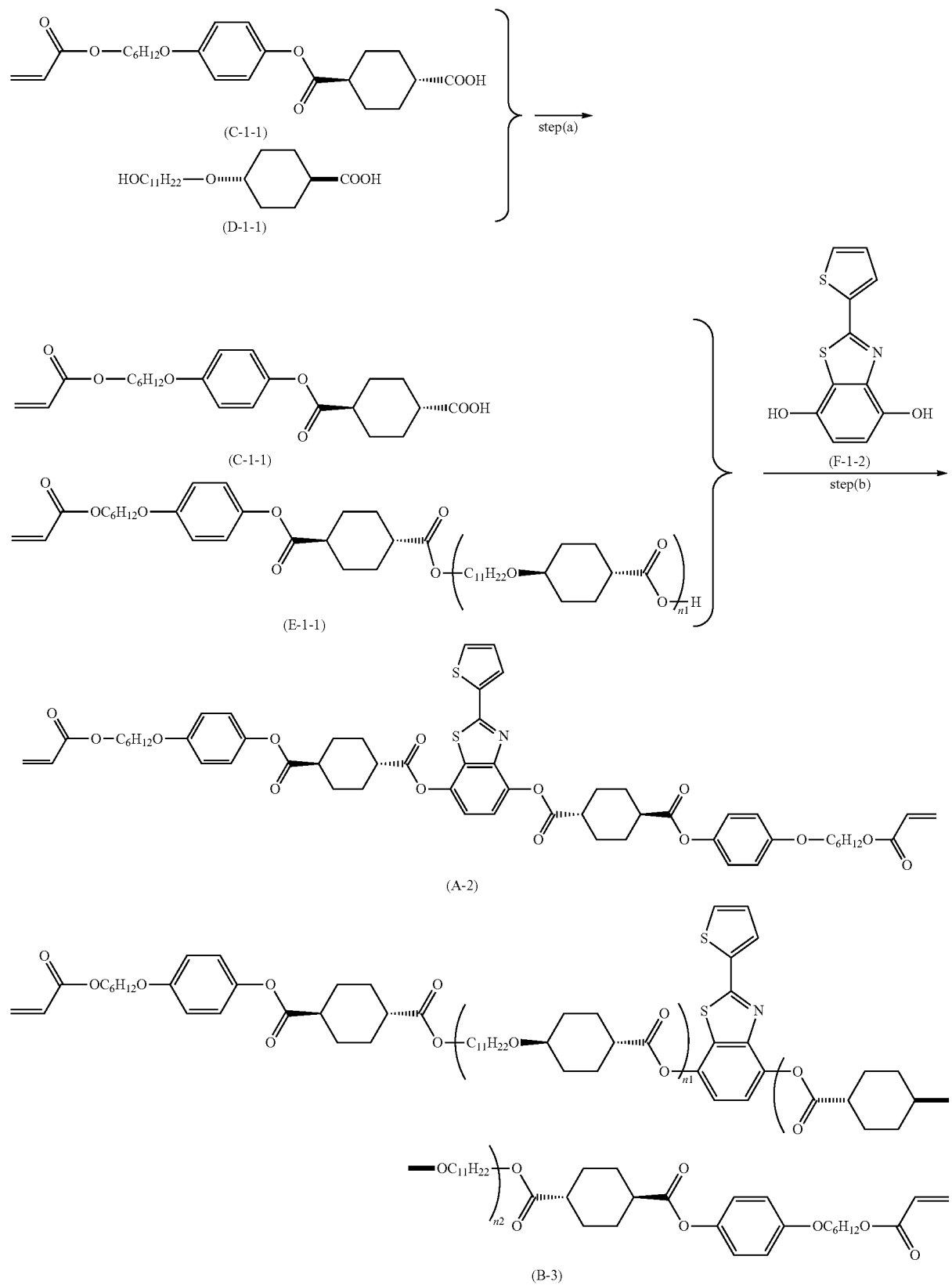

<Step (a)>

In a 100 mL-four-neck flask equipped with a Dimroth cooling tube and a temperature gage, in which the inside atmosphere was replaced with a nitrogen atmosphere, 14.1 g of a compound (C-1-1) synthesized with reference to Patent Document (JP-A-2010-31223), 0.53 g of a compound (D-1-1) synthesized with reference to a treatise (Lub et al. Recl. Trav. Chim. Pays-Bas, 115, 321-328 (1996)), 0.20 g of DMAP (manufactured by Wako Pure Chemical Industries, Ltd.), 0.25 g of BHT (manufactured by Wako Pure Chemical Industries, Ltd.), and 70 g of chloroform (manufactured by Kanto Chemical Co., Inc.) were mixed and 5.06 g of IPC (manufactured by Wako Pure Chemical Industries, Ltd.) was added to the mixture by a dropping funnel to undergo reaction at 0° C. for 30 min.

<Step (b)>

The mixture obtained in the step (a) was reacted with 4.00 g of a compound (F-1-2) synthesized with reference to Patent Document (JP-A-2010-31223) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 12.5 g of a liquid crystal composition (8) which was a mixture of the compounds (A-2) and (B-3). The yield of the compound (A-2) was 65% based on the compound (F-1-2). Also, the maximum absorption wavelength of the compound (A-2) was 326 nm, the maximum absorption wavelength of the compound (B-3) was 326 nm, and the maximum absorption wavelength of the liquid crystal composition (8) was 326 nm. In this case, the sum of n1 and n2 in the formula (B-3) was 1 and specifically, n1=1 and n2=0 or n1=0 and n2=1 from the production steps.

The obtained liquid crystal composition (8) was used to evaluate the preservation stability and also, the weight average molecular weight and area percentage of the compound (B-3) were measured in the same manner as in Example 1. The results are shown in Table 3.

Example 9

A mixture of a polymerizable liquid crystal compound (A-3) represented by the formula (A-3) and a polymerizable liquid crystal compound (B-4) represented by the formula (B-4) was synthesized in the following manner.

[Chemical 260]

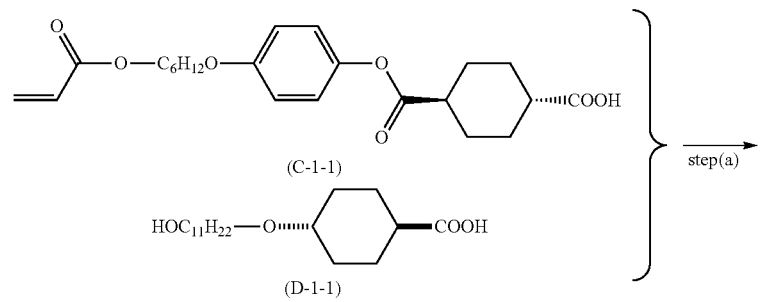

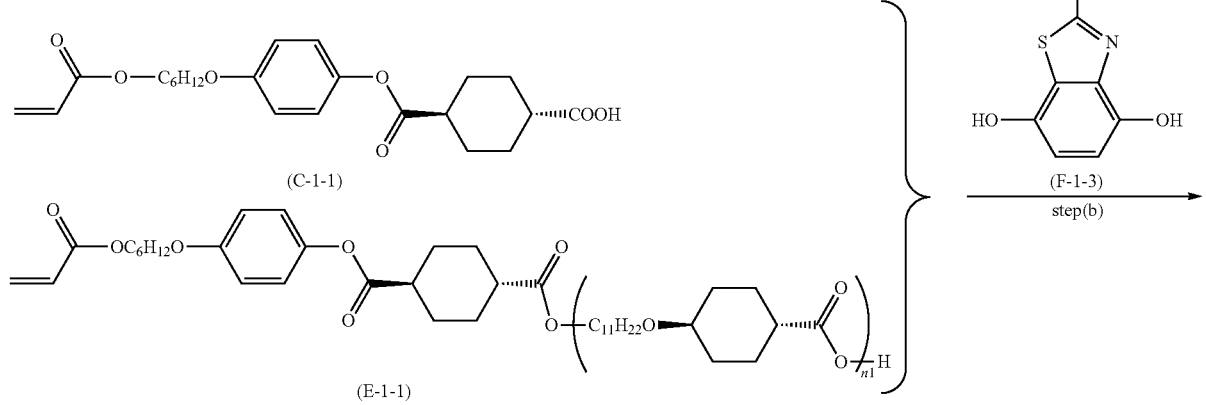

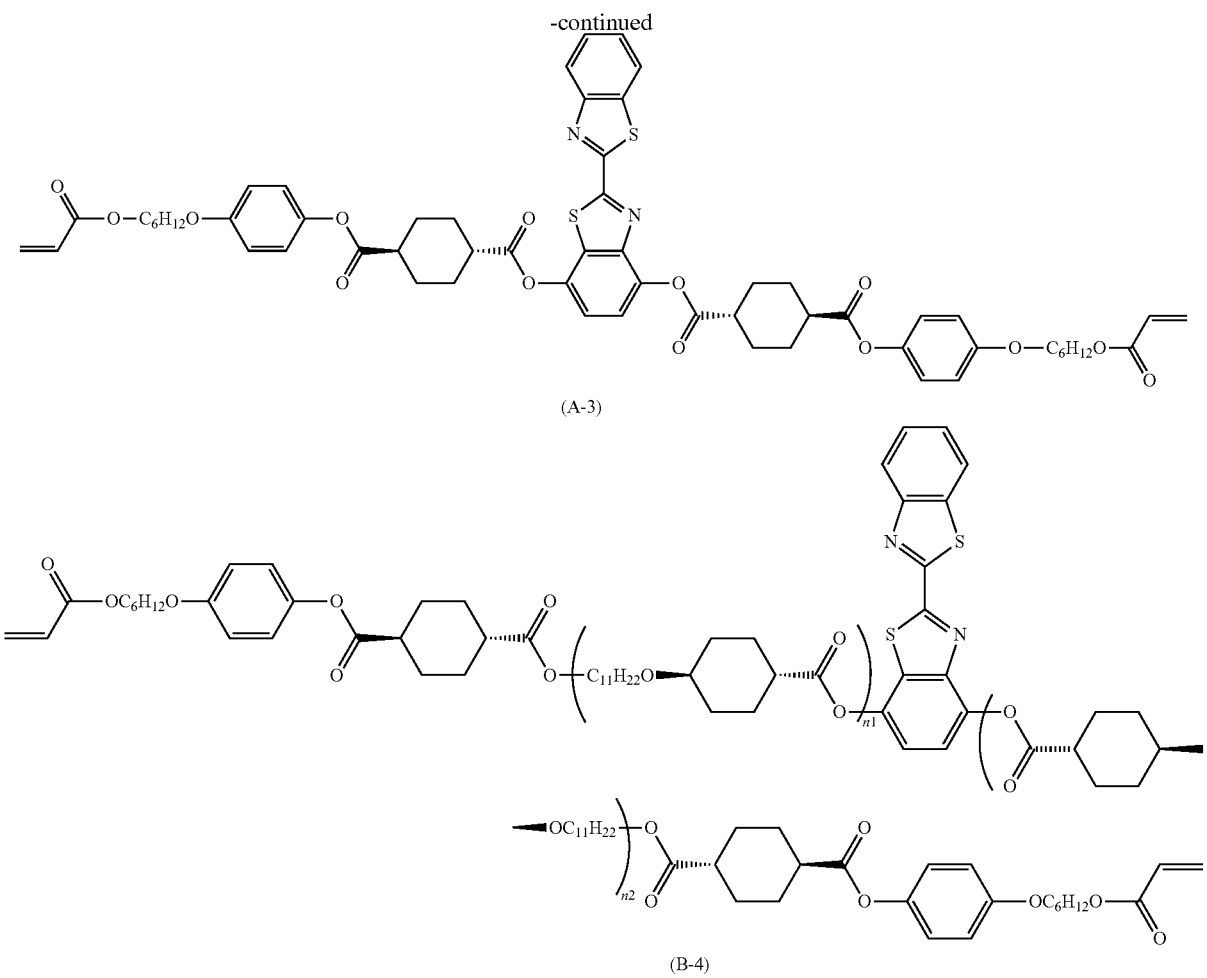

(A-3)

(B-4)

<Step (a)>

In a 100 mL-four-neck flask equipped with a Dimroth cooling tube and a temperature gage, in which the inside atmosphere was replaced with a nitrogen atmosphere, 11.7 g of a compound (C-1-1) synthesized with reference to Patent Document (JP-A-2010-31223), 0.44 g of a compound (D-1-1) synthesized with reference to a treatise (Lub et al. Recl. Trav. Chim. Pays-Bas, 115, 321-328 (1996)), 0.16 g of DMAP (manufactured by Wako Pure Chemical Industries, Ltd.), 0.21 g of BHT (manufactured by Wako Pure Chemical Industries, Ltd.), and 58 g of chloroform (manufactured by Kanto Chemical Co., Inc.) were mixed and 4.20 g of IPC (manufactured by Wako Pure Chemical Industries, Ltd.) was added to the mixture by a dropping funnel to undergo reaction at 0° C. for 30 min.

<Step (b)>

The mixture obtained in the step (a) was reacted with 4.00 g of a compound (F-1-3) synthesized with reference to Patent Document (JP-A-2011-207765) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 11.9 g of a liquid crystal composition (9) which was a mixture of the compounds (A-3) and (B-4). The yield of the compound (A-3) was 71% based on the compound (F-1-3). Also, the maximum absorption wavelength of the compound (A-3) was 342 nm, the maximum absorption wavelength of the compound (B-4) was 342 nm, and the maximum absorption wavelength of the liquid crystal composition (9) was 342 nm. In this case, the sum of n1 and n2 in the formula (B-4) was 1 and specifically, n1=1 and n2=0 or n1=0 and n2=1 from the production steps.

The obtained liquid crystal composition (9) was used to evaluate the preservation stability and also, the weight average molecular weight and area percentage of the compound (B-4) were measured in the same manner as in Example 1. The results are shown in Table 3.

Example 10

The preservation stability of the liquid crystal composition (1) was evaluated in the same manner as in Example 1 except that cyclopentanone (manufactured by Kanto Chemical Co., Inc.) was used in place of NMP as the solvent. The results are shown in Table 3.

Comparative Example 1

A polymerizable liquid crystal compound (A-1) represented by the formula (A-1) was synthesized with reference to Patent Document (JP-A-2011-207765).

[Chemical 261]

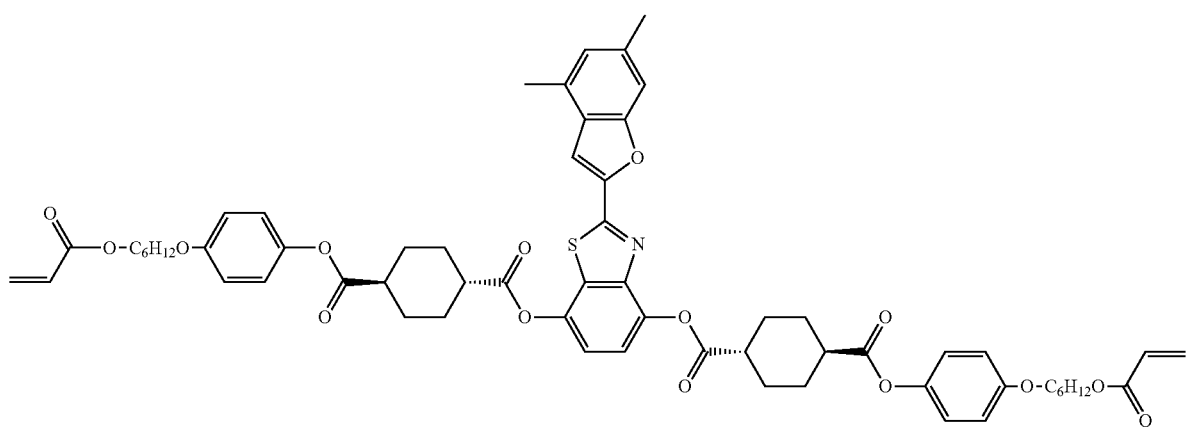

(A-1)

The preservation stability was evaluated using the obtained polymerizable liquid crystal compound (A-1) in the same manner as in Example 1. The results are shown in Table 4.

Comparative Example 2

A mixture of a polymerizable liquid crystal compound (A-1) represented by the formula (A-1) and a polymerizable liquid crystal compound (B-5) represented by the formula (B-5) was synthesized in the following manner.

[Chemical 262]

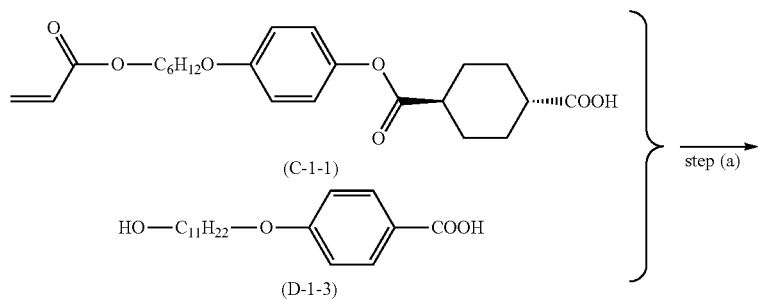

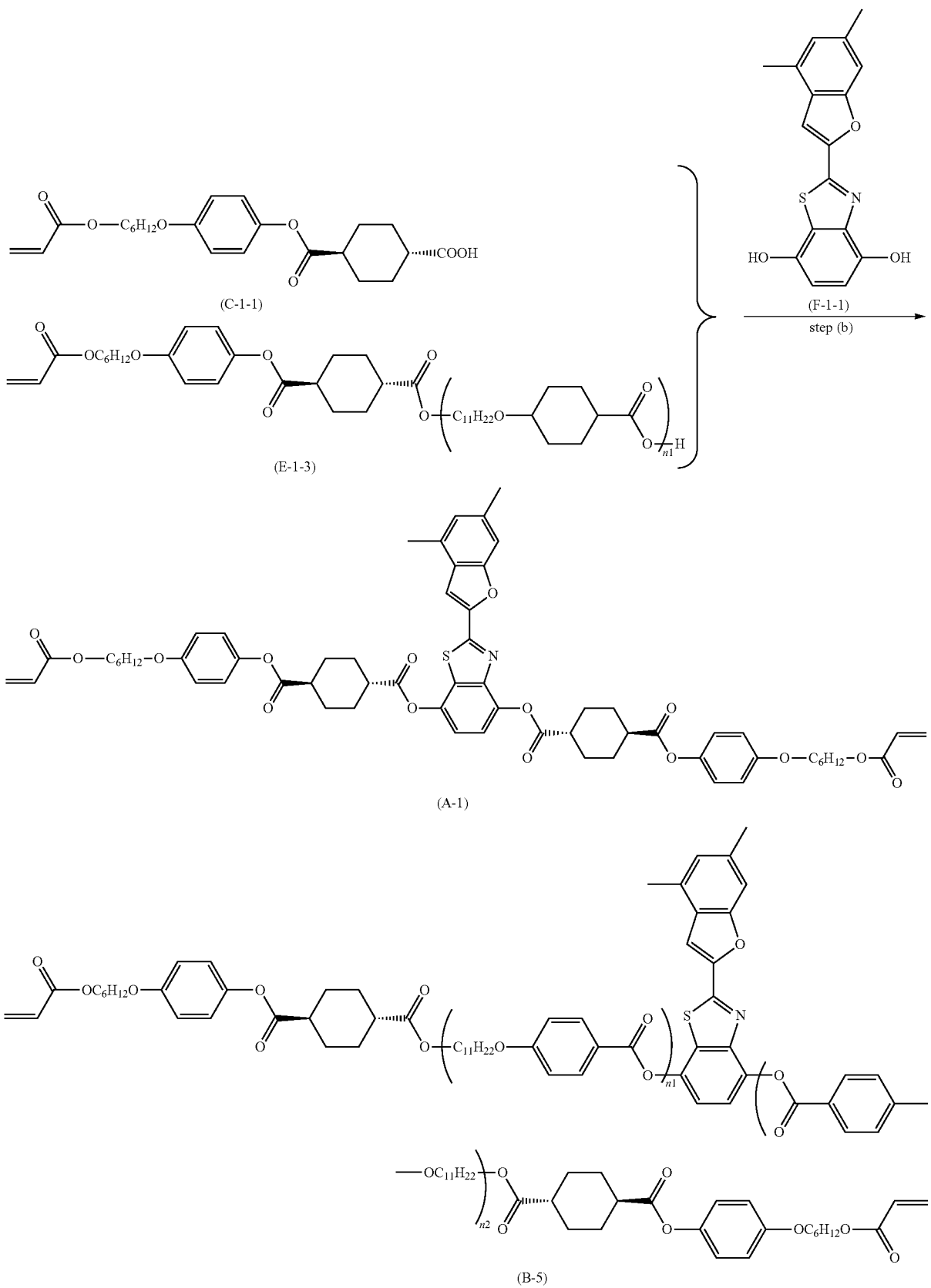

303

<Step (a)>

In a 20 mL-four-neck flask equipped with a Dimroth cooling tube and a temperature gage, in which the inside atmosphere was replaced with a nitrogen atmosphere, 11.3 g of a compound (C-1-1) synthesized with reference to Patent Document (JP-A-2010-31223), 0.83 g of a compound (D-1-3) synthesized with reference to Patent Document (JP-A-2015-000896), 0.16 g of DMAP (manufactured by Wako Pure Chemical Industries, Ltd.), 0.20 g of BHT (manufactured by Wako Pure Chemical Industries, Ltd.), and 58 g of chloroform (manufactured by Kanto Chemical Co., Inc.) were mixed and 4.05 g of IPC (manufactured by Wako Pure Chemical Industries, Ltd.) was added to the mixture by a dropping funnel to undergo reaction at 0° C. for 30 min.

<Step (b)>

The mixture obtained in the step (a) was reacted with 4.00 g of a compound (F-1-1) synthesized with reference to Patent Document (JP-A-2011-207765) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform

304 to be contained. In succession, the mixture was subjected to filtration to collect the precipitated solid, which was then washed three times with 20 g of acetonitrile and dried at 30° C. under reduced pressure to obtain 12.6 g of a liquid crystal composition (10) which was a mixture of the compounds (A-1) and (B-5). The yield of the compound (A-1) was 76% based on the compound (F-1-1). Also, the maximum absorption wavelength of the compound (A-1) was 352 nm, the maximum absorption wavelength of the compound (B-5) was 352 nm, and the maximum absorption wavelength of the liquid crystal composition (10) was 352 nm. In this case, the sum of n1 and n2 in the formula (B-5) was 1 and specifically, n1=1 and n2=0 or n1=0 and n2=1 from the production steps.

The obtained liquid crystal composition (10) was used to evaluate the preservation stability and also, the weight average molecular weight and area percentage of the compound (B-5) were measured in the same manner as in Example 1. The results are shown in Table 4.

Comparative Example 3

A mixture of a polymerizable liquid crystal compound (A-1) represented by the formula (A-1) and a polymerizable liquid crystal compound (B-6) represented by the formula (B-6) was synthesized in the following manner.

[Chemical 263]

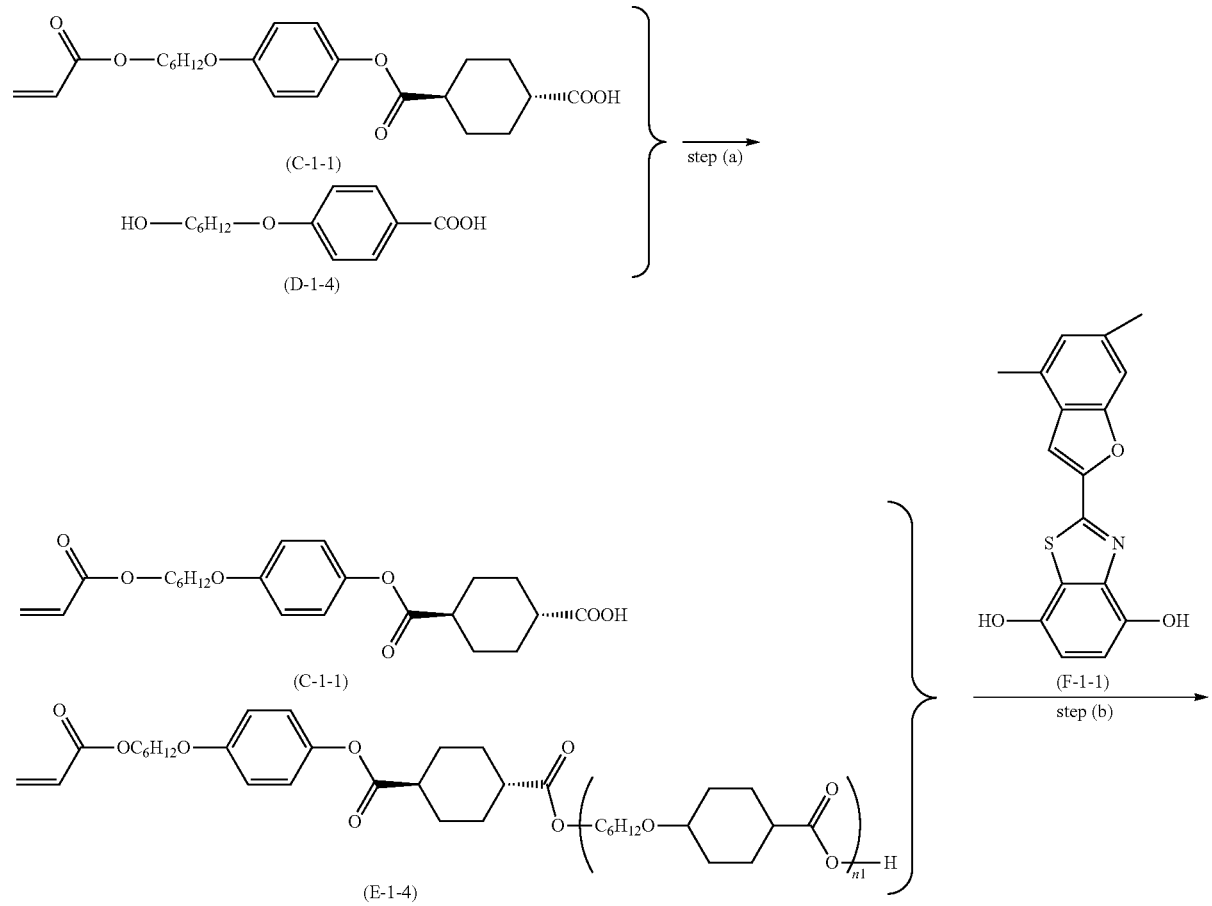

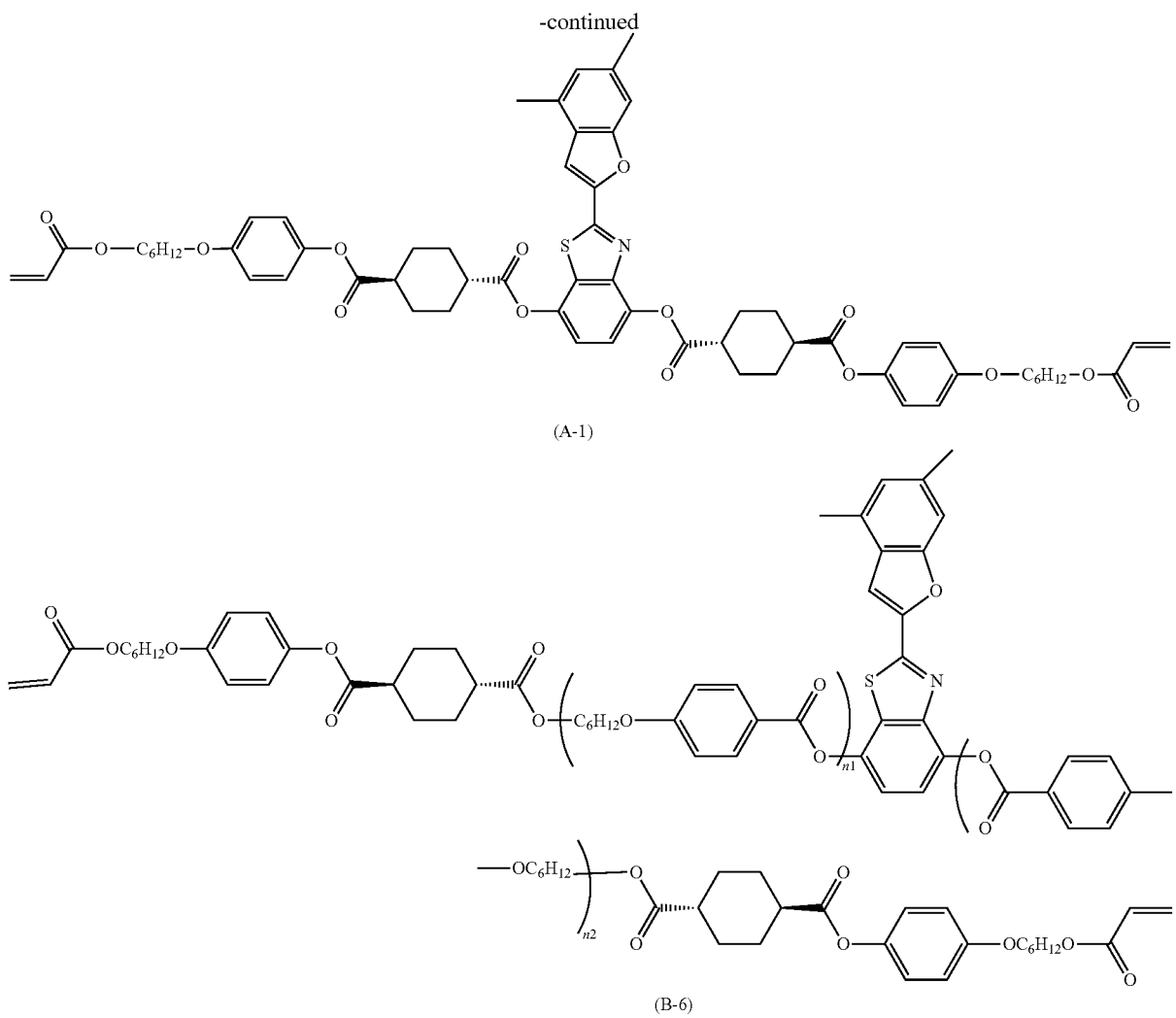

(A-1)

(B-6)

<Step (a)>
In a 20 mL-four-neck flask equipped with a Dimroth cooling tube and a temperature gage, in which the inside atmosphere was replaced with a nitrogen atmosphere, 11.3 g of a compound (C-1-1) synthesized with reference to Patent Document (JP-A-2010-31223), 0.64 g of a compound (D-1-4) synthesized with reference to Patent Document (JP-A-2015-000896), 0.16 g of DMAP (manufactured by Wako Pure Chemical Industries, Ltd.), 0.20 g of BHT (manufactured by Wako Pure Chemical Industries, Ltd.), and 58 g of chloroform (manufactured by Kanto Chemical Co., Inc.) were mixed and 4.05 g of IPC (manufactured by Wako Pure Chemical Industries, Ltd.) was added to the mixture by a dropping funnel to undergo reaction at 0° C. for 30 min.

<Step (b)>
The mixture obtained in the step (a) was reacted with 4.00 g of a compound (F-1-1) synthesized with reference to Patent Document (JP-A-2011-207765) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 11.8 g of a liquid crystal composition (11) which was a mixture of the compounds (A-1) and (B-6). The yield of the compound (A-1) was 74% based on the compound (F-1-1). Also, the maximum absorption wavelength of the compound (A-1) was 352 nm, the maximum absorption wavelength of the compound (B-6) was 352 nm, and the maximum absorption wavelength of the liquid crystal composition (11) was 352 nm. In this case, the sum of n1 and n2 in the formula (B-6) was 1 and specifically, n1=1 and n2=0 or n1=0 and n2=1 from the production steps.

The obtained liquid crystal composition (11) was used to evaluate the preservation stability and also, the weight average molecular weight and area percentage of the compound (B-6) were measured in the same manner as in Example 1. The results are shown in Table 4.

Comparative Example 4

A mixture of a polymerizable liquid crystal compound (A-1) represented by the formula (A-1) and a polymerizable liquid crystal compound (B-7) represented by the formula (B-7) was synthesized in the following manner.

[Chemical 264]
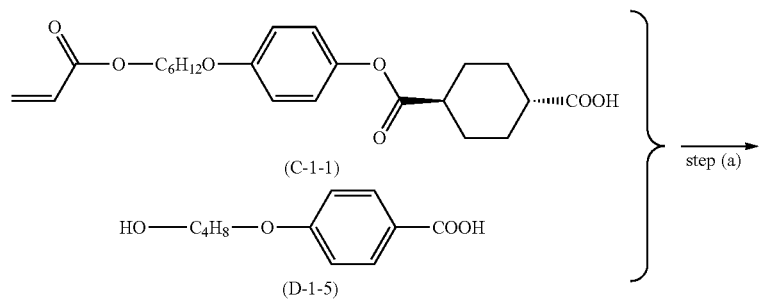
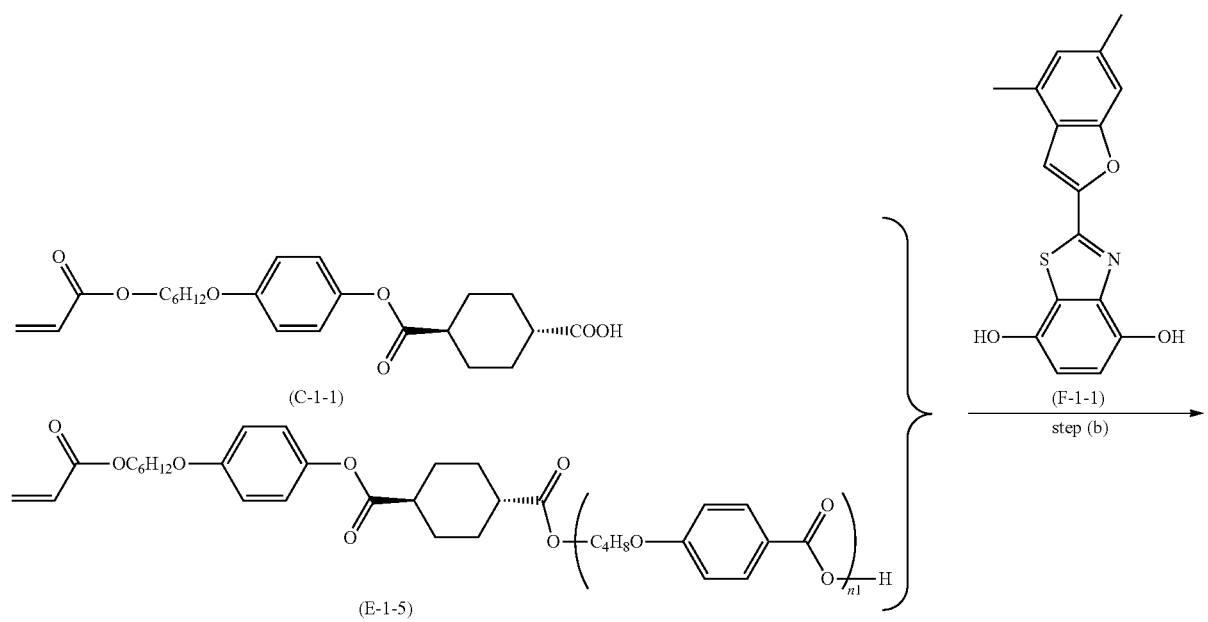
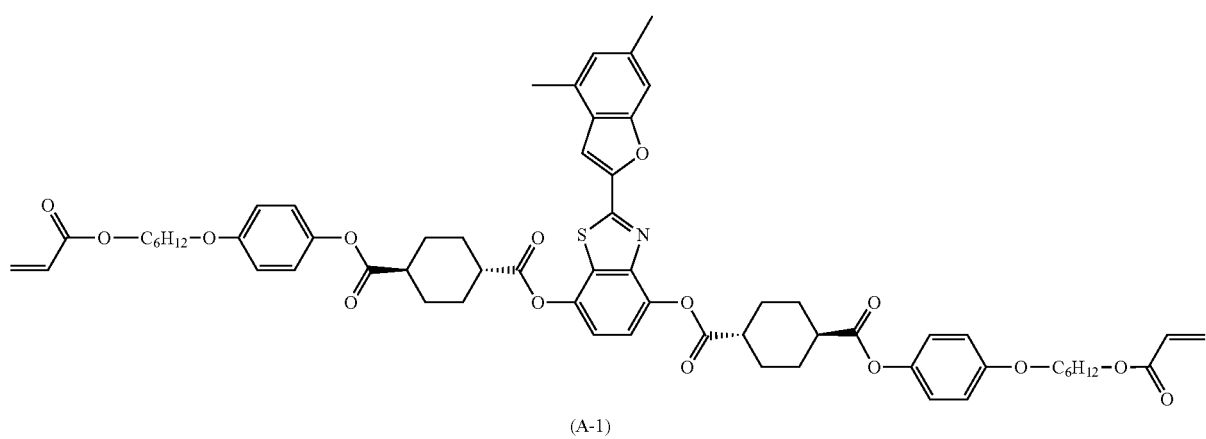

-continued

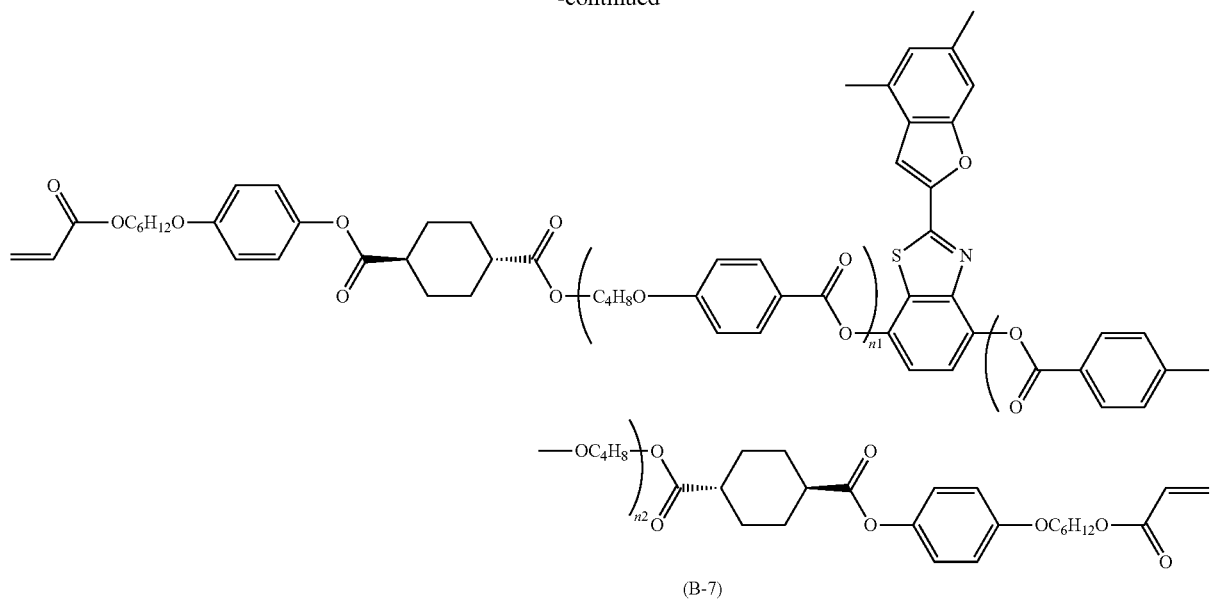

(B-7)

<Step (a)>

In a 20 mL-four-neck flask equipped with a Dimroth cooling tube and a temperature gage, in which the inside atmosphere was replaced with a nitrogen atmosphere, 11.3 g of a compound (C-1-1) synthesized with reference to a Patent Document (JP-A-2010-31223), 0.57 g of a compound (D-1-5) synthesized with reference to a treatise (JP-A-2015-000896), 0.16 g of DMAP (manufactured by Wako Pure Chemical Industries, Ltd.), 0.20 g of BHT (manufactured by Wako Pure Chemical Industries, Ltd.), and 58 g of chloroform (manufactured by Kanto Chemical Co., Inc.) were mixed and 4.05 g of IPC (manufactured by Wako Pure Chemical Industries, Ltd.) was added to the mixture by a dropping funnel to undergo reaction at 0° C. for 30 min.
<Step (b)>

The mixture obtained in the step (a) was reacted with 4.00 g of a compound (F-1-1) synthesized with reference to Patent Document (JP-A-2011-207765) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 12.8 g of a liquid crystal composition (12) which was a mixture of the compounds (A-1) and (B-7). The yield of the compound (A-1) was 81% based on the compound (F-1-1). Also, the maximum absorption wavelength of the compound (A-1) was 352 nm, the maximum absorption wavelength of the compound (B-7) was 352 nm, and the maximum absorption wavelength of the liquid crystal composition (12) was 352 nm. In this case, the sum of n1 and n2 in the formula (B-7) was 1 and specifically, n1=1 and n2=0 or n1=0 and n2=1 from the production steps.

The obtained liquid crystal composition (12) was used to evaluate the preservation stability and also, the weight average molecular weight and area percentage of the compound (B-7) were measured in the same manner as in Example 1. The results are shown in Table 4.

Comparative Example 5

A mixture of a polymerizable liquid crystal compound (A-1) represented by the formula (A-1) and a polymerizable liquid crystal compound (B-8) represented by the formula (B-8) was synthesized in the following manner.

[Chemical 265]

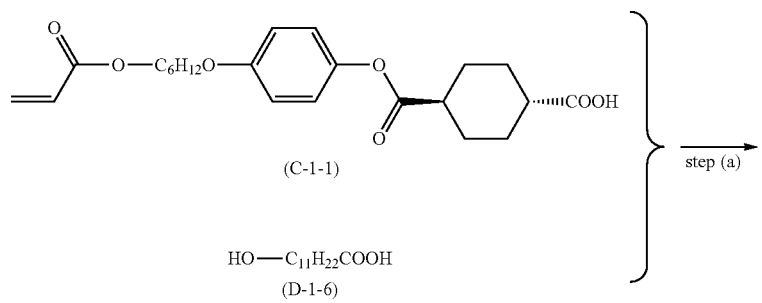

step (a)

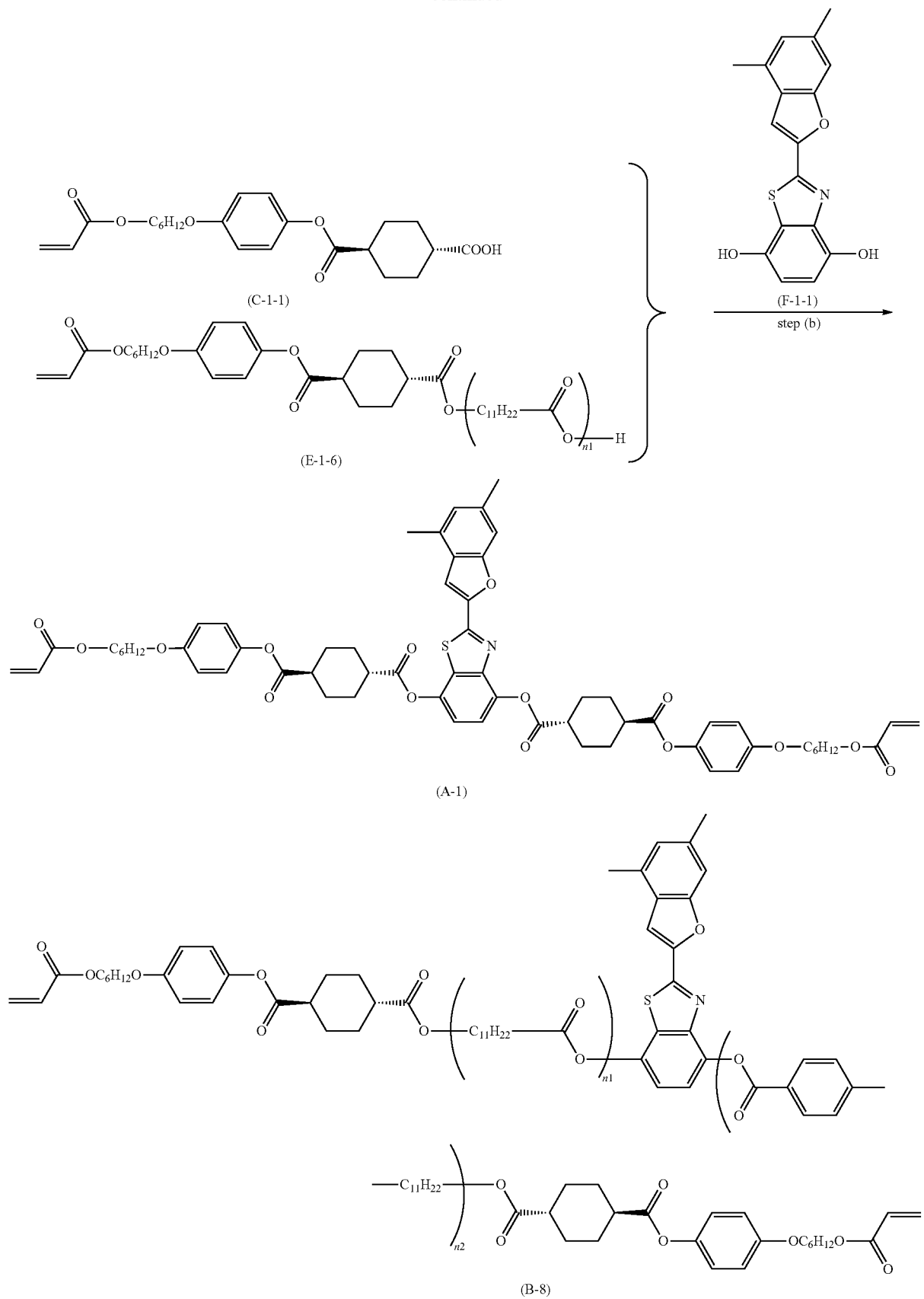

<Step (a)>

In a 20 mL-four-neck flask equipped with a Dimroth cooling tube and a temperature gage, in which the inside atmosphere was replaced with a nitrogen atmosphere, 11.3 g of a compound (C-1-1) synthesized with reference to Patent Document (JP-A-2010-31223), 0.58 g of a compound (D-1-6) (manufactured by SIGMA-ALDRICH), 0.16 g of DMAP (manufactured by Wako Pure Chemical Industries, Ltd.), 0.20 g of BHT (manufactured by Wako Pure Chemical Industries, Ltd.), and 58 g of chloroform (manufactured by Kanto Chemical Co., Inc.) were mixed and 4.05 g of IPC (manufactured by Wako Pure Chemical Industries, Ltd.) was added to the mixture by a dropping funnel to undergo reaction at 0° C. for 30 min.

<Step (b)>

The mixture obtained in the step (a) was reacted with 4.00 g of a compound (F-1-1) synthesized with reference to Patent Document (JP-A-2011-207765) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 12.2 g of a liquid crystal composition (13) which was a mixture of the compounds (A-1) and (B-8). The yield of the compound (A-1) was 74% based on the compound (F-1-1). Also, the maximum absorption wavelength of the compound (A-1) was 352 nm, the maximum absorption wavelength of the compound (B-8) was 352 nm, and the maximum absorption wavelength of the liquid crystal composition (13) was 352 nm. In this case, the sum of n1 and n2 in the formula (B-8) was 1 and specifically, n1=1 and n2=0 or n1=0 and n2=1 from the production steps.

The obtained liquid crystal composition (13) was used to evaluate the preservation stability and also, the weight average molecular weight and area percentage of the compound (B-8) were measured in the same manner as in Example 1. The results are shown in Table 4.

Comparative Example 6

A polymerizable liquid crystal compound (A-2) represented by the formula (A-2) was synthesized with reference to Patent Document (JP-A-2010-31223).

[Chemical 266]

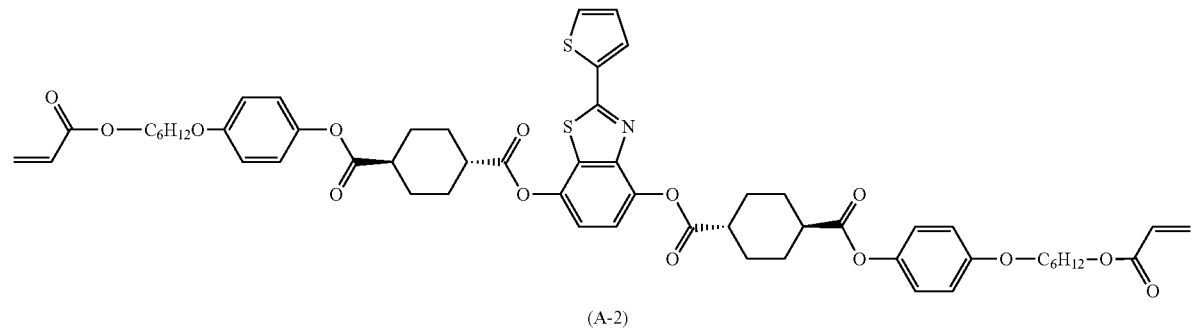

(A-2)

The preservation stability was evaluated using the obtained polymerizable liquid crystal compound (A-2) in the same manner as in Example 1. The results are shown in Table 4.

Comparative Example 7

A mixture of a polymerizable liquid crystal compound (A-2) represented by the formula (A-2) and a polymerizable liquid crystal compound (B-9) represented by the formula (B-9) was synthesized in the following manner.

[Chemical 267]

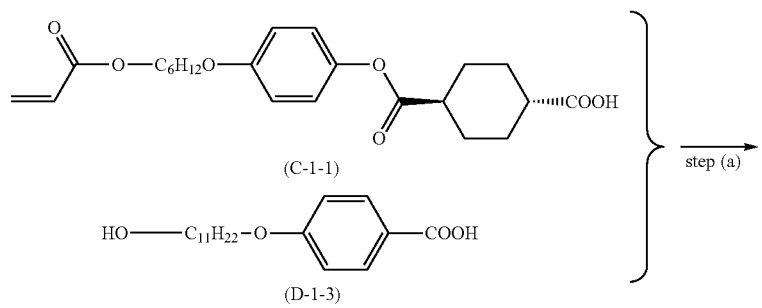

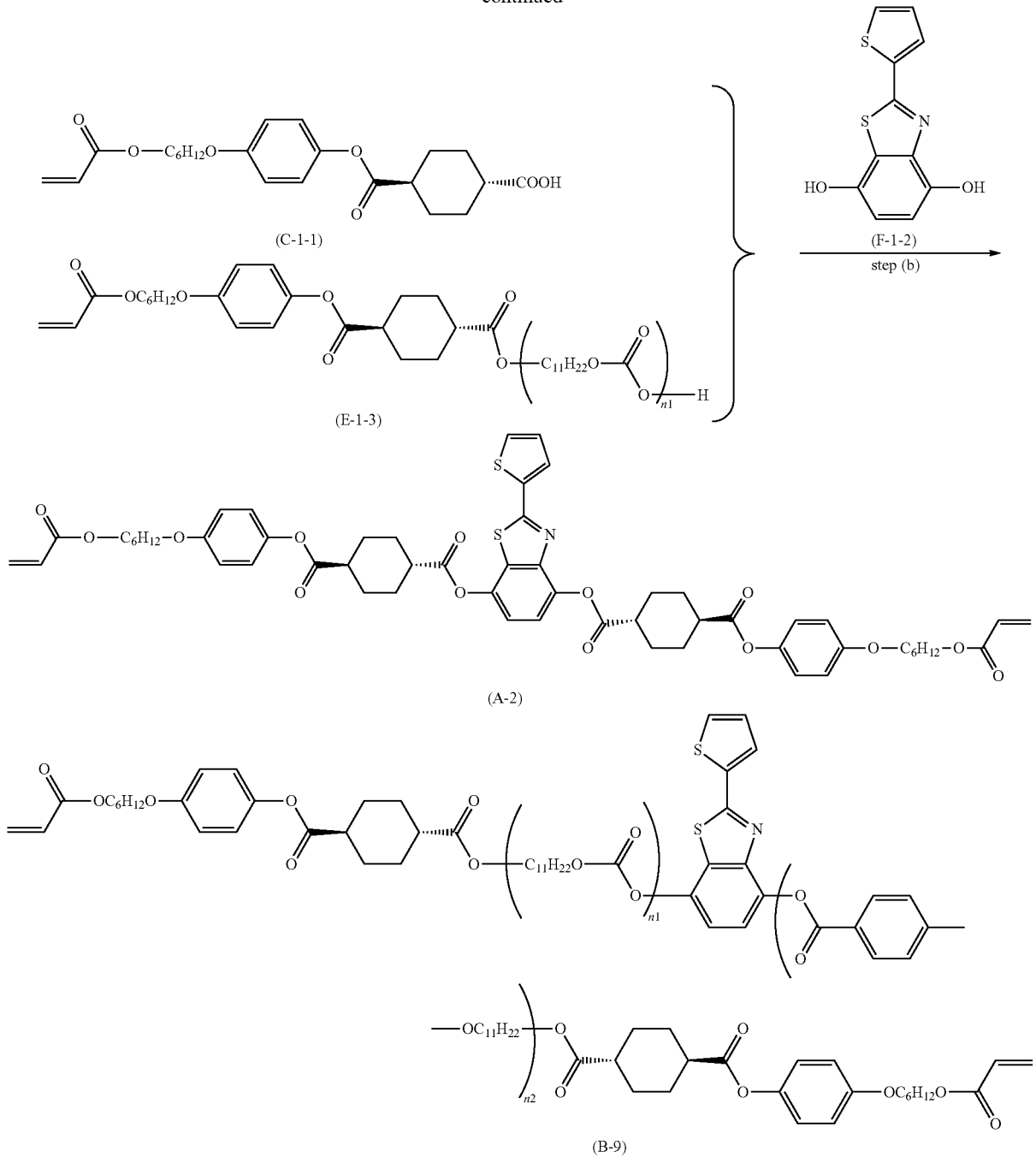

<Step (a)>

In a 20 mL-four-neck flask equipped with a Dimroth cooling tube and a temperature gage, in which the inside atmosphere was replaced with a nitrogen atmosphere, 14.1 g of a compound (C-1-1) synthesized with reference to Patent Document (JP-A-2010-31223), 1.04 g of a compound (D-1-3) synthesized with reference to Patent Document (JP-A-2015-000896), 0.20 g of DMAP (manufactured by Wako Pure Chemical Industries, Ltd.), 0.25 g of BHT (manufactured by Wako Pure Chemical Industries, Ltd.), and 70 g of chloroform (manufactured by Kanto Chemical Co., Inc.) were mixed and 5.06 g of IPC (manufactured by Wako Pure Chemical Industries, Ltd.) was added to the mixture by a dropping funnel to undergo reaction at 0° C. for 30 min.

<Step (b)>

The mixture obtained in the step (a) was reacted with 4.00 g of a compound (F-1-2) synthesized with reference to Patent Document (JP-A-2010-31223) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 11.6 g of a liquid crystal composition (14) which was a mixture of the compounds (A-2) and (B-9). The yield of the compound (A-2) was 71% based on the compound (F-1-2). Also, the maximum absorption wavelength of the compound (A-2) was 326 nm, the maximum absorption wavelength of the compound (B-9) was 326 nm, and the maximum absorption wavelength of the liquid crystal composition (14) was 326 nm. In this case, the sum of n1 and n2 in the formula (B-9) was 1 and specifically, n1=1 and n2=0 or n1=0 and n2=1 from the production steps.

The obtained liquid crystal composition (14) was used to evaluate the preservation stability and also, the weight average molecular weight and area percentage of the compound (B-9) were measured in the same manner as in Example 1. The results are shown in Table 4.

Comparative Example 8

A polymerizable liquid crystal compound (A-3) represented by the formula (A-3) was synthesized with reference to Patent Document (JP-A-2010-31223).

[Chemical 268]

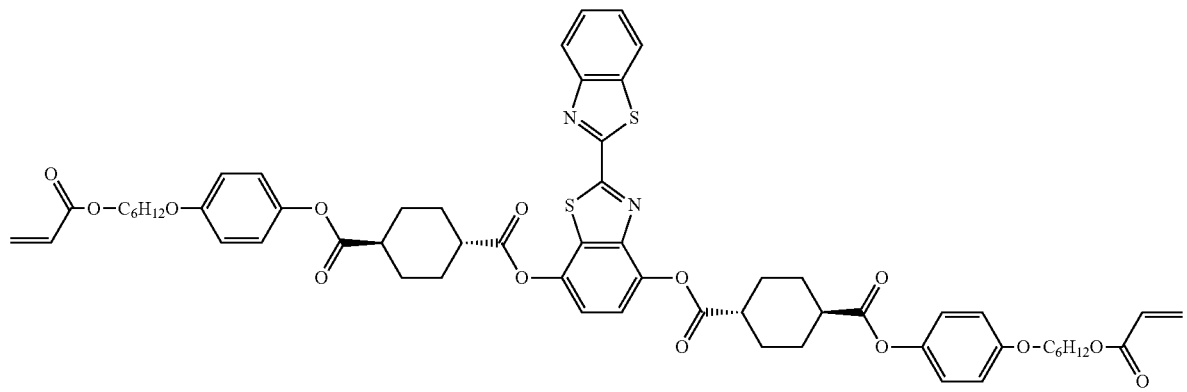

(A-3)

The preservation stability was evaluated using the obtained polymerizable liquid crystal compound (A-3) in the same manner as in Example 1. The results are shown in Table 4.

Comparative Example 9

A mixture of a polymerizable liquid crystal compound (A-3) represented by the formula (A-3) and a polymerizable liquid crystal compound (B-10) represented by the formula (B-10) was synthesized in the following manner.

[Chemical 269]

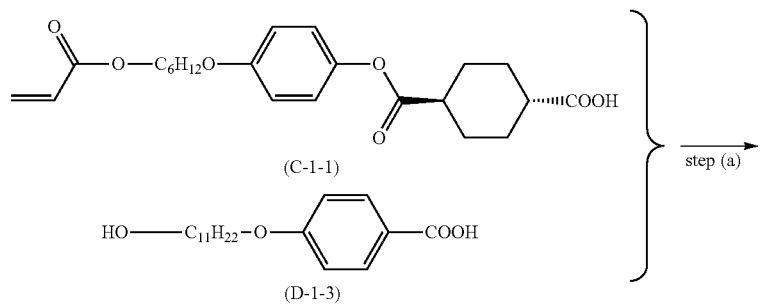

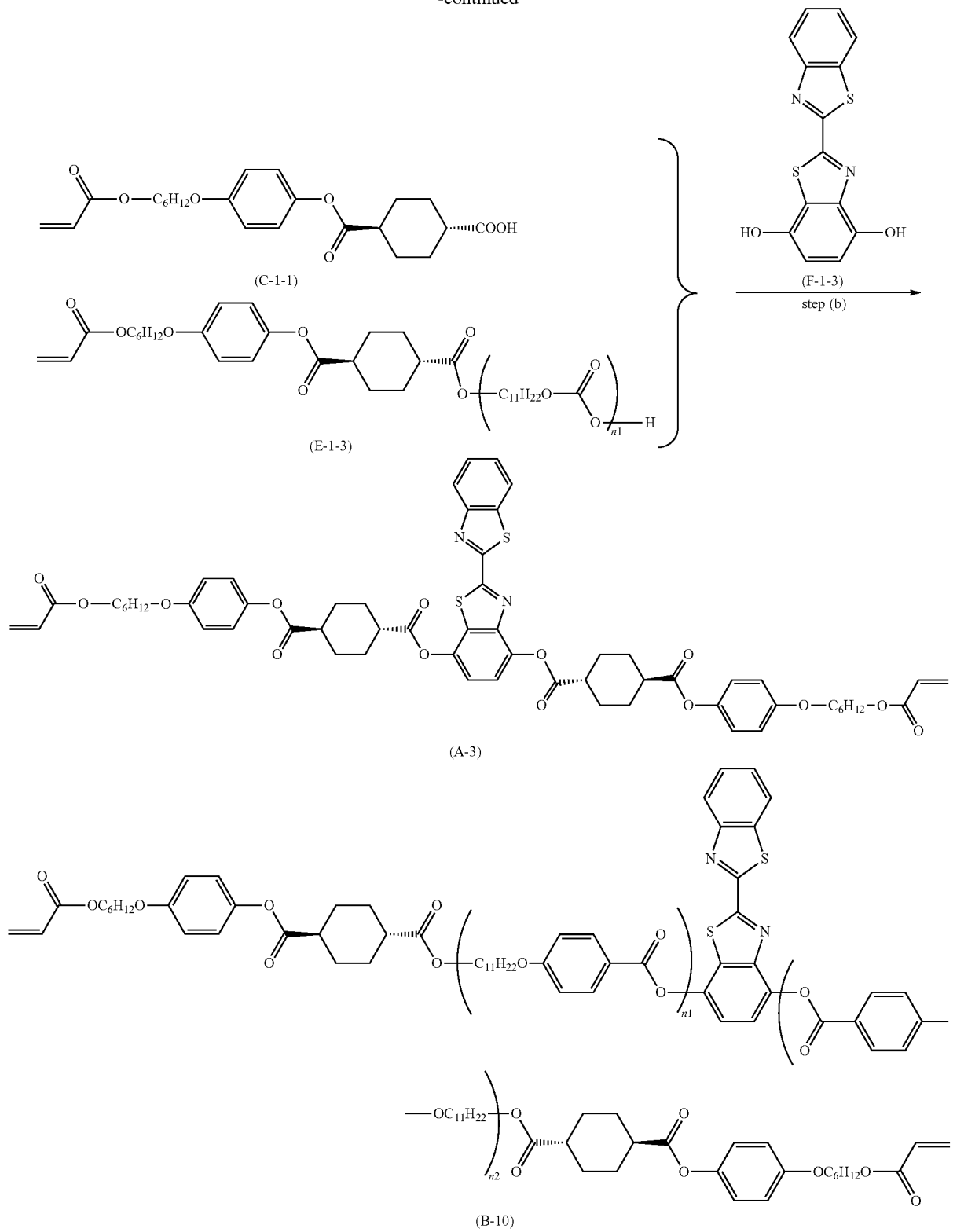

<Step (a)>
In a 20 mL-four-neck flask equipped with a Dimroth cooling tube and a temperature gage, in which the inside atmosphere was replaced with a nitrogen atmosphere, 11.7 g of a compound (C-1-1) synthesized with reference to Patent Document (JP-A-2010-31223), 0.86 g of a compound (D-1-3) synthesized with reference to Patent Document (JP-A-2015-000896), 0.16 g of DMAP (manufactured by Wako Pure Chemical Industries, Ltd.), 0.21 g of BHT (manufactured by Wako Pure Chemical Industries, Ltd.), and 58 g of chloroform (manufactured by Kanto Chemical Co., Inc.) were mixed and 4.20 g of IPC (manufactured by Wako Pure Chemical Industries, Ltd.) was added to the mixture by a dropping funnel to undergo reaction at 0° C. for 30 min.

<Step (b)>

The mixture obtained in the step (a) was reacted with 4.00 g of a compound (F-1-3) synthesized with reference to Patent Document (JP-A-2011-207765) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 11.8 g of a liquid crystal composition (15) which was a mixture of the compounds (A-3) and (B-10). The yield of the compound (A-3) was 72% based on the compound (F-1-3). Also, the maximum absorption wavelength of the compound (A-3) was 342 nm, the maximum absorption wavelength of the compound (B-10) was 342 nm, and the maximum absorption wavelength of the liquid crystal composition (15) was 342 nm. In this case, the sum of n1 and n2 in the formula (B-10) was 1 and specifically, n1=1 and n2=0 or n1=0 and n2=1 from the production steps.

The obtained liquid crystal composition (15) was used to evaluate the preservation stability and also, the weight average molecular weight and area percentage of the compound (B-10) were measured in the same manner as in Example 1. The results are shown in Table 4.

Comparative Example 10

A mixture of a polymerizable liquid crystal compound (A-1) represented by the formula (A-1) and a polymerizable liquid crystal compound (B-11) represented by the formula (B-11) was synthesized in the following manner.

[Chemical 270]

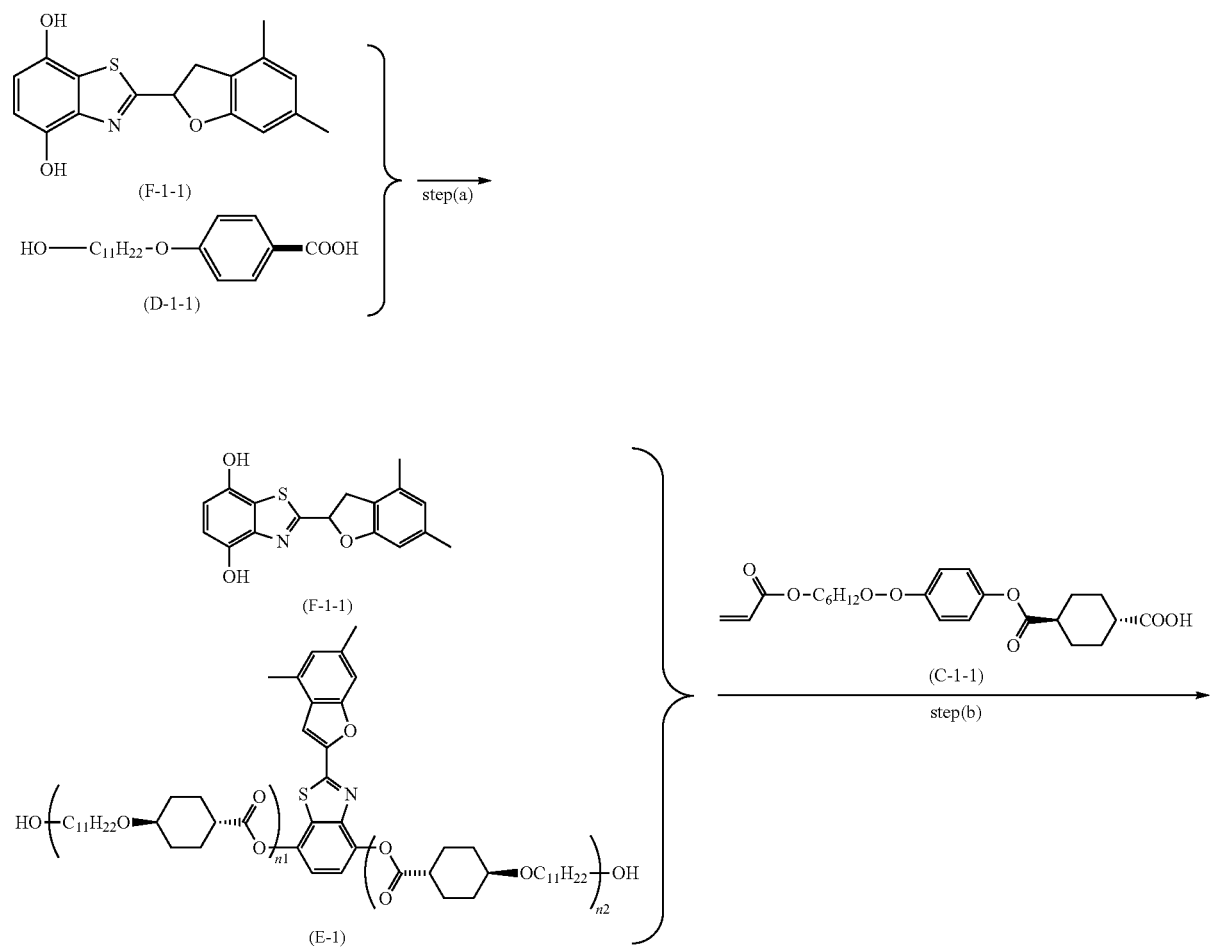

-continued

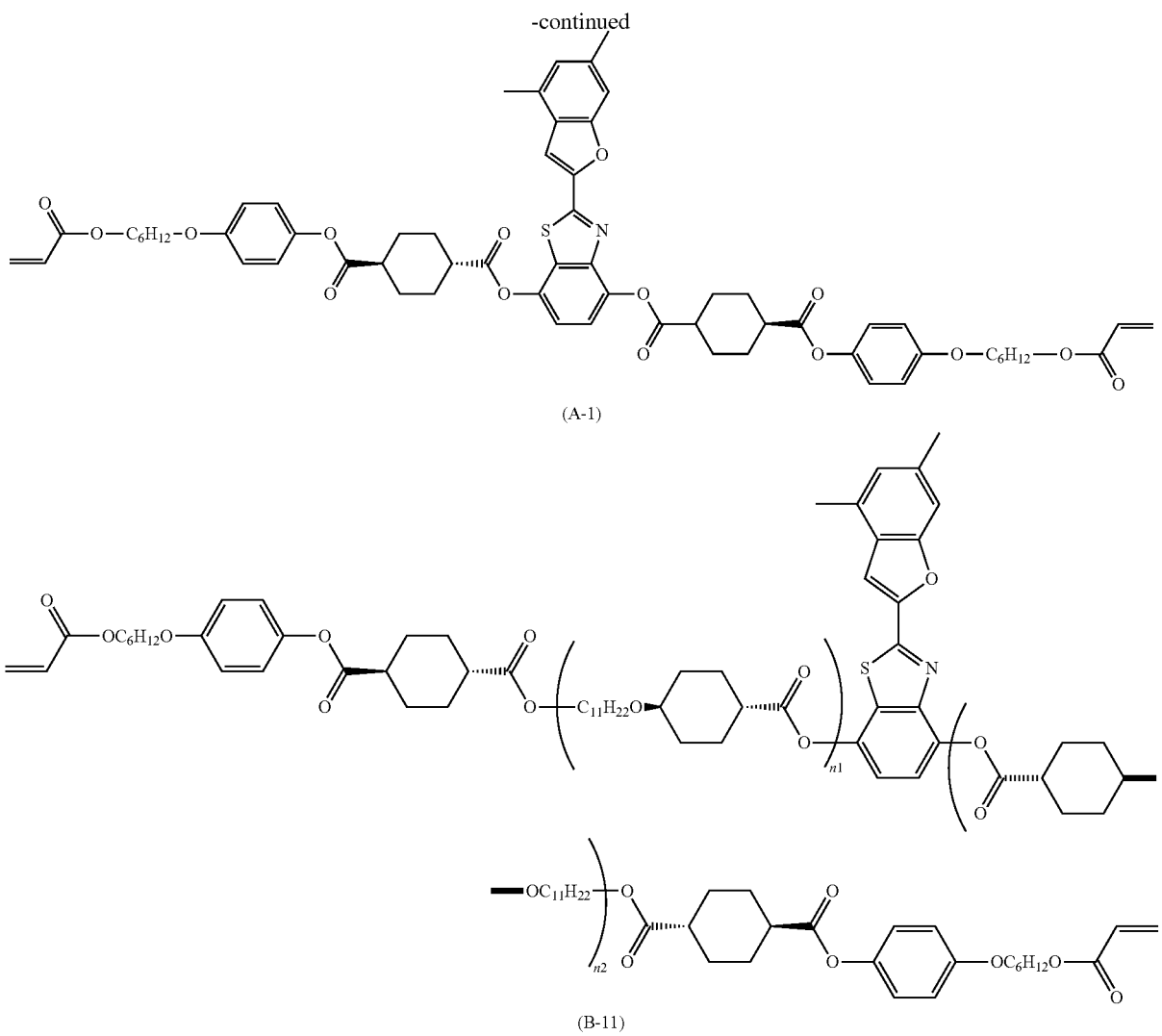

(A-1)

(B-11)

<Step (a)>

In a 100 mL-four-neck flask equipped with a Dimroth cooling tube and a temperature gage, in which the inside atmosphere was replaced with a nitrogen atmosphere, 4.00 g of a compound (F-1-1) synthesized with reference to Patent Document (JP-A-2011-207765), 0.85 g of compound (D-1-1) synthesized with reference to a treatise (Lub et al. Recl. Trav. Chim. Pays-Bas, 115, 321-328 (1996)), 0.16 g of dimethylaminopyridine (hereinafter abbreviated as DMAP, manufactured by Wako Pure Chemical Industries, Ltd.), 0.20 g of 3,5-dibutyl-4-hydroxytoluene (hereinafter abbreviated as BHT, manufactured by Wako Pure Chemical Industries, Ltd.), and 58 g of chloroform (manufactured by Kanto Chemical Co., Inc.) were mixed and 4.05 g of diisopropylcarbodiimide (hereinafter abbreviated as IPC, manufactured by Wako Pure Chemical Industries, Ltd.) was added to the mixture by a dropping funnel to undergo reaction at ambient temperature for 1 hr.

<Step (b)>

The mixture obtained in the step (a) was reacted with 11.3 g of a compound (C-1-1) synthesized with reference to Patent Document (JP-A-2010-31223) at 0° C. overnight. After the reaction was completed, the mixture was subjected to filtration to remove insoluble components. The obtained chloroform solution was added dropwise to acetonitrile (manufactured by Wako Pure Chemical Industries, Ltd.) contained in an amount three times the weight of chloroform to be contained. In succession, the mixture was subjected to filtration to collect the precipitated solid, which was then washed three times with 20 g of acetonitrile and dried at 30° C. under reduced pressure to obtain 10.1 g of a liquid crystal composition (16) which was a mixture of the compounds (A-1) and (B-11). The yield of the compound (A-1) was 60% based on the compound (F-1-1). Also, the maximum absorption wavelength of the compound (A-1) was 352 nm, the maximum absorption wavelength of the compound (B-11) was 352 nm, and the maximum absorption wavelength of the liquid crystal composition (16) was 352 nm. In this case, the sum of n1 and n2 in the formula (B-11) was 7.

The obtained liquid crystal composition (16) was used to evaluate the preservation stability and also, the weight average molecular weight and area percentage of the compound (B-11) were measured in the same manner as in Example 1. The results are shown in Table 4.

Comparative Example 11

The preservation stability of the liquid crystal composition (A-1) was evaluated in the same manner as in Comparative Example 1 except that cyclopentanone (manufactured by Kanto Chemical Co., Inc.) was used in place of NMP as the solvent. The results are shown in Table 4.

TABLE 4

| | | Polymerizable liquid crystal compound (A) [Type] | Polymerizable liquid crystal compound (B) [Type] | Polymerizable liquid crystal compound (B) [Weight average molecular weight] | Area percentage of Polymerizable liquid crystal compound (B) [%] | Evaluation of Preservation stability |
|---|---|---|---|---|---|---|
| Example | 1 | A-1 | B-1 | 2311 | 1.00 | 4 |
| | 2 | A-1 | B-1 | 2235 | 7.39 | 4 |
| | 3 | A-1 | B-1 | 2352 | 11.9 | 4 |
| | 4 | A-1 | B-1 | 2488 | 21.8 | 4 |
| | 5 | A-1 | B-1 | 2556 | 38.4 | 4 |
| | 6 | A-1 | B-1 | 2819 | 47.3 | 2 |
| | 7 | A-1 | B-2 | 1769 | 12.1 | 4 |
| | 8 | A-2 | B-3 | 2218 | 6.89 | 4 |
| | 9 | A-3 | B-4 | 2178 | 7.01 | 4 |
| | 10 | A-1 | B-1 | 2311 | 1.00 | 4 |

TABLE 5

| | | Polymerizable liquid crystal compound (A) [Type] | Polymerizable liquid crystal compound (B) [Type] | Polymerizable liquid crystal compound (B) [Weight average molecular weight] | Area percentage of Polymerizable liquid crystal compound (B) [%] | Evaluation of Preservation stability |
|---|---|---|---|---|---|---|
| Comparative Example | 1 | A-1 | — | — | 0.00 | 1 |
| | 2 | A-1 | B-5 | 2346 | 16.0 | 1 |
| | 3 | A-1 | B-6 | 2019 | 15.8 | 1 |
| | 4 | A-1 | B-7 | 1968 | 15.2 | 1 |
| | 5 | A-1 | B-8 | 1932 | 14.3 | 1 |
| | 6 | A-2 | — | — | 0.00 | 1 |
| | 7 | A-2 | B-9 | 2312 | 14.8 | 1 |
| | 8 | A-3 | — | — | 0.00 | 1 |
| | 9 | A-3 | B-10 | 2289 | 14.2 | 1 |
| | 10 | A-1 | B-11 | 4012 | 9.06 | 1 |
| | 11 | A-1 | — | — | 0.00 | 1 |

<Preparation of Composition for Formation of Photo-Orientation Film>

The following ingredients were mixed and stirred at 80° C. for 1 hr to obtain a composition (1) for formation of a photo-orientation film Photo-Orientation Material (5 Parts):

[Chemical 271]

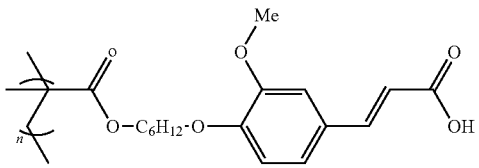

Solvent (95 Parts): Cyclopentanone

Example 11

<Example of Production of a Retardation Film>

Using the liquid crystal composition (1) obtained after it was kept at 25° C. for 72 hr in the evaluation of preservation stability in Example 1, a retardation film was produced in the following manner.

Using a corona treater (AGF-B10, manufactured by KASUGA DENKI, INC), corona treatment was performed once on a cycloolefin polymer film (COP) (ZF-14, manufactured by Zeon Corporation) in the condition of an output of 0.3 kW and a treatment speed of 3 m/min. The composition (1) for formation of a photo-orientation film was applied to the corona-treated surface by using a bar coater, dried at 80° C. for 1 min, and exposed to polarized UV light at an integrated dose of 100 mJ/cm$^2$ by using a polarizing light UV irradiation apparatus (SPOT CURE SP-7, manufactured by USHIO INC.) to obtain an orientation film. The film thickness of the obtained orientation film was measured by a laser microscope (LEXT, manufactured by Olympus Corporation), to find that it was 100 nm.

In succession, the liquid crystal composition (1) obtained in Example 1 was applied to the surface of the orientation film by using a bar coater, dried at 120° C. for 1 min, and exposed to UV light (in a nitrogen atmosphere, wavelength: 365 nm, integrated dose of 1000 mJ/cm$^2$) to UV light by using a high-pressure mercury lamp (Unicure VB-15201BY-A, manufactured by USHIO INC.) to obtain a retardation film.

<Optical Characteristics of Retardation Film>

The obtained retardation film was cut into a size of 40 mm×40 mm to measure inplane retardation values for light having wavelengths of 450 nm and 650 nm by using KOBRA-WR (manufactured by Oji Scientific Instruments Co., Ltd.). As a result, the inplane retardation value was as follows: Re (450)=116 nm, Re (550)=140 nm, and Re (650)=142 nm and the relation between the inplane retardation values obtained at each wavelength was as follows.

Re(450)/Re(550)=0.83

Re(650)/Re(550)=1.02

In the formula, Re (450) represents an inplane retardation value for light having a wavelength of 450 nm, Re (550) represents an inplane retardation value for light having a wavelength of 550 nm, and Re (650) represents an inplane retardation value for light having a wavelength of 650 nm.

<Confirmation of Orientation Defects>

The obtained retardation film was cut into a 10 cm×10 cm square to visually confirm the number of orientation defects on a display by using polarizing microscope (LEXT, manufactured by Olympus Corporation). The evaluation was made based on the following standard. The results are shown in Table 5.

(Standard of Evaluation of Orientation Defects)

1: orientation defects occur on the entire surface (>100)

2: orientation defects=11 to 100 in number

3: orientation defects=1 to 10 in number

4: no defect

Example 12

A retardation film was manufactured in the same manner as in Example 11 except that the liquid crystal composition (2) obtained in Example 2 was used in place of the liquid crystal compound (1) obtained in Example 1. The confirmed result of the value of Re (450)/(550) and orientation defects are shown in Table 5.

TABLE 6

| | Coating solution | Retardation film Re(450)/Re(550) | Film thickness of Retardation film (μm) | Orientation defects |
|---|---|---|---|---|
| Example 11 | Solution of Example 1 | 0.83 | 2.0 | 4 |
| Example 12 | Solution of Example 2 | 0.83 | 2.0 | 4 |

What is claimed is:

1. A liquid crystal composition comprising a first polymerizable liquid crystal compound represented by the following formula (A), and a second polymerizable liquid crystal compound represented by the following formula (B):

(A)

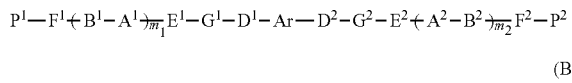

(B)

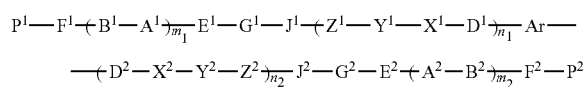

wherein:
n1 and 2 each independently denote an integer from 0 to 3, in formula (A), m1 and m2 each independently denote an integer from 0 to 3 and in formula (B), m1 and m2 each independently denote an integer from 0 to 2, wherein the sum of m1 and m2 is 1 to 2 and the sum of n1 and n2 is 2 to 6, provided that when m1 is an integer of 2 or more, a plurality of $A^1$s and $B^1$s may be respectively the same or different and when m2 is an integer of 2 or more, a plurality of $A^2$s and $B^2$s may be respectively the same or different;

$B^1$, $B^2$, $D^1$, $D^2$, $E^1$, $E^2$, $J^1$, $J^2$, $Y^1$, and $Y^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond, wherein $R^1$ and $R^2$ each independently represent a hydrogen atom, a fluorine atom, or an alkyl group having 1 to 4 carbon atoms;

$A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms, provided that a hydrogen atom contained in the alicyclic hydrocarbon group and aromatic hydrocarbon group is optionally substituted with a halogen atom, —$R^3$, —$OR^4$, cyano group, or nitro group, —$CH_2$— contained in the alicyclic hydrocarbon group is optionally substituted with —O—, —S—, —NH—, or —$NR^5$—, and —CH(—)- contained in the alicyclic hydrocarbon group is optionally substituted with —N(—)-, wherein $R^3$, $R^4$, and $R^5$ each independently represent an alkyl group having 1 to 4 carbon atoms, provided that a hydrogen atom contained in the alkyl group is optionally substituted with a fluorine atom;

$X^1$ and $X^2$ each independently represent a divalent alicyclic hydrocarbon group having 3 to 16 carbon atoms, provided that a hydrogen atom contained in the alicyclic hydrocarbon group is optionally substituted with a halogen atom, —$R^6$, —$OR^7$, cyano group, or nitro group, —$CH_2$— contained in the alicyclic hydrocarbon group is optionally substituted with —O—, —S—, —NH—, or —$NR^8$—, and —CH(—)- contained in the alicyclic hydrocarbon group is optionally substituted with —N(—)-, wherein $R^6$, $R^7$, and $R^8$ each independently represent an alkyl group having 1 to 4 carbon atoms, provided that a hydrogen atom contained in the alkyl group is optionally substituted with a fluorine atom;

$F^1$, $F^2$, $Z^1$, and $Z^2$ each independently represent an alkanediyl group having 1 to 16 carbon atoms or a single bond, provided that a hydrogen atom contained in the alkanediyl group is optionally substituted with —$OR^9$ or a halogen atom and —$CH_2$— contained in the alkanediyl group is optionally replaced with —O— or —CO—, wherein $R^9$ represents an alkyl group having 1 to 4 carbon atoms, provided that a hydrogen atom contained in the alkyl group is optionally substituted with a fluorine atom;

$P^1$ and $P^2$ each independently represent a hydrogen atom or a polymerizable group, wherein at least one of $P^1$ and $P^2$ represents a polymerizable group; and Ar represents a divalent aromatic group which may be substituted, provided that the aromatic group contains at least one of a nitrogen atom, oxygen atom, and sulfur atom.

2. The liquid crystal composition according to claim 1, wherein the aromatic group in Ar has 10 to 30 π-electrons.

3. The liquid crystal composition according to claim 1, the liquid crystal composition having a maximum absorption wavelength ($\lambda_{max}$) of 300 to 400 nm.

4. The liquid crystal composition according to claim 1, wherein Ar is an aromatic group having a hetero ring.

5. The liquid crystal composition according to claim 4, wherein
the aromatic group having a hetero ring is an aromatic group having a benzothiazole group.

6. The liquid crystal composition according to claim 1, wherein $G^1$, $G^2$, $X^1$, and $X^2$ are independently a trans-cyclohexane-1,4-diyl group.

7. The liquid crystal composition according to claim 1, wherein an area percentage of the second polymerizable liquid crystal compound which is measured by gel permeation chromatography (GPC) is 0.1% to 40%.

8. The liquid crystal composition according to claim 1, wherein a weight average molecular weight of the second polymerizable liquid crystal compound which is measured by gel permeation chromatography (GPC) is 1000 to 3000.

9. A polymerizable liquid crystal compound represented by the following formula (B):

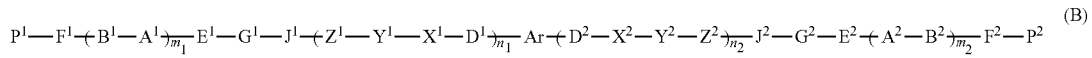

(B)

wherein:
m1 and m2 each independently denote an integer from 0 to 2; n1 and n2 each independently denote an integer from 0 to 3, wherein the sum of m1 and m2 is 1 to 2 and the sum of n1 and n2 is 2 to 6, provided that when m1 is an integer of 2, a plurality of $A^1$s and $B^1$s may be respectively the same or different and when m2 is an integer of 2, a plurality of $A^2$s and $B^2$s may be respectively the same or different;

$B^1$, $B^2$, $D^1$, $D^2$, $E^1$, $E^2$, $J^1$, $J^2$, $Y^1$, and $Y^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond, wherein $R^1$ and $R^2$ each independently represent a hydrogen atom, a fluorine atom, or an alkyl group having 1 to 4 carbon atoms;

$A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms, provided that a hydrogen atom contained in the alicyclic hydrocarbon group and aromatic hydrocarbon group is optionally substituted with a halogen atom, —$R^3$, —$OR^4$, cyano group, or nitro group, —$CH_2$— contained in the alicyclic hydrocarbon group is optionally substituted with —O—, —S—, —NH—, or —$NR^5$—, and —CH(—)- contained in the alicyclic hydrocarbon group is optionally substituted with —N(—)-, wherein $R^3$, $R^4$, and $R^5$ each independently represent an alkyl group having 1 to 4 carbon atoms, provided that a hydrogen atom contained in the alkyl group is optionally substituted with a fluorine atom;

$X^1$ and $X^2$ each independently represent a divalent alicyclic hydrocarbon group having 3 to 16 carbon atoms, provided that a hydrogen atom contained in the alicyclic hydrocarbon group is optionally substituted with a halogen atom, —$R^6$, —$OR^7$, cyano group, or nitro group, —$CH_2$— contained in the alicyclic hydrocarbon group is optionally substituted with —O—, —S—, —NH—, or —$NR^8$—, and —CH(—)- contained in the alicyclic hydrocarbon group is optionally substituted with —N(—)-, wherein $R^6$, $R^7$, and $R^8$ each independently represent an alkyl group having 1 to 4 carbon atoms, provided that a hydrogen atom contained in the alkyl group is optionally substituted with a fluorine atom;

$F^1$, $F^2$, $Z^1$, and $Z^2$ each independently represent an alkanediyl group having 1 to 16 carbon atoms or a single bond, provided that a hydrogen atom contained in the alkanediyl group is optionally substituted with —$OR^9$ or a halogen atom and —$CH_2$— contained in the alkanediyl group is optionally replaced with —O— or —CO—, wherein $R^9$ represents an alkyl group having 1 to 4 carbon atoms, provided that a hydrogen atom contained in the alkyl group is optionally substituted with a fluorine atom;

$P^1$ and $P^2$ each independently represent a hydrogen atom or a polymerizable group, wherein at least one of $P^1$ and $P^2$ represents a polymerizable group; and Ar represents a divalent aromatic group which may be substituted, provided that the aromatic group contains at least one of a nitrogen atom, oxygen atom, and sulfur atom.

10. A retardation film comprising a polymer of the polymerizable liquid crystal composition according to claim 1, wherein the polymer is kept in an oriented state.

11. The retardation film according to claim 10, the retardation film satisfying the following formula (1):

$$0.8 \leq Re(450\ nm)/Re(550\ nm) < 1 \qquad (1)$$

wherein Re(450 nm) and Re(550 nm) represent front retardation values Re(λ) for light having wavelengths (λ) of 450 nm and 550 nm respectively.

12. A polarizing plate comprising the retardation film as claimed in claim 10.

13. An optical display comprising the polarizing plate as claimed in claim 12.

14. A method of producing a liquid crystal composition containing a first polymerizable liquid crystal compound represented by the following formula (A-1) and a second polymerizable liquid crystal compound represented by the following formula (B-1):

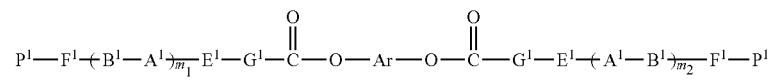

(A-1)

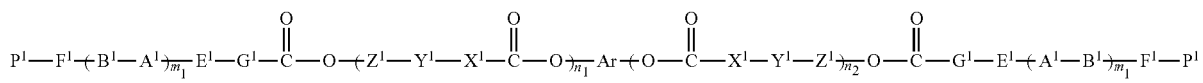

(B-1)

the method comprising a step of reacting a first carboxylic acid compound represented by the following formula (C) with a second carboxylic acid compound represented by the following formula (D) to obtain a mixture containing a third carboxylic acid compound represented by the following formula (E) and the first carboxylic acid compound:

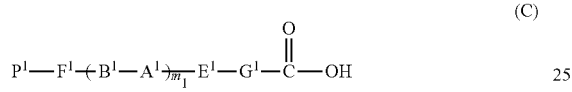

(C)

(D)

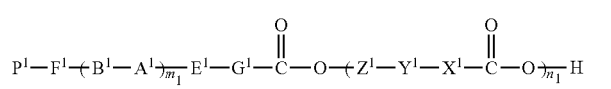

(E)

wherein:
- n1 and 2 each independently denote an integer from 0 to 3, in formulas (A-1), (C), (D), and (E), m1 denotes an integer from 0 to 3 and in formula (B), denotes an integer from 0 to 2, wherein the sum of plurality m1s in formula (A-1) or in formula (B-1) is 1 to 2 and the sum of n1 and n2 is 2 to 6, provided that when m1 is an integer of 2 or more, a plurality of $A^1$s and $B^1$s may be respectively the same or different;
- $B^1$, $B^2$, $D^1$, $D^2$, $E^1$, $E^2$, $J^1$, $J^2$, $Y^1$, and $Y^2$ each independently represent —$CR^1R^2$—, —$CH_2$—$CH_2$—, —O—, —S—, —CO—O—, —O—CO—, —O—CO—O—, —C(=S)—O—, —O—C(=S)—, —O—C(=S)—O—, —CO—$NR^1$—, —$NR^2$—CO—, —O—$CH_2$—, —$CH_2$—O—, —S—$CH_2$—, —$CH_2$—S—, or a single bond, wherein $R^1$ and $R^2$ each independently represent a hydrogen atom, a fluorine atom, or an alkyl group having 1 to 4 carbon atoms;
- $A^1$, $A^2$, $G^1$, and $G^2$ each independently represent a divalent alicyclic hydrocarbon group having 3 to 16 carbon atoms or a divalent aromatic hydrocarbon group having 6 to 20 carbon atoms, provided that a hydrogen atom contained in the alicyclic hydrocarbon group and aromatic hydrocarbon group is optionally substituted with a halogen atom, —$R^3$, —$OR^4$, cyano group, or nitro group, —$CH_2$— contained in the alicyclic hydrocarbon group is optionally substituted with —O—, —S—, —NH—, or —$NR^5$—, and —CH(—)- contained in the alicyclic hydrocarbon group is optionally substituted with —N(—)-, wherein $R^3$, $R^4$, and $R^5$ each independently represent an alkyl group having 1 to 4 carbon atoms, provided that a hydrogen atom contained in the alkyl group is optionally substituted with a fluorine atom;
- $X^1$ and $X^2$ each independently represent a divalent alicyclic hydrocarbon group having 3 to 16 carbon atoms, provided that a hydrogen atom contained in the alicyclic hydrocarbon group is optionally substituted with a halogen atom, —$R^6$, —$OR^7$, cyano group, or nitro group, —$CH_2$— contained in the alicyclic hydrocarbon group is optionally substituted with —O—, —S—, —NH—, or —$NR^8$—, and —CH(—)- contained in the alicyclic hydrocarbon group is optionally substituted with —N(—)-, wherein $R^6$, $R^7$, and $R^8$ each independently represent an alkyl group having 1 to 4 carbon atoms, provided that a hydrogen atom contained in the alkyl group is optionally substituted with a fluorine atom;
- $F^1$, $F^2$, $Z^1$, and $Z^2$ each independently represent an alkanediyl group having 1 to 16 carbon atoms or a single bond, provided that a hydrogen atom contained in the alkanediyl group is optionally substituted with —$OR^9$ or a halogen atom and —$CH_2$— contained in the alkanediyl group is optionally replaced with —O— or —CO—, wherein $R^9$ represents an alkyl group having 1 to 4 carbon atoms, provided that a hydrogen atom contained in the alkyl group is optionally substituted with a fluorine atom; and
- $P^1$ and $P^2$ each independently represent a hydrogen atom or a polymerizable group, wherein at least one of $P^1$ and $P^2$ represents a polymerizable group.

15. The method according to claim 14, the method including a step of reacting the mixture containing the third carboxylic acid compound and first carboxylic acid compound with an alcohol compound represented by the following formula (F) to obtain the liquid crystal composition containing the first polymerizable liquid crystal compound and the second polymerizable liquid crystal compound:

HO—Ar—OH  (F)

wherein Ar represents a divalent aromatic group which may be substituted, the aromatic group containing at least one of a nitrogen atom, oxygen atom, and sulfur atom.

16. The method according to claim 14, wherein the amount of second the carboxylic acid compound based on 1 mol of the first carboxylic acid compound is 0.001 to 0.5 mol.

17. The method according to claim 14, wherein the reaction between the first carboxylic acid compound and second the carboxylic acid compound and/or the reaction between the alcohol compound and the mixture containing the first carboxylic acid compound and the third carboxylic acid compound is undergone in the presence of a condensing agent.

* * * * *